US011710469B2

(12) United States Patent
Mathur et al.

(10) Patent No.: US 11,710,469 B2
(45) Date of Patent: *Jul. 25, 2023

(54) DEPTH BASED FOVEATED RENDERING FOR DISPLAY SYSTEMS

(71) Applicant: Magic Leap, Inc., Plantation, FL (US)

(72) Inventors: Vaibhav Mathur, Weston, FL (US); Lionel Ernest Edwin, Hollywood, FL (US); Xiaoyang Zhang, Alviso, CA (US); Bjorn Nicolaas Servatius Vlaskamp, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,760

(22) Filed: Jan. 21, 2022

(65) Prior Publication Data

US 2022/0148538 A1 May 12, 2022

Related U.S. Application Data

(63) Continuation of application No. 16/355,603, filed on Mar. 15, 2019, now Pat. No. 11,238,836.
(Continued)

(51) Int. Cl.
*G09G 5/391* (2006.01)
*G06F 3/01* (2006.01)
*G06T 5/00* (2006.01)

(52) U.S. Cl.
CPC ............ *G09G 5/391* (2013.01); *G06F 3/013* (2013.01); *G06T 5/002* (2013.01);
(Continued)

(58) Field of Classification Search
None
See application file for complete search history.

(56) References Cited

U.S. PATENT DOCUMENTS

| 6,850,221 B1 | 2/2005 | Tickle |
| D514,570 S | 2/2006 | Ohta |

(Continued)

FOREIGN PATENT DOCUMENTS

| JP | 2017-500605 A | 1/2017 |
| WO | WO 2000/62543 | 10/2000 |

(Continued)

OTHER PUBLICATIONS

Invitation to Pay Additional Fees And, Where Applicable, Protest Fee for PCT Application No. PCT/US18/23619, mailed Jun. 8, 2018.
(Continued)

*Primary Examiner* — Hilina K Demeter
(74) *Attorney, Agent, or Firm* — Tobias Intellectual Property Law, PLLC

(57) ABSTRACT

Methods and systems for depth-based foveated rendering in the display system are disclosed. The display system may be an augmented reality display system configured to provide virtual content on a plurality of depth planes using different wavefront divergence. Some embodiments include determining a fixation point of a user's eyes. Location information associated with a first virtual object to be presented to the user via a display device is obtained. A resolution-modifying parameter of the first virtual object is obtained. A particular resolution at which to render the first virtual object is identified based on the location information and the resolution-modifying parameter of the first virtual object. The particular resolution is based on a resolution distribution specifying resolutions for corresponding distances from the fixation point. The first virtual object rendered at the identified resolution is presented to the user via the display system.

20 Claims, 108 Drawing Sheets

Related U.S. Application Data

(60) Provisional application No. 62/644,366, filed on Mar. 16, 2018.

(52) U.S. Cl.
CPC .......... *G09G 2320/0606* (2013.01); *G09G 2320/0613* (2013.01); *G09G 2340/0428* (2013.01); *G09G 2354/00* (2013.01)

(56) References Cited

U.S. PATENT DOCUMENTS

| | | |
|---|---|---|
| 8,950,867 B2 | 2/2015 | Macnamara |
| 9,081,426 B2 | 7/2015 | Armstrong |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 11,156,835 B2 | 10/2021 | Samec et al. |
| 2003/0194142 A1 | 10/2003 | Kortum et al. |
| 2004/0207635 A1 | 10/2004 | Miller et al. |
| 2004/0227699 A1 | 11/2004 | Mitchell |
| 2005/0232530 A1 | 10/2005 | Kekas |
| 2006/0007242 A1* | 1/2006 | Hill .............. G06F 3/1446 345/619 |
| 2006/0028436 A1 | 2/2006 | Armstrong |
| 2007/0081123 A1 | 4/2007 | Lewis |
| 2010/0056274 A1 | 3/2010 | Uusitalo et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0271454 A1 | 10/2013 | Lyons et al. |
| 2013/0300635 A1 | 11/2013 | White et al. |
| 2014/0071539 A1 | 3/2014 | Gao |
| 2014/0092006 A1 | 4/2014 | Boelter et al. |
| 2014/0140653 A1 | 5/2014 | Brown et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234462 A1 | 8/2015 | Miller et al. |
| 2015/0234463 A1 | 8/2015 | Miller et al. |
| 2015/0235429 A1 | 8/2015 | Miller et al. |
| 2015/0235433 A1 | 8/2015 | Miller et al. |
| 2015/0235434 A1 | 8/2015 | Miller et al. |
| 2015/0235435 A1 | 8/2015 | Miller et al. |
| 2015/0235610 A1 | 8/2015 | Miller et al. |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0070344 A1 | 3/2016 | Gohl |
| 2016/0170481 A1 | 6/2016 | Fateh |
| 2016/0327789 A1 | 11/2016 | Klug et al. |
| 2016/0328884 A1 | 11/2016 | Schowengerdt et al. |
| 2016/0364881 A1* | 12/2016 | Mallinson ............ G06T 7/70 |
| 2016/0379606 A1* | 12/2016 | Kollin .............. G03H 1/0005 345/428 |
| 2017/0091996 A1 | 3/2017 | Wei et al. |
| 2017/0109936 A1 | 4/2017 | Powderly et al. |
| 2017/0272737 A1 | 9/2017 | Jacobs et al. |
| 2017/0287111 A1 | 10/2017 | Makinen et al. |
| 2017/0287446 A1 | 10/2017 | Young et al. |
| 2017/0316609 A1 | 11/2017 | Dunn et al. |
| 2017/0373459 A1 | 12/2017 | Weng et al. |
| 2017/0374357 A1 | 12/2017 | Jacobs et al. |
| 2018/0090052 A1* | 3/2018 | Marsh .............. G09G 3/3406 |
| 2018/0095284 A1 | 4/2018 | Welch et al. |
| 2018/0129282 A1 | 5/2018 | Sinay et al. |
| 2018/0136471 A1 | 5/2018 | Miller et al. |
| 2018/0227630 A1* | 8/2018 | Schmidt ............ H04N 21/4223 |
| 2018/0275410 A1 | 9/2018 | Yeoh et al. |
| 2018/0284451 A1* | 10/2018 | Eash ................ G09G 3/002 |
| 2018/0292896 A1* | 10/2018 | Hicks .............. G06F 3/013 |
| 2019/0026874 A1 | 1/2019 | Jin et al. |
| 2019/0068960 A1 | 2/2019 | Jacobs et al. |
| 2019/0285897 A1 | 9/2019 | Topliss et al. |
| 2019/0287495 A1 | 9/2019 | Mathur |

FOREIGN PATENT DOCUMENTS

| | | |
|---|---|---|
| WO | WO 2014/164901 | 10/2014 |
| WO | WO 2015/184412 | 12/2015 |
| WO | WO 2017/025487 | 2/2017 |
| WO | WO 2017/031246 | 2/2017 |
| WO | WO 2018/089329 | 5/2018 |
| WO | WO 2018/094086 | 5/2018 |
| WO | WO 2018/175625 | 9/2018 |
| WO | WO 2019/178566 | 9/2019 |
| WO | WO 2020/033875 | 2/2020 |

OTHER PUBLICATIONS

International Search Report and Written Opinion for PCT Application No. PCT/US18/23619, dated Aug. 3, 2018.
International Preliminary Report on Patentability for PCT Application No. PCT/US18/23619, dated Sep. 24, 2019.
International Search Report and Written Opinion for PCT Application No. PCT/US19/22619, dated May 24, 2019.
International Preliminary Report on Patentability for PCT Application No. PCT/US19/22619, dated Sep. 22, 2020.
"Telescope images are degraded by the blurring effects of the atmosphere and by light pollution" Chapter 6-3 https://web.archive.org/web/20160726162320/http://www.public.asu.edu/~atpcs/atpcs/Univ10e/chapter06-03.html as archived Jul. 26, 2016 in 2 pages.
"The Telescopic Eye", Telescope-Optics.net, archived Jul. 21, 2016, in 5 pages. URL: https://web.archive.org/web/20160721003510/https://www.telescope-optics.net/eye.htm.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Binocular Visual Field, URL: https://www.med.kindai.ac.jp/optho/english/olaboratory.html Jun. 2016 in 1 page.

(56) References Cited

OTHER PUBLICATIONS

Brunelli, Roberto, Template Matching Techniques in Computer Vision, Theory and Practice, pp. 25-28, published 2009.
Cornish et al., "Distribution of short-wavelength-sensitive cones in human fetal and postnatal retina: early development of spatial order and density profiles" Science Direct, Vision Research 44, 2004, in 8 pages.
Escuti, M. et al., "39.4: Polarization-independent switching with high contrast from a liquid crystal polarization grating", SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
Gilliam, C., "Can VR Justify QHD and 4K Displays?", XDA Developers, Feb. 11, 2015, https://web.archive.org/web/20170804164547/https://www.xda-developers.com/can-vr-justify-qhd-and-4k-displays/ as archived Aug. 4, 2017, in 7 pages.
HyperPhysics Concepts, Department of Physics and Astronomy, Georgia State University, https://web.archive.org/web/20170122201515/http://hyperphysics.phy-astr.gsu.edu/hbase/index.html as archived Jan. 22, 2017 in 5 pages.
HyperPhysics, "The Color-Sensitive Cones" http://hyperphysics.phyastr.gsu.edu/hbase/vision/colcon.html printed Apr. 1, 2019 in 2 pages.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
KentOptronics, "Liquid Crystal Switchable Mirror,"—brochure in 2 pages, 2014.
Kim, J. et al., "Wide-angle, nonmechanical beam steering with high throughput utilizing polarization gratings", Applied Optics, vol. 50, No. 17, Jun. 10, 2011, in 4 pages.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, nonlinear, and soft matter physics, May 25, 2007, in 8 pages.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-independent modulation for projection displays using small-period LC polarization gratings", Journal of the Society for information display, vol. 15, No. 8, pp. 589-594, Aug. 2007, in 7 pages.
Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.
Nikolova et al., "Diffraction Efficiency and Selectivity of Polarization Holographic Recording", Optica Acta: Int'l J Optics (1984) 31(5):579-588.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh, C. et al., "Numerical analysis of polarization gratings using the finite-difference time-domain method", Physical review A, vol. 76, Oct. 12, 2007, in 8 pages.
Oh, C. et al., "Polarization-Independent Modulation using Standard LCDs and Polymer PGs", 2008, in 6 pages.
Oh, C. et al., 16.2: Polarization-Independent Modulation Using Standard Liquid Crystal Microdisplays and Polymer Polarization Gratings, IDRC, 2008, in 4 pages.
Physiological Principles for the Effective Use of Color, https://web.archive.org/web/20160730010600/https://www.siggraph.org/education/materials/HyperGraph/color/coloreff.htm as archived Jul. 30, 2016 in 4 pages.
Snowbrains.com, Illustration Blind Spot, as archived May 18, 2015 in 1 page, https://web.archive.org/web/20150518201835/https://snowbrains.com/wp-content/uploads/2013/07/illustration-blind-spot.gif.
Super-resolution 3D Microscopy of Whole Cells Opens New Window for Scientists https://web.archive.org/web/20160829070151/https://www.medgadget.com/2016/07/super-resolution-3d-microscopy-whole-cells-opens-new-window-scientists.html as archived Aug. 29, 2016 and printed Apr. 16, 2019.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Webvision, Graph of Rod and Cone Densities along the Horizontal Meridian, https://web.archive.org/web/20170117221526/https://webvision.med.utah.edu/imageswv/Ostergr.jpeg as archived Jan. 17, 2017 in 1 page.
Webvision, Isodensity Maps of Cone Densities (X1000) in the Human Retina, as archived Jul. 22, 2016 in 1 page, https://web.archive.org/web/20160722041212/http://webvision.med.utah.edu/imageswv/Curciopl.jpeg.
Wikipedia, "Angular Resolution", https://web.archive.org/web/20170130060614/https://en.wikipedia.org/wiki/Angular_resolution as archived Jan. 30, 2017 in 4 pages.
Wikipedia, "Crowding", https://web.archive.org/web/20161120032119/https://en.wikipedia.org/wiki/Crowding as archived Nov. 20, 2016 in 2 pages.
Wikipedia: "Adaptation", Wikipedia, printed Jul. 11, 2017, in 9 pages. URL: https://en.wikipedia.org/wiki/Adaptation_(eye).
Wikipedia: "Peripheral vision", Wikipedia, as archived Aug. 3, 2017, in 6 pages. URL: https://web.archive.org/web/20170803223449/https://en.wikipedia.org/wiki/Peripheral_vision.
Telescope-optics.net, "Eye Chromatism", https://web.archive.org/web/20160310131809/http://www.telescope-optics.net/eye_chromatism.htm as archived Mar. 10, 2016 in 5 pages.
"Eye Chromatism", Telescope-Optics.net, archived Mar. 10, 2016, in 5 pages. URL: http://web.archive.org/web/20160310131809/http://www.telescopeoptics.net/eye_chromatism.htm.
Telescope-optics.net., "Eye Spectral Response", URL: http://www.telescopeoptics.net/eye_spectral_response.htm retrieved Jul. 11, 2017 in 9 pages.
Wikipedia, "Fovea Centralis," https://web.archive.org/web/20170120175611/https://en.wikipedia.org/wiki/Fovea_centralis as archived Jan. 20, 2017 in 8 pages.
Sunnex Biotechnologies, "The Role of Blue Light in the Pathogenesis of AMD" https://web.archive.org/web/20160820011045/http://www.sunnexbiotech.com/therapist/blue%20light%20and%20amd.html as archived Aug. 20, 2016 in 20 pages.
Guenter, et al., "Foveated 3D Graphics," ACM Transactions on Graphics, Nov. 2012.

\* cited by examiner

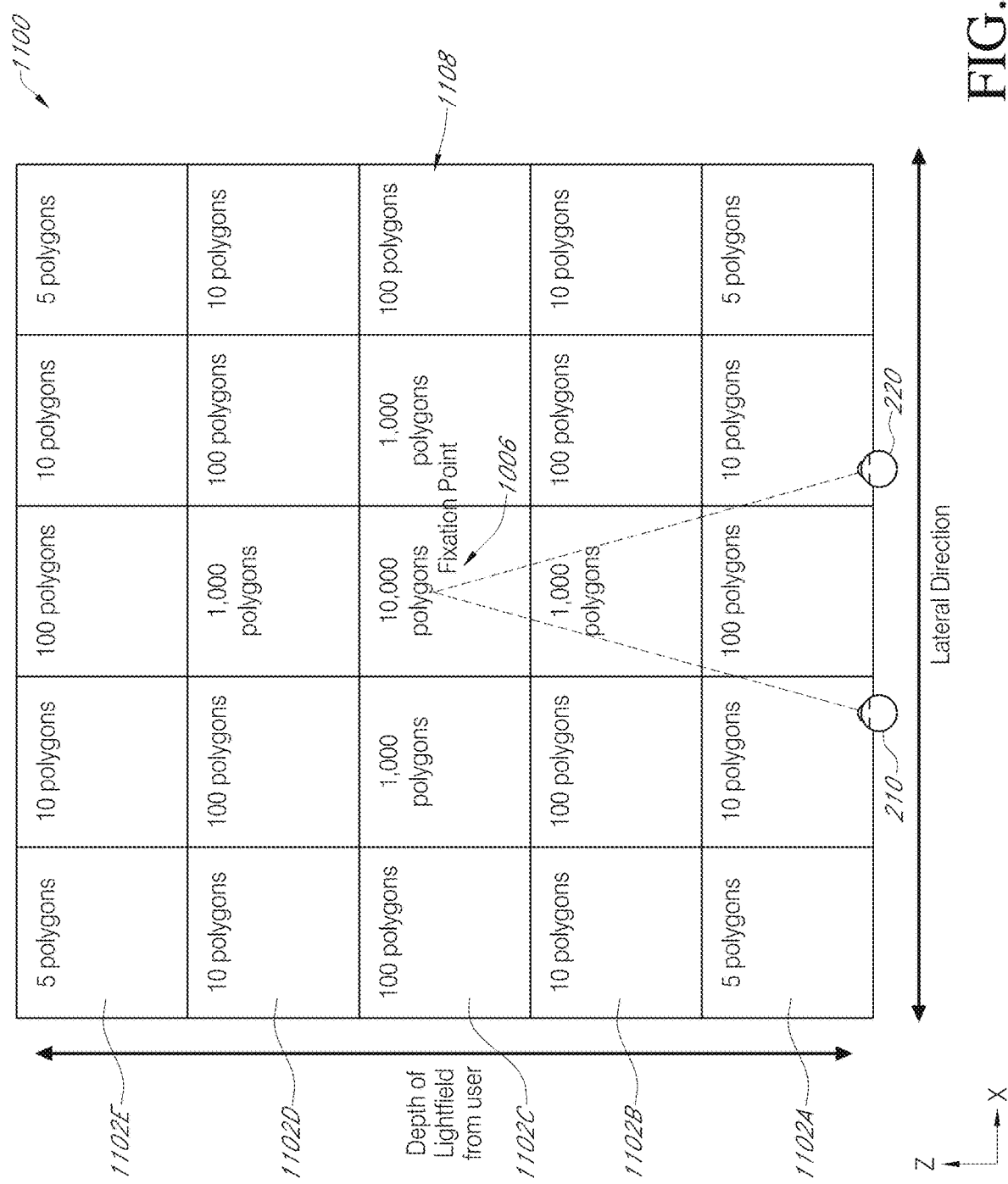
FIG. 11A1

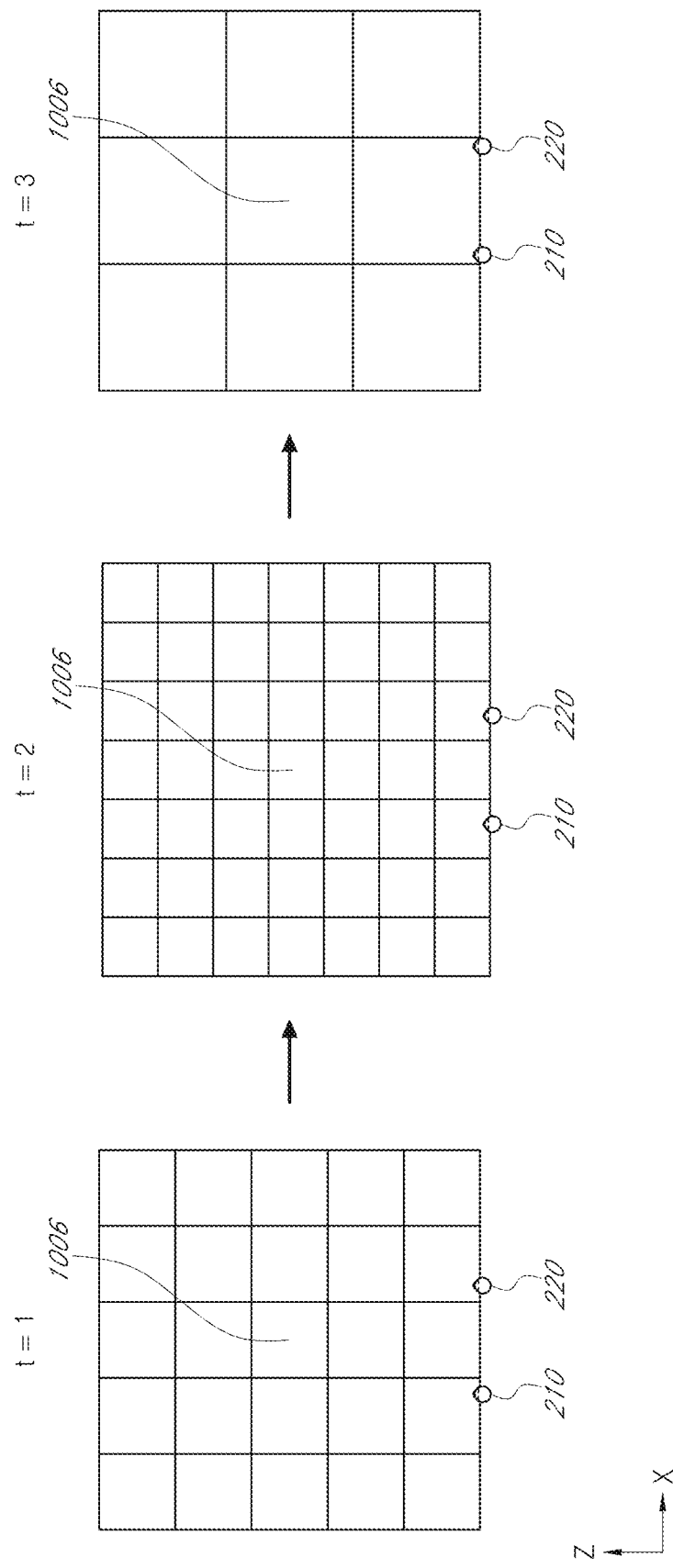
FIG. 11A2

DEPTH BASED FOVEATED RENDERING FOR DISPLAY SYSTEMS

PRIORITY CLAIM

This application is a continuation of U.S. application Ser. No. 16/355,603, filed on Mar. 15, 2019, which claims the benefit of priority of U.S. Provisional Application No. 62/644,366, filed on Mar. 16, 2018, the entirety of which is incorporated herein by reference.

INCORPORATION BY REFERENCE

This application incorporates by reference the entirety of each of the following patent applications and publications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 15/902,927 filed on Feb. 22, 2018; U.S. Provisional Application No. 62/475,012 filed on Mar. 22, 2017; and U.S. Provisional Application No. 62/539,934 filed on Aug. 1, 2017.

BACKGROUND

Field

The present disclosure relates to display systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments, a system comprises one or more processors and one or more computer storage media storing instructions that when executed by the one or more processors, cause the one or more processors to perform operations. The operations comprise monitoring, based on information detected via one or more sensors, eye movements of a user. A fixation point at which the user's eyes are fixating is determined based on the eye movements, with the fixation point being a three-dimensional location in a field of view of the user. The operations include obtaining location information associated with one or more virtual objects to present to the user, the location information indicating three-dimensional positions of the virtual objects. The operations also include adjusting resolutions of at least one virtual object based, at least in part, on a proximity of the at least one virtual object to the fixation point. The operations also include causing a presentation to the user, via a display, of the virtual objects, with at least one virtual object being rendered according to the adjusted resolution.

According to some embodiments, a display system comprises a display device configured to present virtual content to a user, one or more processors, and one or more computer storage media storing instructions that when executed by the system, cause the system to perform operations. The operations comprise monitoring information associated with eye movements of the user. A fixation point within a display frustum of the display device is determined based on the monitored information, the fixation point indicating a three-dimensional location being fixated upon by eyes of the user. The operations also include presenting virtual content at three-dimensional locations within the display frustum based on the determined fixation point, with the virtual content being adjusted in resolution based on a proximity of the virtual content from the fixation point.

According to some other embodiments, a method comprises monitoring, based on information detected via one or more sensors, eye movements of a user. A fixation point at which the user's eyes are fixating is determined based on the eye movements, with the fixation point being a three-dimensional location in a field of view of the user. Location information associated with one or more virtual objects to present to the user is obtained, the location information indicating three-dimensional positions of the virtual objects. The resolution of at least one virtual object is adjusted based, at least in part, on a proximity of the at least one virtual object to the fixation point. The method also includes causing presentation to the user, via a display, of the virtual objects, with at least one virtual object being rendered according to the adjusted resolution.

According to some embodiments, a display system comprises a frame configured to mount on a head of a user, a light modulating system configured to output light to form images, and one or more waveguides attached to the frame and configured to receive the light from the light modulating system and to output the light across a surface of the one or more waveguides. The system also comprises one or more processors, and one or more computer storage media storing instructions that, when executed by the one or more processors, cause the one or more processors to perform various operations. The operations include determining an amount of light reaching a retina of an eye of the user; and adjusting resolution of virtual content to be presented to the user based on the amount of light reaching the retina.

According to some other embodiments, a display system comprises one or more processors; and one or more computer storage media storing instructions. When the instructions are executed by the one or more processors, they cause the one or more processors to perform various operations. The operations include determining an amount of light reaching a retina of an eye of a user of the display system; and adjusting resolution of virtual content to be presented to the user based on the amount of light reaching the retina.

According to some embodiments, a method is performed by a display system comprising one or more processors and a head-mountable display. The method comprises determining an amount of light reaching a retina of an eye of a user of the display system; and adjusting resolution of virtual content to be presented to the user based on the amount of light reaching the retina.

According to some other embodiments, a display system comprises a frame configured to mount on a head of a user; and light modulating system; one or more waveguides; one or more processors; and one or more computer storage media storing instructions. The light modulating system is configured to output light to form images. The one or more waveguides are attached to the frame and configured to receive the light from the light modulating system and to output the light across a surface of the one or more waveguides. The one or more computer storage media store instructions that, when executed by the one or more processors, cause the one or more processors to perform various operations. The operations comprise adjusting a resolution of component color images forming virtual content based on: a proximity of the virtual content from a user fixation point; and a color of the component color image. At least one of the component color images differs in resolution from component color images of another color.

According to yet other embodiments, a display system comprises one or more processors; and one or more computer storage media storing instructions. When the instructions are executed by the one or more processors, they cause the one or more processors to perform various operations. The operations include adjusting a resolution of component color images forming virtual content based on: a proximity of the virtual content from a user fixation point; and a color of the component color image, wherein at least one of the component color images differs in resolution from component color images of another color.

According to some other embodiments, a method is performed by a display system comprising one or more processors and a head-mountable display. The method comprises adjusting a resolution of component color images forming virtual content based on: a proximity of the virtual content from a user fixation point; and a color of the component color image, wherein at least one of the component color images differs in resolution from component color images of another color.

According to yet other embodiments, a display system comprises an image source comprising a spatial light modulator for providing a first image stream and a second image stream; a viewing assembly; one or more processors in communication with the image source; and one or more computer storage media storing instructions that, when executed by the one or more processors, cause the one or more processors to perform various operations. The viewing assembly comprises light guiding optics for receiving the first and second image streams from the image source and outputting the first and second image streams to a user. The various operations performed by the one or more processors comprise causing the image source to output the first image stream to the viewing assembly, wherein images formed by the first image stream have a first pixel density; and causing the image source to output the second image stream to the viewing assembly. The images formed by the second image stream have a second pixel density that is greater than the first pixel density, and correspond to portions of images provided by the first image stream. Images formed by the second image stream overlie corresponding portions of a field of view of provided by the first image stream.

According to some embodiments, a wearable display system may include an afocal magnifier with circular polarization handedness dependent magnification. The afocal magnifier may include a first fixed focal length lens element, a first geometric phase lens that exhibits a positive refractive power for a first handedness of incident circularly polarized light and exhibits a negative refractive power for a second handedness of incident circularly polarized light, and a second geometric phase lens.

According to some other embodiments, an optical subsystem for a wearable image projector may include a polarization selective reflector and a set of four lens elements positioned about the polarization selective reflector.

According to some other embodiments, a display system for projecting images to an eye of a user may include an eyepiece. The eyepiece may include a waveguide, and an in-coupling grating optically coupled to the waveguide. The display system may further include a first image source configured to project a first light beam associated with a first image stream. The first image stream may have a first field of view and may be incident on a first surface of the in-coupling grating. A portion of the first light beam may be coupled into the waveguide by the in-coupling grating for positioning the first image stream in a fixed position to the eye of the user. The display system may further include a second image source configured to project a second light beam associated with a second image stream. The second image stream may have a second field of view that is narrower than the first field of view. The display system may further include a scanning mirror configured to receive and reflect the second light beam such that the second light beam is incident on a second surface of the in-coupling grating opposite to the first surface thereof. A portion of the second light beam may be coupled into the waveguide by the in-coupling grating. The display system may further include an eye-gaze tracker configured to detect movement of the eye of the user, and control circuitry in communication with the eye gaze tracker and the scanning mirror. The control circuitry may be configured to position the scanning mirror such that a position of the second image stream is moved in accordance with the detected movement of the eye of the user.

According to some other embodiments, a display system for projecting images to an eye of a user may include an eyepiece. The eyepiece may include a waveguide, and an in-coupling grating optically coupled to the waveguide. The display system may further include an image source configured to project a first light beam associated with a first image stream in a first polarization, and a second light beam associated with a second image stream in a second polarization different from the first polarization. The first image stream may have a first field of view and the second image stream may have a second field of view that is narrower than the first field of view. The first light beam and the second light beam may be multiplexed. The display system may further include a polarization beam splitter configured to receive and reflect the first light beam along a first optical path, and receive and transmit the second light beam along a second optical path. The display system may further include a first optical reflector positioned along the first optical path and configured to receive and reflect the first light beam such that the first light beam is incident on a first surface of the in-coupling grating. A portion of the first light beam may be coupled into the waveguide by the in-coupling grating for positioning the first image stream in a fixed position to the eye of the user. The display system may further include a scanning mirror disposed along the second optical path and configured to receive and reflect the second light beam, and a second optical reflector positioned along the second optical path downstream from the scanning mirror. The second optical reflector may be configured to receive and reflect the second light beam such that the second light beam is incident on a second surface of the in-coupling grating opposite the first surface thereof. A portion of the second light beam may be coupled into the waveguide by the in-coupling grating. The display system may further include an eye-gaze tracker configured to detect movement of the eye of the user, and control circuitry in communication with the eye gaze tracker and the scanning mirror. The control circuitry may be configured to position the scanning mirror such that a position of the second image stream is moved in accordance with the detected movement of the eye of the user.

According to some other embodiments, a display system for projecting images to an eye of a user may include a waveguide, an image source configured to project a first light beam associated with a first image stream in a first polarization and a second light beam associated with a second image stream in a second polarization different from the first polarization. The first image stream may have a first field of view, and the second image stream having a second field of view that is narrower than the first field of view. The first light beam and the second light beam may be multiplexed. The display system may further include a polarization beam splitter configured to receive and reflect the first light beam along a first optical path, and to receive and transmit the second light beam along a second optical path. The display system may further include a first in-coupling prism positioned along the first optical path and adjacent a first surface of the waveguide. The first in-coupling prism may be configured to couple a portion of the first light beam into the waveguide for positioning the first image stream in a fixed position to the eye of the user. The display system may further include a scanning mirror disposed along the second optical path and configured to receive and reflect the second light beam. The display system may further include a second in-coupling prism positioned along the second optical path downstream from the scanning mirror and adjacent a second surface of the waveguide opposite to the first surface of the waveguide. The second in-coupling prism may be configured to couple a portion of the second light beam into the waveguide. The display system may further include an eye-gaze tracker configured to detect movement of the eye of the user, and control circuitry in communication with the eye gaze tracker and the scanning mirror. The control circuitry may be configured to position the scanning mirror such that a position of the second image stream is moved in accordance with the detected movement of the eye of the user According to an embodiment, a display system for projecting images to an eye of a user includes an image source. The image source can be configured to project a first light beam associated with a first image stream in a first polarization, and a second light beam associated with a second image stream in a second polarization different from the first polarization. The first image stream can have a first field of view, and the second image stream can have a second field of view that is narrower than the first field of view. The first light beam and the second light beam can be multiplexed. The display system can further include a polarization beam splitter. The polarization beam splitter can be configured to receive and reflect the first light beam along a first optical path toward a viewing assembly for positioning the first image stream in a fixed position to the eye of the user, and receive and transmit the second light beam along a second optical path. The display system can further include a scanning mirror disposed along the second optical path and configured to receive and reflect the second light beam toward the viewing assembly. The display system can further include an eye-gaze tracker configured to detect movement of the eye of the user, and control circuitry in communication with the eye gaze tracker and the scanning mirror. The control circuitry can be configured to position the scanning mirror such that a position of the second image stream is moved in accordance with the detected movement of the eye of the user.

According to another embodiment, a display system for projecting images to an eye of a user include an image source. The image source can be configured to project a first light beam associated with a first image stream and a second light beam associated with a second image stream. The first image stream can have a first field of view, and the second image stream can have a second field of view that is narrower than the first field of view. The first light beam and the second light beam can be multiplexed. The display system can further include a scanning mirror configured to receive and reflect the first light beam and the second light beam toward a viewing assembly for projecting the first image stream and the second image stream. The display system can further include an eye-gaze tracker configured to detect movement of the eye of the user, and control circuitry in communication with the eye gaze tracker and the scanning mirror. The control circuitry can be configured to position the scanning mirror such that a position of the first image stream and a position of the second image stream are moved in accordance with the detected movement of the eye of the user. The display system can further include a switchable optical element disposed in an optical path of the first light beam and the second light beam. The switchable optical element can be configured to be switched to a first state for the first light beam such that the first light beam is angularly magnified by a first angular magnification, and be switched to a second state for the second light beam such that the second light beam is angularly amplified by a second angular magnification that is less than the first angular magnification.

In some embodiments, a display system comprises one or more processors and one or more computer storage media storing instructions that when executed by the one or more processors, cause the one or more processors to perform operations. The operations comprise determining a fixation point of a user's eyes; obtaining location information associated with a first virtual object to be presented to the user via a display device; obtaining a resolution-modifying parameter of the first virtual object; identifying, based on the location information and the resolution-modifying parameter of the first virtual object, a particular resolution at which to render the first virtual object, wherein the particular resolution is based on a resolution distribution specifying resolutions for corresponding distances from the fixation point; and causing presentation to the user, via the display device, of the first virtual object rendered at the identified resolution.

In some embodiments, a computer-implemented method is provided. The method is performed by a display system of one or more processors. The method comprises determining a fixation point of a user's eyes; obtaining location information associated with a first virtual object to be presented to the user via a display device; obtaining a resolution-modifying parameter of the first virtual object; identifying, based on the location information and the resolution-modifying parameter of the first virtual object, a particular resolution at which to render the first virtual object, wherein the particular resolution is based on a resolution distribution specifying resolutions for corresponding distances from the fixation point; and causing presentation to the user, via the display device, of the first virtual object rendered at the identified resolution.

In some embodiments, a non-transitory computer storage media is provided. The computer storage media stores instructions that when executed by a display system of one or more processors, cause the one or more processors to perform operations. The operations comprise determining a fixation point of a user's eyes; obtaining location information associated with a first virtual object to be presented to the user via a display device; obtaining a resolution-modifying parameter of the first virtual object; identifying, based on the location information and the resolution-modifying parameter of the first virtual object, a particular resolution at which to render the first virtual object, wherein the particular resolution is based on a resolution distribution specifying resolutions for corresponding distances from the fixation point; and causing presentation to the user, via the display device, of the first virtual object rendered at the identified resolution.

Additional examples of embodiments are provided below.

1. A display system comprising:
   one or more processors; and
   one or more computer storage media storing instructions that when executed by the one or more processors, cause the one or more processors to perform operations comprising:
      determining a fixation point of a user's eyes;
      obtaining location information associated with a first virtual object to be presented to the user via a display device;
      obtaining a resolution-modifying parameter of the first virtual object;
      identifying, based on the location information and the resolution-modifying parameter of the first virtual object, a particular resolution at which to render the first virtual object, wherein the particular resolution is based on a resolution distribution specifying resolutions for corresponding distances from the fixation point; and
      causing presentation to the user, via the display device, of the first virtual object rendered at the identified resolution.

2. The display system of example 1, wherein the resolution-modifying parameter comprises a content type associated with the first virtual object, wherein the operations further comprise:
   accessing a plurality of resolution distributions, the resolution distributions associated with respective virtual content types; and
   selecting, from the plurality of resolution distributions, a particular resolution distribution based on the content type of the first virtual object, wherein the particular resolution comprises the particular resolution distribution.

3. The display system of example 3, wherein the virtual content type associated with the first virtual object is identified based on a frequency spectrum associated with the first virtual object.

4. The display system of example 3, wherein the plurality of resolution distributions are associated with respective rollofs in resolution away from the fixation point, wherein values of the rollofs differ for content with different frequency spectrums.

5. The display system of example 1, wherein the resolution-modifying parameter is a user selectable value.

6. The display system of example 5, wherein the display device is configured to adjust the particular resolution, and wherein adjusting the particular resolution comprises:
   causing presentation to the user, via the display device, of a second virtual object, the second virtual object being rendered with the resolution distribution identified for the first virtual object;
   receiving, from the user, a response indicating user detection of reduction in resolution of the second virtual object, wherein the user response is the user selectable value; and
   adjusting the particular resolution distribution.

7. The display system of example 6, wherein adjusting the particular resolution distribution comprises:
   adjusting a rolloff associated with the particular resolution distribution, wherein adjusting a rolloff changes an amount of resolution reduction based on angular distance from the center of the field of view of the user.

8. The display system of example 1, wherein the fixation point is in a volume at the center of the field of view of the user.

9. The display system of example 1, wherein the field of view of the user is separated into a plurality of portions based on the resolution distribution, the plurality of portions including the first portion, wherein each portion encompasses a respective range of angular distances from the center of the field of view, and wherein each portion is assigned an associated resolution at which to render virtual content.

10. The display system of example 9, wherein the operations further comprise:
    determining a proximity of the first virtual object to a boundary of one of the plurality of portions; and
    modifying a presentation of the first virtual objected based on the determined proximity.

11. The display system of example 9, wherein modifying a presentation of the first virtual objected based on the determined proximity comprises applying a blurring process to the virtual object.

12. The display system of example 9, wherein identifying a particular resolution at which to render the first virtual object comprises:
    identifying a second portion of the plurality of portions which encompasses the first virtual object; and
    identifying the resolution based on the second portion.

13. A computer-implemented method, the method being performed by a display system of one or more processors, and the method comprising:

determining a fixation point of a user's eyes;
obtaining location information associated with a first virtual object to be presented to the user via a display device;
obtaining a resolution-modifying parameter of the first virtual object;
identifying, based on the location information and the resolution-modifying parameter of the first virtual object, a particular resolution at which to render the first virtual object, wherein the particular resolution is based on a resolution distribution specifying resolutions for corresponding distances from the fixation point; and
causing presentation to the user, via the display device, of the first virtual object rendered at the identified resolution.

14. The computer-implemented method of example 13, wherein the resolution-modifying parameter comprises a content type associated with the first virtual object, wherein the method further comprises:
accessing a plurality of resolution distributions, the resolution distributions associated with respective virtual content types; and
selecting, from the plurality of resolution distributions, a particular resolution distribution based on the content type of the first virtual object, wherein the particular resolution comprises the particular resolution distribution.

15. The computer-implemented method of example 14, wherein the virtual content type associated with the first virtual object is identified based on a frequency spectrum associated with the first virtual object.

16. The computer-implemented method of example 14, wherein the plurality of resolution distributions are associated with respective rolloffs in resolution away from the fixation point, wherein values of the rolloffs differ for content with different frequency spectrums.

17. Non-transitory computer storage media storing instructions that when executed by a display system of one or more processors, cause the one or more processors to perform operations comprising:
determining a fixation point of a user's eyes;
obtaining location information associated with a first virtual object to be presented to the user via a display device;
obtaining a resolution-modifying parameter of the first virtual object;
identifying, based on the location information and the resolution-modifying parameter of the first virtual object, a particular resolution at which to render the first virtual object, wherein the particular resolution is based on a resolution distribution specifying resolutions for corresponding distances from the fixation point; and
causing presentation to the user, via the display device, of the first virtual object rendered at the identified resolution.

18. The computer storage media of example 17, wherein the resolution-modifying parameter comprises a content type associated with the first virtual object, wherein the operations further comprise:
accessing a plurality of resolution distributions, the resolution distributions associated with respective virtual content types; and
selecting, from the plurality of resolution distributions, a particular resolution distribution based on the content type of the first virtual object, wherein the particular resolution comprises the particular resolution distribution.

19. The computer storage media of example 18, wherein the virtual content type associated with the first virtual object is identified based on a frequency spectrum associated with the first virtual object.

20. The computer storage media of example 18, wherein the plurality of resolution distributions are associated with respective rolloffs in resolution away from the fixation point, wherein values of the rolloffs differ for content with different frequency spectrums.

BRIEF DESCRIPTION OF THE DRAWINGS

FIG. 11A1 illustrates an example of a representation of a top-down view of adjustments in resolution in different resolution adjustment zones based on three-dimensional fixation point tracking.

FIG. 11A2 illustrates examples of representations of top-down views of resolution adjustment zones at different times as the sizes and numbers of the zones change.

DETAILED DESCRIPTION

Figure 1:
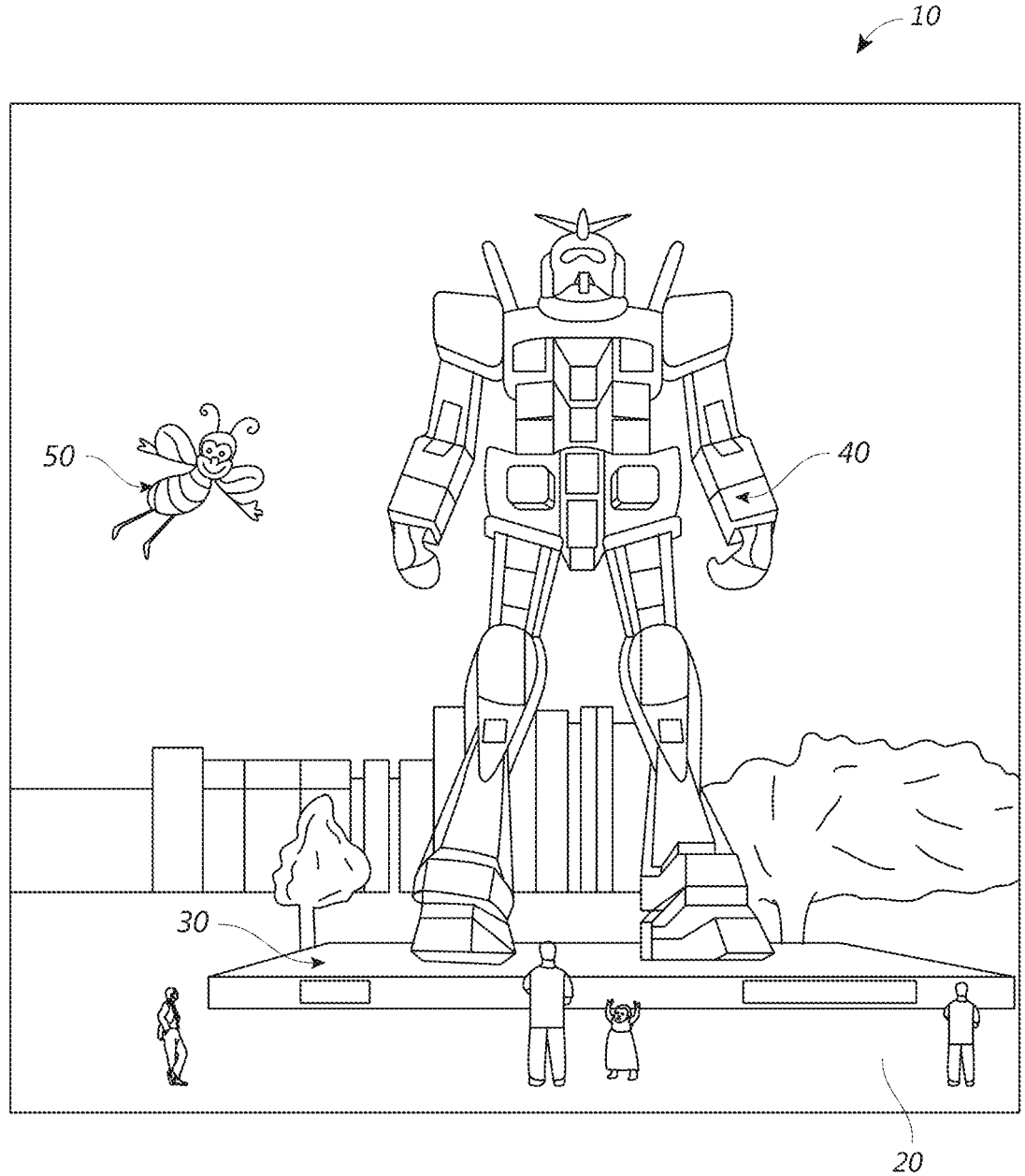
FIG. 1 illustrates a user's view of augmented reality (AR) through an AR device.

Rendering virtual content for augmented and virtual display systems is computationally intensive. Among other things, the computational intensity may undesirably use large amounts of memory, cause high latency, and/or may require the use of powerful processing units that may have high cost and/or high energy-consumption.

In some embodiments, methods and systems conserve computational resources, such as memory and processing time, by reducing the resolution of virtual content positioned at locations away from the fixation point of the user's eyes. For example, the system may render virtual content at a relative high (e.g., a highest) resolution at or proximate a fixation point of the user's eyes, while utilizing one or more lower resolutions for virtual content away from the fixation point. The virtual content is presented by a display system that can display virtual content on a plurality of different depths (e.g., a plurality of different depth planes, such as two or more depth planes), and the reduction in resolution preferably occurs along at least the z axis, where the z-axis is the depth axis (corresponding to distance away from the user). In some embodiments, the resolution reduction occurs along the z-axis and one or both of the x and y axes, where the x-axis is the lateral axis, and the y-axis is the vertical axis.

Determining the appropriate resolution of the virtual content may include determining the fixation point, in three-dimensional space, of a user's eyes. For example, the fixation point may be an x, y, z, coordinate in a field of view of the user, upon which the user's eyes are fixated. The display system may be configured to present virtual objects that have differences in resolution, with the resolution decreasing with decreasing proximity of a virtual object to the fixation point; stated another way, the resolution decreases with increasing distance from the fixation point.

As discussed herein, the display system may present virtual objects within a display frustum of the display system, with the virtual objects capable of being presented on different depth planes. In some embodiments, the display frustum is the field of view provided by the display system, over which the display system is configured to present virtual content to the user of the display system. The display system may be a head-mounted display system including one or more waveguides which may present virtual content (e.g., virtual objects, graphics, text, and so on), with the one or more waveguides configured to output light with different wavefront divergence and/or different binocular disparity corresponding to the different depth planes (e.g., corresponding to particular distances from the user). It will be appreciated that each eye may have an associated one or more waveguides. Using the different wavefront divergence and/or different binocular disparity, the display system may cause a first virtual object to appear to be located at a first depth in the user's field of view, while causing a second virtual object to appear to be located at a second depth in the user's field of view. In some embodiments, the depth plane of or a close depth plane to the fixation point may be determined and the resolution of content on other depth planes may be reduced based on distance of those depth planes to the depth plane on which the fixation point is disposed. It will be appreciated that references to the depth of virtual content herein (the distance of the virtual content from the user on the z-axis) refer to the apparent depth of the virtual content as intended to be seen to the user; in some embodiments, the depth of the virtual object may be understood to be the distance from the user of a real object having wavefront divergence and/or binocular disparity similar to that of the virtual object.

It will be appreciated that the proximity of a virtual object to the fixation point may be determined by various measures, non-limiting examples of which include determining the distance between the fixation point and the virtual object, determining the resolution adjustment zone occupied by the virtual object relative to a resolution adjustment zone occupied by the fixation point (in embodiments where the user's field of view is subdivided into resolution adjustment zones as described below), and determining the angular proximity of the virtual object to the fixation point of the user. The proximity may also be determined using a combination of the above-noted techniques. For example, the distance and/or angular proximity of a first zone (in which a virtual object is located) to a second zone (in which the fixation point is located) may be used to determine proximity. These various measures are further discussed below.

In some embodiments, determining the fixation point may include anticipating the fixation point of the user's eyes and utilizing the anticipated fixation point as the fixation point for determining the resolution of virtual content. For example, the display system may render particular content at a relatively high resolution with the expectation that the user's eyes will fixate on that content. As an example, it will be appreciated that the human visual system may be sensitive to sudden changes in a scene (e.g., sudden motion, changes in luminance, etc.). In some embodiments, the display system may determine that the virtual content is of a type (e.g., involving motion in a scene in which other virtual and real objects are still) that would cause the user's eyes to fixate on it, and then render that virtual content at high resolution with the expectation that the user's eyes will subsequently focus on that virtual content.

As noted above, in some embodiments, the distance from the determined fixation point to a virtual object may correspond to a distance extending in three-dimensions. As an example, a first virtual object located on a same depth from the user (e.g., at the same depth plane) as the determined fixation point, but located horizontally or longitudinally from the fixation point, may be similarly reduced in resolution as a second virtual object located at a further depth (e.g., a further depth plane) from the determined fixation point. Consequently, different resolutions may be associated with different distances from the fixation point.

In some embodiments, the environment around the user may be broken into volumes of space (herein also referred to as resolution adjustment zones) with the resolution of virtual objects in the same resolution adjustment zone being similar. The resolution adjustment zones may have arbitrary three-dimensional shapes, e.g., cubes, or other three-dimensional polygonal shapes, or curved three-dimensional shapes, as described herein. In some embodiments, all resolution adjustment zones have similar shapes, e.g., cuboid or spherical. In some other embodiments, different resolution adjustment zones may have different shapes or sizes (e.g., the shapes and/or sizes of the volumes may change with distance from the fixation point).

In some embodiments, the resolution adjustment zones are portions of the user's field of view. For instance, the field of view of the user may be separated into volumes of space forming the resolution adjustment zones. In some embodiments, each depth plane may be subdivided into one or more contiguous volumes of space, that is, one or more resolution adjustment zones. In some embodiments, each resolution adjustment zone can encompass a particular range of depths from the user (e.g., a depth plane value+/−a variance, wherein examples of variances include 0.66 dpt, 0.50 dpt, 0.33 dpt, or 0.25 dpt), and a particular lateral and a particular vertical distance. Virtual objects located within the same resolution adjustment zone as the determined fixation point may be presented (e.g., rendered) at a high (e.g., full) resolution, while virtual objects located in volumes of space outside of the fixation point's resolution adjustment zone may be rendered at lesser resolutions according to a distance of the volumes from the fixation point's volume of space. In some embodiments, each resolution adjustment zone may be assigned a particular resolution (e.g., a particular reduction in resolution relative to the full resolution) and virtual content falling within a given zone may be rendered at the associated resolution for that zone. In some embodiments, the distance between a volume and the volume occupied by the fixation point may be determined, and the resolution may be set based upon this distance.

Advantageously, the number and sizes of the resolution adjustment zones utilized to break up a user's field of view may be modified according to a confidence in the user's determined fixation point. For example, the size associated with each volume of space may be increased or decreased based on the confidence that the user's gaze is verging on a precise point in three-dimensional space. If a confidence in the fixation point is high, the display system may present only virtual objects within a compact resolution adjustment zone at a relative high resolution (the compact resolution adjustment zone including the fixation point), while reducing resolutions of other virtual objects, and thus conserving processing power. However, if the confidence is low, the display system may increase the size of each volume of space (e.g., reduce an overall number of the volumes), such that each volume of space encompasses a greater number of virtual objects in the fixation point's volume of space. It will be appreciated that the sizes and shapes of the volumes may be fixed during production of the display system, e.g., based upon expected tolerances in systems for determining the fixation point, and/or may be adjusted or set in the field depending upon a user's characteristics, the user's environment, and/or changes in software that change the tolerances for the systems for determining the fixation point.

It will be appreciated that the user's sensitivity to resolution may decrease with distance from the fixation point. Consequently, by ensuring that full resolution content is presented at the fixation point and by allowing a margin of error for where the fixation point is located, the perceptibility of reductions in resolution may be reduced or eliminated, thereby providing the perception of a high-resolution display without utilizing the computational resources typically required to present content for such a high resolution display.

In some embodiments, the proximity of a virtual object to the fixation point may be determined based on an angular proximity of the virtual object to a gaze of the user, and a resolution of the virtual object may decrease as the angular proximity decreases. In some embodiments, this may result in virtual objects located at different depths from the user being presented at a similar resolution. For example, a first virtual object at a location corresponding to a user's determined fixation point may be located in front (e.g., closer in depth to the user) of a second virtual object. Since the second virtual object will be along a gaze of the user, and thus similarly fall on the user's fovea, where the user's eye is most sensitive to changes in resolution, the second virtual object may optionally be presented at a similar (e.g. same) resolution as the first virtual object. Optionally, the second virtual object may be reduced in resolution, and further adjusted via a blurring process (e.g., a Gaussian blurring kernel may be convolved with the second virtual object), which may represent that the second virtual object is further (e.g., located on a farther depth plane) from the user.

The reductions in resolution may vary based upon how virtual content is presented by the display systems. In some embodiments, a first example display system referred to herein as a vari-focal display system may present virtual content on different depth planes, with all content (e.g., virtual objects) presented at a same depth plane (e.g., via a same waveguide) at a time, e.g. for each frame presented to the user. That is, the vari-focal display system may utilize a single depth plane (e.g., selected from multiple depth planes based on a fixation point of the user, or selected based on a depth of a particular presented virtual object) at a time to present content, and may change the depth plane in subsequent frames (e.g., select different depth planes). In some other embodiments, a second example display system referred to herein as a multi-focal display system may present virtual content on different depth planes, with content simultaneously displayed on multiple depth planes. As will be further described herein, the vari-focal display system may optionally utilize a single frame buffer, and with respect to the example above regarding blurring a second virtual object, the second virtual object may be blurred prior to presentation to the user from the single frame buffer. In contrast, the multi-focal display system may present the second virtual object on a further depth (e.g., on a further depth plane) from the first virtual object optionally at a reduced resolution, and the second virtual object may appear to the user as being blurred (e.g., the second virtual object will be blurred based on the natural physics of the user's eyes, without further processing).

As disclosed herein, the display system may present virtual objects at relatively high (e.g. full) resolution at or near the determined fixation point, and may present virtual objects at reduced resolutions farther from the fixation point. Preferably, the relatively high resolution is the highest resolution for presentation of virtual objects in the user's field of view. The relatively high resolution may be a maximum resolution of the display system, a user-selectable resolution, a resolution based on specific computing hardware presenting the virtual objects, and so on.

It will be appreciated that adjusting resolution of a virtual object may include any modification to the virtual object to alter a quality of presentation of the virtual object. Such modifications may include one or more of adjusting a polygon count of the virtual object, adjusting primitives utilized to generate the virtual object (e.g., adjusting a shape of the primitives, for example adjusting primitives from triangle mesh to quadrilateral mesh, and so on), adjusting operations performed on the virtual object (e.g., shader operations), adjusting texture information, adjusting color resolution or depth, adjusting a number of rendering cycles or a frame rate, and so on, including adjusting quality at one or more points within a graphics pipeline of graphics processing units (GPUs).

In some embodiments, on the x and y-axes, changes in the resolution of virtual content away from the fixation point may generally track changes in the distribution of photoreceptors in the retina of an eye of the user. For example, it will be appreciated that a view of the world and of virtual content may be imaged on the retina, such that different parts of the retina may be mapped to different parts of the user's field of view. Advantageously, the resolution of virtual content across the user's field of view may generally track the density of corresponding photoreceptors (rods or cones) across the retina. In some embodiments, the resolution reduction away from the fixation point may generally track the reduction in density of cones across the retina. In some other embodiments, the resolution reduction away from the fixation point may generally track the reduction in density of rods across the retina. In some embodiments, the trend of the resolution reduction away from the fixation point may be within ±50%, ±30%, ±20%, or ±10% of the trend in the reduction in the density of rods and/or cones across the retina.

The rods and cones are active at different levels of incident light. For example, cones are active under relatively bright conditions, while rods are active under relatively low light conditions. Consequently, in some embodiments where the reduction in resolution generally tracks the densities of rods or cones across the retina, the display system may be configured to determine the amount of light incident on the retina. Based on this amount of light, the appropriate adjustment in resolution may be made. For example, the reduction in resolution may generally track the changes in the density of rods across the retina in low light conditions, while the reduction in resolution may generally track the changes in the density of cones in bright conditions. Consequently, in some embodiments, the display system may be configured to change the profile of the reduction in image resolution based upon the amount of light incident on the retina.

It will be appreciated that the ability of the human eye to resolve fine details may not be directly proportional to the densities of rods or cones in the retina. In some embodiments, changes in the resolution of virtual content across the user's field of view generally track changes in the ability of the eye to resolve fine details. As noted above, the progression of the changes in resolution of the virtual content may vary with the amount of light reaching the retina.

In some embodiments, the amount of light reaching the retina may be determined by detecting the amount of ambient light incident on a sensor mounted on the display device. In some embodiments, determining the amount of light reaching the retina may also include determining the amount of light outputted by the display device to the user. In yet other embodiments, the amount of light reaching the retina may be determined by imaging the eye of the user to determine pupil size. Because pupil size is related to the amount of light reaching the retina, determining pupil size allows the amount of light reaching the retina to be extrapolated.

It will be appreciated that full color virtual content may be formed by a plurality of component color images, which, in the aggregate, provide the perception of full color. The human eye may have different sensitivities to different wavelengths, or colors, of light. In some embodiments, in addition to changing based on proximity to a fixation point, the changes in resolution of the virtual content may vary based upon the color of the component color image that is presented by the display system. For example, were the component color images comprise red, green, and blue images, the green component color images may have a higher resolution than the red component color images, which may have a higher resolution than the blue component color images. In some embodiments, to account for changes in the sensitivities of the eye to different colors at different levels of incident light, the amount of light reaching the retina may be determined, and the resolution adjustment for a given component color image may also vary based upon the determination of the amount of light reaching the retina.

It will be appreciated that the contrast sensitivity of the eye may also vary based on the amount of light incident on the retina. In some embodiments, the size or total number of gradations in contrast in the virtual content may vary based upon the amount of light reaching the retina. In some embodiments, the contrast ratio of images forming the virtual content may vary based upon the amount of light incident on the retina, with the contrast ratio decreasing with decreasing amounts of light.

In some embodiments, certain parts of the user's field of view may not be provided with any virtual content. For example, the display system may be configured to not provide virtual content in a blind spot caused by the optic nerve and/or a peripheral blind spot of a given eye.

As discussed herein, the display system may be configured to display high resolution content in one part of the user's field of view and lower resolution content in another part of the user's field of view. It will be appreciated that the high resolution content may have a higher pixel density than the lower resolution content. In some environments, the display system may be configured to provide such high and low resolution content by effectively superimposing high-resolution and low resolution images. For example, the system may display a low resolution image that spans the entire field of view, and then display a high resolution image spanning a small portion of the field of view, with the high-resolution image being located at the same location as a corresponding portion of the low resolution image. The high and low resolution images may be routed through different optics, which output light at appropriate angles to determine how much of the field of view those images occupy.

In some embodiments, a single spatial light modulator (SLM) may be used to encode light with image information, and a beam splitter or optical switch may be used to split a single light stream from the SLM into two streams, one stream to propagate through optics for the low-resolution images and a second stream to propagate through optics for the high-resolution images. In some other embodiments, the polarization of the light encoded with image information may be selectively switched and passed through optics that effectively provide different angular magnifications for light of different polarizations, thereby providing the high and low resolution images.

Advantageously, various embodiments disclosed herein reduce requirements for processing power for providing content on display systems. Since a larger share of processing power may be devoted to virtual objects that are proximate to a user's three-dimensional fixation point, while processing power for virtual objects further away may be reduced, the overall required processing power for the display system may be reduced, thus reducing one or more of the size of processing components, the heat generated by the processing components, and the energy requirements for the display system (e.g., the display system may optionally be battery powered, require lower capacity batteries, and/or operate for a longer duration with a given battery). Therefore, embodiments described herein address technological problems arising out of augmented or virtual reality display systems. Additionally, the described techniques manipulate graphical content such that upon presentation to the user, the graphical content is presented fundamentally differently (e.g., resolutions are modified), while the graphical content may appear to the user as being the same. Thus, the display system transforms graphical content while preserving visual fidelity, and conserving processing power, as the user looks around their ambient environment.

It will be appreciated that the display system may be part of an augmented reality display system, or a virtual reality display system. As one example, the display of the display system may be transmissive and may allow the user a view of the real world, while providing virtual content in the form of images, video, interactivity, and so on, to the user. As another example, the display system may block the user's view of the real world, and virtual reality images, video, interactivity, and so on, may be presented to the user.

Reference will now be made to the drawings, in which like reference numerals refer to like parts throughout.

Figure 2:
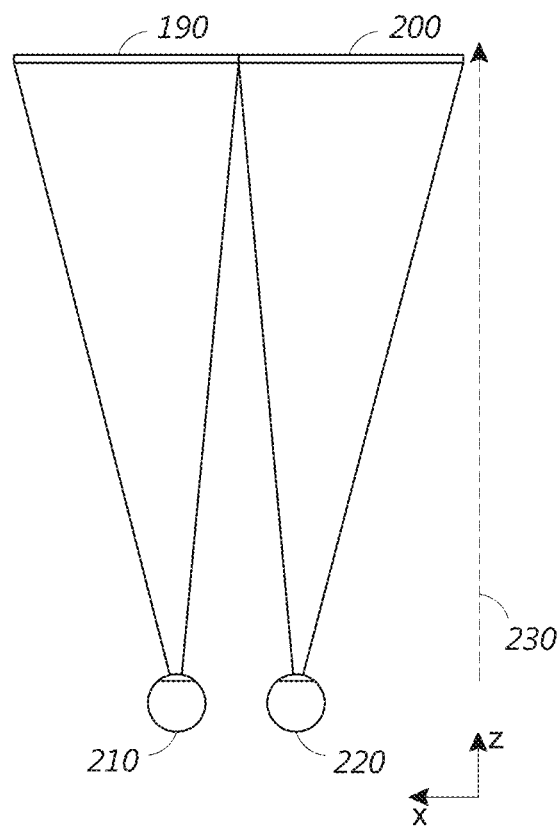
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
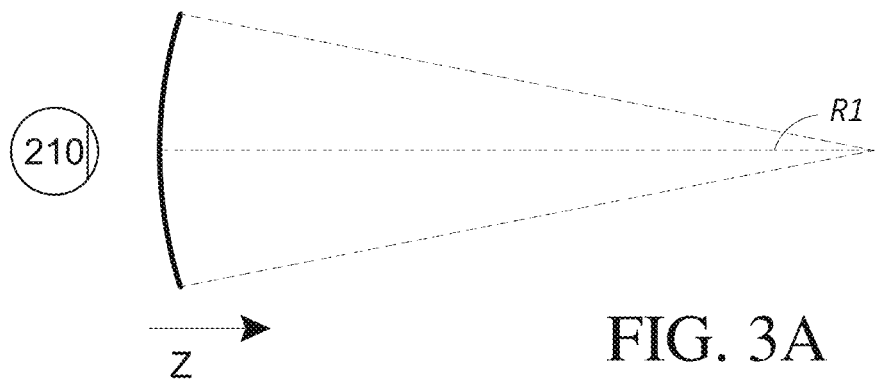
FIGS. 3A-3C illustrate relationships between radius of curvature and focal radius.
Figure 3B:
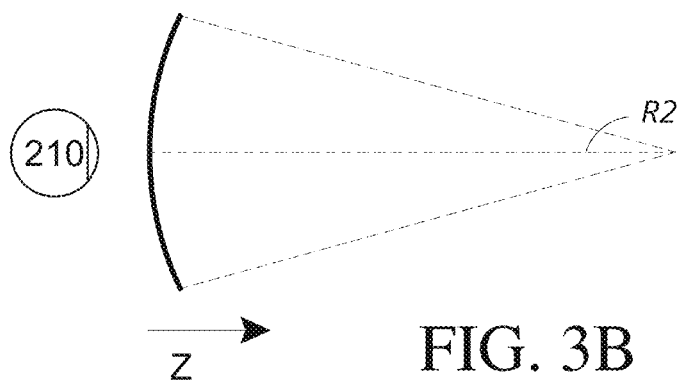
Figure 3C:
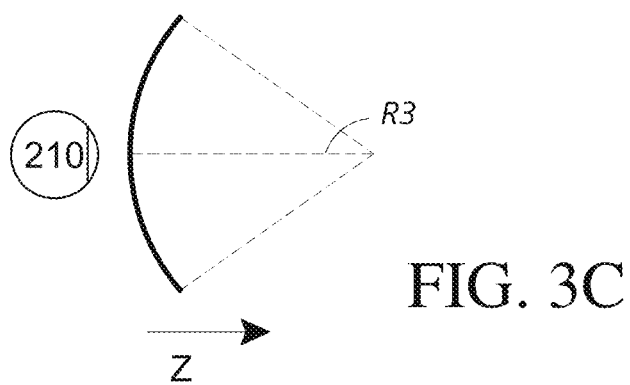

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
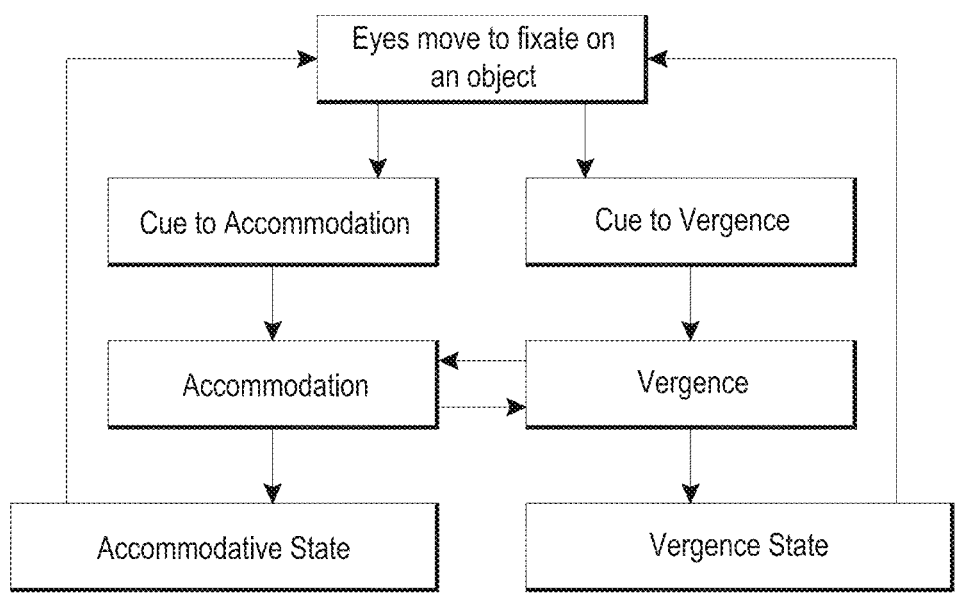
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
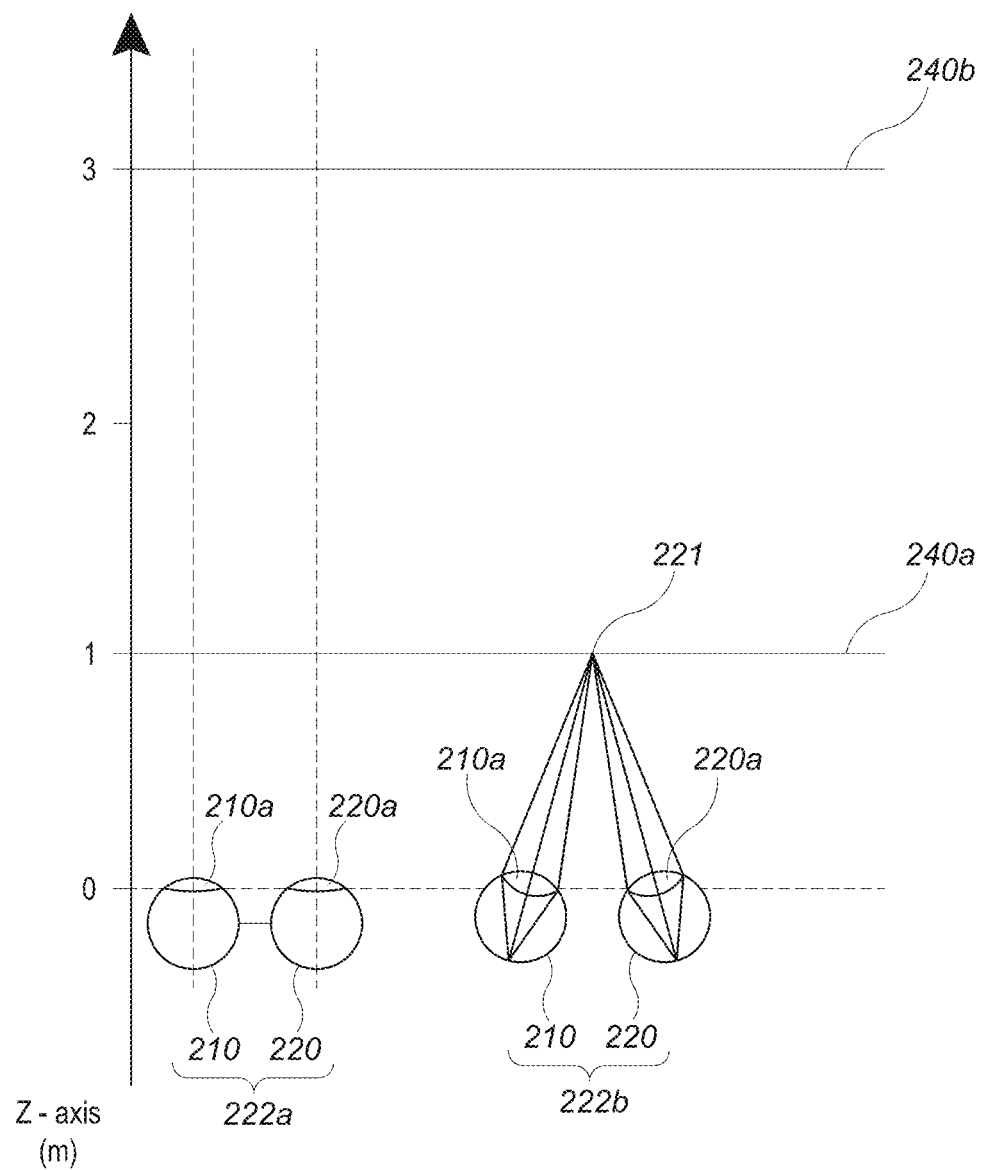
FIG. 4B illustrates examples of different accommodative states and vergence states of a pair of eyes of the user.

With reference now to FIG. 4B, examples of different accommodative and vergence states of the eyes are illustrated. The pair of eyes 222a are fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero point located at the exit pupils of the user's eyes. Thus, a depth plane 240 located at a depth of 1 m corresponds to a distance of 1 m away from the exit pupils of the user's eyes, on the optical axis of those eyes. As an approximation, the depth or distance along the z-axis may be measured from the display in front of the user's eyes (e.g., from the surface of a waveguide), plus a value for the distance between the device and the exit pupils of the user's eyes, with the eyes directed towards optical infinity. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
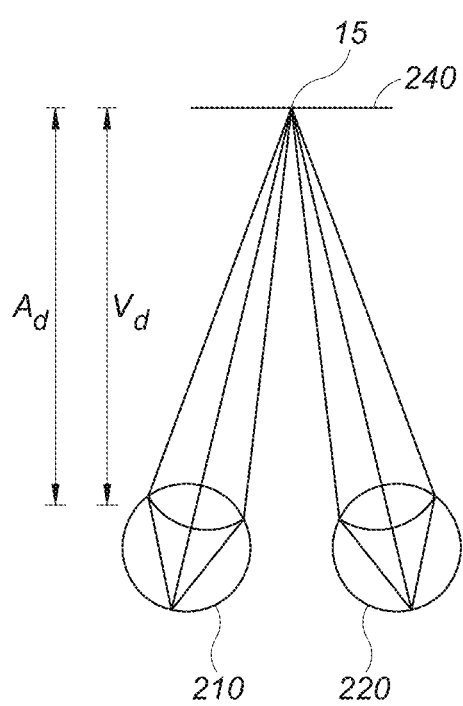
FIG. 4C illustrates an example of a representation of a top-down view of a user viewing content via a display system.
Figure 4D:
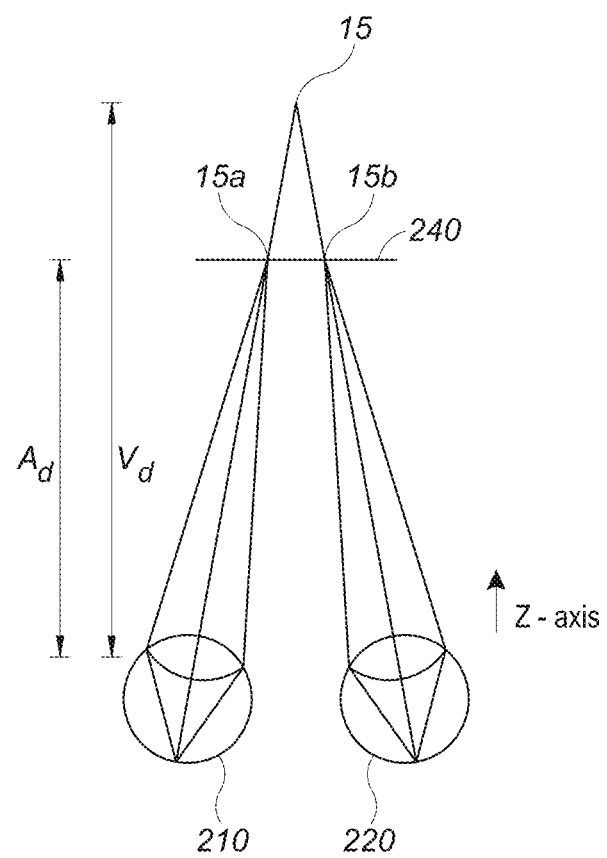
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from a particular reference point of the user (e.g., the exit pupils of the eyes 210, 220) to the depth plane 240, while the vergence distance corresponds to the larger distance from that reference point to the point 15, in some embodiments. Thus, the accommodation distance is different from the vergence distance and there is an accommodation-vergence mismatch. Such a mismatch is considered undesirable and may cause discomfort in the user. It will be appreciated that the mismatch corresponds to distance (e.g., $V_d$-$A_d$) and may be characterized using diopters (units of reciprocal length, 1/m). For example, a $V_d$ of 1.75 diopter and an $A_d$ of 1.25 diopter, or a $V_d$ of 1.25 diopter and an $A_d$ of 1.75 diopter, would provide an accommodation-vergence mismatch of 0.5 diopter.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
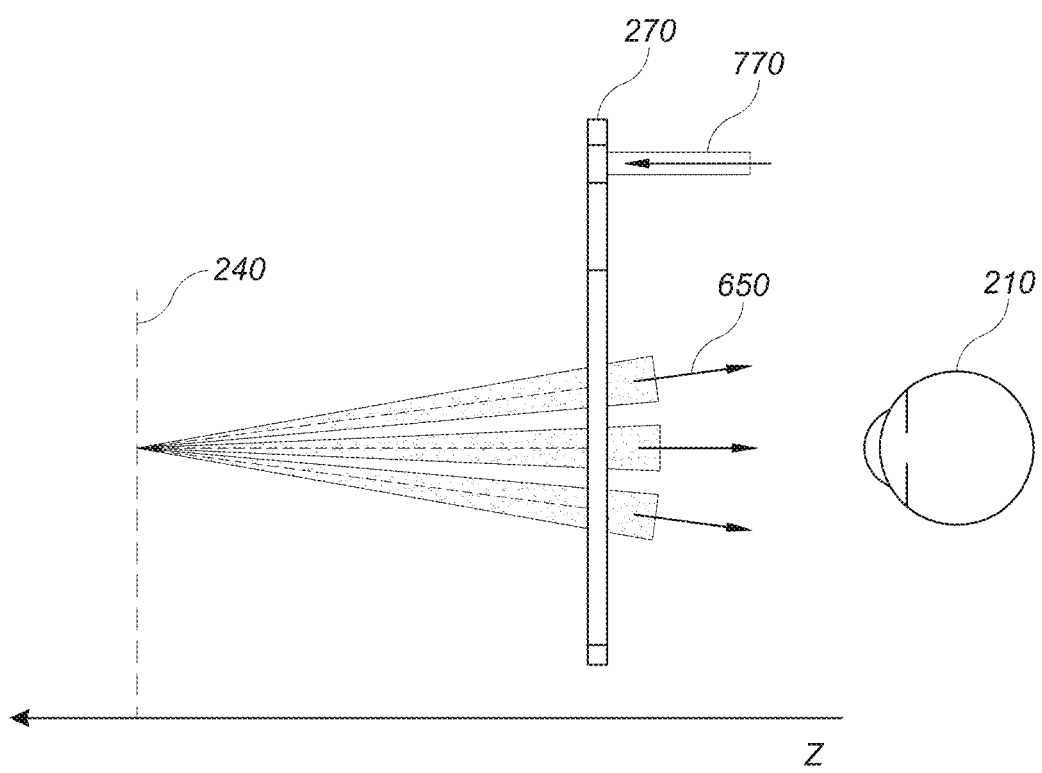
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, for simplicity, the depth planes may follow the contours of flat surfaces.

Figure 6:
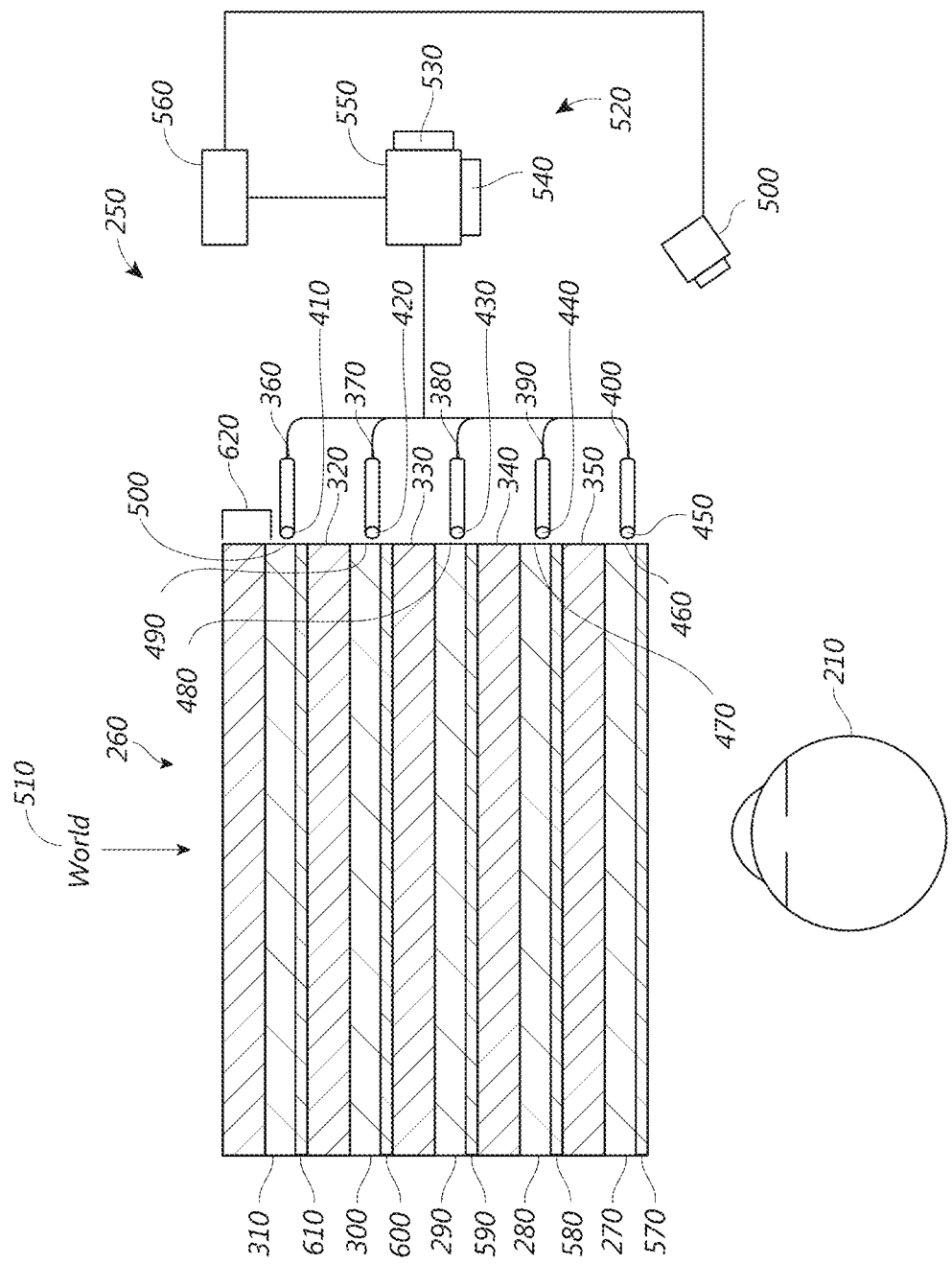
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290,

300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
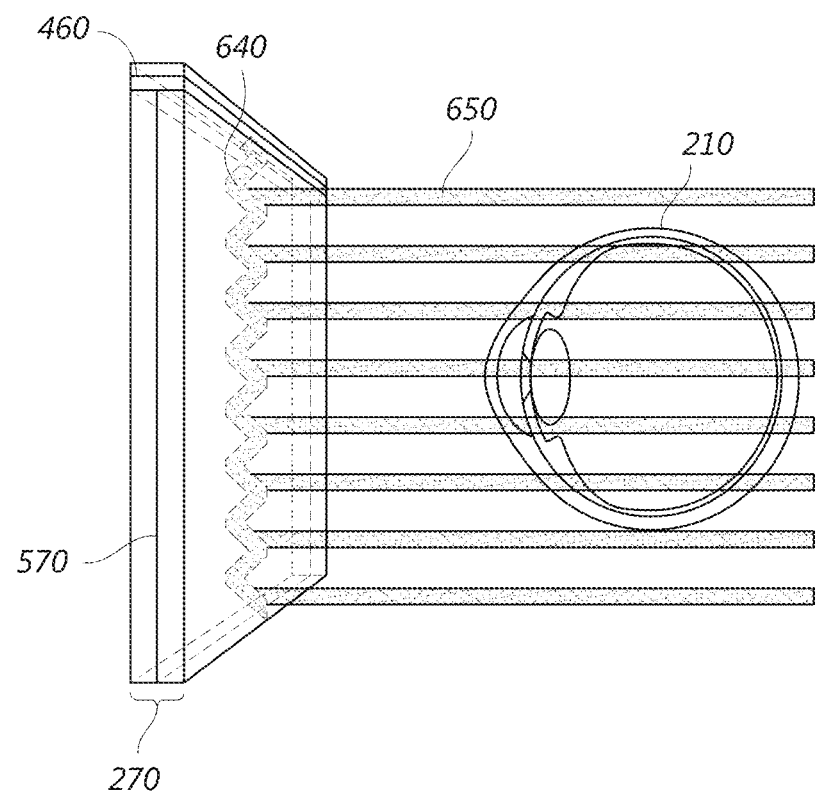
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
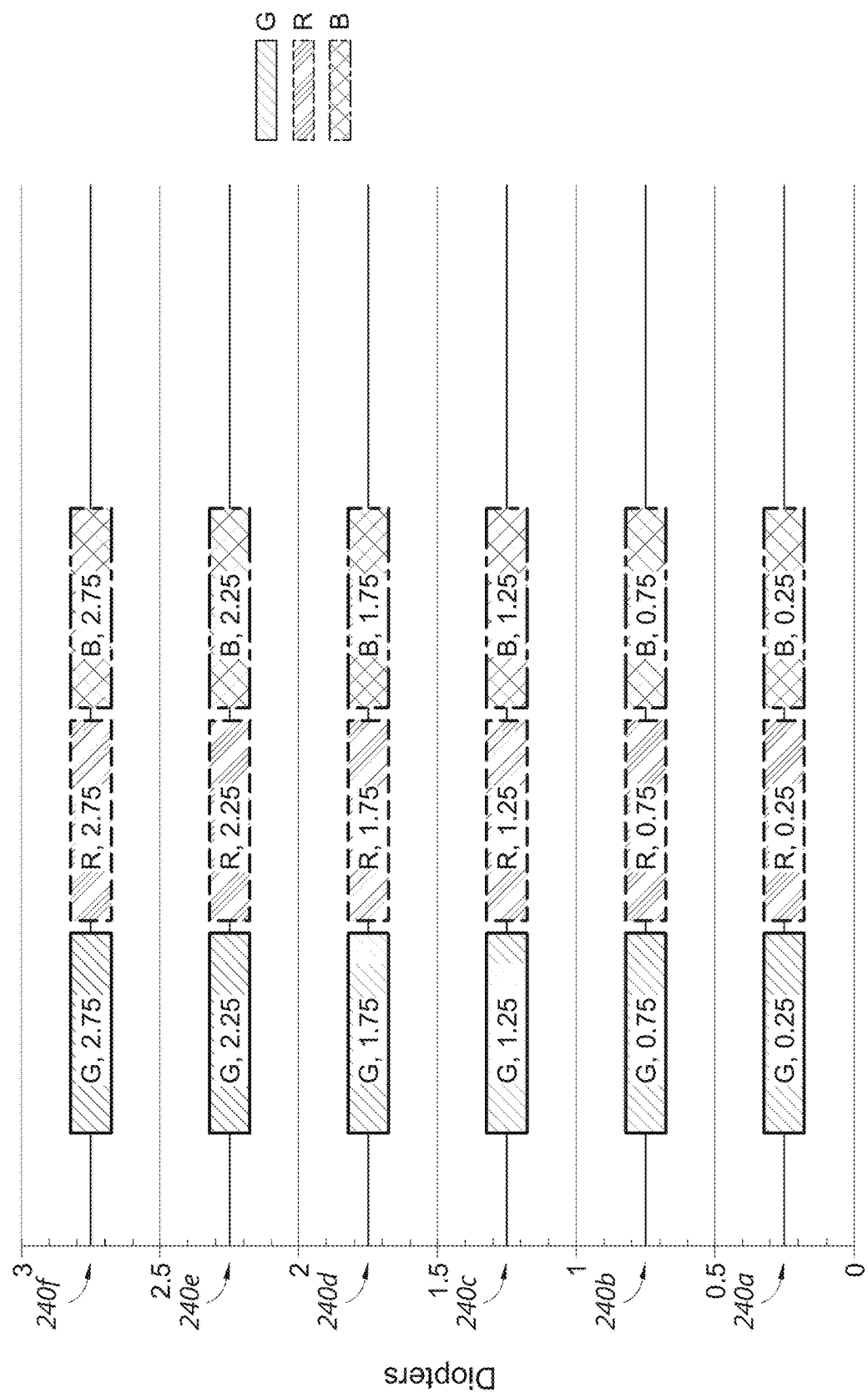
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
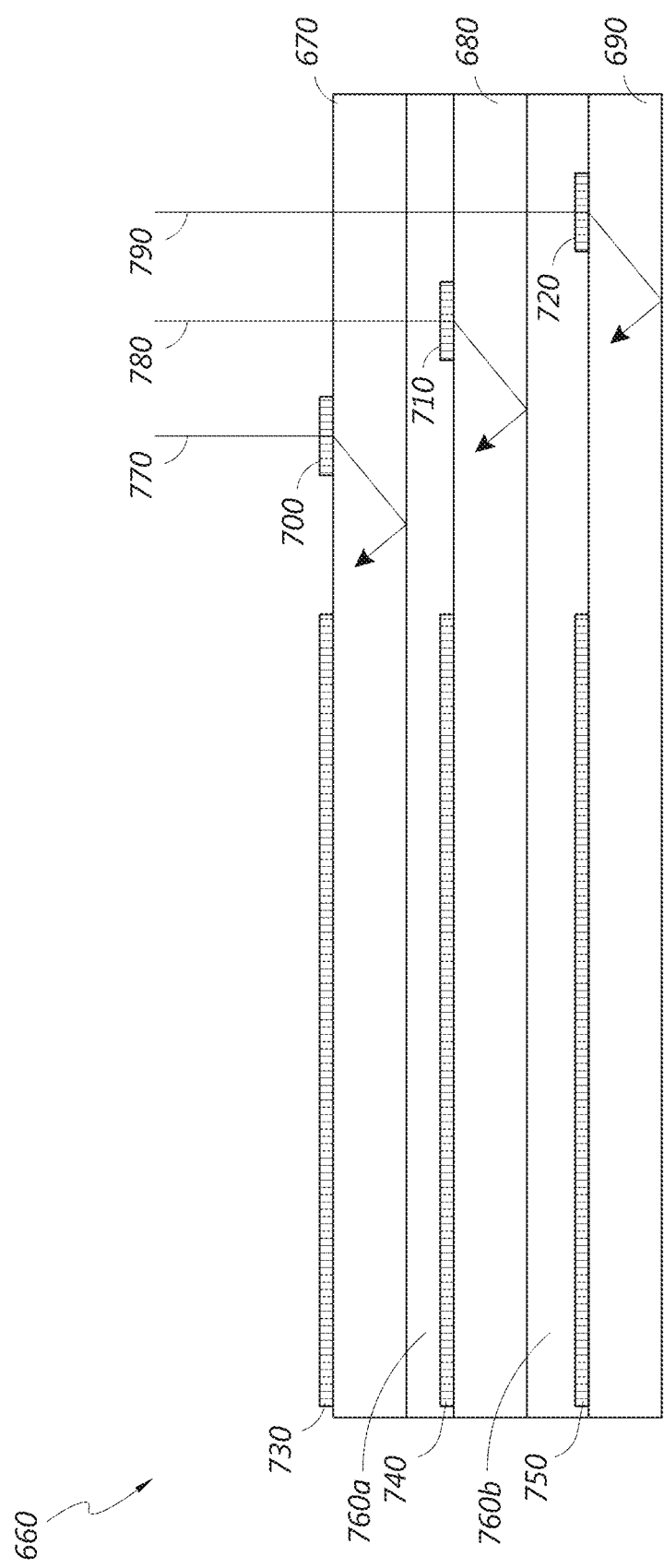
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
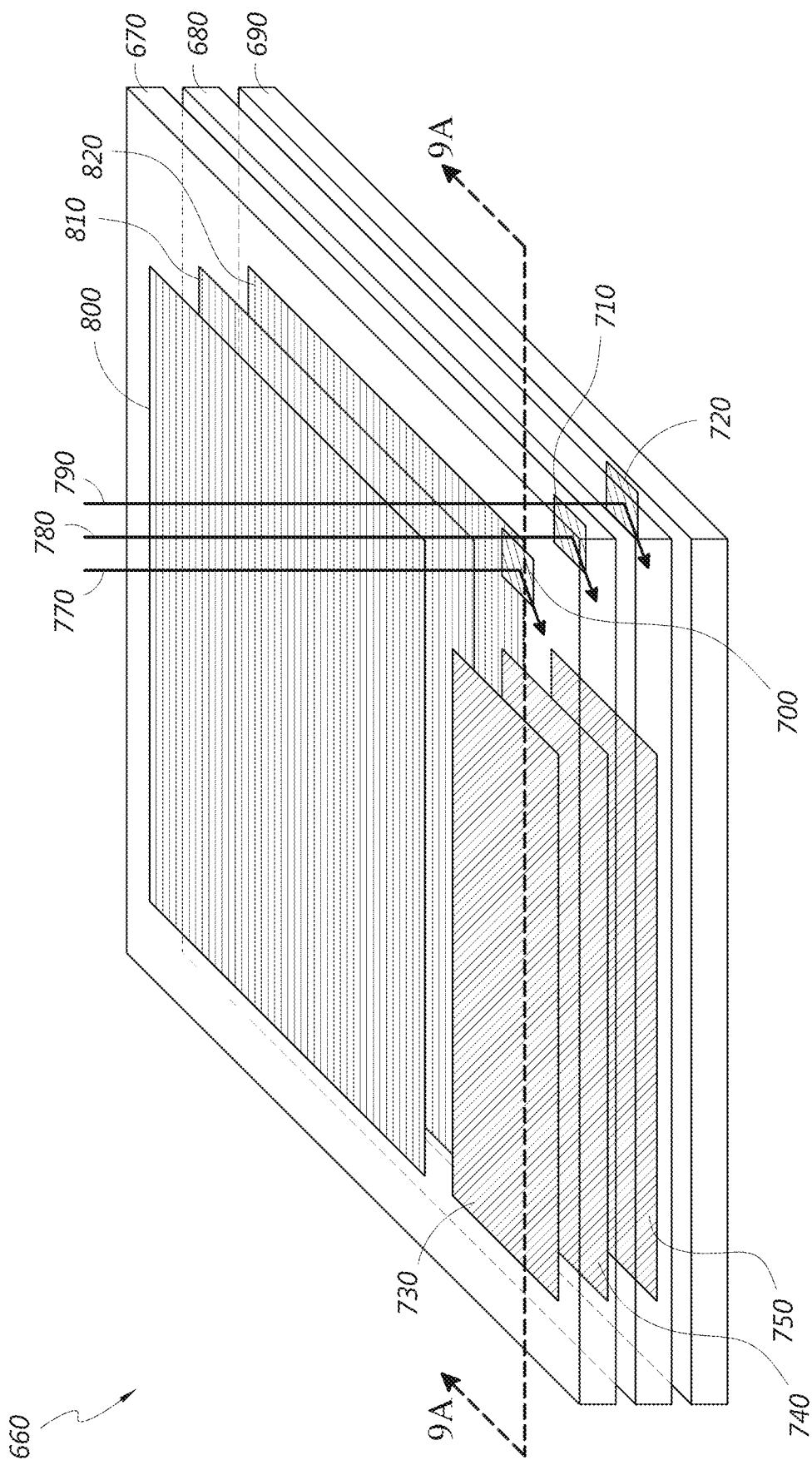
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
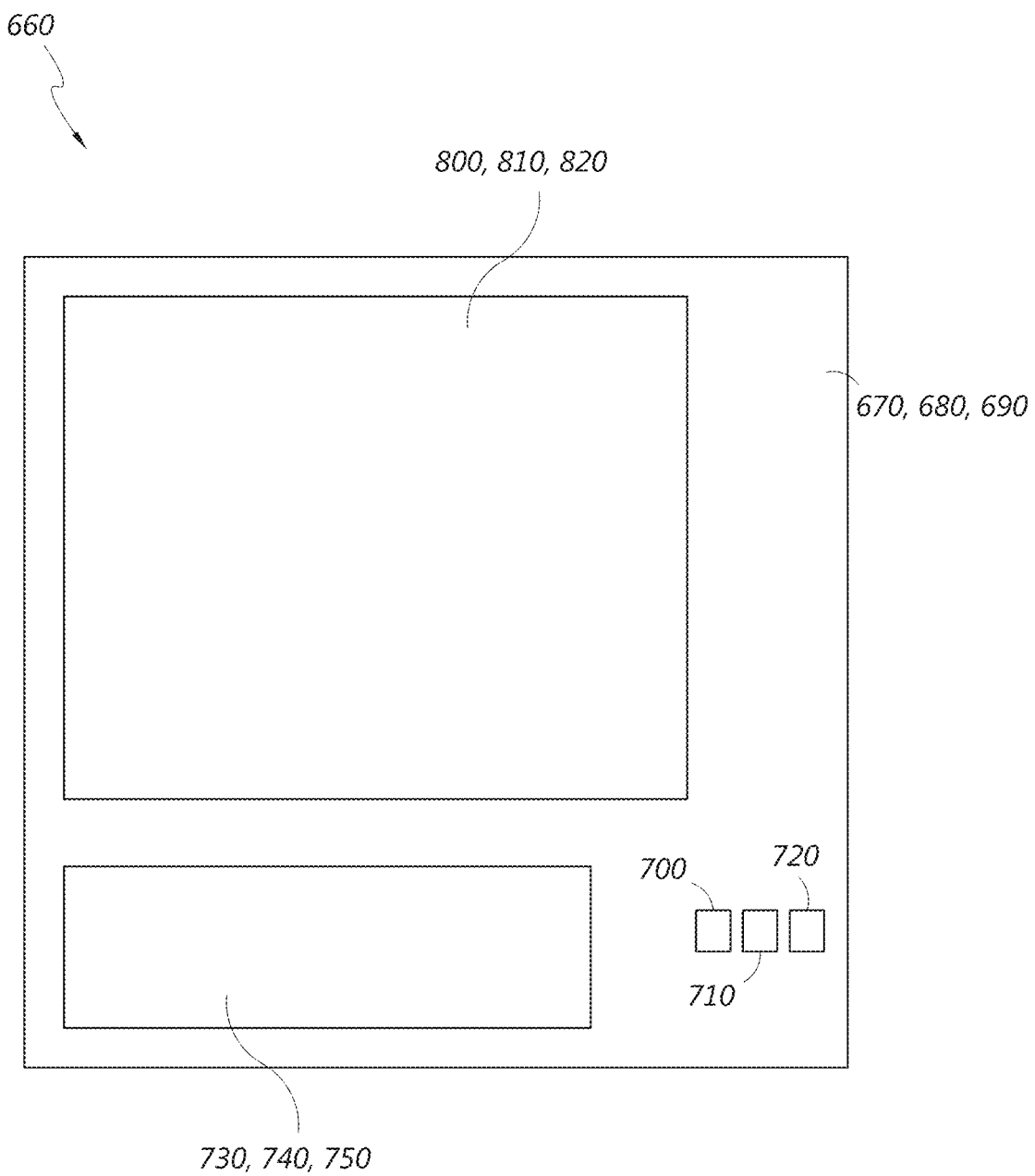
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
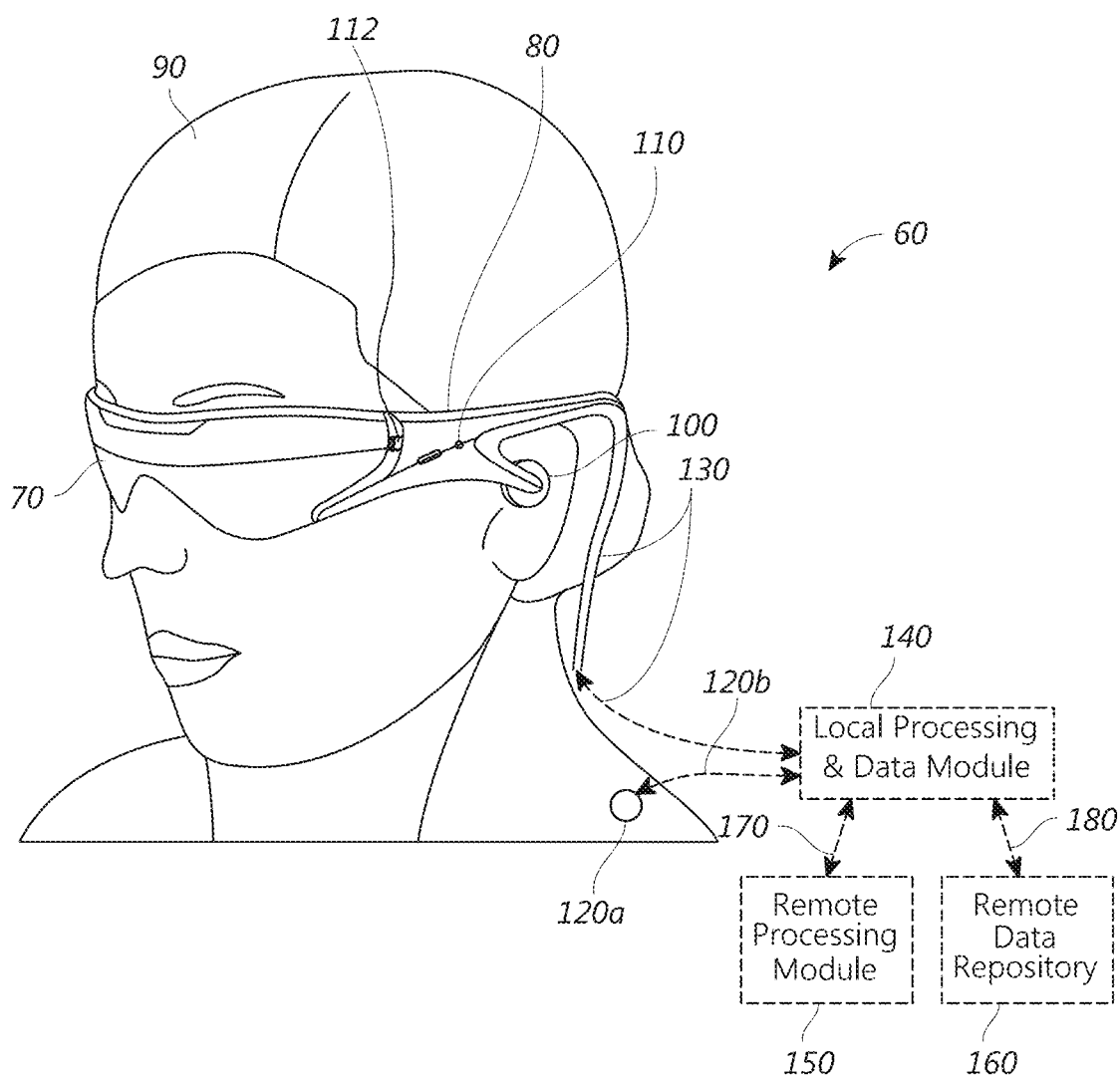
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect light, objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

I. Adjusting Quality Based on Depth Information

As described herein, display systems (e.g., augmented reality display systems such as the display system 60, FIG. 9D) according to various embodiments may determine a three-dimensional fixation point of the user, e.g., by monitoring a user's eyes. The fixation point may indicate the location of the point in space along (1) an x-axis (e.g., a lateral axis), (2) a y-axis (e.g., a vertical axis), and (3) a z-axis (e.g., a depth of the point, for example a depth from the user). In some embodiments, the display system may utilize cameras, sensors, and so on, to monitor the user's eyes (e.g., a pupil, cornea, and so on, of each eye), to determine a gaze of each eye. The gaze of each eye may be understood to be a vector extending from generally a center of the retina of that eye through the lens of the eye. For example, the vector may extend generally from the center of the macula (e.g., the fovea) through the lens of the eye. The display system may be configured to determine where the vectors associated with the eyes intersect, and this intersection point may be understood to be the fixation point of the eyes. Stated another way, the fixation point may be location in three-dimensional space on which the user's eyes are verging. In some embodiments, the display system may filter small movements of the user's eyes for example during rapid movements (e.g., saccades, microsaccades), and may update the fixation point upon determining that the eyes are fixating on a location in three-dimensional space. For example, the display system may be configured to ignore movements of the eye that fixate on a point for less than a threshold duration.

The resolution of content presented by the display system, such as virtual objects or content, may be adjusted based on proximity to the fixation point as discussed herein. It will be appreciated that the display system may have stored within it, or may have access to, information regarding the locations, in three-dimensional space, of virtual objects. Based on the known locations of the virtual objects, the proximity of a given virtual object to the fixation point may be determined. For example, the proximity of the virtual object to the fixation point may be determined by determining one or more of the (1) three-dimensional distance of a virtual object from the fixation point of the user; (2) the resolution adjustment zone in which the virtual object is located, relative to the resolution adjustment zone in which the fixation point is located, in cases where the display system's display frustum is divided into resolution adjustment zones; and (3) the angular separation between the virtual object and a gaze of the user. Virtual content that is closer in proximity to the fixation point may be presented at a greater resolution than content farther from the fixation point. In some embodiments, the resolution of virtual content changes depending upon the proximity of the depth plane on which that virtual content is disposed to the fixation point or the depth plane on which the fixation point is disposed. In some embodiments, adjustments to the resolution may be made by a rendering engine, such as rendering engines included in one or more graphics processing units, for instance in one or more of modules 140, 150 (FIG. 9D).

Figure 10A:
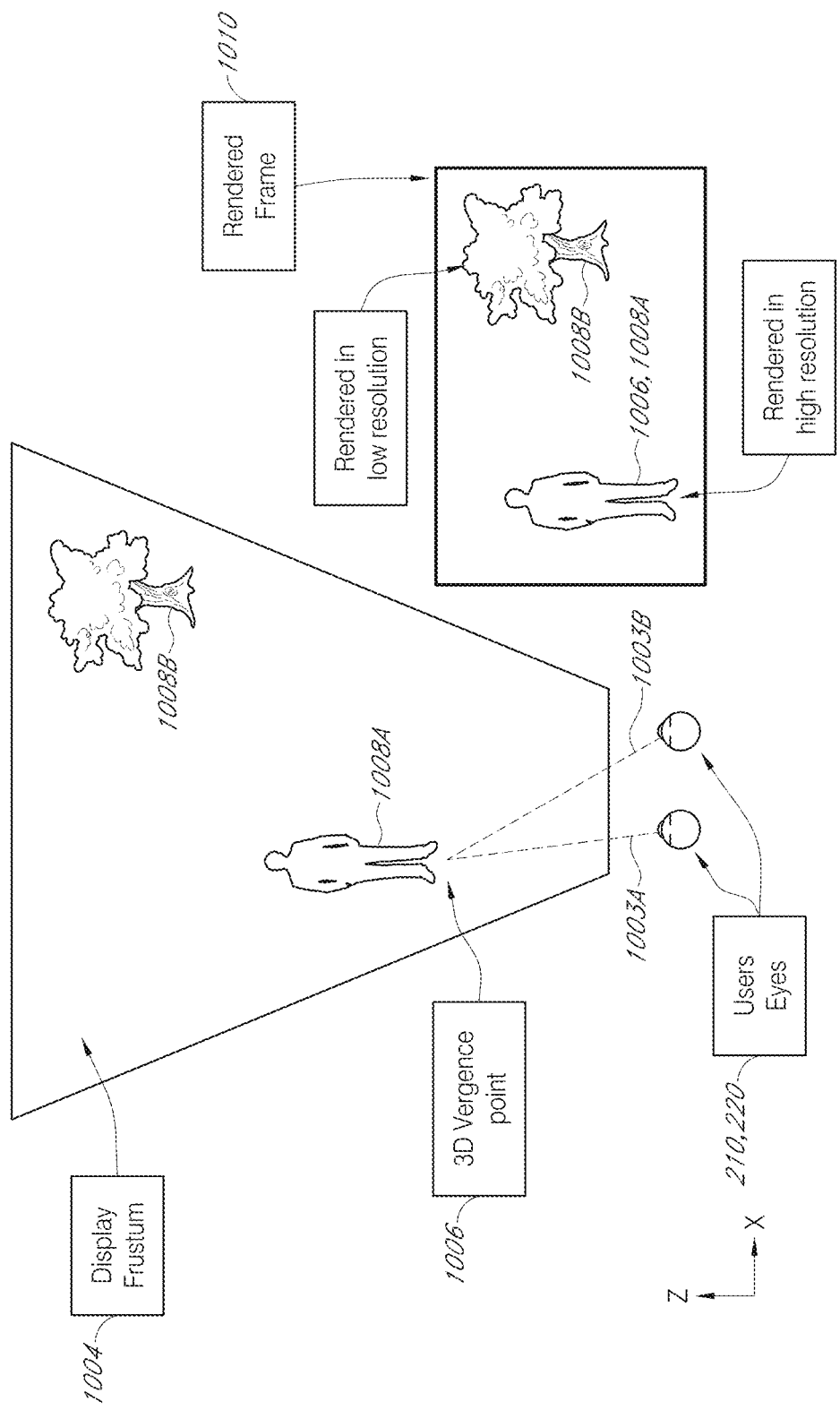
FIG. 10A illustrates an example of a representation of a top-down view of a user viewing content via a display system.

FIG. 10A illustrates an example of a representation of a top-down view of a user viewing content (e.g., content included in a display frustum 1004) presented by a display system (e.g., the display system 60, FIG. 9D). The representation includes the user's eyes 210, 220, and a determination of a fixation point 1006 of the eyes 210, 220. As illustrated, the gaze of each eye is represented as a vector (e.g., vectors 1003A, 1003B) and the display system has detected the fixation point 1006 by, e.g., determining where those vectors converge in front of the eyes 210, 22. In the illustrated example, the fixation point 1006 coincides with the location of a first virtual object 1008A presented by the display system. Examples of systems and methods for eye-tracking may be found in U.S. application Ser. No. 14/690,401 filed on Apr. 18, 2015, which is incorporated by reference for all of purposes; and in the attached Appendix. For example, eye-tracking systems and methods are described in, at least, FIGS. 25-27 of the Appendix, and can be utilized, at least in part, for eye-tracking and/or to determine fixation points as described herein.

With continued reference to FIG. 10A, a second virtual object 1008B is also presented by the display system in the display frustum 1004. The view of these virtual objects 1008A, 1008B, as seen by the viewer, is shown in a rendered frame 1010. The rendered frame 1010 may include the first virtual object 1008A rendered at a first resolution, while the second virtual object 1008B, located away from the fixation point 1006, is rendered at a second, lesser resolution. Specifically, the second virtual object 1008B may be determined to be located at a greater depth than, and towards the side of, the first virtual object 1008A. For example, the display system may determine the depth of the second virtual object 1008B, as discussed herein, or optionally a content provider associated with the virtual content may indicate depths of virtual objects which the display system may utilize for rendering that virtual object. Therefore, the fixation point 1006, as described above, describes a three-dimensional location in space at which the user is looking, and the second virtual object 1008B may be determined to be located further in depth from the user along with being laterally displaced from the fixation point 1006.

Without being limited by theory, it is believed that, with the user's eyes 210, 220 looking at the first virtual object 1008A, an image of the first virtual object 1008A may fall on the user's fovea, while an image of the second virtual object 1008B does not fall on the fovea. As a result, the second virtual object 1008B may be reduced in resolution without significant impact to the perceived image quality of the display system, due to a lower sensitivity of the human visual system to that second virtual object 1008B. In addition, the lower resolution advantageously reduces the computational load required to provide the images. As discussed herein, the resolution at which the second virtual object 1008B is rendered may be based on a proximity to the fixation point 1006, and the reduction in resolution (e.g., with respect to the resolution of the first virtual object 1008A) may increase with decreasing proximity (or increasing distance) between the fixation point 1006 and the virtual object 1008A. In some embodiments, the rate of decrease of the resolution may be in conformance with a rate of reduction of the density of cones in the human eye, or with a visual acuity drop-off away from the fovea.

Figure 10B:
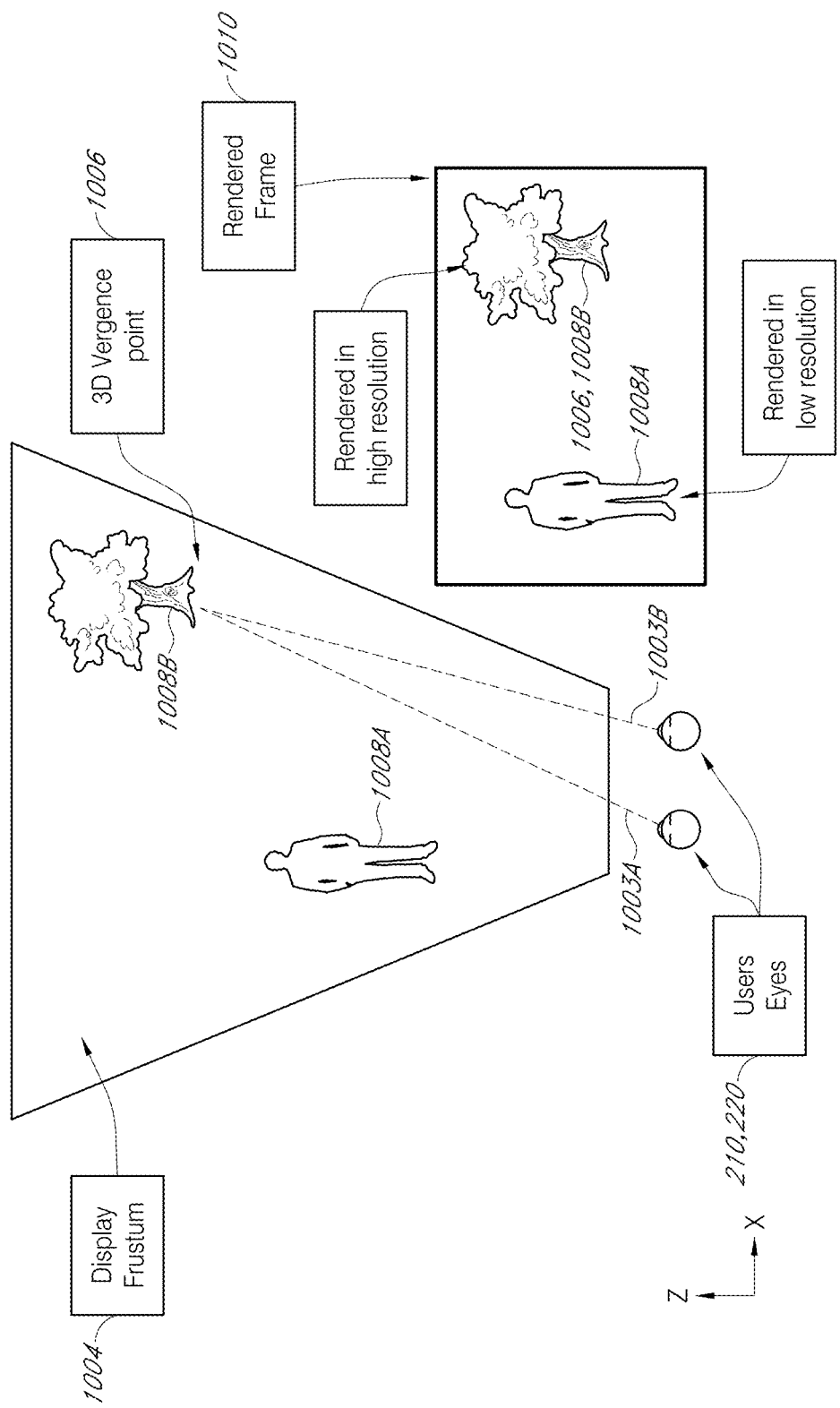
FIG. 10B illustrates another example of a representation of a top-down view of a user viewing content via a display system.

It will be appreciated that the resolutions of the various virtual objects presented by the display system may vary dynamically as the fixation point changes location. For example, FIG. 10B illustrates another example of a representation of a top-down view of a user viewing content presented by the display system. As illustrated in FIG. 10B, the user is now focusing on the second virtual object 1008B, as compared to FIG. 10A, in which the user was focusing on the first virtual object 1008A. By monitoring the gaze 1003A, 1003B of the user, the display system determines that the eyes 210, 220 are verging on the second virtual object 1008B, and sets that location as the new fixation point 1006.

Upon detecting this change in the location of the fixation point 1006, the display system now renders second virtual object 1008B at a greater resolution than the first virtual object 1008A, as shown in the rendered frame 1010. Preferably, the display system monitors the user's gaze 1003A, 1003B at a sufficiently high frequency, and changes the resolution of virtual objects sufficiently quickly, that the transition in resolution of the first virtual object 1008A and second virtual object 1008B is substantially imperceptible to the user.

Figure 10C:
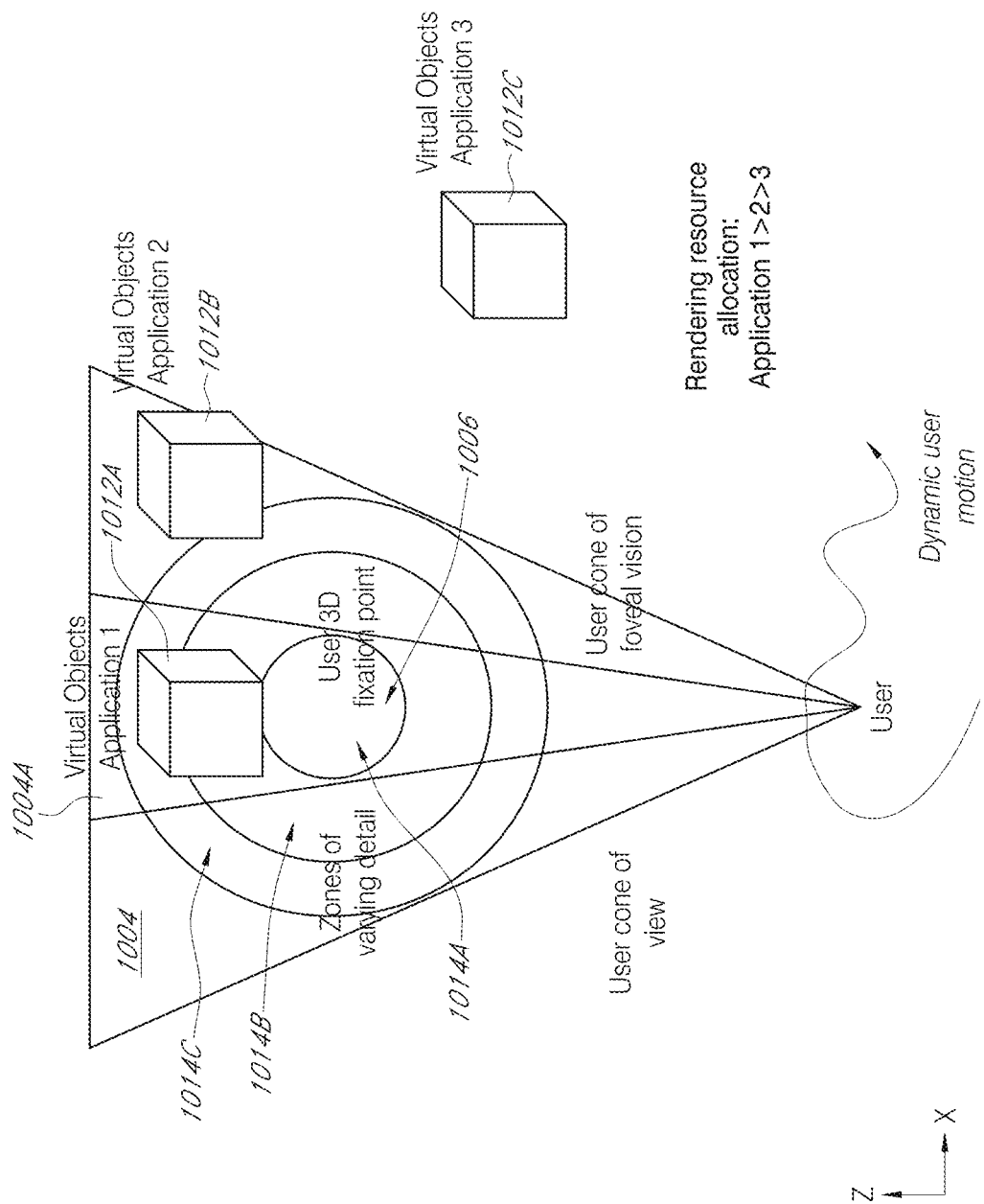
FIG. 10C illustrates yet another example of a representation of a top-down view of a user viewing content via a display system.

FIG. 10C illustrates another example of a representation of a top-down view of a user viewing content via a display system (e.g., the display system 60, FIG. 9D). In the example, the user's field of view 1004 is illustrated along with a fixation point 1006. Three virtual objects are illustrated, with a first virtual object 1012A being closer in proximity to the fixation point 1006 than a second virtual object 1012B or a third virtual object 1012C. Similarly, the second virtual object 1012B is illustrated as being closer in proximity to the fixation point 1006 than the third virtual object 1012C. Therefore, when the virtual objects 1012A-1012C are presented to the user, the display system may allocate resources such that rendering the first virtual object 1012A is accorded a greater resource allocation (e.g., the object 1012A is rendered at a greater resolution) than the second virtual object 1012B, and the second virtual object 1012B receives a greater resource allocation than the third virtual object 1012C. The third virtual object 1012C may optionally not be rendered at all, as it is outside of the field of view 1004.

Resolution adjustment zones are illustrated in the example of FIG. 100, with the zones being ellipses (e.g., circles) described along depth and lateral axes. As illustrated, the fixation point 1006 is inside a center zone 1014A, with the first virtual object 1012A extending between zones 1014B, 1014C and within the user's cone 1004a of foveal vision. The first virtual object 1012A may therefore be presented to the user at a resolution associated with zone 1014B or 1014C, or optionally a portion of the object 1012A within zone 1014B may be presented according to the resolution of zone 1014B and remaining portion within zone 1014C may be presented according to the resolution of zone 1014C. For example, in an embodiment in which the zones are assigned resolutions reduced from a maximum (e.g., highest) resolution, the first virtual object 1012A may be presented at the assigned resolutions. Optionally, the first virtual object 1012A may be presented at either of the resolutions (e.g., the display system may be programmed to display at the highest revolution associated with any zones across which the first virtual object 1012A extends), or a measure of central tendency of the resolutions (e.g., the measure can be weighted according to an extent to which the object 1012A is located within the zones 1014B, 1014C). With continued reference to FIG. 100, it will be appreciated that the resolution adjustment zones at different distances from the fixation point 1006 may have different shapes. For example, the zone 1014C may have a different shape from the zones 1014A-1014C, and conform to the contours of the field of view 1004. In some other embodiments, one or more of the zones 1014A-1014C may have different shapes from one or more others of the zones 1014A-1014C.

Figure 10D:
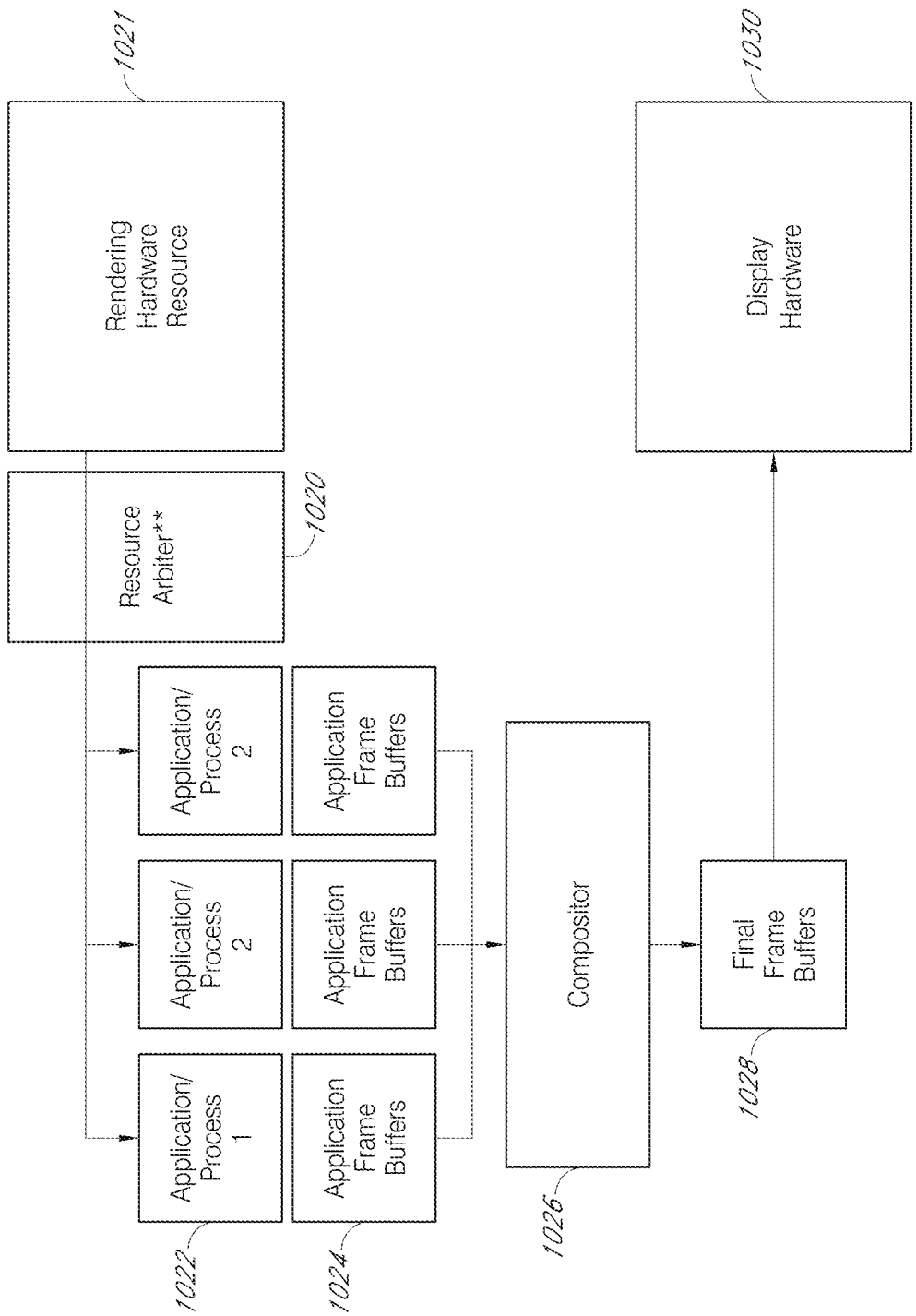
FIG. 10D is a block diagram of an example display system.

FIG. 10D is a block diagram of an example display system. The example display system (e.g., the display system 60, FIG. 9D) may be an augmented reality display system and/or a mixed reality display system, which can adjust usage of rendering hardware resources according to a user's fixation point as described herein. For example, as described above with respect to FIG. 100, rendering hardware resources 1021 can be adjusted according to the user's fixation point. A resource arbiter 1020 may be implemented to regulate usage of such resources 1021, for example the arbiter 1020 can allocate the resources 1021 to particular application processes 1022 associated with presenting virtual objects to the user. The resource arbiter 1020 and/or rendering hardware resources 1021 may optionally be included in the local processing & data module 140 (e.g., as illustrated in FIG. 9D), and/or the remote processing module 150, of the display system 60. For example, the rendering hardware resources 1021 may comprise graphics processing units (GPUs), which may be included in module 140 and/or module 150 as described above with respect to FIG. 9D.

As an example of adjusting resources 1021, and with respect to FIG. 100, a first virtual object 1012A associated with a first application process can be allocated a greater share of resources 1021 than a second virtual object 1012B associated with a second application process. Virtual objects associated with the application processes 1022 can be rendered based on the allocated resources 1021, and included in frame buffers 1024 to be composited (e.g., by compositor 1026) into a final frame buffer 1028. The final frame buffer 1028 can then be presented by display hardware 1030, for example the display 70 illustrated in FIG. 9D, with the rendered virtual objects adjusted in resolution.

As disclosed herein, the resolution of a virtual object may be determined based upon the proximity of the virtual object to the fixation point. In some embodiments, the resolution may be modified as a function of the distance between the virtual object and the fixation point. In some embodiments, the modifications may occur in discrete steps; that is, a similar modification may be applied to all virtual objects disposed in a particular volume or zone. FIG. 11A1 illustrates an example of a representation of a top-down view of adjustments in resolution in different resolution adjustment zones based on three-dimensional fixation point tracking. The display system may divide the display frustum into multiple volumes or resolution adjustment zones, and modify resolution in discrete steps corresponding to these zones. Thus, in some embodiments, to determine an adjustment in the resolution of virtual content, the display system may utilize information describing volumes of space (referred hereinafter as resolution adjustment zones), and assignments of resolution adjustments to each volume of space. As illustrated, a field of view provided by the display system (e.g., the display frustum of the display) is separated into a plurality of different zones each encompassing a range of depths from a user (e.g., depth ranges 1102A-1102E). In some embodiments, each depth range 1102A-1102E has a single associated depth plane that may be presented by the display system. With continued reference to FIG. 11A1, five zones encompass each identified range of depths from the user and are contiguous along a lateral direction. In the illustrated example top-down view, the field of view is divided into a grid 1100 of 25 zones. Each zone represents a volume of real-world space in which virtual content may be placed for a user.

Figure 11B:
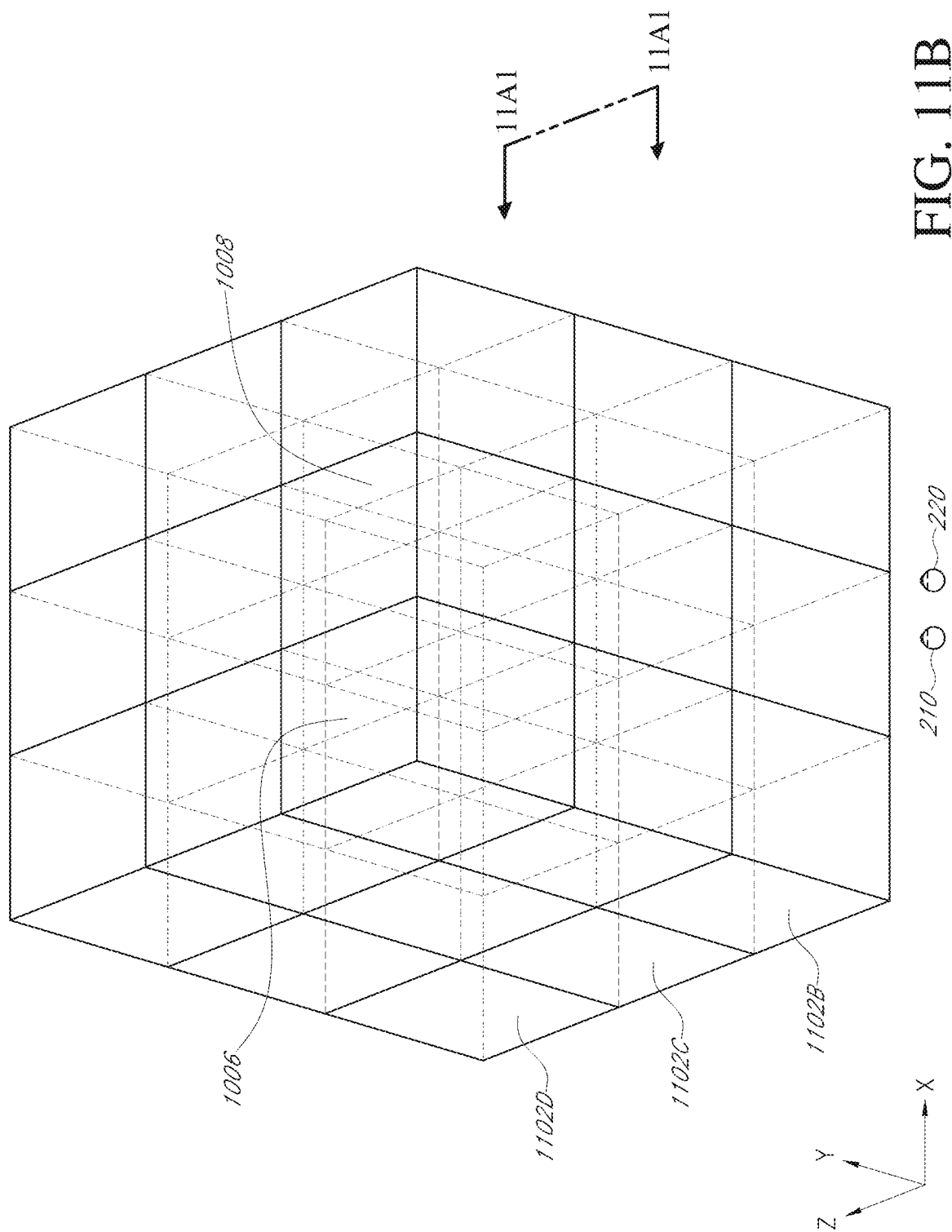
FIG. 11B illustrates an example of a three-dimensional representation of a portion of the resolution adjustment zones of FIG. 11A1.

It will be appreciated that the zones may also extend in a vertical direction (e.g., along the y-axis, not shown), such that the illustrated grid 1100 may be understood to represent one cross-section along this vertical direction. In some embodiments, multiple zones are also provided in the vertical direction. For example, there may be 5 vertical zones per depth range, for a total of 125 resolution adjustment zones. An example of such zones extending in three dimensions is illustrated in FIG. 11B, and described below.

With continued reference to FIG. 11A1, a user's eyes 210, 220 fixate on a particular fixation point 1006 within the grid 1100. The display system may determine the location of the fixation point 1006, and the zone in which the fixation point 1006 is located. The display system may adjust resolutions of content based on the proximity of virtual content to the fixation point 1006, which may include determining the proximity of the virtual content to the zone in which the fixation point 1006 is located. As an example, for content included in a zone in which the fixation point 1006 is located, the resolution may be set at a particular polygon count, which in the example is 10,000 polygons. Based on a distance from the fixation point 1006, content included in the remaining zones may be adjusted accordingly. For example, content included in an adjacent zone to a zone that includes the fixation point 1006 may be rendered at a lower resolution (e.g., 1,000 polygons). While the example of FIG. 11A1 illustrates adjusting a polygon count as an example, as described herein, adjusting resolution may encompass making other modifications to the resolution of presented content. For example, the adjustment in resolution may include one or more of: adjusting the polygon count, adjusting primitives utilized to generate the virtual object (e.g., adjusting a shape of the primitives, for example adjusting primitives from triangle mesh to quadrilateral mesh, and so on), adjusting operations performed on the virtual object (e.g., shader operations), adjusting texture information, adjusting color resolution or depth, adjusting a number of rendering cycles or a frame rate, and adjusting quality at one or more points within a graphics pipeline of graphics processing units (GPUs)).

In addition, while the example of FIG. 11A1 provides particular examples of differences in polygon count in different resolution adjustment zones, other absolute numbers of polygons and other rates of change in resolution with distance from the fixation point 1006 are contemplated. For example, while a drop-off of resolution from the fixation point 1006 may be based on a drop-off rate symmetric about depth and lateral distance from the fixation point 1006, other drop-off relationships may also be utilized. For instance, a lateral distance from the fixation point 1006 may be associated with a greater drop-off in resolution relative to a depth distance from the fixation point 1006. Furthermore, the size of each zone (e.g., size of a volume of space of the zone) included in the grid may optionally be different (e.g., the zones may vary radially from a foveal axis). In some embodiments, the drop-off may be continuous from the fixation point 1006, such that discrete zones having assigned resolutions or resolution relationships with the zone containing the fixation point 1006 are not utilized. For instance, a drop-off from the fixation point 1006 to a particular zone 1108 (e.g., a zone in which content is rendered at a resolution of 100 polygons) may be modified to be a continuous drop-off from the fixation point 1006 to an edge of the grid (e.g., edge of the particular zone 1108). As described in further detail below with reference to FIGS. 54-59, in some embodiments, such a drop-off in resolution may be associated with a "rolloff" attribute of a resolution distribution. It will be appreciated that each of the considerations above also apply to zones extending in the vertical direction.

In some embodiments, the number and sizes of zones included in the grid may be based on a confidence associated with a determination of the user's fixation point 1006. For instance, the confidence may be based on an amount of time that the user's eyes have been fixed on the fixation point 1006, with a lesser amount of time being associated with a lesser confidence. For example, the display system may monitor the user's eye at a particular sampling rate (e.g., 30 Hz, 60 Hz, 120 Hz, 1 kHz), and may increase a confidence in the fixation point 1006 as successive samples indicate the user is generally maintaining the fixation point 1006. Optionally, particular thresholds of fixation may be utilized, for instance a fixation for a particular duration (e.g., 100-300 milliseconds) on a same, or similar, fixation point may be associated with a high confidence, while less than the particular duration may be associated with a lesser confidence. Similarly, fluctuations in the eyes, such as pupil dilation, and so on, which may affect a determination of the user's fixation point, may cause the display system to reduce the confidence. It will be appreciated that the display system may monitor the eye with sensors, such as camera imaging devices (e.g., camera assembly 630, FIG. 6). Optionally, the display system may utilize a combination of the sensors to determine an eye gaze of the user (e.g., different eye gaze determination processes may be utilized, such as an infrared sensor utilized to detect infrared reflections from the eye and to identify a pupil, a visible light imaging device utilized to detect an iris of the eye, and so on). The display system may increase a confidence when multiple eye gaze determination processes are in conformance, and may decrease the confidence level if they disagree. Similarly, for display systems which conduct only one of the eye gaze determination processes, each eye gaze determination process may be associated with a particular confidence level (e.g., one determination process may be considered more accurate than others) and the sizes of the resolution adjustment zones may be selected, at least in part, on the process being implemented.

In some embodiments, the display system may increase, or decrease, a number of zones for each updating of the fixation point 1006. For example, more zones may be utilized as the confidence associated with the fixation point 1006 increases and fewer zones may be utilized as confidence decreases. FIG. 11A2 illustrates examples of representations of top-down views of resolution adjustment zones at different times as the sizes and numbers of the zones change. At time t=1, as seen in a top down view, the user's field of view may be divided into an initial set of zones. At time t=2, confidence in the location of the fixation point 1006 increases and the display system may also decrease the size of the zone that is occupied by the fixation point 1006 and that is render at high resolution. Optionally, as illustrated, the sizes of the other zones may also decrease. At time t=3, confidence in the location of the fixation point 1006 decreases and the display system may also increase the size of the zone that is occupied by the fixation point 1006 and that is render at high resolution. Optionally, as illustrated, the sizes of the other zones may also increase. It will be appreciated that a plurality of zones may also extend in the y-axis and that similar increase or decreases in the sizes and numbers of zones may also be instituted on that axis. For example, the sizes of the zones extending vertically on the y-axis may decrease with increasing confidence, while the sizes may increase with decreasing confidence. Optionally, the display system may determine a confidence of the fixation point 1006 for each frame presented by the display system to the user and t=1, t=2, and t=3 may represent different frames. Since assigning more zones may require an increase in computational power (e.g., the display system may have to adjust resolutions of more content, identify which zones content are included in, and so on), the display system may balance the increase in required computational power afforded by the increase in the number zones with the savings in computation power afforded by the potential decrease in the resolution of content.

With reference again to FIG. 11A1, the grid may change dynamically in the sense that the fixation point 1006 may be set as being located at a center (e.g., centroid) of the grid. Therefore, the display system may avoid edge cases in which the fixation point 1006 is determined to be located on vertices of the grid. For example, as the user's eyes rotate and then fixate on different three-dimensional locations in space, the grid may be similarly moved with the user's gaze.

FIGS. 11B-11E illustrate examples of various resolution adjustment zone configurations. Additional shapes and configures of resolution adjustment zones that are not illustrated may be utilized, and the examples should not be considered exhaustive. In addition, in some drawings, the user's eyes 210, 220 may be illustrated spaced apart from the various resolution adjustment zones for ease and clarity of illustration. For all these drawings, it will be appreciated that the eyes 210, 220 may be disposed at the boundary of, or in, the zone (see, e.g., FIG. 11A1).

FIG. 11B illustrates an example of a three-dimensional representation of a portion of the resolution adjustment zones of FIG. 11A1. It will be appreciated that FIG. 11A1 may be understood to illustrate a cross-sectional view taken along the plane 11A1-11A1 of the three-dimensional representation of FIG. 11B, with FIG. 11B omitting some of the resolution adjustment zones of FIG. 11A1 for clarity of illustration. With continued reference to FIG. 11A1, a field of view provided by a display system is separated into 27 zones. That is, the field of view is separated into 3 depth ranges 1102B-1102D, and at each depth range a 3×3 grid of zones is included that extends laterally and vertically at the depth range.

A determined fixation point 1006 is illustrated as being within a zone located in the center of the field of view. Virtual objects located within zones outside of a zone that includes the fixation point 1006 may be reduced in resolution according to a distance from the fixation point's 1006 zone, as discussed herein. Since the zones extend laterally as well as vertically, reduction in resolution can occur based on distance on lateral, vertical, and depth axes (x, y, and z-axes respectively) from the resolution adjustment zone of the fixation point. For example, in some embodiments, virtual objects located in zone 1108 can be reduced in resolution according to lateral distance as shown in FIG. 11A1 (e.g., zone 1108 includes a same vertical portion of the user's field of view as the zone that includes the fixation point 1006, and may be on the same depth plane).

Similar to the above, and similar to the zones described in FIGS. 11O-11E below, the user's fixation point can optionally maintained located at the center (e.g., centroid) of the zones, or the zones can be fixed with respect to the user's field of view and the user's fixation point can be located within any of the zones.

Figure 11C:
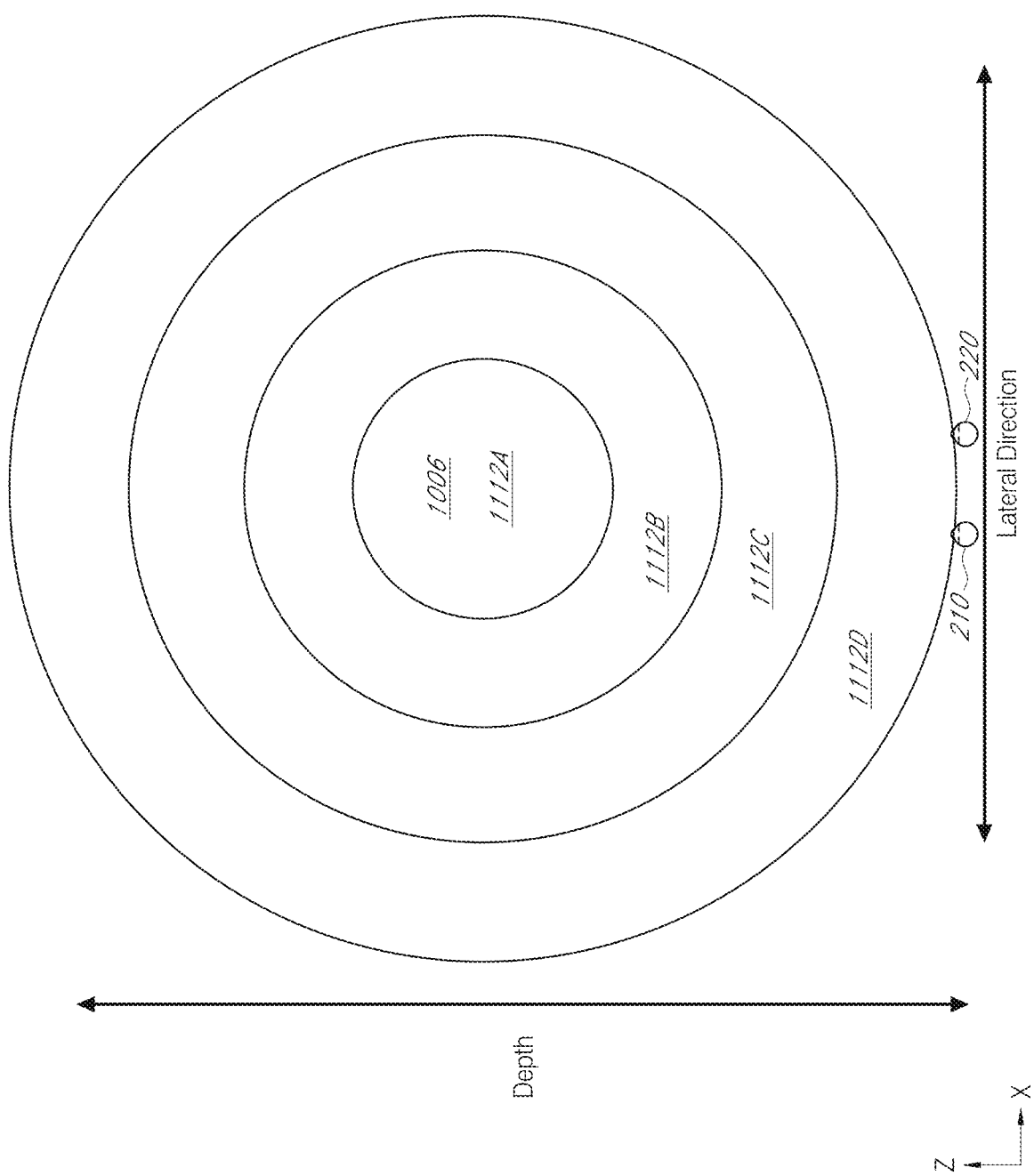
FIG. 11C illustrates another example of a configuration for resolution adjustment zones.
Figure 11D:
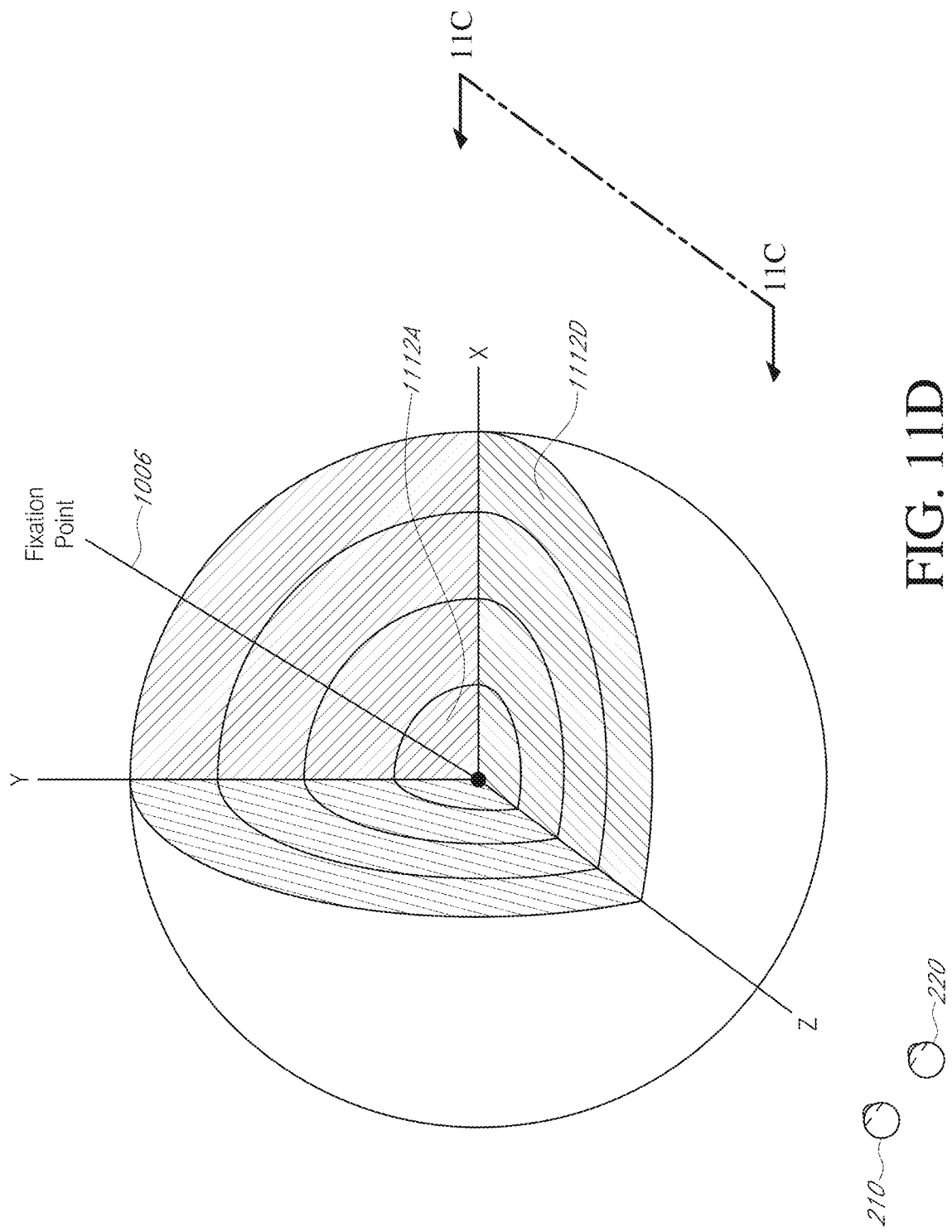
FIG. 11D illustrates an example of a three-dimensional representation of the resolution adjustment zones of FIG. 11C.

FIG. 11C illustrates another example of a configuration for resolution adjustment zones. In the example, a field of view provided by a display system is illustrated as being separated into zones of ellipses that each encompass a particular three-dimensional volume of space. Similar to FIG. 11A1, each zone (e.g., zone 1112A-112D) extends along lateral and depth dimensions. In some embodiments, each zone also extends to encompass at least a portion of the user's vertical field of view. A fixation point 1006 is illustrated as being at a center of the zones (e.g., within zone 1112A). Virtual objects located within zones outside of zone 1112A may be reduced in resolution according to a distance from zone 1112A, for instance according to the techniques described herein. For example, each zone outside of zone 1112A can be assigned a particular resolution, or a drop-off can be utilized, to determine a reduction in resolution. Zone 1112D is illustrated as being a furthest zone from zone 1110A, and the reduction in resolution can be the greatest in zone 1112D.

FIG. 11C illustrates an example of a three-dimensional representation of the resolution adjustment zones of FIG. 11C, with FIG. 11C showing a cross-sectional view taken along the plane 11C-11C. In this example, the field of view provided by the display system is illustrated as being separated into zones of ellipsoids that each encompass a three-dimensional volume of space. The user's fixation point 1006 is illustrated at a centroid of the user's field of view, and located within zone 1112A. Optionally, FIG. 11D can represent each ellipse of FIG. 11C being converted into an ellipsoid. In some embodiments, the size of FIG. 11C's zone 1112A along depth and lateral directions can define the size of the principal axes of FIG. 11D's zone 1112A along the X and Z axes. The various zones may form concentric spheres or ellipsoids.

Figure 11E:
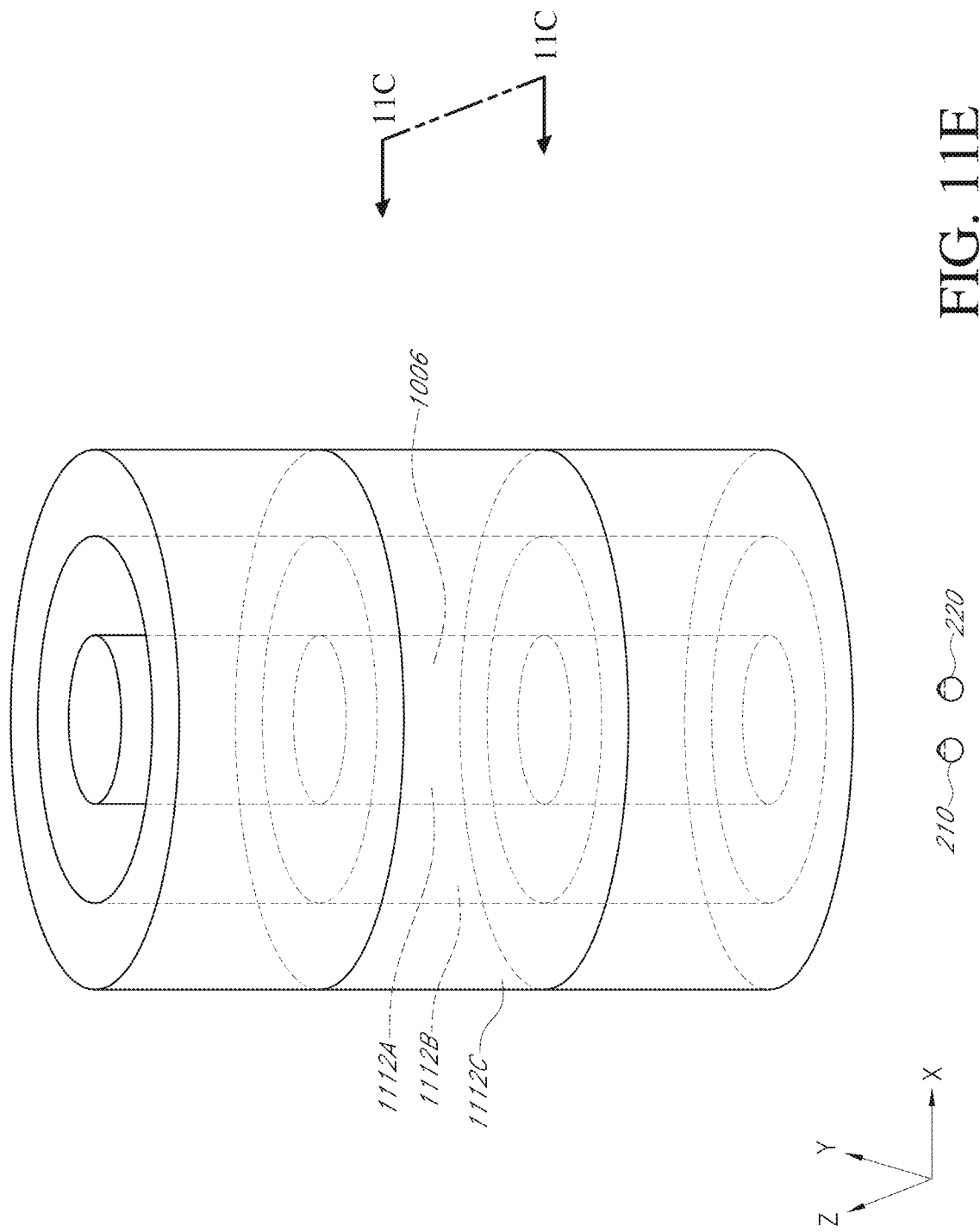
FIG. 11E illustrates another example of a three-dimensional representation of the resolution adjustment zones of FIG. 11C.

FIG. 11E illustrates another example of a three-dimensional representation of the resolution adjustment zones of FIG. 11C, with FIG. 11C showing a cross-sectional view taken along the plane 11C-11C. The field of view provided by the display system is illustrated as being separated into stacked levels of similar concentric zones. For example, FIG. 11E may represent the ellipses of FIG. 11C being extended along a vertical direction to create cylinders. The cylinders may then be separated in the vertical direction, such that each cylinder encompasses a portion of the user's vertical field of view. Therefore, FIG. 11E illustrates 9 zones of cylinders. Each zone additionally excludes any interior zones (e.g., ellipsoid 1112B would encompass a volume of space that excludes a volume of space encompassed by ellipsoid 1112A). In the example, the fixation point 1006 is illustrated as being within a center zone 1110A, and virtual objects located outside of the center zone 1110A can be reduced in resolution according to the techniques described herein.

Figure 12A:
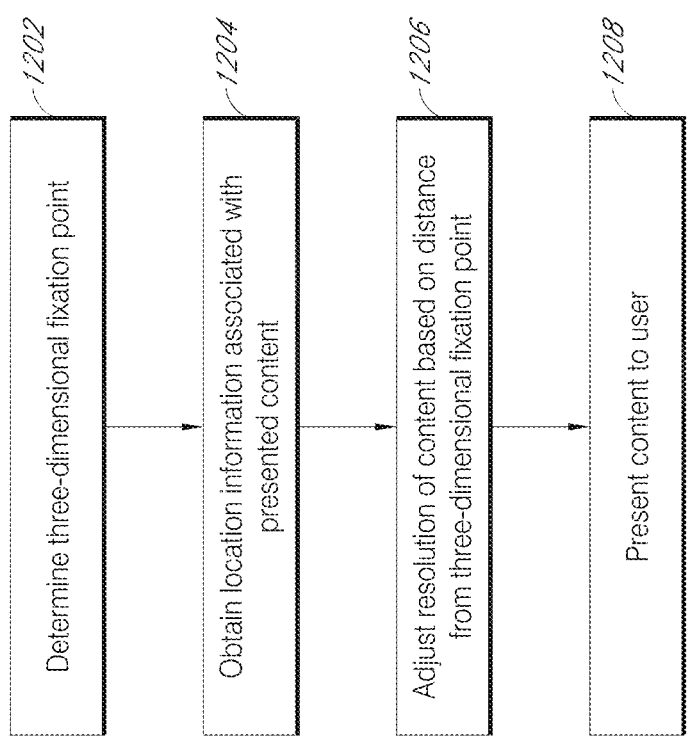
FIGS. 12A-12C shown diagrams of examples of processes for adjusting resolutions of content according to proximity to a three-dimensional fixation point.

FIG. 12A illustrates a flowchart of an example process 1200 for adjusting resolutions of content according to proximity to a three-dimensional fixation point. For convenience, the process 1200 may be described as being performed by a display system (e.g., the wearable display system 60, which may include processing hardware and software, and optionally may provide information to an outside system of one or more computers or other processing, for instance to offload processing to the outside system, and receive information from the outside system).

At block 1202, the display system determines a three-dimensional fixation point of a user. As described above, the display system may include sensors to monitor information associated with the user's eyes (e.g., the orientation of the eyes). A non-exhaustive list of sensors includes infrared sensors, ultraviolet sensors, visible wavelength light sensors. The sensors may optionally output infrared, ultraviolet, and/or visible light onto the user's eyes, and determine reflections of the outputted light from the user's eyes. As an example, infrared light may be output by an infrared light emitter, and an infrared light sensor. It will be appreciated that the sensor, which may include a light emitter, may correspond to the imaging device 630 of FIG. 6.

The display system may utilize the sensors to determine a gaze associated with each eye (e.g., a vector extending from the user's eye, such as extending from the fovea through the lens of the eye), and an intersection of the gazes of each eye. For example, the display system may output infrared light on the user's eyes, and reflections from the eye (e.g., corneal reflections) may be monitored. A vector between a pupil center of an eye (e.g., the display system may determine a centroid of the pupil, for instance through infrared imaging) and the reflections from the eye may be used to determine the gaze of the eye. The intersection of the gazes may be determined and assigned as the three-dimensional fixation point. The fixation point may therefore indicate a location at which content is to be rendered at a full or maximum resolution. For example, based on the determined gazes the display system may triangulate a three-dimensional location in space at which the user is fixating. Optionally, the display system may utilize orientation information associated with the display system (e.g., information describing an orientation of the display system in three-dimensional space) when determining the fixation point.

At block 1204, the display system obtains location information associated with content being, or that is to be, presented by the display system to the user. Prior to rendering content for presentation to the user (e.g., via outputs of waveguides, as described above), the display system may obtain location information associated with content that is to be presented to the user. For instance, as described above, the virtual content may be presented to the user such that the content appears to be located in the real-world (e.g., the content may be located at different depths within the user's field of view). It will be appreciated that the display system include or may have access to a three-dimensional map of the ambient environment, which can inform locations of any virtual content in this ambient environment. With reference to this map, the display system may access and provide information specifying three-dimensional locations of virtual content within the user's field of view (e.g., locations within a display frustum, as illustrated in FIGS. 10A-10B).

At block 1206, the display system adjusts resolution of virtual content to be displayed to the user. The display system adjusts the resolution of content based on its proximity to the three-dimensional fixation point. For instance, a rendering engine, such as a rendering engine implemented by processing devices (e.g., central processing units, graphics processing units) which renders content for presentation to the user, may adjust resources invested in rendering the content (e.g., the rendering engine may adjust a resolution of the content).

The display system may determine a distance in three-dimensional space between content to be presented to the user and the user's fixation point, and may reduce a resolution of the content based on the determined distance. The reduction may be determined according to a drop-off rate, for instance a continuous function that correlates distance to the resolution of content, and the display system may obtain the resolution to render the content based on the continuous function. Optionally, the display system may determine the distance from a centroid of the content to the fixation point, and may render the content at a resolution based on the distance. Optionally, the display system may render portions of a same content at different resolutions according to the distance of various portions to the fixation point (e.g., the display system may separate the content into portions, and may render further portions at reduced resolutions as compared to closer portions).

In some embodiments, the display system may access information usable to separate a field of view of the user (e.g., corresponding to the display frustum) into zones, with each zone representing a volume of space in which content may be included. The accessed information, for example the grid illustrated in FIG. 11A1, may indicate a particular resolution to utilize when rendering content that is to be included in each zone, with the three-dimensional fixation point being set at a center of the grid. Additionally, the grid may indicate drop-offs in resolution to utilize when rendering content. For content that is included in multiple zones (e.g., content located in three-dimensional space claimed by two zones), the display system may optionally adjust a resolution of the content to correspond to a single zone, or optionally adjust portions of the content according to corresponding zones in which the portions are located.

When setting the resolution of content, the display system renders content located at the fixation point (e.g., in a same zone as the fixation point) at a full or maximum resolution. The maximum resolution may be based on a maximum value that hardware and/or software of the display system is capable of rendering, while ensuring that content is presented to the user at greater than a threshold refresh rate (e.g., 60 Hz, 120 Hz) and optionally ensuring that the content is updated at speeds greater than vergence rates (e.g., greater than 60 ms) and greater than accommodation times (e.g., 20 ms to 100 ms) to reduce the perceptibility of changes in resolution. The display system may dynamically modify the maximum resolution, for instance prior to the display system rendering each frame, based on available resources of the display system. For example, as more content is to be presented to the user, a maximum resolution of content may be decreased, ensuring that the display system may present frames of rendered content at above threshold rates desired for reducing the perceptibility of changes in resolution. The display system may optionally monitor the frames per second at which content is being presented, and may adjust the maximum resolution, and/or adjust resolution drop-off rates based on distance from the fixation point, to ensure the presented frames per second does not drop below the threshold rate. As an example, the display system may render content, such as a first virtual object, located in the fixation point's zone at a maximum resolution. Instead of reducing the maximum resolution of the first virtual object, to ensure the frames per second remains above a particular threshold, the display system may dynamically increase drop-off rates of resolution based on distance. In this way, the display system may adjust resolutions assigned to each zone outside of the fixation point's zone. Optionally, the display system may set a minimum resolution that may be used in each zone outside of the fixation point's zone, and may adjust the maximum resolution if the minimum resolution would be exceeded (e.g., if the display system needs to reduce resolution of content below the minimum to maintain the threshold rate, the display system may reduce the maximum resolution). Similarly, the display system may reduce the maximum resolution while not reducing resolutions of content in zones outside of the fixation point's zone. Optionally, a user of the display system may indicate whether he/she prefers that content located proximate to the fixation point is to be given preference over other content.

Figure 13:
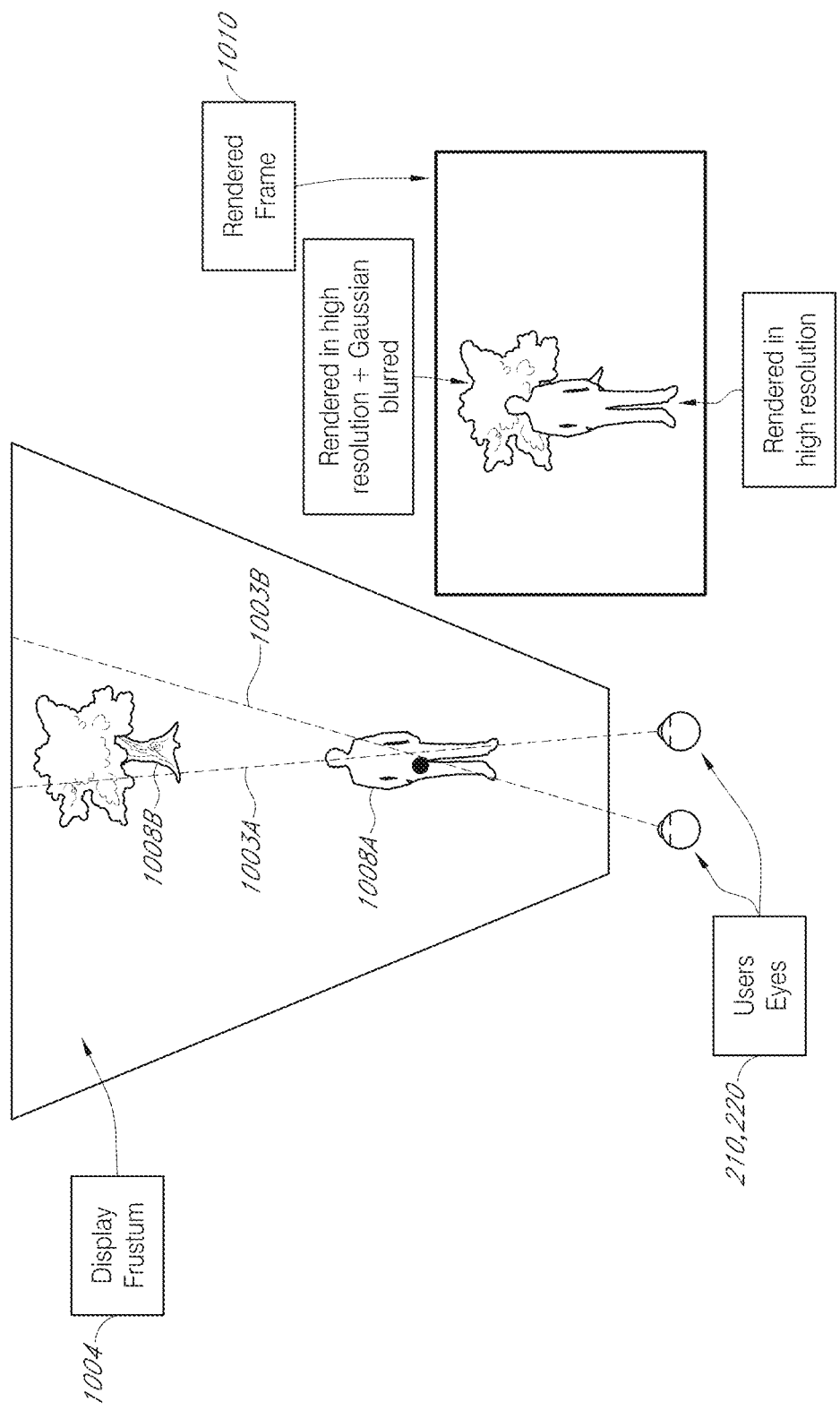
FIG. 13 illustrates an example of a representation of a user viewing multiple virtual objects aligned with the user's line of sight.

In some embodiments, and as will be described in more detail below with respect to FIGS. 13-14, the display system may optionally utilize an angular proximity of content to a gaze of the user to adjust resolution of the content. For example, if particular content is located outside of a zone in which the fixation point is located, but is within a threshold proximity of a gaze of the user such that the particular content will fall on a fovea of the user's eye, the display system may cause the particular content to be rendered at a greater resolution (e.g., the maximum resolution, or at a resolution greater than indicated in the grid illustrated in FIG. 11A1). Optionally, the display system may reduce a resolution of the particular content, and apply a blurring process (e.g., Gaussian blur) to the particular content. In this way, the particular content may be rendered at a lesser resolution, while being blurred to represent that the particular content is, for instance, further away from the user than the fixation point. In addition, the blurring may reduce the perceptibility of the lower resolution (e.g., the blurring may reduce the perceptibility of increases in pixel size due to the lower resolution).

Figure 12B:
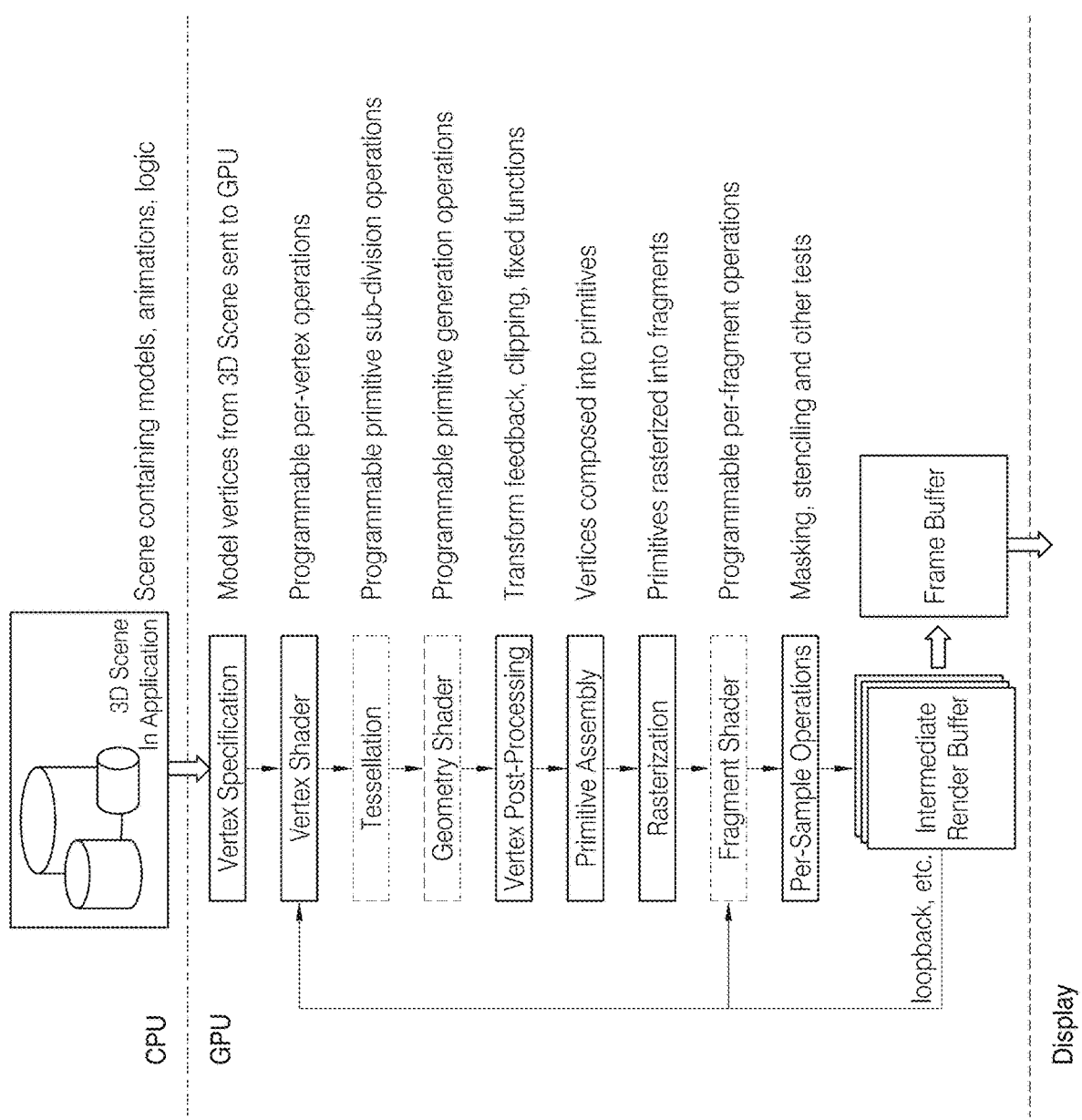
Figure 12C:
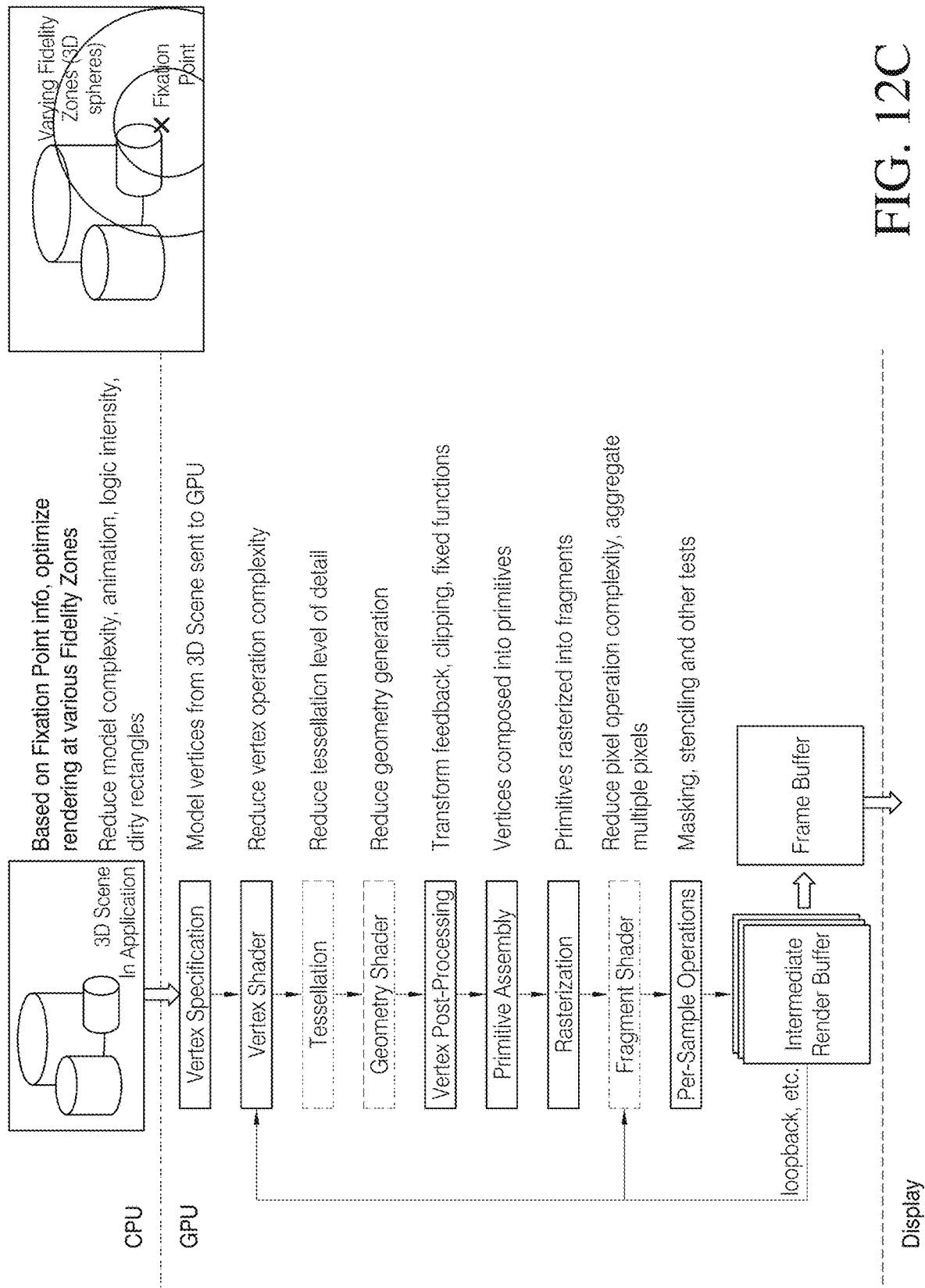

Example operations associated with presenting virtual content are illustrated in FIGS. 12B-12C (e.g., a rendering pipeline). In the example of FIG. 12B, a three-dimensional scene is presented to a user, without adjustments to resolution made as described herein. In FIG. 12C, adjustments to resolution are performed according to fixation point information as described herein. For example, one or more of the following adjustments can be performed: reducing vertex operation complexity, reducing tessellation level of detail, reducing geometry generation, reducing pixel operation complexity/aggregation of multiple pixels, and so on. The adjustments, as illustrated, can advantageously be performed at different steps within a pipeline to present virtual content, and can be optimized according to particular software and/or hardware utilized to present the virtual content. It will be appreciated that the fidelity zones noted in FIG. 12C are resolution adjustment zones.

With reference again to FIG. 12A, the display system presents adjusted content to the user at block 1208. As described above, the display system has adjusted the resolutions of content based on proximity to the three-dimensional fixation point. Subsequently, the display system presents rendered content at associated locations to the user. In some embodiments, the display system may perform process 1200 for each frame of content to be rendered, or may adjust resolutions of content as the user adjusts his/her fixation point.

As noted above, in some embodiments, virtual objects may be within a user's line of sight while also being presented at different depths. FIG. 13 illustrates an example of a representation of a user viewing multiple virtual objects aligned with the user's line of sight. The example representation includes a user's field of view (e.g., display frustum 1004 of the display system), along with a gaze 1003A, 1003B of the user's eyes 210, 220, which are fixated at a fixation point on a first virtual object 1008A.

As illustrated, a second virtual object 1008B is within an angular proximity of a gaze of the user (e.g., one or both of gaze vectors 1003A, 1003B) such that the second virtual object 1008B will fall on the user's fovea (e.g., fall on at least one fovea of either eye). For example, upon rendering frame 1110, the second virtual object 1008B is located behind (e.g., at a greater perceived depth from) the first virtual object 1008A. It will be appreciated that the fovea is the portion of the retina having the highest visual acuity. Since the second virtual object 1008B will fall on the user's fovea, if a resolution of the second virtual object 1008B is reduced (e.g., reduced as described above, with respect to, at least, FIG. 11A1) the user may perceive the reduction in resolution. To avoid a perceptible reduction in resolution, the display system may (1) cause the second virtual object 1008B to be rendered at a same resolution as the first virtual object 1008A, or within a threshold resolution of the first virtual object 1008A, and/or (2) cause the second virtual object 1008B to be rendered at a reduced resolution (e.g., as indicated in FIG. 11A1) and apply a blur to the second virtual object prior to presentation to the user. Without being limited by theory, the blur may mask the reduction in resolution while providing a depth cue.

Figure 14:
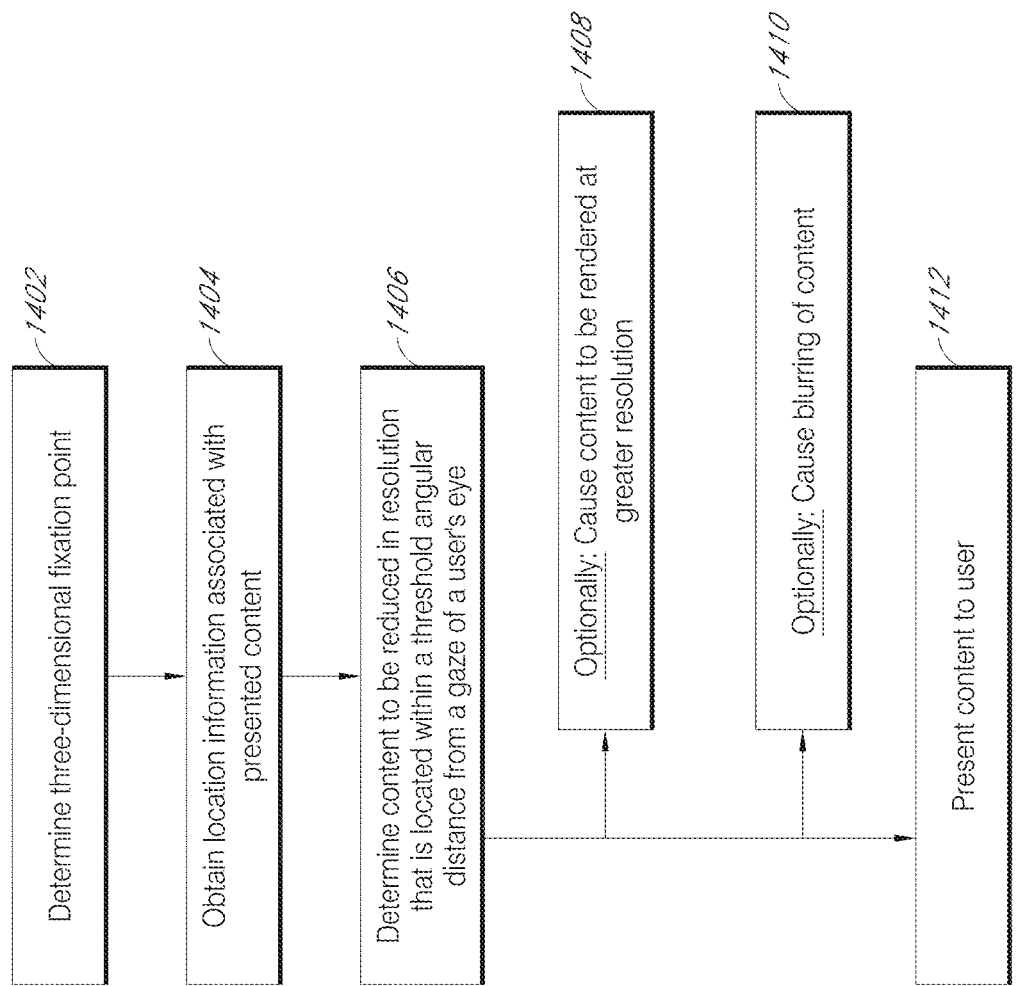
FIG. 14 is a diagram of an example of a process for adjusting virtual content based on angular proximity to a user's gaze.

FIG. 14 is a flowchart of an example of a process 1400 for adjusting virtual content based on angular distance from a user's gaze. For convenience, the process 1400 will be described as being performed by a display system (e.g., the wearable display system 60, which may include processing hardware and software, and optionally may provide information to an outside system of one or more computers or other processing units, for instance to offload processing to the outside system, and receive information from the outside system). In the example process 1400, the display system is a vari-focal display system, in which each frame is presented on the same depth plane, and optionally having all content to be presented collapsed into a single frame buffer; that is, the vari-focal display system presents virtual content on one depth plane at a time.

The display system determines a three-dimensional fixation point of a user (block 1402) and obtains location information associated with presented content (block 1404). The blocks 1402 and 1404 may correspond to the blocks 1202 and 1204, respectively, of FIG. 12A. As described above with reference to FIG. 12A, the display system monitors eye movements (e.g., eye orientations) of the user and determines fixation points of the user. The display system may obtain location information of content to be presented (e.g., in a next frame), and may subsequently adjust resolutions of the content.

With continued reference to FIG. 14, the display system determines content to be reduced in resolution and that is located within a threshold angular distance from the user's gaze (block 1406). The display system identifies content that is to be reduced in resolution due to the proximity of the content from the fixation point (e.g., the content is located at a greater depth than the fixation point), but that will fall on the user's fovea (e.g., fall within a threshold angle from the user's gaze). Since the content will fall on the user's fovea, the user may be able to perceive the reduction in resolution, as by the three-dimensional fixation point foveated rendering described herein. It will be appreciated that content block 1406 may comprise performing the blocks illustrated in FIG. 12C, particularly the blocks identified in the section "GPU".

Consequently, at block 1408, the display system may optionally cause the determined content to be rendered at a greater resolution. The display system may adjust the resolution of the determined content to be at full resolution (e.g., at the same resolution as content located at the fixation point, or within a same zone, or volume of space, as the fixation point), or to be at greater than the reduced resolution that would otherwise be assigned to the content (e.g., as described in block 1406).

At block 1410, display system may optionally reduce the resolution of the content, and may blur the content prior to presentation to the user. As described above, a vari-focal display system may utilize a single display buffer to present content to the user. Since the vari-focal display system is presenting all content at the same depth plane, the vari-focal display system may utilize the same display buffer to output the content, for instance, from a rendering engine.

Optionally, the display system may utilize initial depth buffers, with each depth buffer assigned one or more depth planes, and may combine the initial depth buffers to obtain the display buffer. With reference to the illustration of FIG. 13, a first depth buffer may include the first virtual object 1306, while a second depth buffer may include the second virtual object 1308. The display system may then apply a blurring process to the second depth buffer, or to particular content included in the second depth buffer (e.g., the display system may apply the blurring process to the second virtual content 1308, but not to other content located on a same depth plane but at a further angular distance from the user's gaze). After performing the blurring process, the display system may combine the first depth buffer and second depth buffer (e.g., the display system may add occlusions, for instance removing a portion of the second virtual object 1308 not visible due to occlusion by the first virtual object 1306), to obtain the display buffer.

An example blurring process may include the display system performing a convolution of a kernel associated with blurring (e.g., a Gaussian kernel, circular kernel such as to reproduce a bokeh effect, box blur, and so on) to the content. In this way, the reduction in resolution may be masked, while the processing savings from reducing the resolution may be maintained. Optionally, a strength associated with the blurring process (e.g., a degree to which the content is blurred) may be based on a difference in depth between the user's fixation point and the content, and/or an angular proximity of the content to the user's gaze. For example, the degree of blurring may increase with increasing proximity to the user's gaze.

In some embodiments, the display system may utilize the features of block 1408 or 1410 according to hardware and/or software of the display system. For example, particular hardware (e.g., graphics processing units) may be able to perform the blurring process in hardware without a threshold hit to performance of the hardware. For this particular hardware, the display system may be configured to reduce resolution of content and then blur the content. However, other hardware may be slow to perform the blurring process, and rendering content at greater resolutions might enable greater performance. For this other hardware, the display system may be configured to render content at greater resolutions. Furthermore, the decision between whether to render content at a greater resolution, or at a lower resolution with blurring may depend on the type of content to be displayed. For instance, the display system may be configured to render text at a greater resolution, while rendering shapes at a lower resolution and blurring.

With continued reference to FIG. 14, at block 1412 the display system presents content to the user. The display system may present the adjusted content to the user, for instance from a same display buffer as described above.

II. Changes in Resolution Based on Ambient Illumination Levels

In addition to or as an alternative to reductions in resolution along the z-axis, various other schemes for presenting virtual content with reductions in resolution may be implemented in some embodiments. Advantageously, as noted herein, some aspects of the virtual content may be presented at relatively high resolution and some other aspects may be presented in relatively low resolution, which may reduce the use of computational and energy resources by the display system, while preferably having low impact on the perceived image quality of the virtual content.

Figure 15:
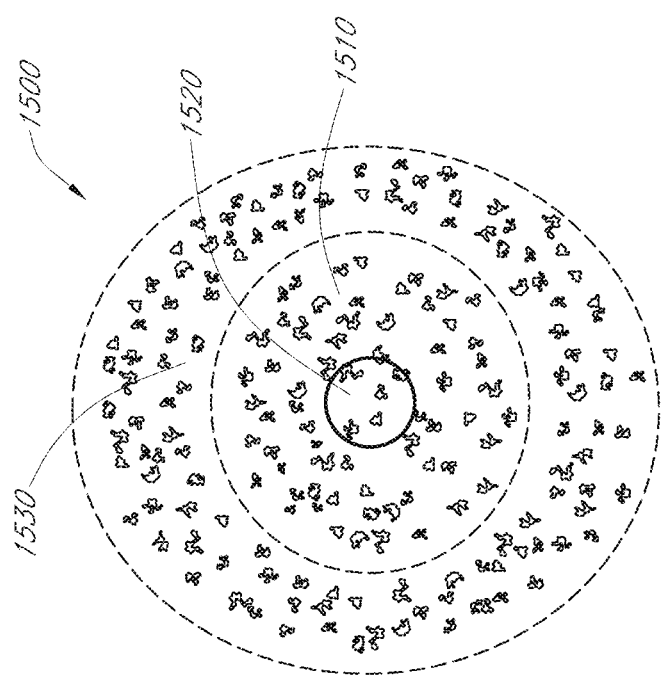
FIG. 15 illustrates an example of a representation of the retina of an eye of a user.

With reference now to FIG. 15, an example is illustrated of a representation of the retina of an eye of a user. The illustrated view shows a retina 1500 as seen when viewed head-on along the visual axis of that retina. The retina 1500 includes a fovea 1510 surrounded by a peripheral area 1530. Within the fovea 1510 is the foveola 1520, which intersects the visual axis.

It will be appreciated that the retina includes two types of photoreceptors: rods and cones. In addition, the distributions of these photoreceptors across the retina varies, providing different rod and cone densities across the retina.

Figure 16:
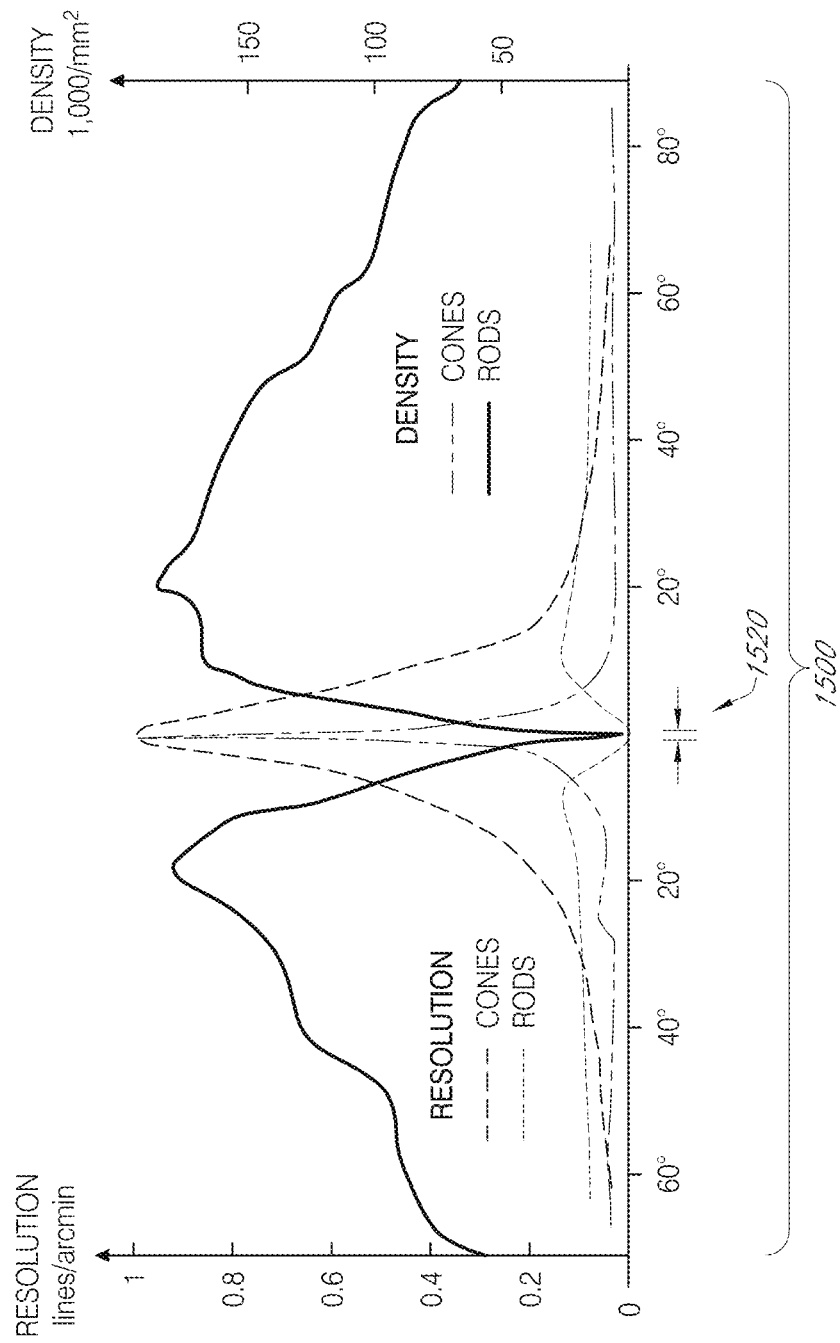
FIG. 16 graphically illustrates an example of resolution, and rod and cone density, across the retina of FIG. 15.

With reference now to FIG. 16, an example of resolution, and rod and cone density, across the retina 1500 of FIG. 15 is graphically illustrated. The x-axis indicates degrees of eccentricity relative to a point at which the visual axis intersects the retina. The rightward direction on the page is the nasal direction and the leftward direction on the page is the temporal direction. As illustrated, the resolution of the human eye roughly correlates with the densities of photoreceptors (rods and cones) in the retina. Consequently, in some embodiments, the reduction or taper in the resolution (e.g., spatial resolution) of virtual content on the x and y-axes (e.g., on a given depth plane) may substantially follow the reductions across the retina of cone density, rod density, or an aggregate of rod and cone density. For example, the trend of the resolution reduction away from the fixation point across the user's field of view may be within ±50%, ±30%, ±20%, or ±10% of the trend in the changes in the photoreceptor density (e.g., cone density, rod density, or an aggregate of rod and cone density) over corresponding portions of the retina. In some embodiments, the reduction in resolution away from the fixation point is gradual and substantially follows the density changes. In some other embodiments, the reduction in resolution may occur in steps (e.g., one step, two steps, etc.). For example, there may be two steps: a highest resolution region of the field of view correlated with the foveola, a medium resolution region correlated with the fovea, and a lower resolution region correlated with the peripheral area.

With continued reference to FIG. 16, it will be appreciated that different photoreceptors have different levels of activity under different light conditions, e.g., at different ambient illumination levels. As a result, it is possible that, while reductions in resolution that follow the densities of photoreceptors may not be consciously perceptible to the user at some illumination levels, they may be perceptible at other illumination levels. Consequently, in some embodiments, reductions in the resolution of virtual content, along the x, y, or z-axes, maybe set with reference to external light conditions.

For example, the vision behavior of the eye may be divided into three modes, based on the light conditions. The three modes are photopic vision, mesotopic vision, and scotopic vision. Photopic vision typically occurs in bright conditions, e.g., ambient light or illumination levels of about 3 $cd/m^2$ or more, including about 10 to $10^8$ $cd/m^2$. In photopic vision, cones are primarily active. In scotopic vision, rods are primarily active. In mesotopic vision, both rods and cones may be active. As used herein, ambient light conditions or illumination levels refer to the amount of light that the eye of the user and his/her retina are exposed to.

Mesotopic vision typically occurs under lower light conditions, e.g., illumination levels of about $10^{-3}$ to $10^{0.5}$ $cd/m^2$. Both cones and rods are active in at least some illumination levels within mesotopic vision, with the dominance of the rods or cones changing over time depending upon whether ambient illumination levels are increasing or decreasing. As the eye adapts to a brighter environment, more cones become activated in comparison to rods; on the other hand, as the eyes adapt to a dark environment, more rods are activated in comparison to cones.

Scotopic vision typically occurs in light conditions in which the illumination levels are less than the illumination levels for photopic vision. For example, scotopic vision may occur at illumination levels of about $10^{-2}$ $cd/m^2$ or less, or about $10^{-3}$ $cd/m^2$ or less, including about $10^{-3}$ to $10^{-6}$ $cd/m^2$. Rods are primarily active in scotopic vision. It will be appreciated that the illumination levels noted herein for photopic, mesotopic, and scotopic vision are examples. In some embodiments, the illumination levels associated with each of type of vision may be assigned arbitrarily, based on user preferences, and/or customization for a group to which the user belongs (e.g., based on gender, age, ethnicity, the presence of visual abnormalities, etc.).

In some embodiments, the type of vision (photopic, mesotopic, or scotopic) active in the user may be determined based on measurements of ambient illumination levels. For example, the display system may be configured to measure ambient illumination levels using a light sensor, such as the outwardly-facing camera 112 (FIG. 9D). In some embodiments, the display system may be in communication with another sensor or device which provides information regarding the ambient illumination levels.

Figure 17:
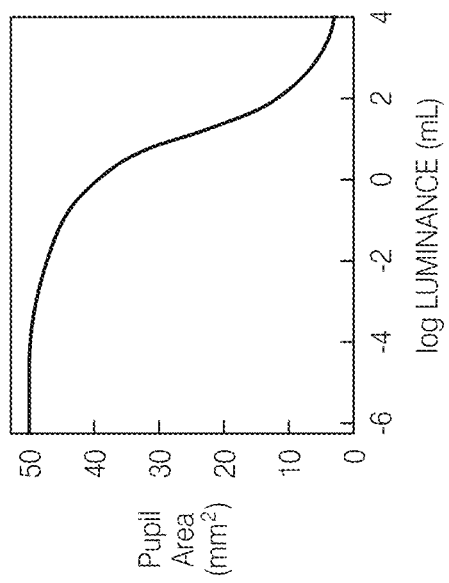
FIG. 17 graphically illustrates an example of the relationship between pupil size and the amount of light incident on an eye of a user.

It will be appreciated that head-mounted display systems may block or attenuate some of the ambient light, such that an outwardly-facing camera may not give luminance levels that accurately reflect the amount of light impinging on the eye. In addition, the display system, in projecting light to the eye to provide virtual content, is also a source of light that may alter the illumination levels to which the eye is exposed. In some other embodiments, an inwardly-facing camera may be utilized to determine luminance levels. For example, luminance levels are roughly correlated with the size of the pupil. FIG. 17 graphically illustrates an example of the relationship between pupil size and the amount of light incident on an eye of a user. The x-axis shows values for luminance and the y-axis shows values for pupil area. Consequently, the display system may be configured to determine the pupil area of the user and then extrapolate luminance based on this pupil area. For example, the display system may be configured to use the inwardly-facing camera 500 (FIG. 6) to capture an image of the eye 210 of the user and then analyze the image to determine the pupil area or other metric indicative of pupil area (e.g., pupil diameter or width). For example, the area occupied by the pupil of the eye 210 in the image captured by the camera may be determined and then corrected for any scaling factor caused by the optics of the camera. Advantageously, using pupil area to determine luminance levels may effectively take into account both reductions in ambient luminance levels caused by the display blocking some ambient light and also contributions to the luminance levels by the light output of the display itself.

With continued reference to FIG. 17, the display system may be configured to determine whether the user's eyes are in a photopic, mesotopic, or scotopic vision mode based upon the determined pupil area. For example, the display system may have resident in memory a table or other stored information specifying the vision mode expected for particular pupil area. As examples, in line with the graph shown in FIG. 17, the display system may categorize pupil areas of about 3 mm$^2$ or less as being indicative of photopic vision, pupil areas of 3 mm$^2$ or more up to about 38 mm$^2$ as being indicative of mesotopic vision, and pupil areas of more than 38 mm$^2$ as being indicative of scotopic vision. It will be appreciated that these luminance values and associated vision modes are examples and that other values may be substituted. For example, different values may be applied to different users in response to input from the users, or different values may be applied based on the particular category in which the user may fall (e.g., gender, age, ethnicity, the presence of visual abnormalities, etc.). In addition, it will be appreciated that the display system does not necessarily identify a specific vision mode. Rather, the display system may be configured to simply associate particular measured pupil areas with particular resolution levels or adjustments.

In some embodiments, inputs from both the inwardly-facing camera 510 (FIG. 6) and the outwardly-facing camera 112 (FIG. 9D) may be utilized to determine luminance levels. For example, the display system may be configured to take an average (including a weighted average) of the luminance levels determined using the cameras 510 and 112. As noted above, the luminance level determined using the camera 510 may be extrapolated from the size of the pupil area of the user's eye, based on imaging the user's eye using that camera 510.

It will be appreciated that rods and cones have different levels of visual acuity and different sensitivities to color and contrast. Consequently, because ambient luminance levels impact whether rods and/or cones are active, there are differences in visual acuity and sensitivities to color and contrast at different ambient luminance levels. Advantageously, the light-level differences in visual acuity and sensitivities to color and contrast may be applied to provide additional bases for reducing resolution, which may be utilized in conjunction with changes in resolution based on the fixation point as described above (e.g., regarding FIGS. 12A and 14), or may be utilized separately even without specifically making changes in resolution based on the fixation point.

Figure 18:
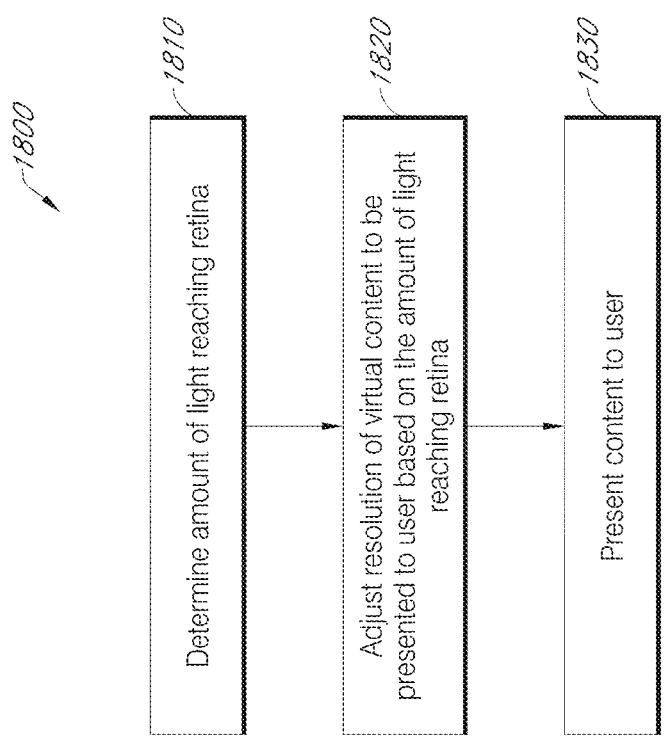
FIG. 18 is a diagram of an example of a process for adjusting virtual content based on the amount of light incident on an eye of a user.

With reference now to FIG. 18, a diagram is shown of an example of a process 1800 for adjusting virtual content based on the amount of light incident on an eye of a user. For convenience, the process may be described as being performed by a display system (e.g., the wearable display system 60 (FIG. 9D), which may include processing hardware and software, and optionally may provide information to an outside system of one or more computers or other processing units, for instance to offload processing to the outside system, and receive information from the outside system).

At block 1810, the display system determines the amount of light reaching the retina. Preferably, this determination is an estimate of the amount of light reaching the retina rather than a direct measurement of light that impinges on the retina. This estimate may be made as discussed herein using the methods disclosed for determining luminance levels. For example, luminance levels may be assumed to correspond to the amount of light reaching the retina. As result, determining the amount light reaching the retina may include determining a size of the user's pupil and/or determining ambient luminance levels using a sensor configured to detect light, such as an outwardly-facing camera on a display device.

At block 1820, the display system adjusts the resolution of virtual content to be presented to the user based on the amount of light found to be reaching the retina at block 1810. In some embodiments, adjusting the resolution of the virtual content comprises adjusting one or more of the spatial resolution, color depth, and light intensity resolution of the virtual content. It will be appreciated that the human visual system has the greatest acuity and sensitivity to spatial resolution, color, and light intensity under photopic illumination levels. The ability to perceive differences in spatial resolution, color, and light intensity decrease under mesotopic illumination levels, and further decrease under scotopic illumination levels.

Consequently, in some embodiments, if the amount of light present is found to correspond to the levels for photopic vision, then virtual objects may be rendered at full or high spatial resolution (compared to spatial resolution which would be utilized for mesotopic or scotopic vision). If the amount of light present is found to correspond to mesotopic levels, then virtual objects may be rendered at may reduce spatial resolution compared to the spatial resolution utilized for virtual objects under photopic illumination levels. If the amount of light is found to correspond to scotopic levels, then the virtual objects may be rendered at a spatial resolution that is lower than that used under mesotopic or photopic illumination levels. Spatial resolution may be adjusted as described herein, e.g., by reducing the number of polygons, etc.

Color depth or bit depth may similarly be adjusted depending on illumination levels, with the highest color depth used under photopic illumination levels, an intermediate color depth used under mesotopic illumination levels, and the lowest color depth used under scotopic illumination levels. It will be appreciated that color depth may be adjusted by changing the number of bits used for each color component of a pixel, with fewer bits equating to lower color depth.

Likewise, without being limited by theory, gradations in light intensity are believed to become larger as illumination levels progress from photopic to mesotopic to scotopic illumination levels. Stated another way, the human visual system is believed to be able to discern fewer differences in light intensity as the ambient illumination level decreases. In some embodiments, the display system may be configured to display fewer gradations in light intensity as illumination levels progress from photopic to mesotopic to scotopic illumination levels. As a result, the largest number of gradations in light intensity levels are presented under photopic illumination levels, fewer gradations are presented under mesotopic illumination levels, and yet fewer gradations are presented under scotopic illumination levels.

In addition, in some embodiments, the display system may be able to provide a larger number of gradations in light intensity than the user is able to perceive. An example of this illustrated in FIGS. 22a-22c, discussed further below. For example, the display system may be able to display 256 different levels of intensity for a given image pixel, but the user may only be able to perceive a lower number of levels, e.g., 64 levels. In this instance, multiple possible light intensity levels are subsumed within a single one of the perceptible light intensity levels. For example, the display system may be able to display four different light intensity levels, but the user may perceive all four as being similar. In such circumstances, where multiple possible light intensities are perceived by the user as being the same, the display system may be configured to select the lowest intensity value, out of these values that are perceived to be similar, for display. As a result, the display system may be able to utilize lower intensities, thereby reducing the amount of power used to illuminate a display to achieve the desired light intensities. This may have particular advantages in display systems in which individual pixels of a spatial light modulator are themselves light emitters, such as organic and inorganic LEDs. In some embodiments, the number of gradations decrease with decreases in ambient illumination levels, and the display system is configured to group a larger number of possible light intensity levels together, to display the lowest light intensity of the group.

It will be appreciated that, for virtual content that is to be displayed, one, two, or all three of spatial resolution, color depth, and light intensity resolution may be changed based on the light conditions to which a user is subjected (the amount of light reaching the user's retina). These adjustments to spatial resolution, color depth, and/or light intensity resolution based on light conditions may be made to virtual content overall, without making adjustments to resolution based on distance from the fixation point of the user's eyes, as disclosed herein. In some other embodiments, the adjustments to spatial resolution, color depth, and/or light intensity resolution based on light conditions may be made in conjunction with adjustments to resolution based on distance from the fixation point (see, e.g., FIGS. 12A and 14). In some embodiments, if resolution decreases with distance from the fixation point, the profile of the decrease on a given plane (on the x and y-axes) preferably matches the profile of changes in cone density across corresponding portions of the retina.

In some embodiments, as noted herein, adjustments to spatial resolution, color depth, and/or light intensity resolution are preferably tied to the mode of vision (photopic, mesotopic, or scotopic vision) active at a given time. These adjustments may dynamically change if the mode of vision changes. For example, when the user progresses from photopic vision to scotopic vision, resolution may decrease as discussed herein. Conversely, when the user progresses from scotopic vision to mesotopic vision, the resolution of virtual content may increase. It will be appreciated that tying resolution adjustments to a particular mode of vision does not require a specific determination that the user is in that particular mode; rather, the display system may be configured to simply associate particular ranges of ambient illumination levels or pupil size with particular resolutions, whether spatial resolution, color depth, or light intensity resolution. In addition, while the resolution adjustments are preferably tied to three levels of light conditions (corresponding to three modes of vision) as discussed herein, in some embodiments, the resolution adjustments may be tied to two levels of light conditions, or more than three levels of light conditions.

It will also be appreciated that the resolution adjustment may occur in real time (e.g., as ambient light conditions change), or may be delayed for a set duration to allow the human visual system to adapt to existing light conditions before the resolution adjustment to virtual content is made. Without being limited by theory, it is believed that the human visual system requires a period of time to adapt to different illumination levels, with that period of time increasing as illumination levels decrease. Consequently, in some embodiments, adjustments in resolution due to changing illumination levels are not made until the user has been exposed (e.g., substantially continuously exposed) to a particular illumination level for a set amount of time. For example, the set amount time may be 5 minutes, 10 minutes, 15 minutes, or 20 minutes.

With continued reference to FIG. 18, at block 1830, virtual content is presented to the user. The presentation of this virtual content may be conducted as discussed herein, e.g., as in block 1208 of FIG. 12A or block 1412 of FIG. 14.

Figure 19:
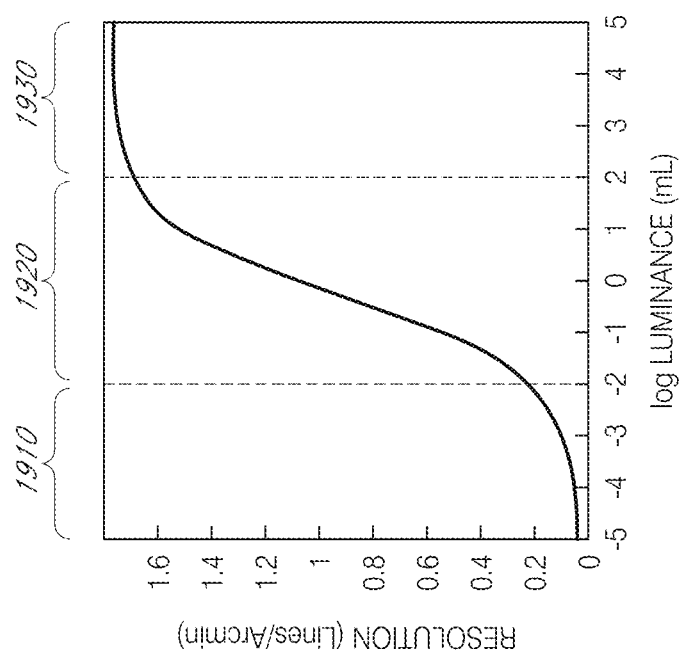
FIG. 19 graphically illustrates an example of a change in resolution detectable by the eye of a user as the amount of light incident on the eye changes.

With reference now to FIG. 19, an example is graphically illustrated of a change in resolution detectable by the eye of a user as the amount of light incident on the eye changes. This figure illustrates an example of the sensitivity of the human visual system to spatial resolution under different vision modes. Scotopic vision occurs in the low-light region 1910, mesotopic vision occurs in the medium-light region 1920, and photopic vision occurs in the bright light region 1930. As shown, sensitivity to spatial resolution decreases substantially as ambient illumination levels decrease. In some embodiments, the adjustments to spatial resolution discussed above regarding FIG. 18 correspond to the contours of the illustrated curve. For example, for a given light level in the photopic or scotopic vision mode, the virtual content is rendered with sufficient spatial resolution to meet or exceed the resolution values shown on the y-axis.

Figure 20:
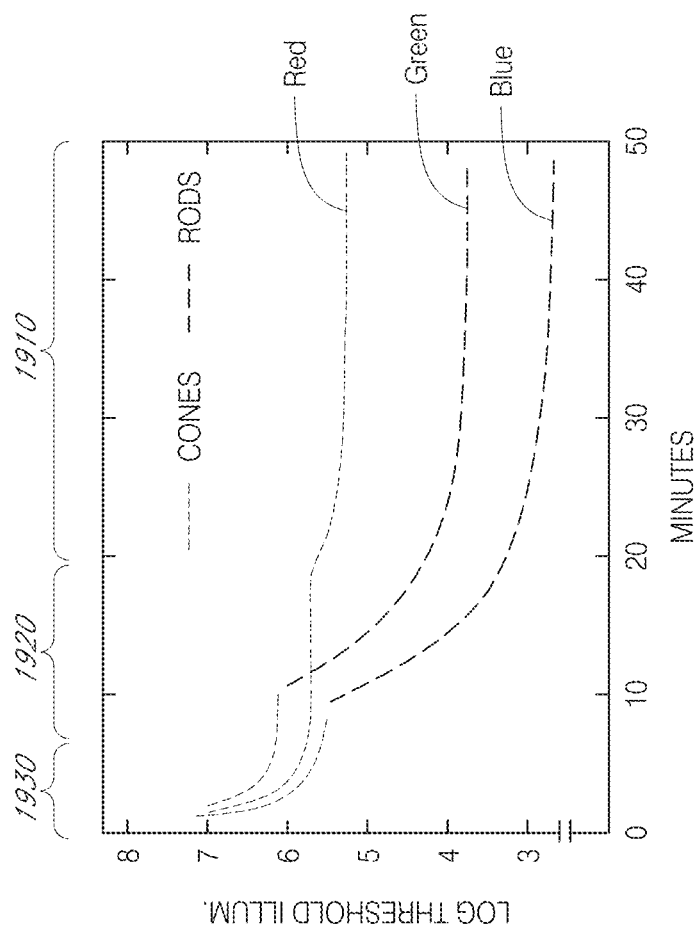
FIG. 20 graphically illustrates an example of differences in sensitivity of the eye to light of different colors at different levels of illumination.

With reference now to FIG. 20, it will be appreciated that different photoreceptors may be used to perceive light of different wavelengths or colors. FIG. 20 graphically illustrates an example of differences in sensitivity of the eye to light of different colors at different levels of illumination. The differences in time duration on the x-axis are reflective of the amount of time typically needed for the human visual system to adapt to a particular ambient illumination level, such that a particular mode of vision is activated. Notably, at ambient illumination levels corresponding to scotopic vision and a portion of mesotopic vision, photoreceptors for red light may no longer be active, while photoreceptors for blue light are active under the lowest light conditions. It will be appreciated that red, green, and blue light correspond to the colors most typically used as component colors in a display system to form full color images (e.g., as discussed herein regarding FIG. 8-9B). In some embodiments, the display system may be configured to vary the rendering of images of different colors depending upon the ambient illumination levels.

Figure 21:
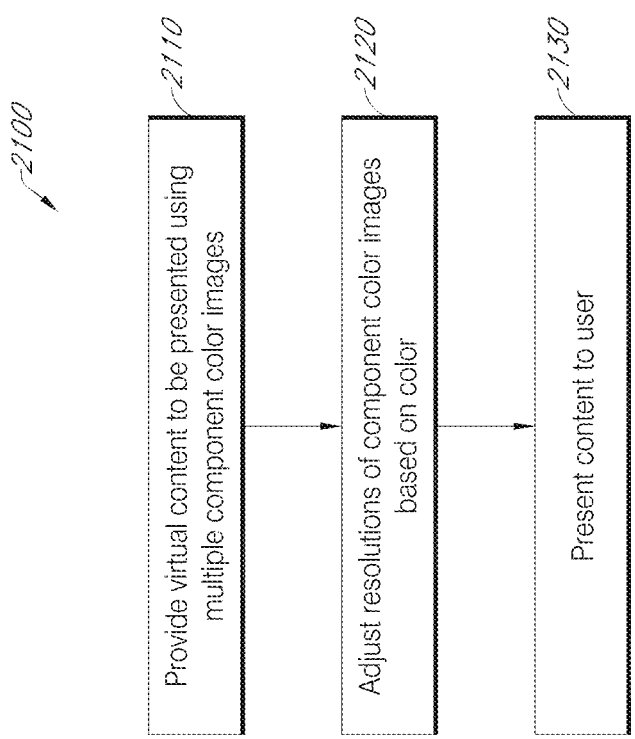
FIG. 21 is a diagram of an example of a process for adjusting virtual content formed using multiple component color images, where the resolution adjustment is made based on the color of the component color image.

With reference now to FIG. 21, a diagram is shown of an example of a process 2100 for adjusting virtual content formed using multiple component color images, where the resolution adjustment is made based on the color of the component color image. At block 2110, the display system provides virtual content to be presented using multiple component images. These may be different images of different component colors to be directed to different waveguides, as discussed regarding FIG. 8-9B. Consequently, in some embodiments, each of the streams of images of different component colors may be separately rendered. Providing virtual content to be presented using multiple component images may include utilizing a display system that outputs image streams of different component colors to form a full color image.

At block 2120, the display system may adjust resolutions of component color images based on their color. For example, the display system may select color images of one of these component colors for resolution adjustment. For example, the selection may be made based on a determination of illumination levels, as discussed above regarding block 1810 of FIG. 18. As shown in FIG. 19, some component colors may not be perceived by a user at some illumination levels. The display system may have stored within it information regarding illumination levels and component colors that are not visible at those levels. If there is a match between the illumination level and the component color not visible at those levels, then images of that component color may be selected for adjustment. In some environments, one adjustment may be to simply not render or display that component color image if the ambient illumination levels are such that the user is not expected to perceive that color. For example, under scotopic illumination levels, the display system may be configured to not render or display images of the component color red.

With continued reference to FIG. 21, at block 2130, virtual content is presented to the user. The presentation of the virtual content may be conducted as discussed herein, e.g., as in block 1208 of FIG. 12A or block 1412 of FIG. 14.

Figures 22A, 22B, 22C:
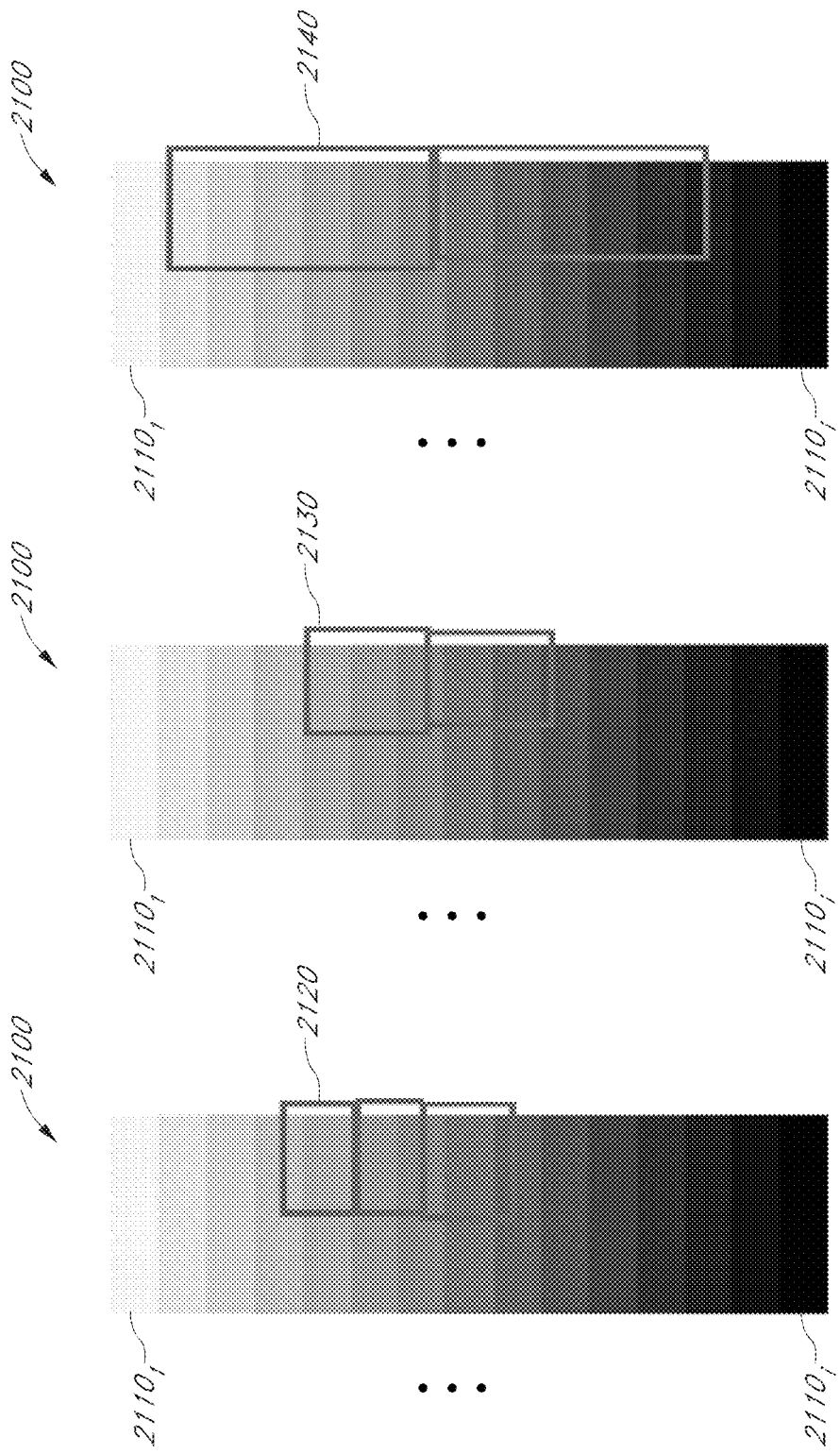
FIGS. 22A-22C illustrate examples of changing contrast sensitivity as the amount of light incident on the eye of the user decreases.

With reference now to FIGS. 22A-22C, as discussed above and without being limited by theory, the ability of the human visual system to perceive gradations in light intensity is believed to change with ambient illumination levels. FIGS. 22A-22C show examples of changing contrast sensitivity as the amount of light incident on the eye of the user decreases. For example, FIG. 22A may be understood to show the contrast sensitivity under photopic light conditions, FIG. 22B may be understood to show the contrast sensitivity under mesotopic light conditions, and FIG. 22C may be understood to show the contrast sensitivity under scotopic light conditions. FIG. 22A shows a progression 2100 of gradations $2110_1$ to $2110_t$, proceeding from high light intensity at the top to low with light intensity at the bottom. Similarly, FIG. 22B shows a progression 2102 of gradations $2110_1$ to $2110_t$, proceeding from high light intensity to low with light intensity. Likewise, FIG. 22C shows a progression 2104 of gradations $2110_1$ to $2110_t$, proceeding from high light intensity to low light intensity. The boxes 2120, 2130, 2140, indicate the groups of intensity gradations which are perceived by the user is being the same. The sizes of these groups are expected to increase with decreasing ambient illumination levels, as illustrated. Consequently, as discussed above regarding FIG. 18, in some embodiments, the display system may be configured to use the lowest intensity value within each group (e.g., within each of the boxes 2120, 2130, 2140).

Figure 23:
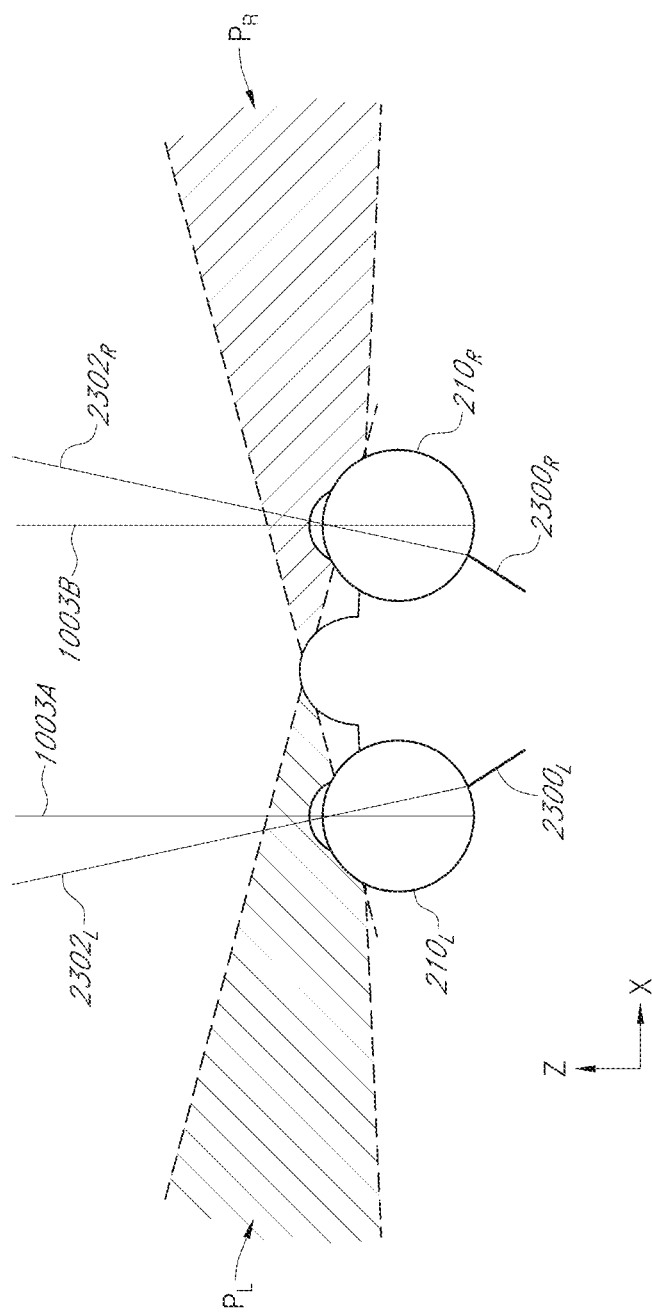
FIG. 23 illustrates an example of a representation of the optic nerve and peripheral blind spots of the eyes of a user.

With reference now to FIG. 23, an example of a representation of the optic nerve and peripheral blind spots of the eyes of a user is illustrated. In some embodiments, in addition to or as an alternative to any of the resolution adjustments disclosed herein, the display system may be configured to refrain from rendering content in various locations where content is not expected to be perceptible by the user. FIG. 23 illustrates left and right eyes $210_L$ and $210_R$, respectively. Each eye has a respective optical axis 1003A and 1003B and optical nerve $2300_L$ and $2300_R$. There is a blind spot of the point where each of the optical nerves $2300_L$ and $2300_R$ contact their respective eyes $210_L$ and $210_R$. These blind spots prevent the viewer from seeing content in the direction of the rays $2302_L$ and $2302_R$. In addition, at the periphery of each eye there exists a region in which content cannot be seen by the opposite eye. For example, content in the left peripheral region $P_L$ may be seen by the left eye $210_L$, but is not seen by the right eye $210_R$. On the other hand, content in the right peripheral region $P_R$ may be seen by the right eye $210_R$, but is not seen by the left eye $210_L$. Consequently, in some embodiments, the display system may be configured to omit rendering content that would be mapped to the blind spots of each eye $210_L$ and $210_R$, e.g., content falling on the rays $2302_L$ and $2302_R$. In addition or alternatively, in some embodiments, the display system may be configured to omit rendering content to the left eye $210_L$ if that content falls within the right peripheral region $P_L$; and/or the display system may be configured to omit rendering content to the right eye $210_R$ if that content falls within the left peripheral region $P_L$. It will be appreciated that the locations of the blind spots and/or the peripheral regions may be preset, e.g., based on averages for a population of users and/or may be tailored and calibrated for a particular user by test using content displayed at various locations and inputs from the user indicating whether or not a virtual object is visible.

Multiple Image Streams for Providing Content Having Different Resolutions

In some embodiments, a foveated image having high and low spatial resolution regions may be formed by spatially overlapping two or more image streams, each having a different resolution (e.g., a different perceived pixel density). For example, one of the image streams, e.g., the low resolution image stream, may form images having a large field of view and another of the image streams, e.g., the high-resolution image stream, may form images having a narrow field of view. The narrow field of view image and the high field of view image may contain similar content, although at different resolutions or pixel densities as seen by the user. These images may be overlaid one another (e.g., occupy the same location in space simultaneously or in close temporal proximity, such that the viewer perceives the images are being present simultaneously). Thus, the viewer may receive an aggregate image having high-resolution in a confined part of their field of view and low resolution over a larger portion of their field of view. Preferably, as discussed herein, the high-resolution portion maps to the foveal vision region of the user's eyes while the low resolution portion maps to the peripheral vision region of the user's eyes. As such, the differences in resolution between the high-resolution portion and the low resolution portion of the image is preferably not readily perceptible to the user.

In some environments, the display system for displaying the high and low resolution images utilizes the same spatial light modulator to form both images. Thus, the spatial light modulator has a fixed size and density of pixels. In display systems with a fixed size and density of pixels, an increase in angular field of view (FOV) comes at the cost of spatial or angular resolution, e.g., as governed by the Lagrange invariant. For example, if an SLM having a fixed number of pixels is used to form both the high and low resolution images, then spreading those pixels across the entire field of view would provide an image with a lower apparent resolution than confining those pixels to a small portion of the total field of view; the pixel density of the high-resolution images is higher than the pixel density of the low-resolution images. Consequently, there is generally an inverse relationship between FOV and angular resolution. Because FOV and angular resolution affect image visibility and quality, this tradeoff places constraints on user experience and the ultimate achievable FOV and angular resolution in AR or VR systems. As will be apparent from the discussion herein, in some embodiments, the term "resolution" may be used to refer to "angular resolution."

Head-mounted display devices or wearable display devices can be configured to provide an immersive user experience by projecting virtual content directly into the eyes of a user. Although it can be beneficial to provide wide FOV images at a uniformly high resolution across the FOV, the physiological limitations of the human visual system can prevent a user from appreciating or even noticing high resolution imagery positioned in the peripheral regions of the user's field of view. This inability to perceive high resolution imagery within the peripheral regions is caused by characteristics of the retina of a human eye, which contains two types of photoreceptors, namely rod cells and cone cells. The cones are more responsible for acute (detailed) vision. The rods and cones are distributed differently in the human eye. The highest concentration of cone cells is found within the fovea (i.e., the center of the retina), while the highest concentration of rod cells is found in the region immediately surrounding the fovea (i.e., the periphery of the retina). Because of this non-uniform distributions of the rod cells and cone cells, the fovea is responsible for sharp central vision (also called foveal vision). Visual acuity decreases as distance from the fovea increases.

For AR or VR applications, a headset is generally worn by one user at a time. The headset can be configured to take advantage of the user's inability to perceive all the details of a wide field of view stream of images at once by limiting the display of high-resolution content to regions within the wide field of view currently being focused on by the user. In this way, the headset can provide the user with the appearance of a high-resolution wide FOV stream of images without the need for the processing power that would otherwise be required to generate high-resolution content across the entire field of view. The stream of images presented to the user can take many forms and will be generally referred to as an image stream. For example, the image stream can show a static image by continuously displaying the same image to the user or can show motion by displaying a stream of different images. In some embodiments, the headset can be configured to display more than one image stream at the same time; the different image streams can have different angular resolutions and can extend across different regions of the user's FOV. It should be noted that an image stream associated with an AR system might not display content entirely across a particular region to which it is assigned since AR systems are designed to mix virtual content with real-world content.

According to some embodiments, a first image stream and a second image stream can be presented to a user simultaneously, or in rapid succession such that the two image streams appear to be displayed simultaneously. The first image stream can have a wide FOV and low resolution that can encompass the user's vision to evoke an immersion experience to the user. The second image stream can have a narrow FOV and a high resolution that can be dynamically displayed within the boundaries of the first image stream according to the user's current fixation point as determined in real-time using eye-gaze tracking techniques. In other words, the second image stream can be shifted around as the user's eye gaze changes, such that the second image stream persistently covers the user's foveal vision. In some embodiments, the first image stream is presented to the user at a fixed position, as the second image stream is shifted around relative to the first image stream. In some other embodiments, both the first image stream and the second image stream are shifted according to the user's current fixation point.

The content of the second image stream can include a subset of the content of the first image stream with a higher resolution than the first image stream, and can be overlaid on and properly aligned with respect to the first image stream. Because the higher resolution second image stream overlays the portion of the first image stream within the user's foveal vision, the lower resolution of the first image stream may not be perceived or noticed by the user. In some embodiments, the subset of the content of the first image stream overlaid by the second image stream can be turned off or be presented with a lower intensity for more uniform brightness and for better resolution perception. In this way, the user can perceive the combination of the first image stream and the second image stream as having both a wide FOV and high resolution. Such a display system can afford several advantages. For example, the display system can provide a superior user experience whiling having a relatively small form factor and saving computing resources and computing power.

According to some embodiments, a first light beam associated with the first image stream and a second light beam associated with the second image stream can be multiplexed into a composite light beam using certain multiplexing methods. For example, time-division multiplexing, polarization-division multiplexing, wavelength-division multiplexing, and the like, can be used according to various embodiments. The composite light beam can be directed to one or more optical elements that serve to de-multiplex the composite light beam into two separate optical paths. For example, a beam splitter such as a polarization beam splitter (PBS) or a dichroic beam splitter, or optical switching elements can be used to separate the composite light beam depending on the method of multiplexing used. Once separated, the first light beam associated with the first image stream and the second light beam associated with the second image stream can be routed through their respective optical paths and ultimately provided as output to the user.

According to some embodiments, the first light beam associated with the first image stream can be angularly magnified by optical elements in a first optical path so that the first image stream can be presented with a wider FOV and lower angular resolution (as governed by the Lagrange invariant); whereas the second light beam associated with the second image stream is not angularly magnified, demagnified, or magnified by an amount less than the amount of magnification applied to the first light beam associated with the first image stream. In this way, the second image stream can be presented with a narrower FOV and higher angular resolution (as governed by the Lagrange invariant) than the first image stream.

Figure 24:
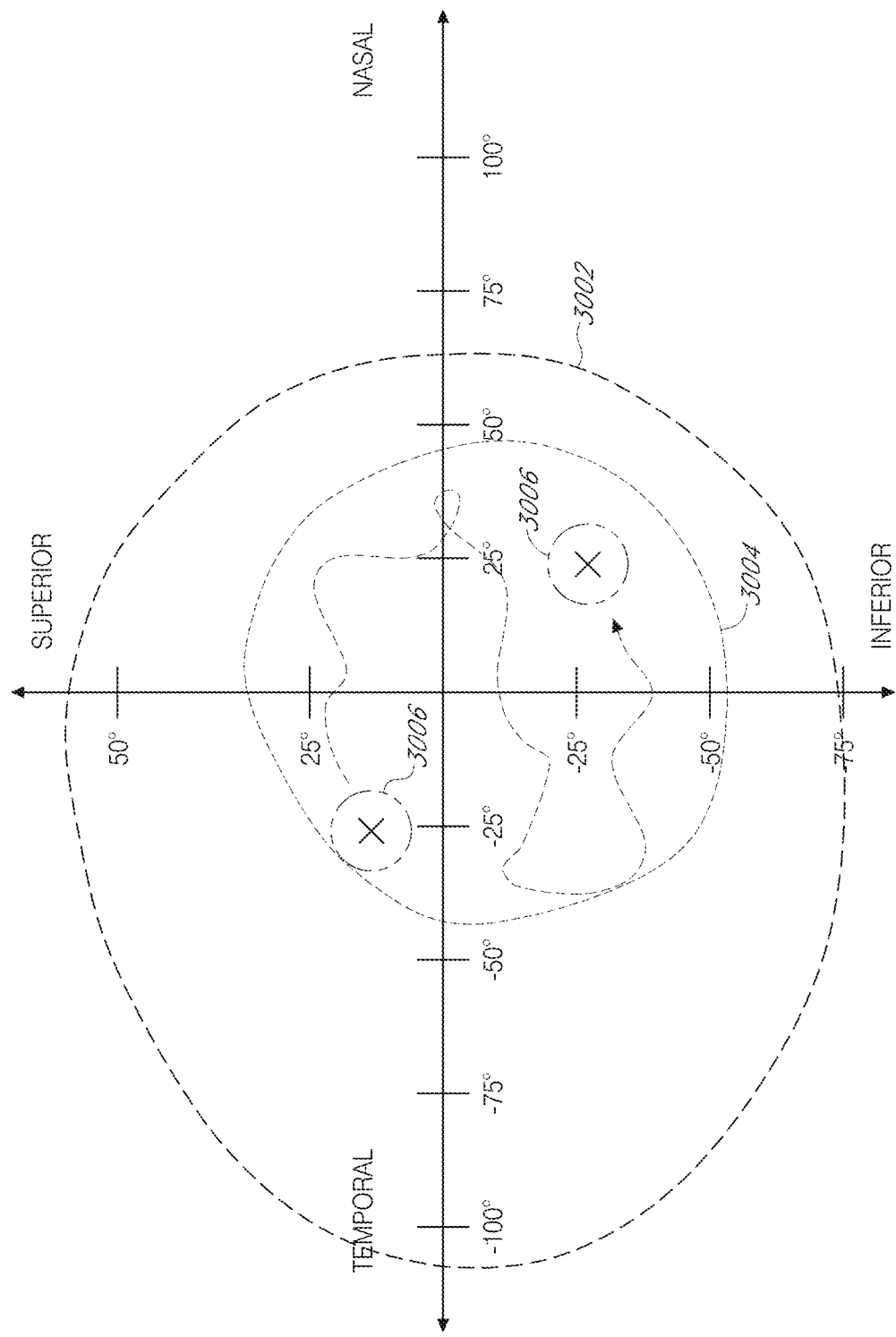
FIG. 24 shows an exemplary monocular field of view for a human eye.

FIG. 24 shows a visual field diagram depicting the outer perimeter of an exemplary monocular field of view 3002 for a human eye in two-dimensional angular space. As shown in FIG. 24, temporal-nasal and inferior-superior axes of the visual field diagram serve to define the two-dimensional angular space within which the outer perimeter of the monocular field of view 3002 is mapped. In this way, the visual field diagram of FIG. 24 may be seen as being equivalent or similar to a "Goldmann" visual field map or plot for a human eye. As indicated by the depicted arrangement of the temporal-nasal and inferior-superior axes, the visual field diagram shown in FIG. 24 represents a visual field diagram for the left eye of a human. While field of view can vary slightly from person to person, the depicted field of view is close to what many humans are capable of viewing with their left eye. It follows that a visual field diagram depicting the outer perimeter of an exemplary monocular field of view of the right eye might resemble something of a version of the visual field diagram of FIG. 24 in which the temporal-nasal axis and the outer perimeter of the monocular field of view 3002 have been mirrored about the inferior-superior axis.

The visual field diagram of FIG. 24 further depicts the outer perimeter of an exemplary field of regard 3004 for the human eye, which represents a portion of the monocular field of view 30022 in angular space within which the person can fixate. In addition, the visual field diagram of FIG. 24 also depicts the outer perimeter of an exemplary foveal field 3006 for the human eye, which represents a portion of the monocular field of view 3002 in angular space in direct view of the fovea of the human eye at a given point in time. As depicted, a person's foveal field 3006 can move anywhere within field of regard 3004. Portions of the monocular field of view 3002 outside of foveal field 3006 in angular space can be referred herein as the peripheral region of the person's field of view. Because of the ability of human eyes to distinguish a high level of detail outside of the foveal field 3006 is quite limited, displaying reduced resolution imagery outside of the foveal field 3006 is unlikely to be noticed and can allow for substantial savings on power expenditure for processing components responsible for generating content for the display.

Figure 25A:
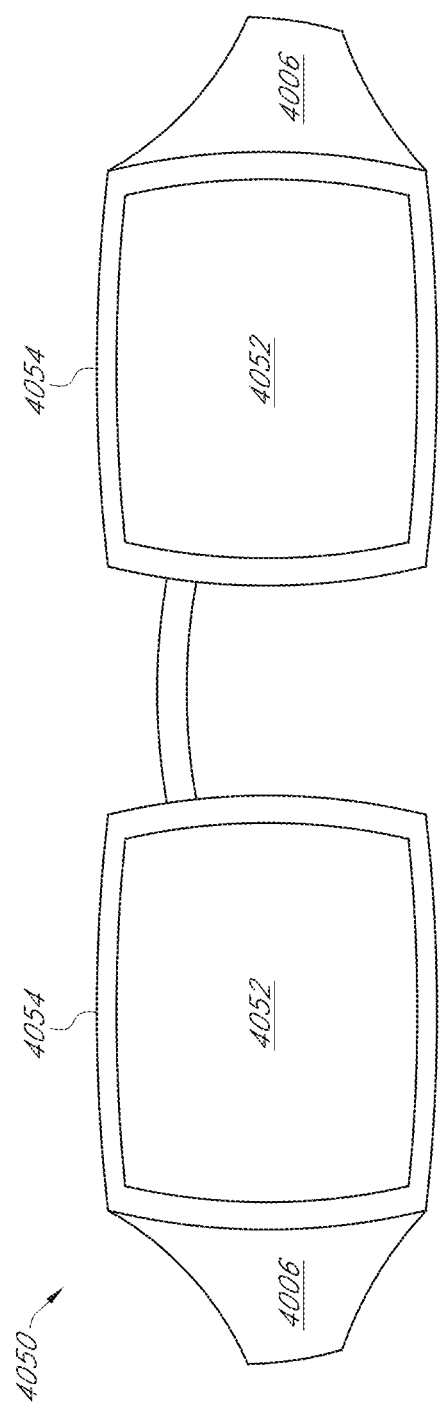
FIG. 25A shows an exemplary wearable display device configured to provide virtual content to a user.

FIG. 25A shows an exemplary wearable display device 4050 configured to provide virtual content to a user according to some embodiments. Wearable display device 4050 includes main displays 4052 supported by frame 4054. Frame 4054 can be attached to the head of a user using an attachment member taking the form of temple arms 4006.

Figure 25B:
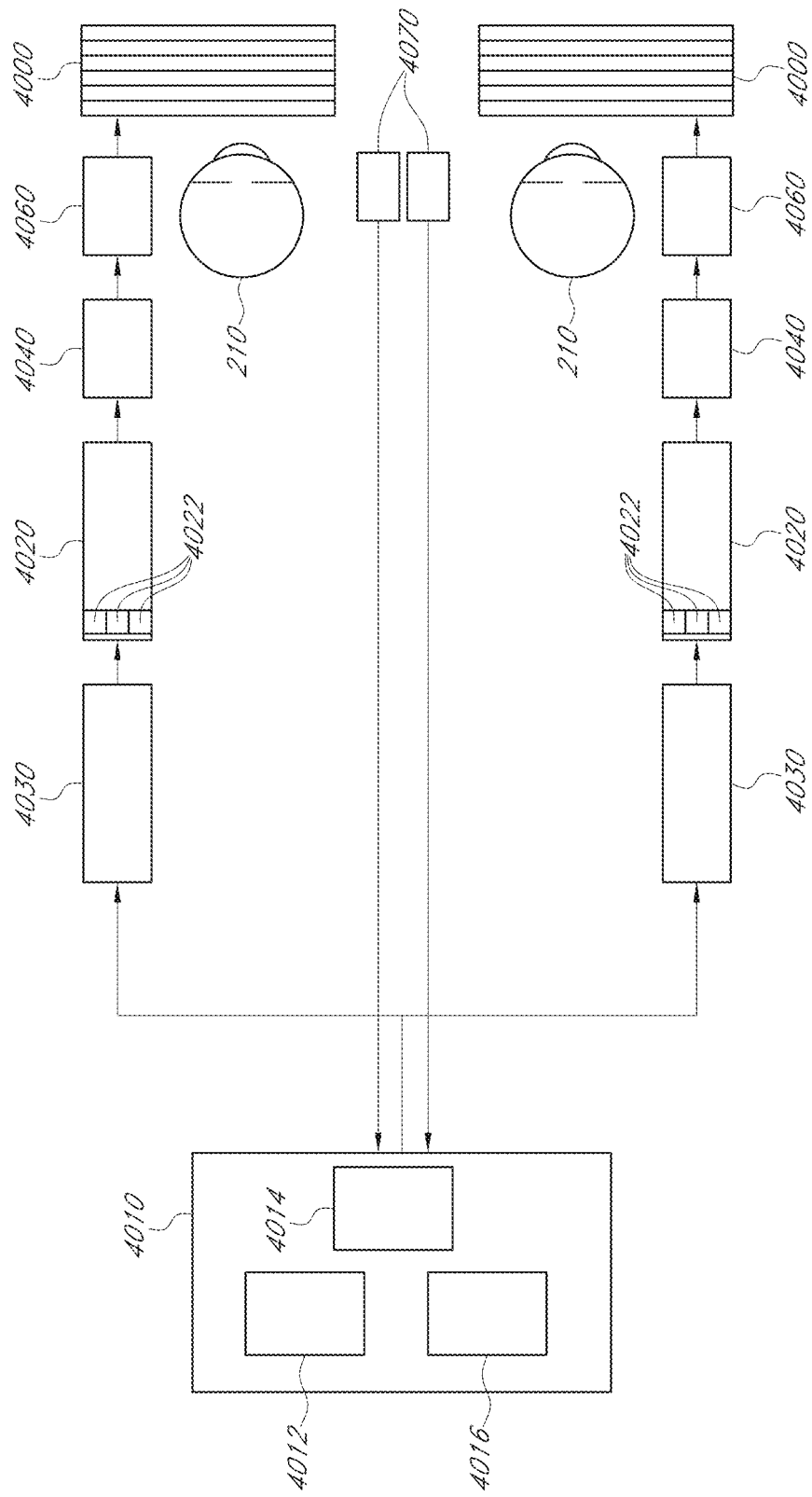
FIG. 25B is a block diagram depicting an augmented reality system.

Referring now to FIG. 25B, an exemplary embodiment of an AR system configured to provide virtual content to a user will now be described. In some embodiments, the AR system of FIG. 25B may represent a system to which the wearable display device 4050 of FIG. 25A belongs. The AR system of FIG. 25B uses stacked light-guiding optical element assemblies 4000 and generally includes an image generating processor 4010, a light source 4020, a controller 4030, a spatial light modulator ("SLM") 4040, an injection optical system 4060, and at least one set of stacked eyepiece layers or light guiding optical elements ("LOEs"; e.g., a planar waveguide) 4000 that functions as a multiple plane focus system. The system may also include an eye-tracking subsystem 4070. It should be appreciated that other embodiments may have multiple sets of stacked LOEs 4000, but the following disclosure will focus on the exemplary embodiment of FIG. 25B.

The image generating processor 4010 is configured to generate virtual content to be displayed to the user. The image generating processor may convert an image or video associated with the virtual content to a format that can be projected to the user in 3-D. For example, in generating 3-D content, the virtual content may need to be formatted such that portions of a particular image are displayed at a particular depth plane while others are displayed at other depth planes. In one embodiment, all of the image may be generated at a particular depth plane. In another embodiment, the image generating processor may be programmed to provide slightly different images to the right and left eyes 210 such that when viewed together, the virtual content appears coherent and comfortable to the user's eyes.

The image generating processor 4010 may further include a memory 4012, a GPU 4014, a CPU 4016, and other circuitry for image generation and processing. The image generating processor 4010 may be programmed with the desired virtual content to be presented to the user of the AR system of FIG. 25B. It should be appreciated that in some embodiments, the image generating processor 4010 may be housed in the wearable AR system. In other embodiments, the image generating processor 4010 and other circuitry may be housed in a belt pack that is coupled to the wearable optics. The image generating processor 4010 is operatively coupled to the light source 4020 which projects the light associated with the desired virtual content and one or more spatial light modulators (described below).

The light source 4020 is compact and has high resolution. The light source 4020 includes a plurality of spatially separated sub-light sources 4022 that are operatively coupled to a controller 4030 (described below). For instance, the light source 4020 may include color specific LEDs and lasers disposed in various geometric configurations. Alternatively, the light source 4020 may include LEDs or lasers of like color, each one linked to a specific region of the field of view of the display. In another embodiment, the light source 4020 may comprise a broad-area emitter such as an incandescent or fluorescent lamp with a mask overlay for segmentation of emission areas and positions. Although the sub-light sources 4022 are directly connected to the AR system of FIG. 2B in FIG. 2B, the sub-light sources 222 may be connected to system via optical fibers (not shown), as long as the distal ends of the optical fibers (away from the sub-light sources 4022) are spatially separated from each other. The system may also include condenser (not shown) configured to collimate the light from the light source 4020.

The SLM 4040 may be reflective (e.g., a DLP DMD, a MEMS mirror system, an LCOS, or an FLCOS), transmissive (e.g., an LCD) or emissive (e.g. an FSD or an OLED) in various exemplary embodiments. The type of spatial light modulator (e.g., speed, size, etc.) can be selected to improve the creation of the 3-D perception. While DLP DMDs operating at higher refresh rates may be easily incorporated into stationary AR systems, wearable AR systems typically use DLPs of smaller size and power. The power of the DLP changes how 3-D depth planes/focal planes are created. The image generating processor 4010 is operatively coupled to the SLM 4040, which encodes the light from the light source 4020 with the desired virtual content. Light from the light source 4020 may be encoded with the image information when it reflects off of, emits from, or passes through the SLM 4040.

Referring back to FIG. 25B, the AR system also includes an injection optical system 4060 configured to direct the light from the light source 4020 (i.e., the plurality of spatially separated sub-light sources 4022) and the SLM 4040 to the LOE assembly 4000. The injection optical system 4060 may include one or more lenses that are configured to direct the light into the LOE assembly 4000. The injection optical system 4060 is configured to form spatially separated and distinct pupils (at respective focal points of the beams exiting from the injection optical system 4060) adjacent the LOEs 4000 corresponding to spatially separated and distinct beams from the sub-light sources 4022 of the light source 4020. The injection optical system 4060 is configured such that the pupils are spatially displaced from each other. In some embodiments, the injection optical system 4060 is configured to spatially displace the beams in the X and Y directions only. In such embodiments, the pupils are formed in one X, Y plane. In other embodiments, the injection optical system 4060 is configured to spatially displace the beams in the X, Y and Z directions.

Spatial separation of light beams forms distinct beams and pupils, which allows placement of in-coupling gratings in distinct beam paths, so that each in-coupling grating is mostly addressed (e.g., intersected or impinged) by only one distinct beam (or group of beams). This, in turn, facilitates entry of the spatially separated light beams into respective LOEs 4000 of the LOE assembly 4000, while minimizing entry of other light beams from other sub-light sources 4022 of the plurality (i.e., cross-talk). A light beam from a particular sub-light source 4022 enters a respective LOE 4000 through an in-coupling grating (not shown in FIG. 25B, see FIGS. 24-26) thereon. The in-coupling gratings of respective LOEs 4000 are configured to interact with the spatially separated light beams from the plurality of sub-light sources 4022 such that each spatially separated light beam only intersects with the in-coupling grating of one LOE 4000. Therefore, each spatially separated light beam mainly enters one LOE 4000. Accordingly, image data encoded on light beams from each of the sub-light sources 4022 by the SLM 4040 can be effectively propagated along a single LOE 4000 for delivery to an eye 210 of a user.

Each LOE 4000 is then configured to project an image or sub-image that appears to originate from a desired depth plane or FOV angular position onto a user's retina. The respective pluralities of LOEs 4000 and sub-light sources 4022 can therefore selectively project images (synchronously encoded by the SLM 4040 under the control of controller 4030) that appear to originate from various depth planes or positions in space. By sequentially projecting images using each of the respective pluralities of LOEs 4000 and sub-light sources 4022 at a sufficiently high frame rate (e.g., 360 Hz for six depth planes at an effective full-volume frame rate of 60 Hz), the system of FIG. 25B can generate a 3-D image of virtual objects at various depth planes that appear to exist simultaneously in the 3-D image.

The controller 4030 is in communication with and operatively coupled to the image generating processor 4010, the light source 4020 (sub-light sources 4022) and the SLM 4040 to coordinate the synchronous display of images by instructing the SLM 4040 to encode the light beams from the sub-light sources 4022 with appropriate image information from the image generating processor 4010.

The AR system also includes an optional eye-tracking subsystem 4070 that is configured to track the user's eyes 4002 and determine the user's focus. In one embodiment, only a subset of sub-light sources 4022 may be activated, based on input from the eye-tracking subsystem, to illuminate a subset of LOEs 4000, as will be discussed below. Based on input from the eye-tracking subsystem 4070, one or more sub-light sources 4022 corresponding to a particular LOE 4000 may be activated such that the image is generated at a desired depth plane that coincides with the user's focus/accommodation. For example, if the users eyes 210 are parallel to each other, the AR system of FIG. 25B may activate the sub-light sources 4022 corresponding to the LOE 4000 that is configured to deliver collimated light to the user's eyes, such that the image appears to originate from optical infinity. In another example, if the eye-tracking sub-system 4070 determines that the user's focus is at 1 meter away, the sub-light sources 4022 corresponding to the LOE 4000 that is configured to focus approximately within that range may be activated instead. It should be appreciated that, in this particular embodiment, only one group of sub-light sources 4022 is activated at any given time, while the other sub-light sources 4020 are deactivated to conserve power.

Figure 25C:
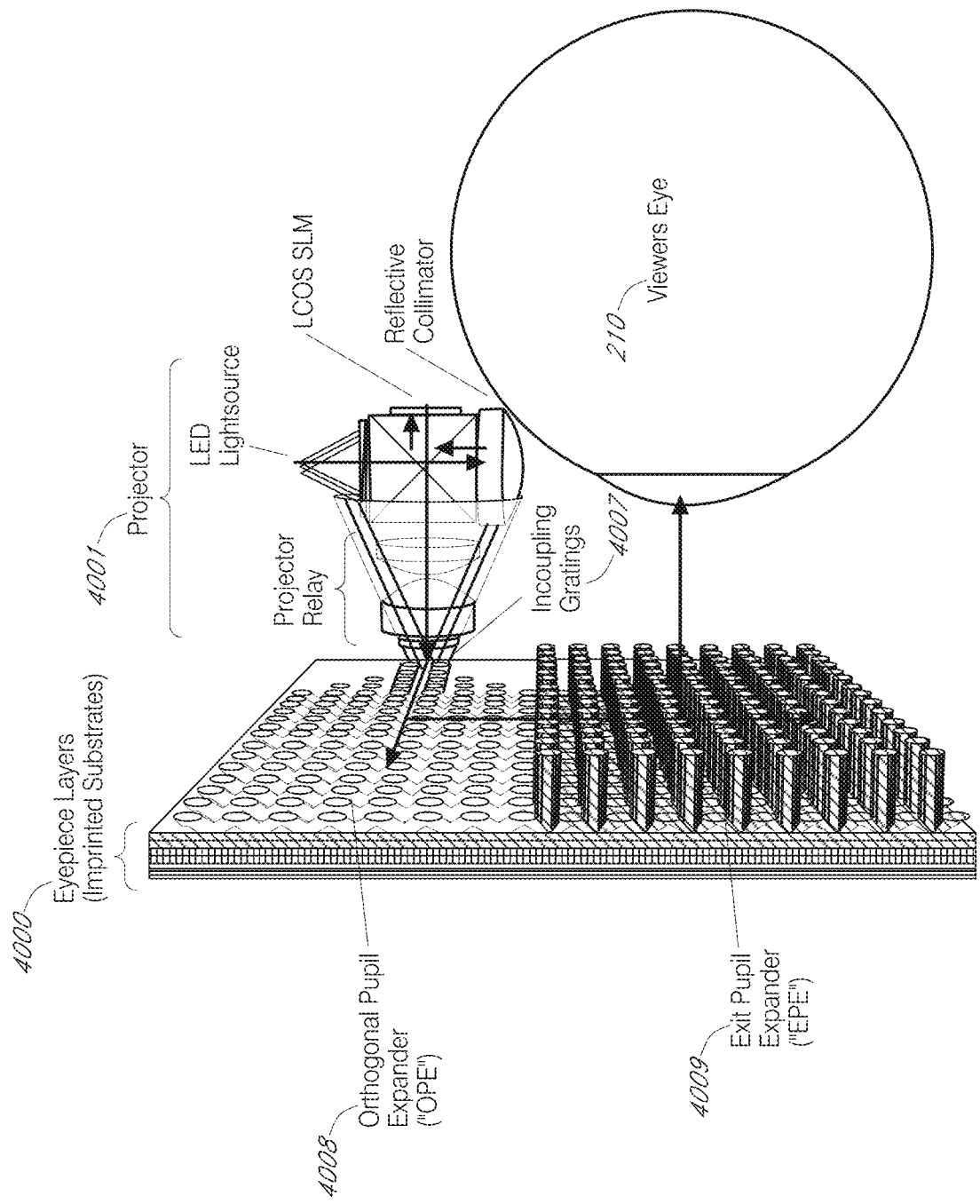
FIG. 25C illustrates schematically light paths in a viewing optics assembly (VOA) that may be used to present a digital or virtual image to a viewer.

FIG. 25C illustrates schematically the light paths in an exemplary viewing optics assembly (VOA) that may be used to present a digital or virtual image to a viewer, according to some embodiments. In some embodiments, the VOA could be incorporated in a system similar to wearable display device 4050 as depicted in FIG. 25A. The VOA includes a projector 4001 and an eyepiece 200 that may be worn around a viewer's eye. The eyepiece 4000 may, for example, may correspond to LOEs 4000 as described above with reference to FIG. 25B. In some embodiments, the projector 4001 may include a group of red LEDs, a group of green LEDs, and a group of blue LEDs. For example, the projector 201 may include two red LEDs, two green LEDs, and two blue LEDs according to an embodiment. In some examples, the projector 4001 and components thereof as depicted in FIG. 25C (e.g., LED light source, reflective collimator, LCoS SLM, and projector relay) may represent or provide the functionality of one or more of light source 4020, sub-light sources 4022, SLM 4040, and injection optical system 4060, as described above with reference to FIG. 25B. The eyepiece 4000 may include one or more eyepiece layers, each of which may represent one of LOEs 4000 as described above with reference to FIG. 25B. Each eyepiece layer of the eyepiece 4000 may be configured to project an image or sub-image that appears to originate from a respective desired depth plane or FOV angular position onto the retina of a viewer's eye.

In one embodiment, the eyepiece 4000 includes three eyepiece layers, one eyepiece layer for each of the three primary colors, red, green, and blue. For example, in this embodiment, each eyepiece layer of the eyepiece 4000 may be configured to deliver collimated light to the eye that appears to originate from the optical infinity depth plane (0 diopters). In another embodiment, the eyepiece 4000 may include six eyepiece layers, i.e., one set of eyepiece layers for each of the three primary colors configured for forming a virtual image at one depth plane, and another set of eyepiece layers for each of the three primary colors configured for forming a virtual image at another depth plane. For example, in this embodiment, each eyepiece layer in one set of eyepiece layers of the eyepiece 4000 may be configured to deliver collimated light to the eye that appears to originate from the optical infinity depth plane (0 diopters), while each eyepiece layer in another set of eyepiece layers of the eyepiece 4000 may be configured to deliver collimated light to the eye that appears to originate from a distance of 2 meters (0.5 diopter). In other embodiments, the eyepiece 4000 may include three or more eyepiece layers for each of the three primary colors for three or more different depth planes. For instance, in such embodiments, yet another set of eyepiece layers may each be configured to deliver collimated light that appears to originate from a distance of 1 meter (1 diopter).

Each eyepiece layer comprises a planar waveguide and may include an incoupling grating 4007, an orthogonal pupil expander (OPE) region 4008, and an exit pupil expander (EPE) region 4009. More details about incoupling grating, orthogonal pupil expansion, and exit pupil expansion are described in U.S. patent application Ser. No. 14/555,585 and U.S. patent application Ser. No. 14/726,424, the contents of which are hereby expressly and fully incorporated by reference in their entirety, as though set forth in full. Still referring to FIG. 25C, the projector 4001 projects image light onto the incoupling grating 4007 in an eyepiece layer 4000. The incoupling grating 4007 couples the image light from the projector 4001 into the waveguide propagating in a direction toward the OPE region 4008. The waveguide propagates the image light in the horizontal direction by total internal reflection (TIR). The OPE region 4008 of the eyepiece layer 4000 also includes a diffractive element that couples and redirects a portion of the image light propagating in the waveguide toward the EPE region 4009. More specifically, collimated light propagates horizontally (i.e., relative to view of FIG. 25C) along the waveguide by TIR, and in doing so repeatedly intersects with the diffractive element of the OPE region 4008. In some examples, the diffractive element of the OPE region 4008 has a relatively low diffraction efficiency. This causes a fraction (e.g., 10%) of the light to be diffracted vertically downward toward the EPE region 4009 at each point of intersection with the diffractive element of the OPE region 4008, and a fraction of the light to continue on its original trajectory horizontally along the waveguide via TIR. In this way, at each point of intersection with the diffractive element of the OPE region 4008, additional light is diffracted downward toward the EPE region 4009. By dividing the incoming light into multiple outcoupled sets, the exit pupil of the light is expanded horizontally by the diffractive element of the OPE region 4008. The expanded light coupled out of the OPE region 4008 enters the EPE region 4009.

The EPE region 4009 of the eyepiece layer 4000 also includes a diffractive element that couples and redirects a portion of the image light propagating in the waveguide toward a viewer's eye 210. Light entering the EPE region 4009 propagates vertically (i.e., relative to view of FIG. 25C) along the waveguide by TIR. At each point of intersection between the propagating light and the diffractive element of the EPE region 4009, a fraction of the light is diffracted toward the adjacent face of the waveguide allowing the light to escape the TIR, emerge from the face of the waveguide, and propagate toward the viewer's eye 210. In this fashion, an image projected by projector 4001 may be viewed by the viewer's eye 210. In some embodiments, the diffractive element of the EPE region 4009 may be designed or configured to have a phase profile that is a summation of a linear diffraction grating and a radially symmetric diffractive lens. The radially symmetric lens aspect of the diffractive element of the EPE region 4009 additionally imparts a focus level to the diffracted light, both shaping the light wavefront (e.g., imparting a curvature) of the individual beam as well as steering the beam at an angle that matches the designed focus level. Each beam of light outcoupled by the diffractive element of the EPE region 4009 may extend geometrically to a respective focus point positioned in front of the viewer, and may be imparted with a convex wavefront profile with a center of radius at the respective focus point to produce an image or virtual object at a given focal plane.

Descriptions of such a viewing optics assembly and other similar set-ups are further provided in U.S. patent application Ser. No. 14/331,218, U.S. patent application Ser. No. 15/146,296, and U.S. patent application Ser. No. 14/555,585, all of which are incorporated by reference herein in their entireties. It follows that, in some embodiments, the exemplary VOA may include and/or take on the form of one or more components described in any of the patent applications mentioned above with reference to FIG. 25C and incorporated herein by reference.

Figure 26A:
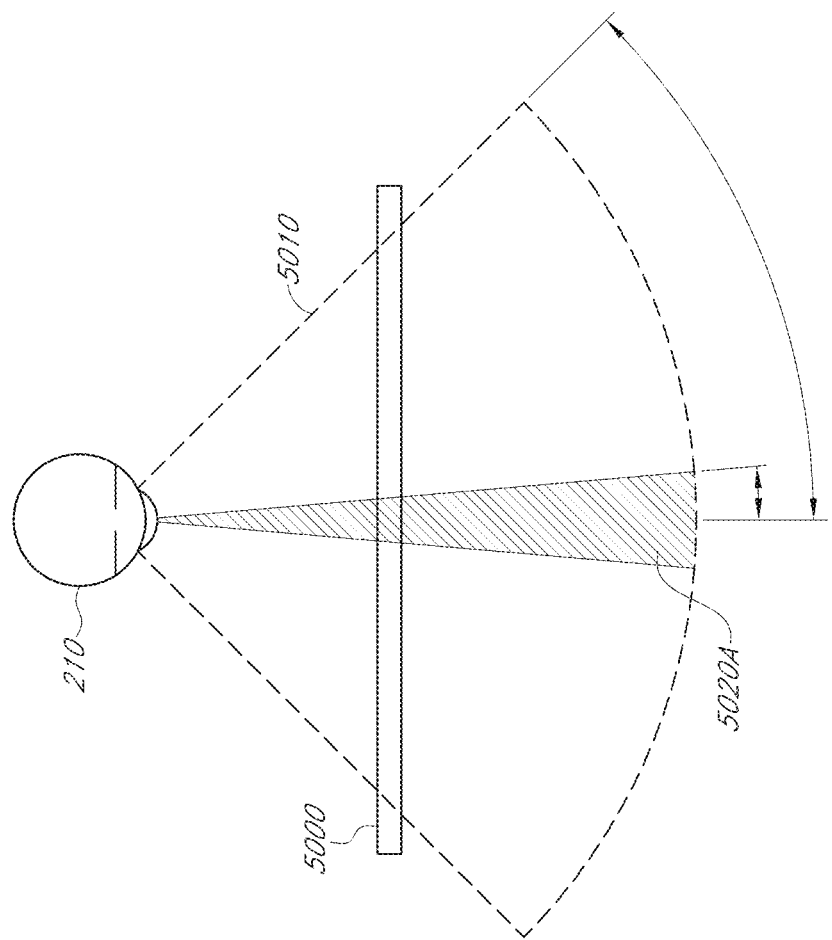
FIGS. 26A-26D illustrate exemplary render perspectives to be used and light fields to be produced in an AR system for each of two exemplary eye orientations.

III. High Field of View and High Resolution Foveated Display Using Multiple Optical Paths FIGS. 26A-26D illustrate exemplary render perspectives to be used and light fields to be produced in an AR system for each of two exemplary eye orientations. In FIG. 26A, a viewer's eye 210 is oriented in a first manner with respect to an eyepiece 5000. In some embodiments, the eyepiece 5000 may be similar to the stack of LOEs or eyepiece 4000 as described above with reference to FIGS. 25B and 25C. More specifically, in this example, the viewer's eye 210 is oriented such that the viewer may be able to see the eyepiece 5000 in a relatively straightforward direction. The AR system to which the eyepiece 5000 belongs, which in some examples may be similar to the AR system as described above with reference to FIG. 25B, may perform one or more operations to present virtual content on one or more depth planes positioned within the viewer's FOV at one or more distances in front of the viewer's eye 210.

The AR system may determine a perspective within render space from which the viewer is to view 3-D virtual contents of the render space, such as virtual objects, based on the position and orientation of the viewer's head. As described in further detail below with reference to FIG. 29A, in some embodiments, such an AR system may include one or more sensors and leverage data from these one or more sensors to determine the position and/or orientation of the viewer's head. The AR system may include such one or more sensors in addition to one or more eye-tracking components, such as one or more components of the eye-tracking sub-system 4070 described above with reference to FIG. 25B. With such data, the AR system may effectively map the position and orientation of the viewer's head within the real world to a particular location and a particular angular position within a 3D virtual environment, create a virtual camera that is positioned at the particular location within the 3D virtual environment and oriented at the particular angular position within the 3D virtual environment relative to at the particular location within the 3D virtual environment, and render virtual content for the viewer as it would be captured by the virtual camera. Further details discussing real world to virtual world mapping processes are provided in U.S. patent application Ser. No. 15/296,869, entitled "SELECTING VIRTUAL OBJECTS IN A THREE-DIMENSIONAL SPACE," which is expressly incorporated herein by reference in its entirety for all purposes.

In some examples, the AR system may create or dynamically reposition and/or reorient one such head-tracked virtual camera for the viewer's left eye or eye socket, and another such head-tracked virtual camera for the viewer's right eye or eye socket, as the viewer's eyes and or eye sockets are physically separated from one another and thus consistently positioned at different locations. It follows that virtual content rendered from the perspective of a head-tracked virtual camera associated with the viewer's left eye or eye socket may be presented to the viewer through an eyepiece on the left side of a wearable display device, such as that described above with reference to FIGS. 25A-25C, and that virtual content rendered from the perspective of a head-tracked virtual camera associated with the viewer's right eye or eye socket may be presented to the viewer through an eyepiece on the right side of the wearable display device. Although a head-tracked virtual camera may be created and/or dynamically repositioned for each eye or eye socket based on information regarding the current position and orientation of the viewer's head, the position and orientation of such a head-tracked virtual camera may neither depend upon the position nor the orientation of each eye of the viewer relative to the respective eye socket of the viewer or the viewer's head. Further details discussing the creation, adjustment, and use of virtual cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

The AR system of FIG. 26A may create or dynamically reposition and/or reorient such a head-tracked virtual camera, render virtual content from the perspective of the head-tracked virtual camera (perspective 5010), and project light representing renderings of the virtual content through the eyepiece 5000 and onto the retina of the viewer's eye 210. As shown in FIG. 26A, the head-tracked render perspective 5010 may provide an FOV spanning a region of $\pm\theta_{310}$ angular units diagonally, horizontally, and/or vertically. As described in further detail below, in some embodiments, the head-tracked render perspective 5010 may provide a relatively wide FOV. In such embodiments, the AR system may also create or dynamically reposition and/or reorient another virtual camera for each eye or eye socket different from and in addition to a head-tracked virtual camera. In the example of FIG. 26A, the AR system may render and present virtual content from the perspective of the head-tracked virtual camera 5010 along with virtual content from the perspective of another virtual camera in render space.

For instance, in such embodiments, the AR system of FIG. 26A may create or dynamically reposition and/or reorient such a fovea-tracked virtual camera based on the current gaze of the viewer's eye 210. As described in further detail below with reference to FIG. 29A, in some examples, such an AR system may include one or more eye-tracking components, such as one or more components of the eye-tracking sub-system 4070 described above with reference to FIG. 25B, to determine the viewer's current gaze, the current position and/or orientation of the viewer's eye 210 relative to the viewer's head, and the like. With such data, the AR system of FIG. 26A may create or dynamically reposition and/or reorient such a fovea-tracked virtual camera, render virtual content from the perspective of the fovea-tracked virtual camera (perspective 5020A), and project light representing virtual content as rendered from perspective 5020A through the eyepiece 5000 and onto the fovea of the viewer's eye 210.

As shown in FIG. 26A, the fovea-tracked render perspective 5020A may provide for an FOV that is narrower than that of the head-tracked render perspective 5010. In this way, the FOV of the fovea-tracked render perspective 5020A can be seen as occupying a conical subspace of the FOV of the head-tracked render perspective 5010. That is, the FOV of the fovea-tracked render perspective 5020A may be a subfield of the FOV of the head-tracked render perspective 5010. For instance, as shown in FIG. 26A, the fovea-tracked render perspective 320A may provide an FOV spanning a region of $\pm\theta_{320A}$ angular units diagonally, horizontally, and/or vertically, such that the relationship between the FOV of the head-tracked render perspective 5010 and the fovea-tracked render perspective 5020A is given by $-\theta_{310} \leq -\theta_{320A} \leq \theta_{320A} \leq \theta_{310}$. In some examples, the FOV of the head-tracked render perspective 5010 may be at least as wide as the viewer's field of regard, which in this example would be the total conical space within which the viewer's eye 210 can fixate when the viewer's head is held in a given position and orientation. As such, in these examples, the head-tracked virtual camera and the fovea-tracked virtual camera may be positioned at substantially the same location within render space or may be positioned at locations within render space that are a fixed distance away from one another, such that both virtual cameras may be linearly and/or angularly translated in unison within render space when the position and/or orientation of the viewer's head changes. For example, the head-tracked virtual camera may be positioned at a location in render space that corresponds to the center-of-rotation of the viewer's eye 210, while the fovea-tracked virtual camera may be positioned at a location in render space that corresponds to a region of the viewer's eye 210 between the center-of-rotation and cornea. Indeed, the Euclidean distance between the two virtual cameras may remain substantially constant when translated in render space in much the same way that the Euclidean distance between two specific regions of the viewer's eye 210 or another rigid body may remain substantially constant at all times.

Although the spatial relationship between each virtual camera in such a pair of virtual cameras may remain substantially fixed within render space throughout use of the AR system in these examples, the orientation of the fovea-tracked virtual camera may, however, vary relative to the head-tracked virtual camera when the viewer rotates their eye 210. In this way, the conical subspace of the FOV of the head-tracked virtual camera that is occupied by the FOV of the fovea-tracked virtual camera may dynamically change as the viewer rotates their eye 210.

Furthermore, virtual objects and other content that fall within the fovea-tracked render perspective 5020A may be rendered and presented by the AR system in relatively high resolution. More specifically, the resolution at which virtual content within the FOV of the fovea-tracked virtual camera is rendered and presented may be higher than the resolution at which virtual content within the FOV of the head-tracked virtual camera is rendered and presented. In this way, the highest-resolution subfield of a given light field that is outcoupled by the eyepiece 5000 and projected onto the retina of the viewer's eye 210 may be that which reaches the fovea of the viewer's eye 210.

FIG. 3B illustrates an exemplary light field 5030A that is outcoupled by the eyepiece 5000 and projected onto the retina of the viewer's eye 210 while the viewer's eye 210 is oriented in the first manner as depicted in FIG. 26A and described above with reference thereto. The light field 5030A may include various angular light components representative of virtual content as would be captured in render space by the abovementioned pair of virtual cameras. As described in further detail below with reference to FIG. 26A and onward, light representative of virtual content as would be captured in render space by the head-tracked virtual camera and light representative of virtual content as would be captured in render space by the fovea-tracked virtual camera may be multiplexed by the AR system according to any of a variety of different multiplexing schemes. Employment of such multiplexing schemes may, at least in some instances, allow for the AR system to operate with greater efficiency and/or occupy less physical space.

Figure 26B:
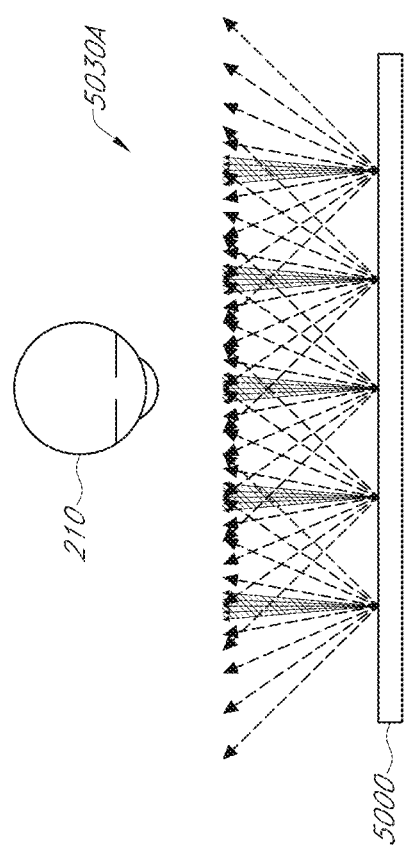

Still referring to FIG. 26B, angular light components of the light field 5030A that are representative of virtual content as would be captured in render space by the head-tracked virtual camera (e.g., virtual objects and other content that fall within the head-tracked render perspective 5010) may include those which are to be projected onto the retina of the viewer's eye 210 at angles ranging from $-\theta_{310}$ to $+\theta_{310}$ angular units relative to the viewer's eye 210. Similarly, angular light components of the light field 5030A that are representative of virtual content as would be captured in render space by the fovea-tracked virtual camera (e.g., virtual objects and other content that fall within the fovea-tracked render perspective 5020A) may include those which are to be projected onto the retina of the viewer's eye 210 at angles ranging from $-\theta_{320A}$ to $+\theta_{320A}$ angular units relative to the viewer's eye 210. The intervals between $-\theta_{320A}$ and $+\theta_{320A}$ angular units at which such angular light components associated with the fovea-tracked render perspective 5020A occur within the light field 5030A may be higher in regularity than the intervals between $-\theta_{310}$ and $+\theta_{310}$ angular units at which angular light components associated with the head-tracked render perspective 5010 occur within the light field 5030A. In this way, the resolution at which virtual content associated with the fovea-tracked render perspective 5020A may be rendered and presented to the viewer may be higher than the resolution at which virtual content associated with the head-tracked render perspective 5010 may be rendered and presented to the viewer.

In some embodiments, angular light components associated with the head-tracked render perspective 5010 that occur within the light field 5030A may further include those which are to be projected onto the retina of the viewer's eye 210 at angles ranging from $-\theta_{320A}$ to $+\theta_{320A}$ angular units relative to the viewer's eye 210. In such embodiments, the intervals between $-\theta_{320A}$ and $+\theta_{320A}$ angular units at which such angular light components associated with the head-tracked render perspective 5010 occur within the light field 5030A may be lower in regularity than the intervals between $-\theta_{320A}$ and $+\theta_{320A}$ angular units at which angular light components associated with the fovea-tracked render perspective 5020A occur within the light field 5030A. In other embodiments, angular light components associated with the head-tracked render perspective 5010 that occur within the light field 5030A may exclude those which are to be projected onto the retina of the viewer's eye 210 at angles ranging from $-\theta_{320A}$ to $+\theta_{320A}$ angular units relative to the viewer's eye 210. As such, in these other embodiments, angular light components associated with the head-tracked render perspective 5010 that occur within the light field 5030A may be those which are to be projected onto the retina of the viewer's eye 210 at angles between $-\theta_{310}$ and $-\theta_{320A}$ angular units or angles between $\theta_{320A}$ and $\theta_{310}$.

Figure 26C:
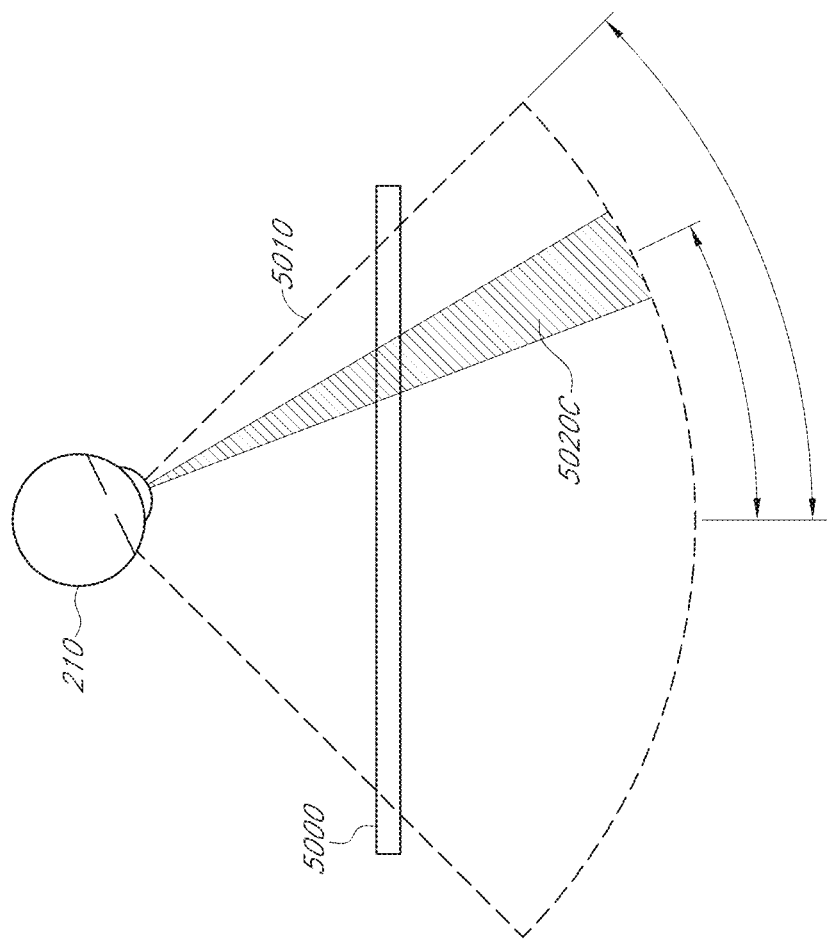

In FIG. 26C, the viewer's eye 210 is oriented in a second manner with respect to the eyepiece 5000 different from the first manner in which the viewer's eye 210 is oriented with respect to the eyepiece 5000 in FIGS. 26A-26B. For purposes of example, the position and orientation of the viewer's head in FIGS. 26C-26D may be treated as being the same as the position and orientation of the viewer's head as described above with reference to FIGS. 26A-26B. As such, FIGS. 26A-26B and FIGS. 26C-26D may represent the abovementioned viewer and AR system in first and second time-sequential stages, respectively. More specifically, in this example, the viewer's eye 210 has rotated off-center from the relatively straightforward orientation as depicted in FIGS. 26A-26B.

In transitioning from the first stage to the second stage, the AR system of FIG. 26C may, for instance, function to maintain the head-tracked virtual camera at the same position and orientation as described above with reference to FIGS. 26A-26B, as the viewer's head pose (e.g., position and orientation) has not changed. As such, in the second stage depicted in FIGS. 26C-26D, the AR system may render virtual content from the perspective of the head-tracked virtual camera (i.e., head-tracked render perspective 5010) and project light representing renderings of the virtual content through the eyepiece 5000 and onto the retina of the viewer's eye 210. While the head-tracked render perspective 5010 may remain static or relatively static throughout the first and second time-sequential stages of FIGS. 26A-26D, in transitioning from the first stage to the second stage, the AR system may function to adjust the orientation of a fovea-tracked virtual camera in render space based on the change in gaze of the viewer's eye 210 from the first stage to the second stage. That is, the AR system may replace or reorient the fovea-tracked virtual camera as employed in the first stage to provide the fovea-tracked render perspective 5020A, such that the fovea-tracked virtual camera as employed in the second stage provides a fovea-tracked render perspective 5020C different from the fovea-tracked render perspective 5020A. It follows that, in the second stage, the AR system may also render virtual content from the perspective of the fovea-tracked virtual camera perspective 5020C and project light representing renderings of the virtual content through the eyepiece 5000 and onto the fovea of the viewer's eye 201.

Figure 26D:
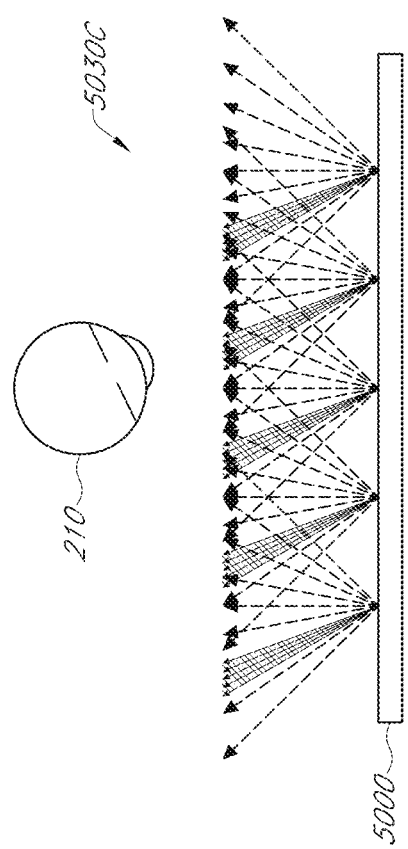

In the example of FIGS. 26C-26D, the fovea-tracked render perspective 5020C may occupy a different conical subspace of the head-tracked render perspective 5010 than that of the fovea-tracked render perspective 5020A. For instance, as shown in FIG. 26C, the fovea-tracked render perspective 5020C may provide an FOV displaced $\theta_{320C}$ angular units from the FOV of the fovea-tracked render perspective 5020A and spanning a region of $\pm\theta_{320A}$ angular units diagonally, horizontally, and/or vertically. That is, the fovea-tracked render perspective 5020C may provide an FOV spanning a region of $\theta_{320C} \pm \theta_{320A}$ angular units diagonally, horizontally, and/or vertically.

FIG. 26D illustrates an exemplary light field 5030C that is outcoupled by the eyepiece 5000 and projected onto the retina of the viewer's eye 201 while the viewer's eye 201 is oriented in the second manner as depicted in FIG. 26C and described above with reference thereto. The light field 5030C may include various angular light components representative of virtual content as would be captured in render space from the head-tracked render perspective 5010 and the fovea-tracked render perspective 5020C. Angular light components of the light field 5030C that are representative of virtual content as would be captured in render space from the head-tracked render perspective 5010 may include those which are to be projected onto the retina of the viewer's eye 210 at angles ranging from $-\theta_{310}$ to $+\theta_{310}$ angular units relative to the viewer's eye 210. However, in a departure from the first stage as described above with reference to FIGS. 26A-26B, the angular light components of light field 5030C that are representative of virtual content as would be captured in render space by the fovea-tracked virtual camera (e.g., virtual objects and other content that fall within the fovea-tracked render perspective 5020C) may include those which are to be projected onto the retina of the viewer's eye 210 at angles ranging from $\theta_{320C}-\theta_{320A}$ angular units to $\theta_{320C}+\theta_{320A}$ angular units relative to the viewer's eye 210.

The intervals between $\theta_{320C}-\theta_{320A}$ angular units and $\theta_{320C}+\theta_{320A}$ angular units at which such angular light components associated with the fovea-tracked render perspective 320C occur within the light field 5030C may be higher than the intervals between $-\theta_{310}$ and $+\theta_{310}$ angular units at which angular light components associated with the head-tracked render perspective 5010 occur within the light field 5030C. In this way, the resolution at which virtual content associated with the fovea-tracked render perspective 5020C may be rendered and presented to the viewer may be higher than the resolution at which virtual content associated with the head-tracked render perspective 5010 may be rendered and presented to the viewer, which notably includes virtual content represented by angular light components that are to be projected onto the retina of the viewer's eye 210 at angles ranging from $-\theta_{320A}$ to $+\theta_{320A}$ angular units relative to the viewer's eye 210.

In some embodiments, angular light components associated with the head-tracked render perspective 5010 that occur within the light field 5030C may further include those which are to be projected onto the retina of the viewer's eye 210 at angles ranging from $\theta_{320C}-\theta_{320A}$ angular units and $\theta_{320C}+\theta_{320A}$ angular units relative to the viewer's eye 210. In such embodiments, the intervals between $-\theta_{320C}-\theta_{320A}$ angular units and $\theta_{320C}+\theta_{320A}$ angular units at which such angular light components associated with the head-tracked render perspective 310 occur within the light field 5030C may be lower in regularity than the intervals between $\theta_{320C}-\theta_{320A}$ angular units and $\theta_{320C}+\theta_{320A}$ angular units angular units at which angular light components associated with the fovea-tracked render perspective 5020C occur within the light field 5030C. In other embodiments, angular light components associated with the head-tracked render perspective 5010 that occur within the light field 5030C may exclude those which are to be projected onto the retina of the viewer's eye 210 at angles ranging from $\theta_{320C}-\theta_{320A}$ angular units and $\theta_{320C}+\theta_{320A}$ angular units relative to the viewer's eye 210. As such, in these other embodiments, angular light components associated with the head-tracked render perspective 5010 that occur within the light field 5030C may be those which are to be projected onto the retina of the viewer's eye 210 at angles between $-\theta_{310}$ and $\theta_{320C}-\theta_{320A}$ angular units and angular units or angles between $\theta_{320C}+\theta_{320A}$ angular and $\theta_{310}$ angular units.

Figure 26F:
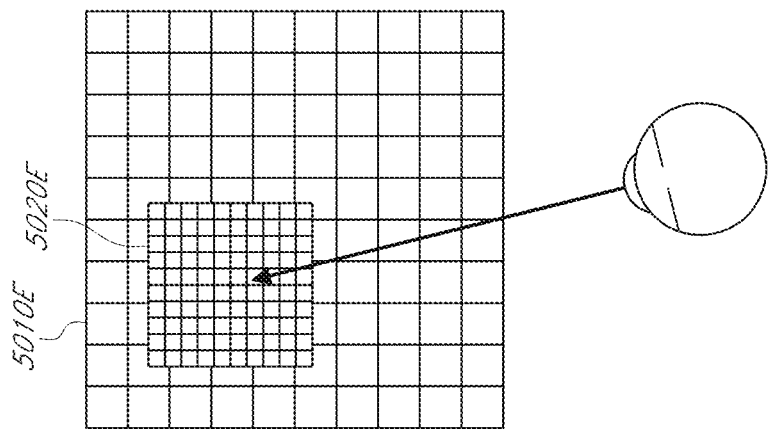
FIGS. 26E-26F illustrate schematically an exemplary configuration of images that can be presented to a user.
Figure 26E:
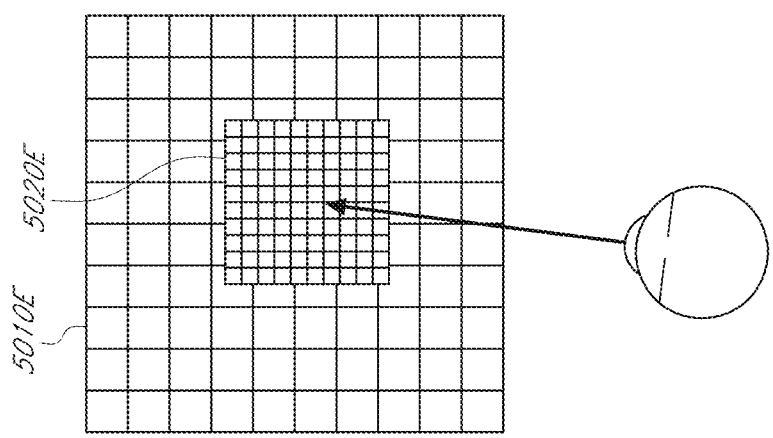

FIGS. 26E-26F illustrate schematically an exemplary configuration of images that can be presented to a user according to some embodiments. It should be noted that the grid squares in FIGS. 26E-26F represent schematically image points that, much like fields 3002, 3004 and 3006 as described above with reference to FIG. 24, are defined in two-dimensional angular space. A low-resolution first image stream 5010E having a wide FOV can be displayed at a static location. A low-resolution first image stream 5010E having a wide FOV can represent one or more images of virtual content as would be captured by a first virtual camera having a static position and orientation in render space. For instance, the low-resolution first image stream 5010E can represent one or more images of virtual content as would be captured by a head-tracked virtual camera such as the head-tracked virtual camera described above with reference to FIGS. 26A-26D. The first image stream 5010E can encompass the user's vision to evoke an immersion experience to the user.

A high-resolution second image stream 5020E having a relatively narrow FOV can be displayed within the boundaries of the first image stream 5010E. In some examples, the second image stream 5020E can represent one or more images of virtual content as would be captured by a second, different virtual camera having an orientation in render space that can be dynamically adjusted in real-time based on data obtained using eye-gaze tracking techniques to angular positions coinciding with the user's current fixation point. In these examples, the high-resolution second image stream 5020E can represent one or more images of virtual content as would be captured by a fovea-tracked virtual camera such as the fovea-tracked virtual camera described above with reference to FIGS. 26A-26D. In other words, the perspective in render space from which one or more images of virtual content represented by the second image stream 5020E is captured can be reoriented as the user's eye gaze changes, such that the perspective associated with the second image stream 5020E is persistently aligned with the user's foveal vision.

For example, the second image stream 5020E can encompass virtual content located within a first region of render space when the user's eye gaze is fixed at the first position as illustrated in FIG. 26E. As the user's eye gaze moves to a second position different from the first position, the perspective associated with the second image stream 5020E can be adjusted such that the second image stream 5020E can encompass virtual content located within a second region of render space, as illustrated in FIG. 26F. In some embodiments, the first image stream 5010E has a wide FOV, but a low angular resolution as indicated by the coarse grid. The second image stream 5020E has a narrow FOV, but a high angular resolution as indicated by the fine grid.

Figure 26H:
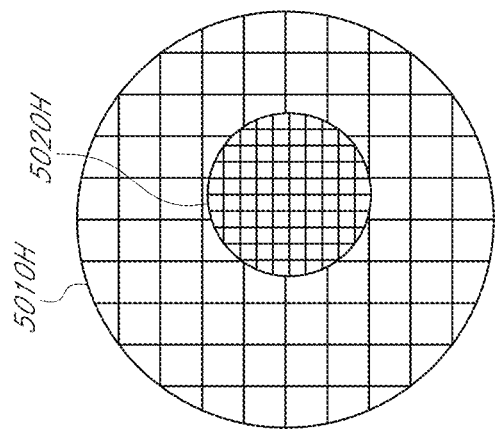
FIGS. 26G-26H illustrate schematically exemplary configurations of images that can be presented to a user.
Figure 26G:
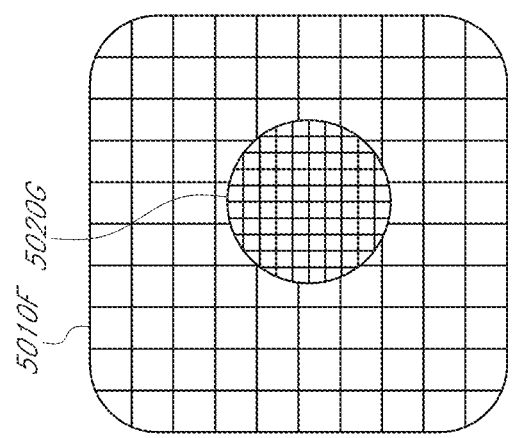

FIG. 26G illustrates schematically an exemplary configuration of images that can be presented to a user according to some other embodiments. Like FIGS. 26E-26F, the grid squares in FIG. 26G represent schematically image points that are defined in two-dimensional angular space. Similar to the configuration illustrated in FIGS. 26E-26F, a low resolution first image stream 5010G having a wide FOV encompasses virtual content as viewed from a head-tracked render perspective, while a high resolution second image stream 5020G having a narrow FOV encompasses virtual content as viewed from a fovea-tracked render perspective that may be dynamically reoriented so as to coincide with the user's current fixation point. Here, the outer perimeter of the FOV associated with the first image stream 5010G can form a rectangular boundary with rounded corners, and the outer perimeter of the FOV associated with the second image stream 5020G can form a circular boundary.

FIG. 26H illustrates schematically an exemplary configuration of images that can be presented to a user according to yet some other embodiments. Like FIGS. 26E-26G, the grid squares in FIG. 26H represent schematically image points that are defined in two-dimensional angular space. Here, both the outer perimeter of the FOV associated with the first image stream 5010H and the outer perimeter of the FOV associated with the second image stream 5020H can form circular boundaries. In some other embodiments, either the outer perimeter of the FOV associated with the first image stream 5010H and the outer perimeter of the FOV associated with the second image stream 5020H, or both, can form an elliptical boundary or other shapes. In some embodiments, an image source of the AR system of FIG. 26H may include a scanning fiber that can be scanned in a predetermined pattern to provide light beams for the first image stream 5010H and the second image stream 5020H with desired boundary shapes.

Figure 27:
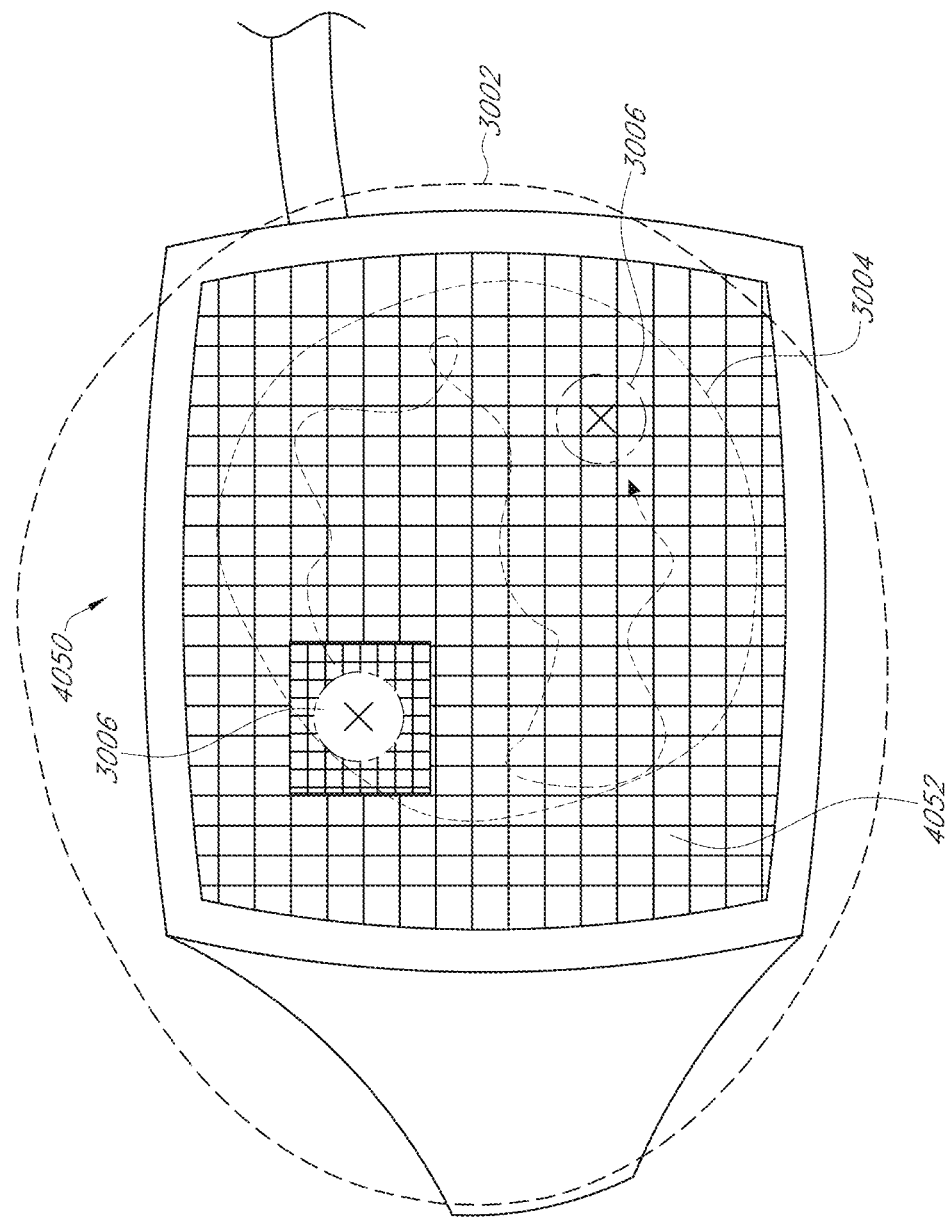
FIG. 27 illustrates a field of view and a field of regard as shown in FIG. 24, overlaid upon one of the displays in the wearable display device as shown in FIG. 25.

FIG. 27 illustrates a field of view 3002 and a field of regard 3004 as shown in FIG. 24, overlaid upon one of the displays 4052 in the wearable display device 4050 as shown in FIG. 25A. According to some embodiments, the wide FOV and low resolution first image stream 5010E illustrated in FIGS. 26E-26F can be displayed across the entire area of the display 4052 (the relatively low resolution of the first image stream 5010E is illustrated with a coarse grid), while the narrow FOV and high resolution second image stream 5020E can be displayed at the user's current foveated region 3006 (the relatively high resolution of the second image stream 5020E is illustrated with a fine grid). While in FIG. 27 the first image stream 5010E and the second image stream 5020E are illustrated as displayed in the "plane" of the displays 4052, in a see-through augmented reality (AR) display system the first image stream 5010E and the second image stream 5020E can also be presented to the user as light fields within certain angular fields of view. Such an AR display system can produce display planes that appear to be "floating" at some distance (e.g., 2 meters) in front of the user. The display plane can appear to be much larger than the glasses. This floating distanced display is used for overlaying information on the real world.

Figure 28A:
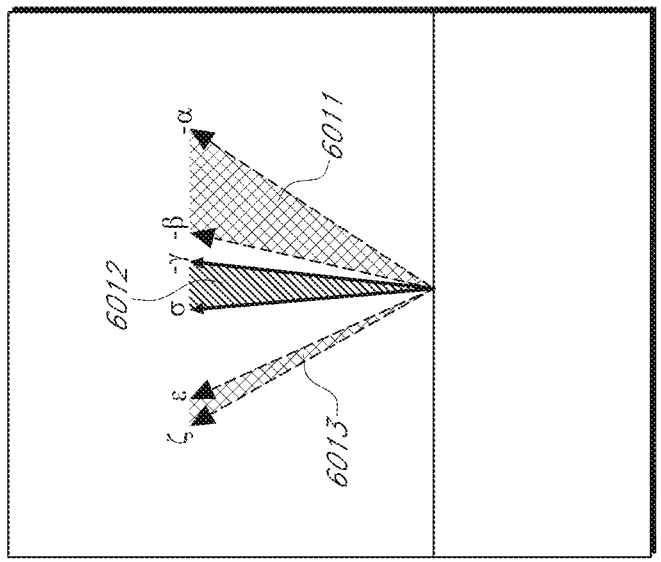
FIGS. 28A-28B illustrate some of the principles described in FIGS. 26A-26D.
Figure 28A:
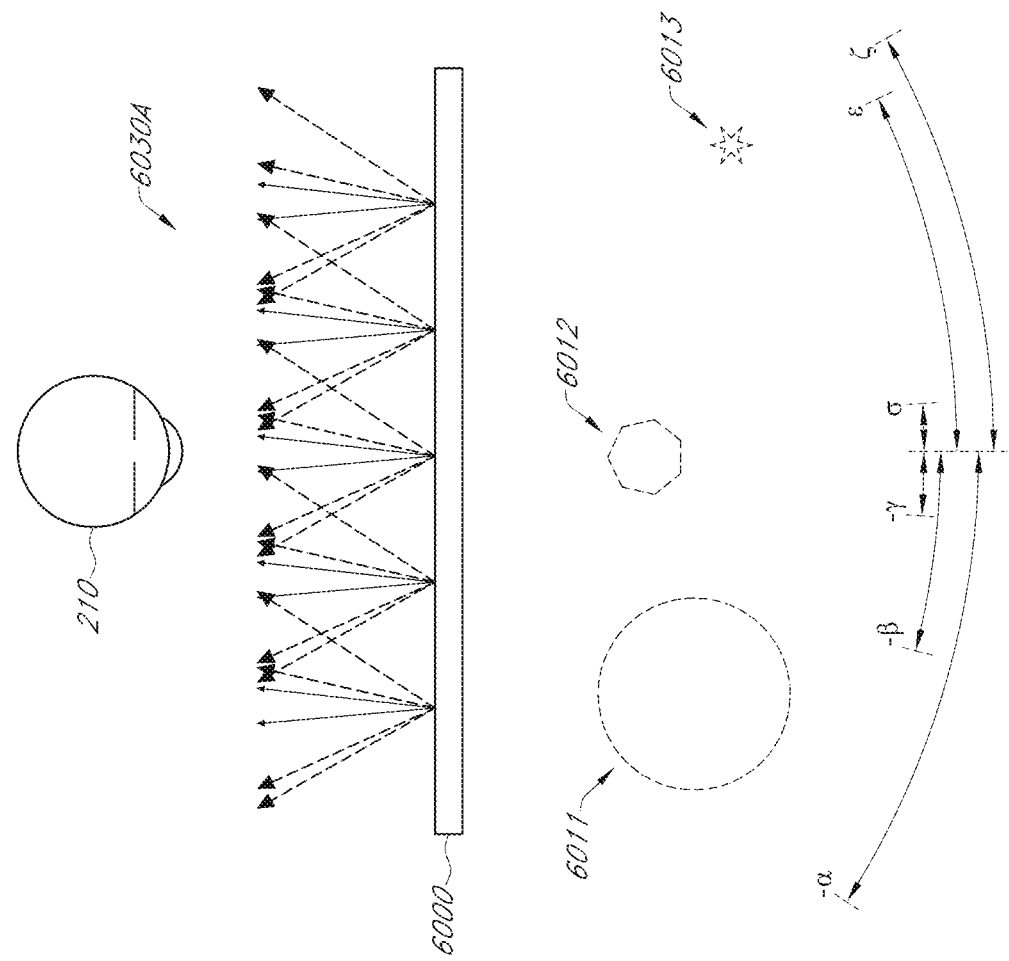
Figure 28B:
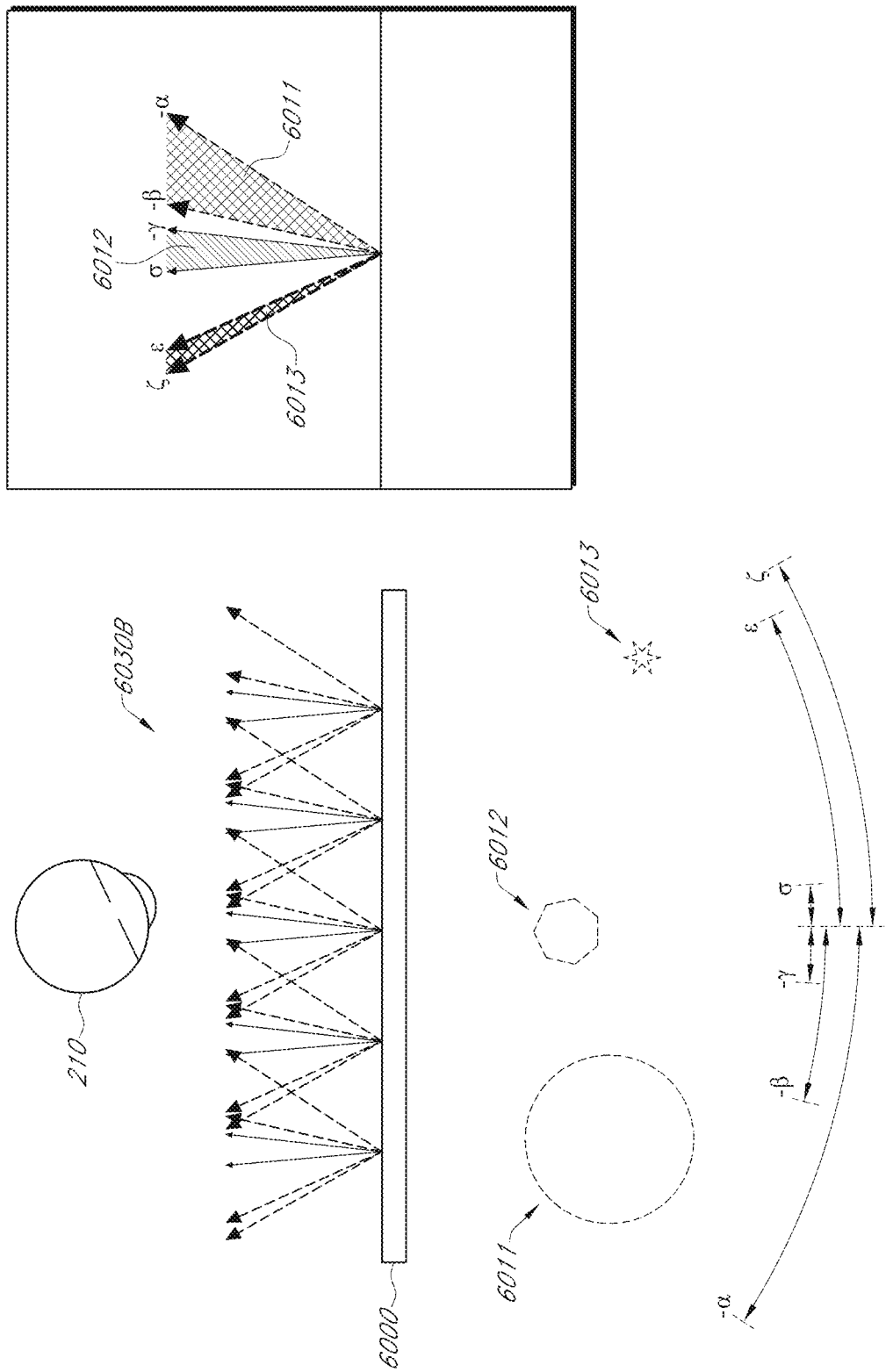

FIGS. 28A-28B illustrate some of the principles described in FIGS. 26A-26D using exemplary virtual content that can be presented to a user according to some embodiments. As such, FIGS. 28A-28B may represent a viewer and an AR system in first and second time-sequential stages, respectively. Furthermore, some or all of the components shown in FIGS. 28A-28B may be the same as or at least similar to components as described above with reference to FIGS. 26A-26D.

The AR system of FIGS. 28A-28B may create or dynamically reposition and/or reorient a head-tracked virtual camera similar to the head-tracked virtual camera described above with reference to FIGS. 26A-26D, render virtual content from the perspective of the head-tracked virtual camera, and project light representing renderings of the virtual content through the eyepiece 6000 and onto the retina of the viewer's eye 210. The AR system of FIGS. 28A-28B may also create or dynamically reposition and/or reorient a fovea-tracked virtual camera similar to the fovea-tracked virtual camera described above with reference to FIGS. 26A-26D, render virtual content from the perspective of the fovea-tracked virtual camera, and project light representing renderings of the virtual content through the eyepiece 400 and onto the fovea of the viewer's eye 210. As shown in FIGS. 28A-28B, such virtual content may include 3-D virtual objects 6011, 6012, and 6013. In some examples, the AR system of FIGS. 28A-28B may perform one or more of the operations described immediately above regarding the head-tracked render perspective and one or more of the operations described immediately above regarding the fovea-tracked render perspective simultaneously. In other examples, the AR system of FIGS. 28A-28B may perform such operations in rapid succession.

In this example, the FOV of the head-tracked render perspective employed by the AR system in FIGS. 28A-28B may be diagonally, horizontally, and/or vertically wide enough in angular space to encompass each of virtual objects 6011, 6012, and 6013. For purposes of example, the position and orientation of the viewer's head may be treated as being static throughout the first and second stages as depicted in FIGS. 28A and 28B, respectively, such that the position and orientation of the head-tracked render perspective remain the same throughout the two stages. In order for the FOV of the head-tracked render perspective employed by the AR system to be large enough to encompass virtual objects 6011-6013, it must at least span a region of $\alpha+\zeta$ angular units diagonally, horizontally, and/or vertically. More specifically, in the example of FIGS. 28A-28B, it can be seen that virtual objects 6011, 6012, and 6013 may span regions of $\alpha-\beta$, $\gamma+\delta$, and $\zeta-\varepsilon$ angular units, respectively.

In FIG. 28A, a viewer's eye 210 is oriented in a first manner with respect to an eyepiece 6000, such that the viewer may be able to see the eyepiece 6000 in a relatively straightforward direction. The orientation of the viewer's eye 210 in FIG. 28A may, for instance, be the same as or similar to the orientation of the viewer's eye 210 as described above with reference to FIGS. 26A-26B, and may be determined by the AR system using one or more of the sensing components and/or techniques described herein. As such, in the stage depicted in FIG. 28A, the AR system may employ head-tracked and fovea-tracked render perspectives at relative positions and orientations similar to those of the head-tracked and fovea-tracked render perspectives 5010 and 5020A, respectively. In the particular example of FIG. 28A, the FOV of the fovea-tracked render perspective employed by the AR system may, for instance, encompass virtual object 6012, but may not encompass either of virtual objects 6011 and 6013. It follows that, in FIG. 28A, the AR system may render virtual object 6012 as it would be captured from the perspective of the fovea-tracked virtual camera in high definition, and may render virtual objects 6011 and 6013 as they would be captured from the perspective of the head-tracked virtual camera in lower definition. In addition, the AR system may project light representing such renderings of virtual objects 6011, 6012, and 6013 through the eyepiece 6000 and onto the retina of the viewer's eye 210. In some embodiments, the AR system may also render virtual object 6012 as it would be captured from the perspective of the head-tracked virtual camera in lower definition.

FIG. 28A also illustrates an exemplary light field 6030A that is outcoupled by the eyepiece 6000 and projected onto the retina of the viewer's eye 210. The light field 6030A may include various angular light components representative of one or more of the abovementioned renderings of virtual objects 6011, 6012, and 6013. For example, angular light components of the light field 6030A that are representative of the virtual object 6011 as it would be captured from the perspective of the head-tracked virtual camera may include those which are to be projected onto the retina of the viewer's eye 210 at angles ranging from $-\alpha$ to $-\beta$ angular units relative to the viewer's eye 210, and angular light components of the light field 6030A that are representative of the virtual object 6013 as it would be captured from the perspective of the head-tracked virtual camera may include those which are to be projected onto the retina of the viewer's eye 210 at angles ranging from $\varepsilon$ to $\zeta$ angular units relative to the viewer's eye 210. Similarly, angular light components of the light field 6030A that are representative of the virtual object 6012 as it would be captured from the perspective of the fovea-tracked virtual camera may include those which are to be projected onto the fovea of the viewer's eye 210 at angles ranging from $-\gamma$ to $\delta$ angular units relative to the viewer's eye 210. As such, components of the light field 6030A that are representative of virtual object 6012 (i.e., components to be projected at angles ranging from $-\gamma$ to $\delta$ angular units relative to the viewer's eye 210)

may be more densely distributed in angular space than components of the light field 6030A that are representative of virtual object 6011 or 6013 (i.e., components to be projected at angles ranging from −α to −β or ε to ζ angular units relative to the viewer's eye 210). In this way, the resolution at which the virtual object 6012 may be rendered and presented to the viewer may be higher than the resolution at which virtual object 6011 or 6013 may be rendered and presented to the viewer.

In FIG. 28B, the viewer's eye 210 is oriented in a second manner with respect to the eyepiece 6000 different from the first manner in which the viewer's eye 210 is oriented with respect to the eyepiece 6000 in FIG. 28A. The orientation of the viewer's eye 210 in FIG. 28B may, for instance, be the same as or similar to the orientation of the viewer's eye 210 as described above with reference to FIGS. 26C-26D, and may be determined by the AR system using one or more of the sensing components and/or techniques described herein. As such, in the stage depicted in FIG. 28B, the AR system may employ head-tracked and fovea-tracked render perspectives at relative positions and orientations similar to those of the head-tracked and fovea-tracked render perspectives 5010 and 5020C, respectively. In the particular example of FIG. 28B, the FOV of the fovea-tracked render perspective employed by the AR system may, for instance, encompass virtual object 6013, but may not encompass either of virtual objects 6011 and 6012. It follows that, in FIG. 28B, the AR system may render virtual object 6013 as it would be captured from the perspective of the fovea-tracked virtual camera in high definition, and may render virtual objects 6011 and 6012 as they would be captured from the perspective of the head-tracked virtual camera in lower definition. In addition, the AR system may project light representing such renderings of virtual objects 6011, 6012, and 6013 through the eyepiece 6000 and onto the retina of the viewer's eye 210. In some embodiments, the AR system may also render virtual object 6013 as it would be captured from the perspective of the head-tracked virtual camera in lower definition.

FIG. 28B also illustrates an exemplary light field 6030B that is outcoupled by the eyepiece 6000 and projected onto the retina of the viewer's eye 210. The light field 6030B may include various angular light components representative of one or more of the abovementioned renderings of virtual objects 6011, 6012, and 6013. For example, angular light components of the light field 6030B that are representative of the virtual object 6011 as it would be captured from the perspective of the head-tracked virtual camera may include those which are to be projected onto the retina of the viewer's eye 210 at angles ranging from −α to −β angular units relative to the viewer's eye 210, and angular light components of the light field 6030B that are representative of the virtual object 6012 as it would be captured from the perspective of the head-tracked virtual camera may include those which are to be projected onto the retina of the viewer's eye 210 at angles ranging from −γ to δ angular units relative to the viewer's eye 210. Similarly, angular light components of the light field 6030B that are representative of the virtual object 6013 as it would be captured from the perspective of the fovea-tracked virtual camera may include those which are to be projected onto the fovea of the viewer's eye 210 at angles ranging from ε to ζ angular units relative to the viewer's eye 210. As such, components of the light field 6030B that are representative of virtual object 6013 (i.e., components to be projected at angles ranging from ε to ζ angular units relative to the viewer's eye 210) may be more densely distributed in angular space than components of the light field 6030A that are representative of virtual object 6011 or 6012 (i.e., components to be projected at angles ranging from −α to −β or −γ to δ angular units relative to the viewer's eye 210). In this way, the resolution at which the virtual object 6013 may be rendered and presented to the viewer may be higher than the resolution at which virtual object 6011 or 6012 may be rendered and presented to the viewer. Indeed, from the stage of FIG. 28A to the stage of FIG. 28B, the AR system described herein with reference thereto has effectively reoriented the perspective from which virtual content may be viewed in high resolution in accordance with the change in gaze of the viewer's eye 402 between stages.

FIGS. 28C-28F illustrate some of the principles described in FIGS. 3E-3F using some exemplary images that can be presented to a user according to some embodiments. In some examples, the one or more of the images and/or image streams depicted in FIGS. 28C-28F may represent two-dimensional images or portions thereof that are to be displayed at a particular depth plane, such as one or more of the depth planes described above with reference to FIG. 25B. That is, such images and/or image streams may represent 3-D virtual content having been projected onto at least one two-dimensional surface at a fixed distance away from the user. In such examples, it is to be understood that such images and/or image streams may be presented to the user as one or more light fields with certain angular fields of view similar to those described above with reference to FIGS. 26A-26D and 28A-28B.

As depicted, a first image stream 6010 includes a tree. During a first period of time represented by FIG. 28C, eye-tracking sensors can determine a user's eye gaze (i.e., the foveal vision) is focused within a first region 6010-1 of the tree that includes the trunk of the tree. In response to determining the user's eye gaze is focused within the first region 6010-1, a second image stream 6020 that includes high-resolution imagery associated with the first region 6010-1 of the first image stream 6010 can be positioned within the first region 410-1 concurrent with the display of the first image stream 6010. The first image stream 410 can have a lower resolution than the second image stream 6020, as illustrated in FIG. 28C.

Figure 28D:
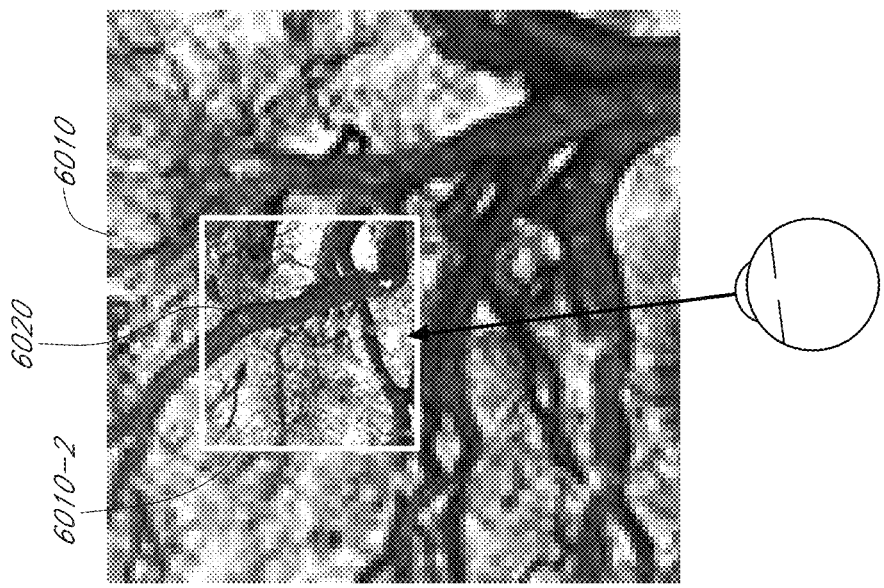
FIGS. 28C-28D illustrate some exemplary images that can be presented to a user.
Figure 28C:
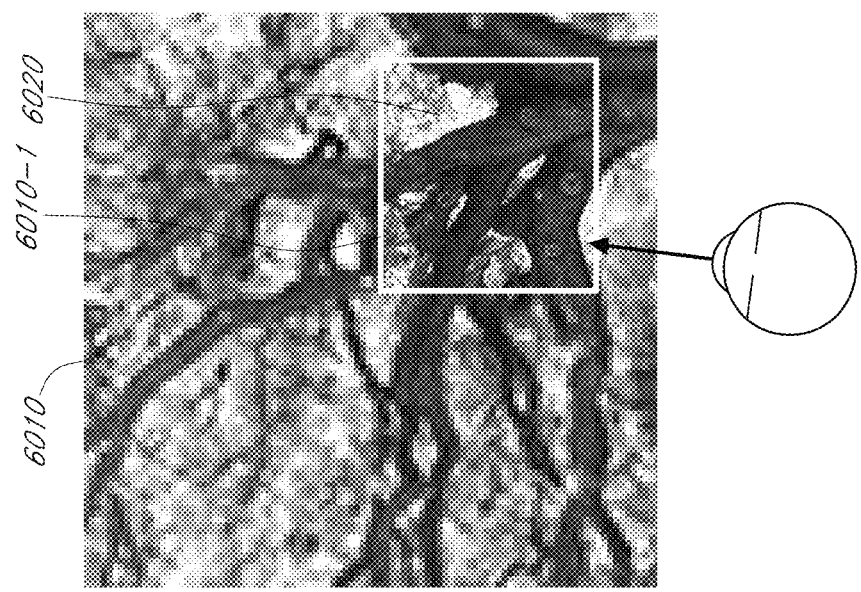

During a second period of time represented by FIG. 28D, eye-tracking sensors can determine the user's eye gaze has moved to a second region 6010-2 of the tree that includes a branch of the tree as illustrated in FIG. 28D. Accordingly, the second image stream 420 can be shifted to the second region 6010-2 and have its content changed to correspond to the content within second region 6010-2 of the first image stream 6010. Because the higher resolution second image stream 6020 overlays the portion of the first image stream 6010 within the user's foveal vision, the lower resolution of the portion of the first image stream 6010 surrounding the second image stream 6020 may not be perceived or noticed by the user. In this way, the user may perceive the combination of the first image stream 6010 and the second image stream 6020 as having both a wide FOV and high resolution. Such a display system can afford several advantages. For example, the display system can provide a superior user experience while maintaining a relatively small form factor and keeping computation resource requirement relatively low. The small form factor and low computation resource requirement can be due to the device only having to generate high-resolution imagery in a limited region of the display.

The second image stream 6020 can be overlaid on the first image stream 6010 simultaneously, or in rapid succession. As discussed above, in some embodiments, the subset of the content of the first image stream 6010 overlaid by the second image stream 6020 can be turned off or be presented with a lower intensity for more uniform brightness and for better resolution perception. It should also be noted that in some embodiments the second image stream associated with the second image stream 6020 can differ from the first image stream associated with the first image stream 6010 in other ways. For example, a color resolution of the second image stream could be higher than the color resolution of the first image stream. A refresh rate of the second image stream could also be higher than the refresh rate of the first image stream.

Figure 28F:
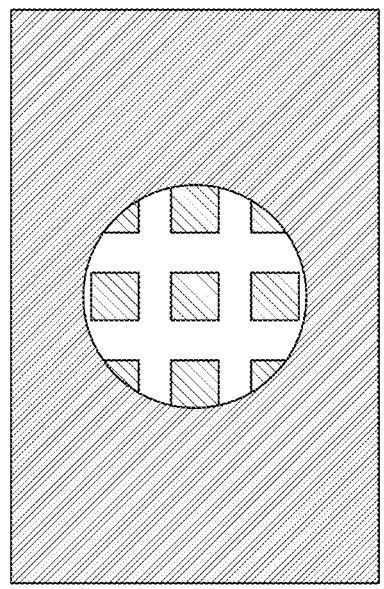
FIG. 28F illustrates an exemplary low-FOV high-resolution image frame.
Figure 28E:
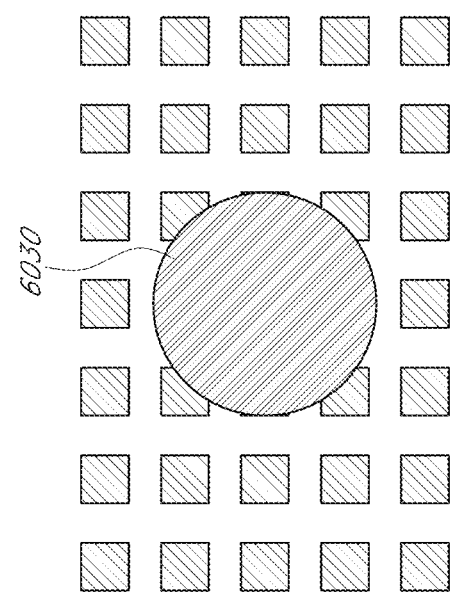
FIG. 28E illustrates an exemplary high-FOV low-resolution image frame.

FIG. 28E illustrates an exemplary high-FOV low-resolution image frame (i.e., the first image stream), and FIG. 28F illustrates an exemplary low-FOV high-resolution image frame (i.e., the second image stream), according to some embodiments. As illustrated in FIG. 28E, the region 6030 of the high-FOV low-resolution image frame, which would be overlaid by the low-FOV high-resolution image frame, can be devoid of virtual content. By omitting the portion of the high-FOV image that corresponds to region 6030, any image blurring or smearing resulting from slight differences in the two images can be avoided. The content of the low-FOV high-resolution image frame (e.g., as illustrated in FIG. 28F) can include a high resolution version of the content corresponding to region 6030.

Figure 29A:
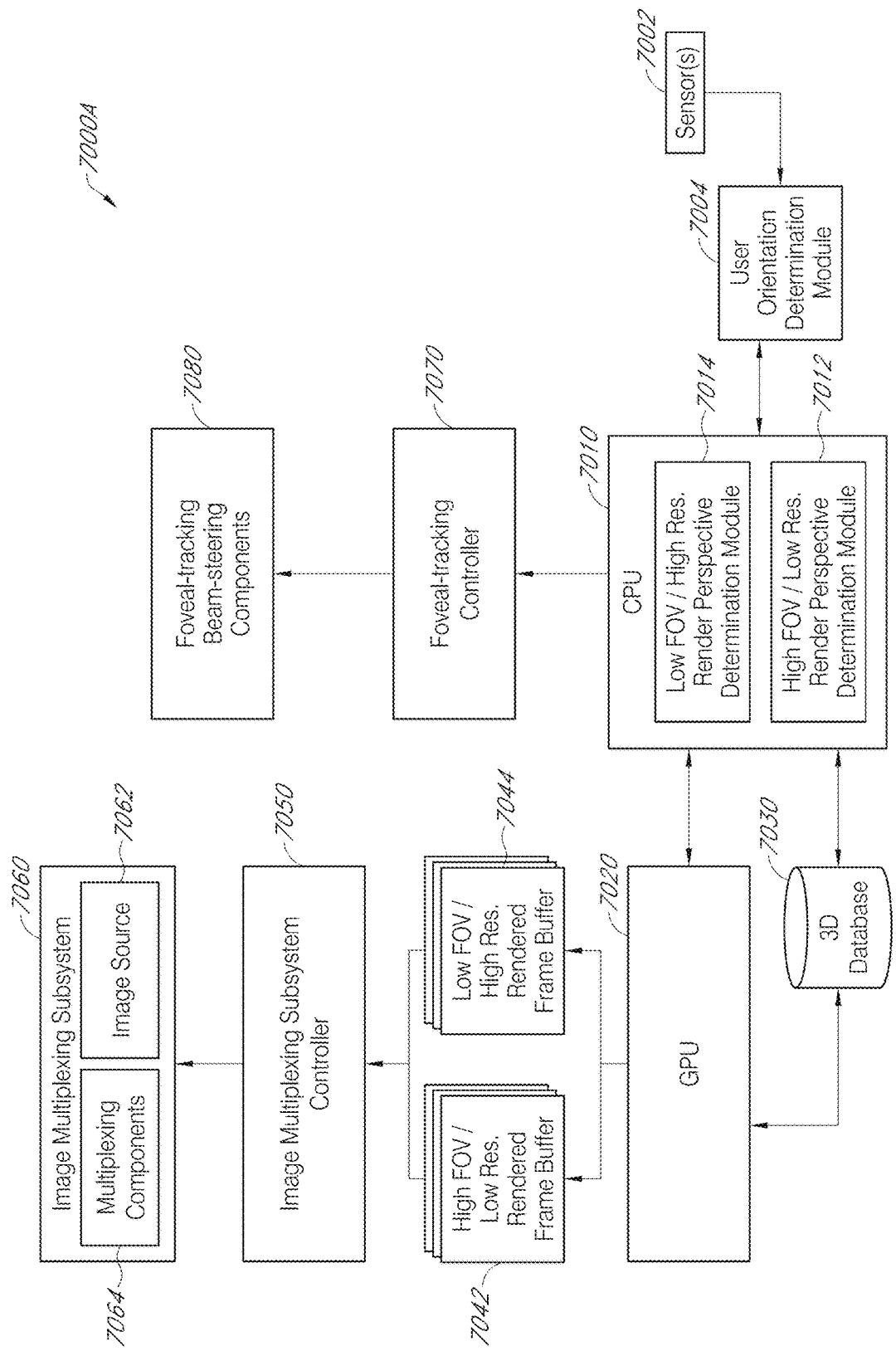
FIG. 29A shows a simplified block diagram of a display system.

FIG. 29A shows a simplified block diagram of a display system 7000A according to some embodiments. The display system 7000A can include one or more sensors 7002 for detecting the position and movement of the head of a user, as well as the eye position and inter-ocular distance of the user. Such sensors may include image capture devices (such as cameras), microphones, inertial measurement units, accelerometers, compasses, GPS units, radio devices, gyroscopes, and the like. In an augmented reality system, the one or more sensors 7002 can be mounted on a head-worn frame.

For example, in some implementations, the one or more sensors 7002 of the display system 7000A may be part of a head worn transducer system and include one or more inertial transducers to capture inertial measures indicative of movement of the head of the user. As such, in these implementations the one or more sensors 7002 may be used to sense, measure, or collect information about the head movements of the user. For instance, such may be used to detect measurement movements, speeds, acceleration, and/or positions of the head of the user.

In some embodiments, the one or more sensors 7002 can include one or more forward facing cameras, which may be used to capture information about the environment in which the user is located. The forward facing cameras may be used to capture information indicative of distance and orientation of the user with respect to that environment and specific objects in that environment. When head worn, the forward facing cameras is particularly suited to capture information indicative of distance and orientation of the head of the user with respect to the environment in which the user is located and specific objects in that environment. The forward facing cameras can be employed to detect head movement, speed, and acceleration of head movements. The forward facing cameras can also be employed to detect or infer a center of attention of the user, for example, based at least in part on an orientation of the head of the user. Orientation may be detected in any direction (e.g., up and down, left and right with respect to the reference frame of the user).

The one or more sensors 7002 can also include a pair of rearward facing cameras to track movement, blinking, and depth of focus of the eyes of the user. Such eye-tracking information can, for example, be discerned by projecting light at the user's eyes, and detecting the return or reflection of at least some of that projected light. Further details discussing eye-tracking devices are provided in U.S. Provisional Patent Application No. 61/801,219, entitled "DISPLAY SYSTEM AND METHOD," U.S. Provisional Patent Application No. 62/005,834, entitled "METHODS AND SYSTEM FOR CREATING FOCAL PLANES IN VIRTUAL AND AUGMENTED REALITY," U.S. Provisional Patent Application No. 61/776,771, entitled "SYSTEM AND METHOD FOR AUGMENTED AND VIRTUAL REALITY," and U.S. Provisional Patent Application No. 62/420,292, entitled "METHOD AND SYSTEM FOR EYE TRACKING USING SPECKLE PATTERNS," which are expressly incorporated herein by reference.

The display system 7000A can further include a user orientation determination module 7004 communicatively coupled to the one or more sensors 7002. The user orientation determination module 7004 receives data from the one or more sensors 7002 and uses such data to determine the user's head pose, cornea positions, inter-pupillary distance, and the like. The user orientation determination module 7004 detects the instantaneous position of the head of the user and may predict the position of the head of the user based on position data received from the one or more sensors 7002. The user orientation determination module 7004 also tracks the eyes of the user based on the tracking data received from the one or more sensors 7002.

The display system 7000A may further include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the example depicted in FIG. 29A, the display system 7000A includes a central processing unit (CPU) 7010, a graphics processing unit (GPU) 7020, and frame buffers 7042 and 7044. Briefly, and as described in further detail below, the CPU 7010 controls overall operation, while the GPU 7020 renders frames (i.e., translating a three-dimensional scene into a two-dimensional image) from three-dimensional data stored in database 7030 and stores these frames in the frame buffers 7042 and 7044. While not illustrated, one or more additional integrated circuits may control the reading into and/or reading out of frames from the frame buffers 7042 and 7044 and operation of one or more other components of the display system 7000A, such as components of the image multiplexing subsystem 7060, foveal-tracking beam-steering components 7080, and the like. Reading into and/or out of the frame buffers 542 and 544 may employ dynamic addressing, for instance, where frames are over-rendered. The display system 7000A further comprises a read only memory (ROM) and a random access memory (RAM). The display system 7000A further comprises a three-dimensional data base 7030 from which the GPU 7020 can access three-dimensional data of one or more scenes for rendering frames.

The CPU 7010 can include a high-FOV low-resolution render perspective determination module 7012 and a low-FOV high-resolution render perspective determination module 7014. In some embodiments, the user orientation determination module 7004 can be part of the CPU 7010.

The high-FOV low-resolution render perspective determination module 7012 can include logic for mapping the data output by the user orientation determination module to the location in 3D space and the angle from which high-FOV low-resolution images are to be perceived. That is, the CPU 7010 determines the perspective of a virtual camera fixed with respect to the user's head at any given time based on the data received from the user orientation determination module 7004. Within the context of the examples described above with reference to FIGS. 26A-26D and 28A-28B, the high-FOV low-resolution render perspective determination module 7012 may serve to monitor head position and orientation, as indicated by the user orientation determination module 7004, and control the position and orientation of at least the head-tracked virtual camera within render space accordingly.

The low-FOV high-resolution render perspective determination module 7014 can include logic for mapping the data output by the user orientation determination module (e.g., data indicating the user's gaze and foveal positioning) to the location in 3D space and the angle from which low-FOV high-resolution images are to be perceived. That is, the CPU 7010 determines the perspective of a virtual camera fixed with respect to the user's fovea at any given time based on the data received from the user orientation determination module 7004. Within the context of the examples described above with reference to FIGS. 26A-26D and 28A-28B, the low-FOV high-resolution render perspective determination module 7014 may serve to monitor eye gaze, as indicated by the user orientation determination module 7004, and control the position and orientation of at least the fovea-tracked virtual camera within render space accordingly.

The display system 7000A can further include a graphics processing unit (GPU) 7020 and a database 7030. The database 7030 can store 3D virtual content. The GPU 7020 can access the 3D virtual content stored in the database 7030 for rendering frames. The GPU 7020 can render frames of virtual content in low FOV and high resolution from the perspective of the virtual camera fixed with respect to the user's fovea (e.g., fovea-tracked render perspective), as determined and provided as output by the CPU 7010. The GPU 7020 can also render frames of virtual content in high FOV and low resolution from the perspective of the virtual camera fixed with respect to the user's head (e.g., head-tracked/non-foveated perspective), as determined and provided as output by the CPU 7010. Further details discussing the creation, adjustment, and use of virtual cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

The high-FOV low-resolution rendered frames of virtual content can be stored in a high-FOV low-resolution rendered frame buffer 7042. Similarly, the low-FOV high-resolution rendered frames of virtual content can be stored in a low-FOV high-resolution rendered frame buffer 7044. In some embodiments, the high-FOV low-resolution rendered frame buffer 7042 and the low-FOV high-resolution rendered frame buffer 7044 can be part of the GPU 7020.

The display system 7000A can further include an image multiplexing subsystem 7060 and an image multiplexing subsystem controller 7050 communicatively coupled to the image multiplexing subsystem 7060. The image multiplexing subsystem 7060 can include an image source 7062 and multiplexing components 7064 for multiplexing high-FOV low-resolution image frames and low-FOV high-resolution image frames, substantially as described in further detail below with reference to FIGS. 30A-30B. The image source 7062 can include, for example, a light source in combination with fiber scanning components, liquid crystal on silicon (LCoS), MEMs scanning mirror, and the like. The multiplexing components 7064 can include optical elements, such as polarization rotators, switchable optics, liquid crystal arrays, varifocal lenses, and the like. The multiplexing components 7064 can be internal or external to the image source 7062.

The image multiplexing subsystem controller 7050 is communicatively coupled to the image multiplexing subsystem 7060, the high-FOV low-resolution rendered frame buffer 7042, and the low-FOV high-resolution rendered frame buffer 7044. The control circuitry can send control signals to the image source 562, so that appropriate image content is presented from each render perspective, as discussed above. The image multiplexing subsystem controller 7050 can also control the multiplexing components 7064 in conjunction with the image source 7062 in a manner so as to yield a multiplexed image stream.

The display system 7000A can further include foveal-tracking beam-steering components 7080 and a foveal-tracking controller 7070 communicatively and/or operatively coupled to foveal-tracking beam-steering components 7080. The foveal-tracking controller 7070 can receive output data from the CPU 7010 regarding the position of the user's fovea (e.g., as determined by the low-FOV high-resolution render perspective determination module 7014 and/or the user orientation determination module 7004), and use such data to control the position of the foveal-tracking beam-steering components 7080. The foveal-tracking beam-steering components 7080 can serve to dynamically steer or otherwise direct low-FOV high-resolution portions of the multiplexed image stream (produced by the image source 7062 and the multiplexing components 7064) toward the user's fovea. Such low-FOV high-resolution portions of the image stream may, for instance, represent virtual content as would be captured from the perspective of a fovea-tracked virtual camera.

The display system 7000A can also include a storage medium for storing computer-readable instructions, databases, and other information usable by the CPU 7010, GPU 7020, and/or one or more other modules or controllers of the display system 7000A. The display system 7000A can further include input-output (I/O) interfaces, such as buttons, that a user may use for interaction with the display system. The display system 7000A can also include a wireless antenna for wireless communication with another part of the display system 7000A, or with the Internet.

Figure 29B:
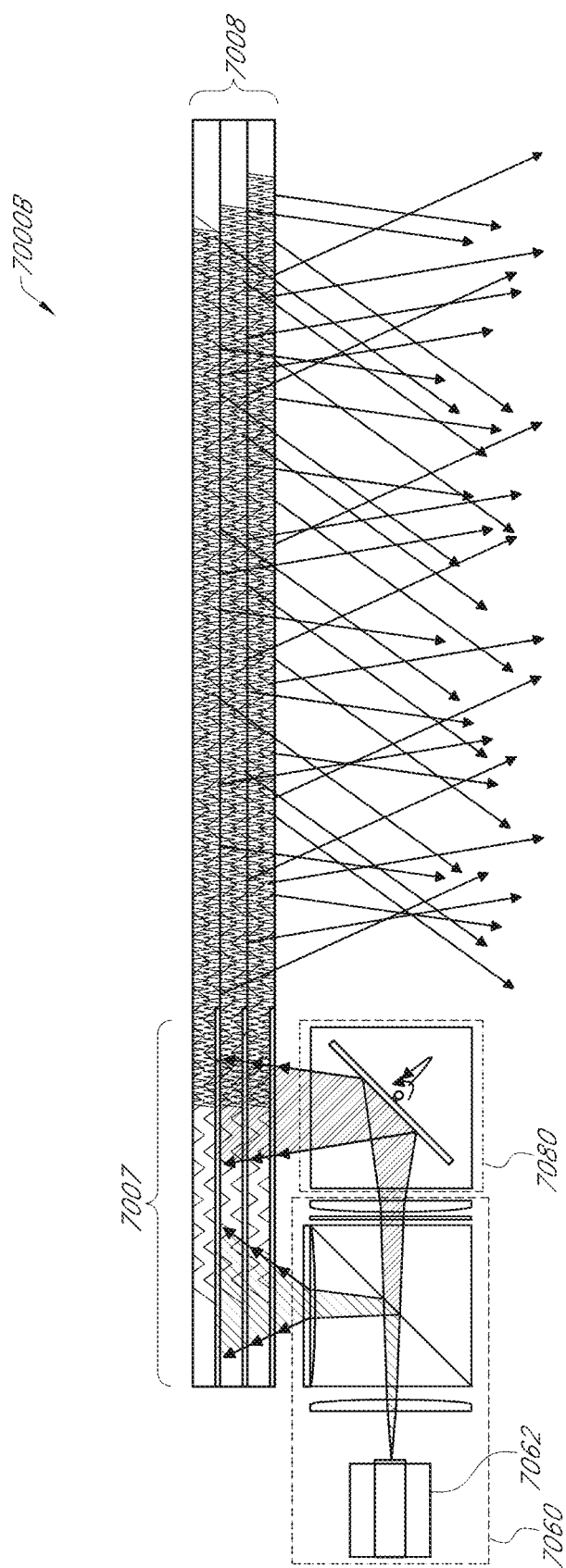
FIG. 29B illustrates schematically a cross-sectional view of an augmented reality (AR) system.

FIG. 29B illustrates schematically a cross-sectional view of an AR system 7000B according to some embodiments. The AR system 7000B can incorporate at least some of the components of the display system 7000A as described above with reference to FIG. 29A, and can be fitted into one of the displays 4052 in the wearable display device 4050 as shown in FIG. 25A according to some embodiments. For instance, the AR system 7000B can include an image multiplexing subsystem 560, which can include an image source 7062 and one or more multiplexing components. In addition, the AR system 7000B can also include foveal-tracking beam-steering components 7080, which in this example may an electromechanical optical device, such as a MEMs scanning mirror. Much like the display system 7000A, the image multiplexing subsystem 7060 may be communicatively and/ or operatively coupled to an image multiplexing subsystem controller, and the foveal-tracking beam-steering components 7080 may be communicatively and/or operatively coupled to a foveal-tracking controller. The AR system 7000B can further include one or more incoupling gratings (ICGs) 7007, and one or more eyepieces 7008. Each incoupling grating 7007 can be configured to couple the first light beam and the second light beam into a respective eyepiece 7008. Each eyepiece 7008 can include outcoupling gratings for outcoupling the first light beam and the second light beam into a user's eye. The incoupling gratings 7007 and the eyepieces 7008 may be referred herein as a "viewing assembly." It will be appreciated that the various incoupling gratings (ICG's) disclosed herein may correspond to the in-coupling optical elements 700, 710, 720 of FIGS. 9A-9C.

Figure 30A:
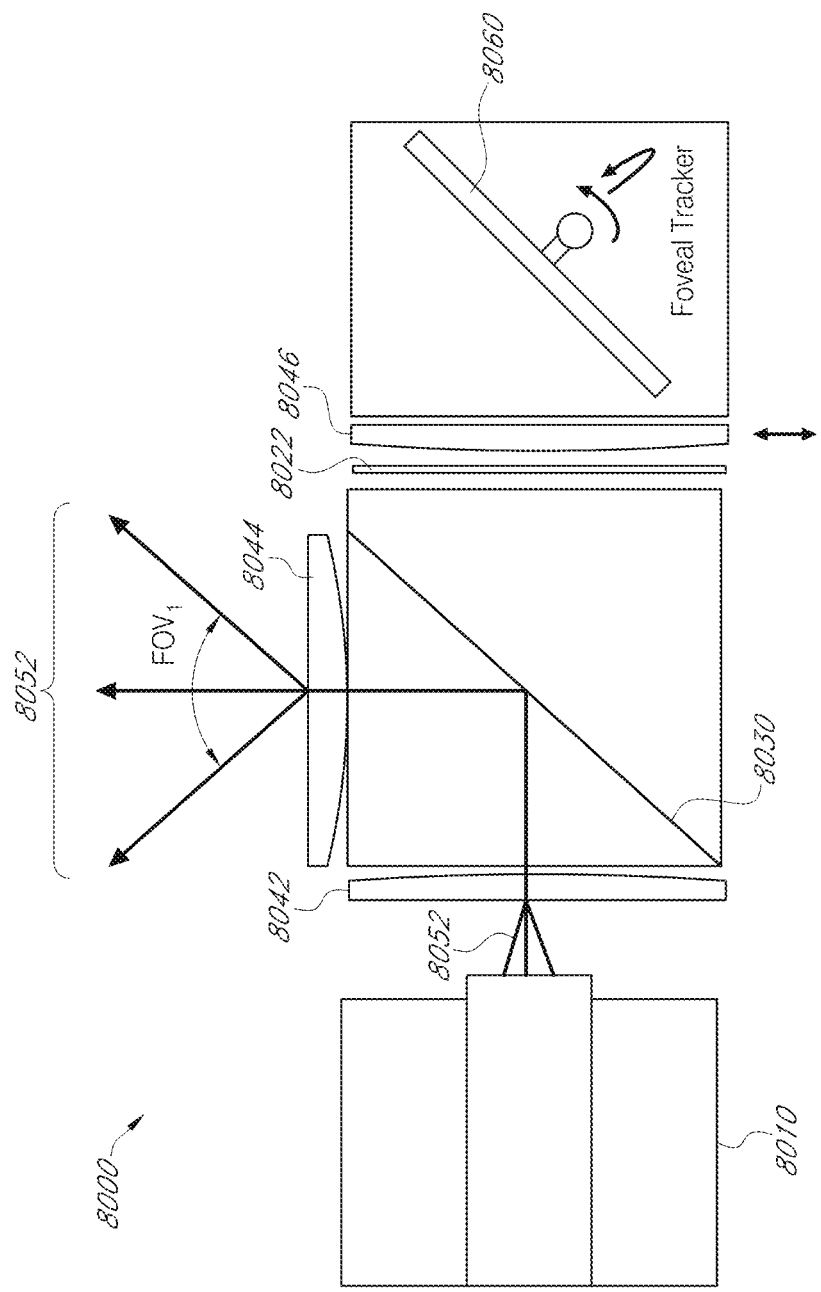
FIGS. 30A-30B illustrate schematically a display system for projecting image streams to an eye of a user.
Figure 30B:
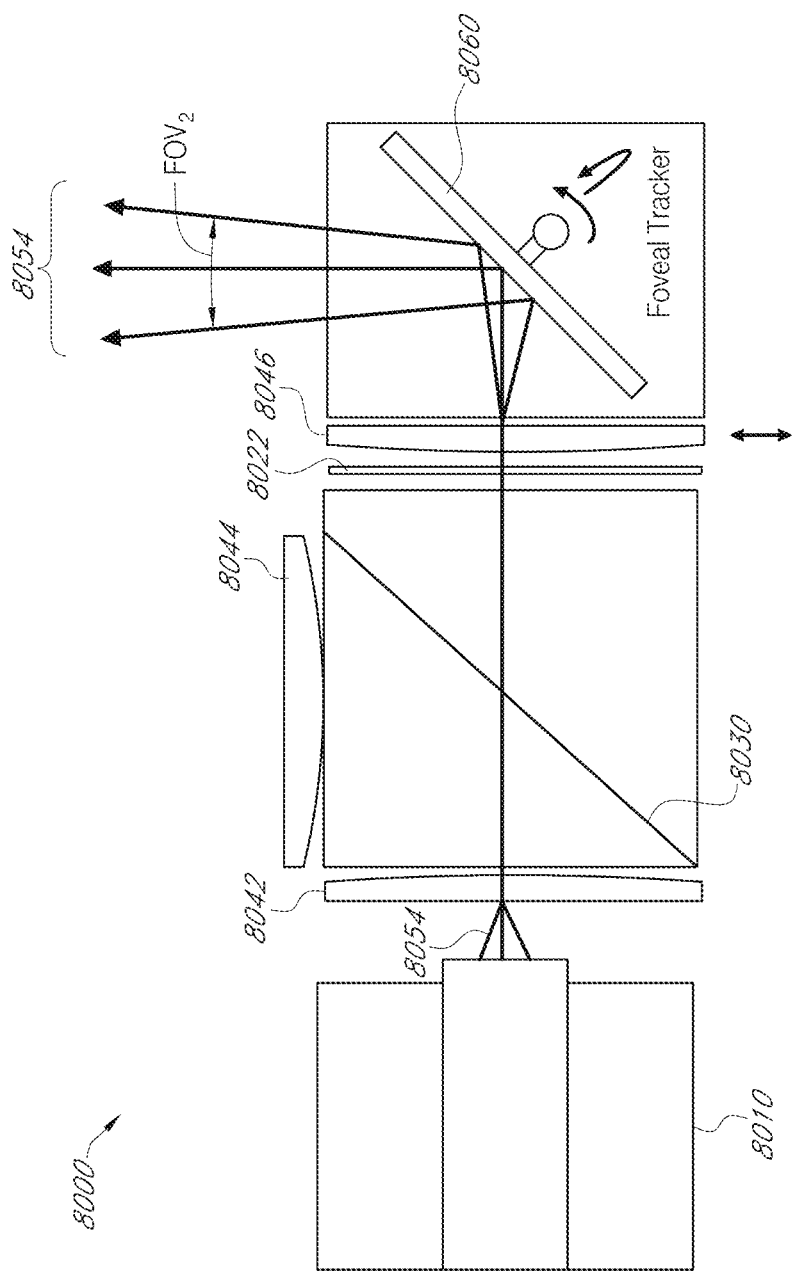

FIGS. 30A-30B illustrate schematically a display system 8000 for projecting images to an eye of a user according to some embodiments. The display system 8000 includes an image source 8010. The image source 8010 can be configured to project a first light beam 8052 associated with a first image stream, as shown in FIG. 30A, and project a second light beam 8054 associated with a second image stream, as shown in FIG. 30B. It should be noted that, the first light beam 8052 and the second light beam 8054 are depicted in FIGS. 30A-30B as schematic light rays, which are not intended to represent accurate ray-traced rays. The first light beam 8052 can be angularly magnified to cover a wider FOV, resulting in a lower angular resolution image stream. The second light beam 8054 can have a narrower FOV with a higher angular resolution, as discussed above with reference to FIGS. 26A-26F and 28A-28D.

The image source 8010 may include a liquid crystal on silicon (LCoS or LCOS) display (can also be referred to as a spatial light modulator), a scanning fiber, or a scanning mirror according to various embodiments. For example, the image source 8010 may include a scanning device that scans an optical fiber in a predetermined pattern in response to control signals. The predetermined pattern can correspond to certain desired image shape, such as rectangle or circular shapes.

According to some embodiments, the first light beam 8052 associated with the first image stream and the second light beam 8054 associated with the second image stream can be multiplexed and output by the image source 8010 as composite light beams. For example, polarization-division multiplexing, time-division multiplexing, wavelength-division multiplexing, and the like, can be used for multiplexing the light beams associated with the first image stream and the light beams associated with the second image stream.

In embodiments where polarization-division multiplexing is used, the first light beam 8052 can be in a first polarization state, and the second light beam 8054 can be in a second polarization state different from the first polarization state. For example, the first polarization state can be a linear polarization oriented in a first direction, and the second polarization state can be a linear polarization oriented in a second direction orthogonal to the first direction. In some other embodiments, the first polarization state can be a left-handed circular polarization, and the second polarization state can be a right-handed circular polarization, or vice versa. The first light beam 8052 and the second light beam 8054 can be projected by the image source 8010 simultaneously or sequentially.

The display system 8000 can further include a polarization beam splitter (PBS) 8030 configured to de-multiplex the first light beam 8052 from the second light beam 8054 according to some embodiments. The polarization beam splitter 8030 can be configured to reflect the first light beam 8052 along a first optical path toward a viewing assembly as illustrated in FIG. 30A, and to transmit the second light beam 8054 along a second optical path as illustrated in FIG. 30B.

Alternatives to polarization beam splitter 8030 may also be used for de-multiplexing light beams. As an example, the beam splitters described herein, including but not limited to polarization beam splitter 8030 of FIGS. 30A and 30B, may be replaced or implemented with a switchable reflector, such as a liquid crystal switchable reflector. In embodiments with such a switchable reflector, all other aspects disclosed herein apply and may be similar, except that the polarization beam splitter is replaced by the switchable reflector. As an example, a switchable reflector, such as switchable reflector 50042 of FIG. 53A, may switch between a reflective state and a transparent state in response to control signals. By coordinating the switching of the switchable reflector, the switchable reflector may operate to de-multiplex light beams. As an example, the switchable reflector may be made reflective at times when a first light beam is incident on the switchable reflector and may be made transparent at times when a second light beam is incident on the switchable reflector, thus permitting de-multiplexing of the first and second light beams. In some embodiments, the switchable reflector may be positioned at an angle (e.g., a 45° angle) relative to the light beams 8052, 8054. As a result, in a transmissive state, one of the light beams 8052, 8054 is transmitted through the switchable reflector; and in a reflective state, the other one of the light beams 8054, 8052 is reflected such that it travels in a different direction away from the switchable reflector than the light beam that was transmitted through the reflector.

Referring to FIG. 30B, the display system 8000 can further include a scanning mirror 8060 positioned downstream from the polarization beam splitter 8030 along the second optical path. The scanning mirror 8060 is configured to reflect the second light beam 8054 toward the viewing assembly to be projected to the user's eye. According to some embodiments, the scanning mirror 8060 can be controlled based on the fixation position of the user's eye for dynamically projecting the second image stream. For example, the scanning mirror 8060 can be in electrical communication via control circuitry with an eye-gaze tracker that tracks the user's eye movement. The control circuitry can send a control signal to tilt and/or translate the scanning mirror 8060 based on the user's current fixation point, such that the second light beam 8054 project the second image stream to a region determined to cover the user's foveal vision. In some embodiments, the scanning mirror 8060 can be a microelectromechanical systems (MEMS) scanner with two degrees of freedom (i.e., capable of being scanned in two independent angles).

In some other embodiments, instead of using a scanning mirror 8060, the display system 8000 can use a fixed mirror. Controlling the position of the second image stream can be achieved by transversely displacing a third optical lens 8046 (see the description of the third optical lens 8046 below). For example, the third optical lens 8046 can be displaced up and down as indicated by the arrow, as well as in and out of the page, to shift the position of the second image stream in two dimensions.

In some embodiments, the display system 8000 can further include a polarization rotator 8022 positioned between the polarization beam splitter 8030 and the scanning mirror 8060. The polarization rotator 8022 can be configured to rotate the polarization of the second light beam

8054, so that the second light beam can have approximately the same polarization as that of the first light beam 8052 as they enter the viewing assembly. The polarization rotator 8022 can include, for example, a half-wave plate.

In some embodiments, the display system 8000 can further include a first relay lens assembly for the first optical path, and a second relay lens assembly for the second optical path. The first relay lens assembly can include a first optical lens 8042 disposed between the image source 8010 and the polarization beam splitter 8030, and a second optical lens 8044 disposed downstream from the polarization beam splitter 8030 along the first optical path. The second relay lens assembly can include the first optical lens 8042, and a third optical lens 8046 disposed downstream from the polarization beam splitter 8030 along the second optical path.

Figure 30C:
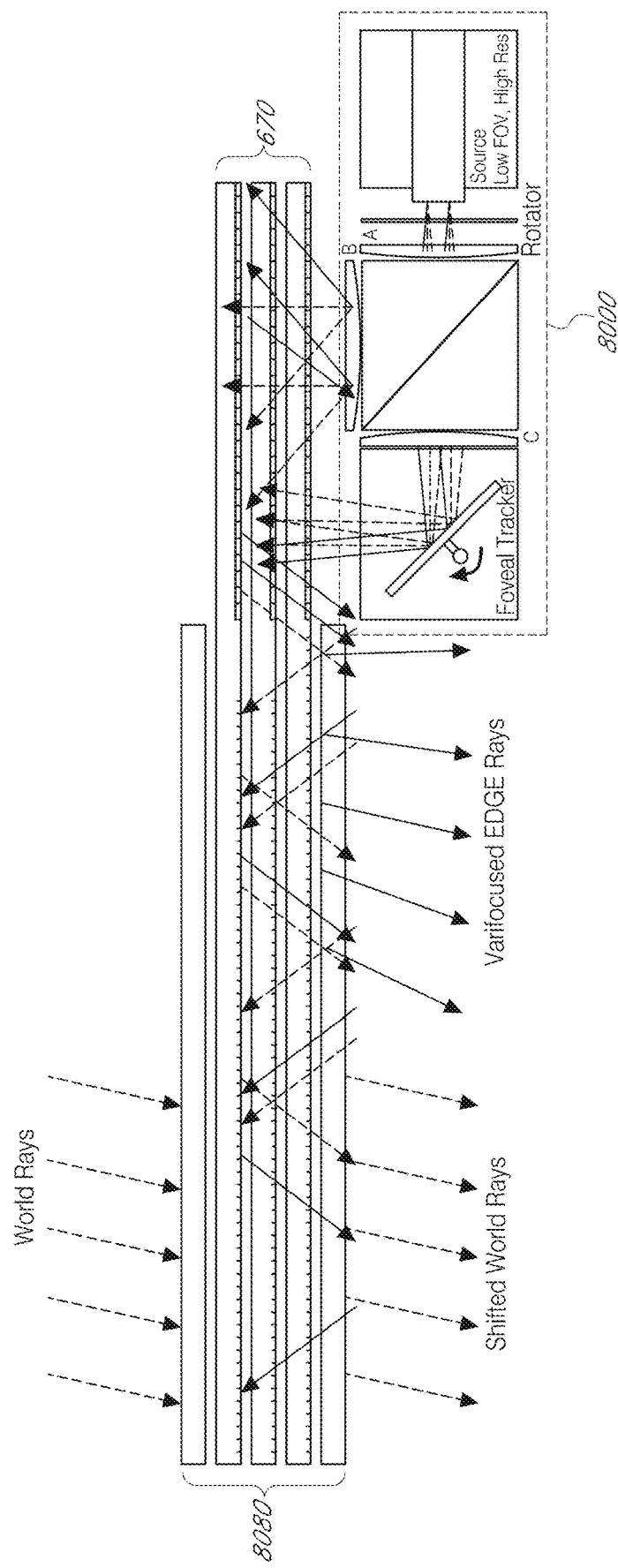
FIG. 30C illustrates schematically a cross-sectional view of an augmented reality (AR) system.

FIG. 30C illustrates schematically a cross-sectional view of an augmented reality (AR) system according to some embodiments. The AR system can be fitted into one of the displays 4052 in the wearable display device 4050 as shown in FIG. 25A according to some embodiments. The AR system can include a light projector 8000 for projecting a first light beam associated with a first image stream and a second light beam associated with a second image stream. The light projector 8000 can be similar to the display system illustrated in FIGS. 30A-30B. The AR system can further include one or more incoupling gratings (ICGs) 8070, and one or more eyepieces 8080. Each incoupling grating 8070 can be configured to couple the first light beam and the second light beam into a respective eyepiece 8080. Each eyepiece 8080 can include outcoupling gratings for outcoupling the first light beam and the second light beam into a user's eye. The incoupling gratings 8070 and the eyepieces 8080 may be referred herein as a "viewing assembly."

Figure 30D:
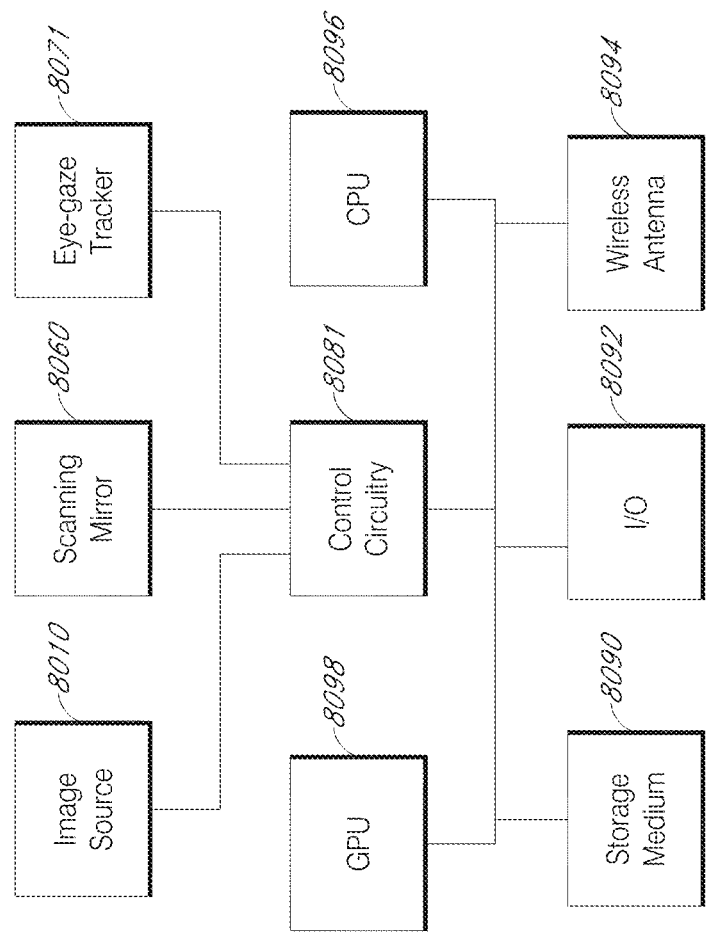
FIG. 30D shows a simplified block diagram of a display system.

FIG. 30D shows a simplified block diagram of a display system according to some embodiments. The display system can include an image source 8010, and a scanning mirror 8060, substantially as described above with reference to FIGS. 30A-30C. The display system can also include an eye-gaze tracker 8071 and control circuitry 8081. The control circuitry 8081 can be communicatively coupled to the image source 8010, the scanning mirror 8060, and the eye-gaze tracker 8071. The control circuitry 8081 can send control signals to tilt and/or translate the scanning mirror 8060 based on the user's current fixation point as determined by the eye-gaze tracker 8071, so that the second light beam 8054 project the second image stream to a region determined to cover the user's foveal vision. The control circuitry 8081 can also send control signals to the image source 8010, so that appropriate image content is presented in the first image stream and the second image stream, as discussed above. The display system can also include a central processing unit (CPU) 8096, a graphics processing unit (GPU) 8098, a storage medium 8090 for storing computer-readable instructions, databases, and other information usable by the control circuitry 8081, the CPU 8096, and the GPU 8098. The display system can further include input-output (I/O) interfaces 8092, such as buttons, that a user may use for interaction with the display system. The display system can also include a wireless antenna 8094 for wireless communication with another part of the display system, or with the Internet. The display system can also include other sensors, such as cameras.

Figure 31A:
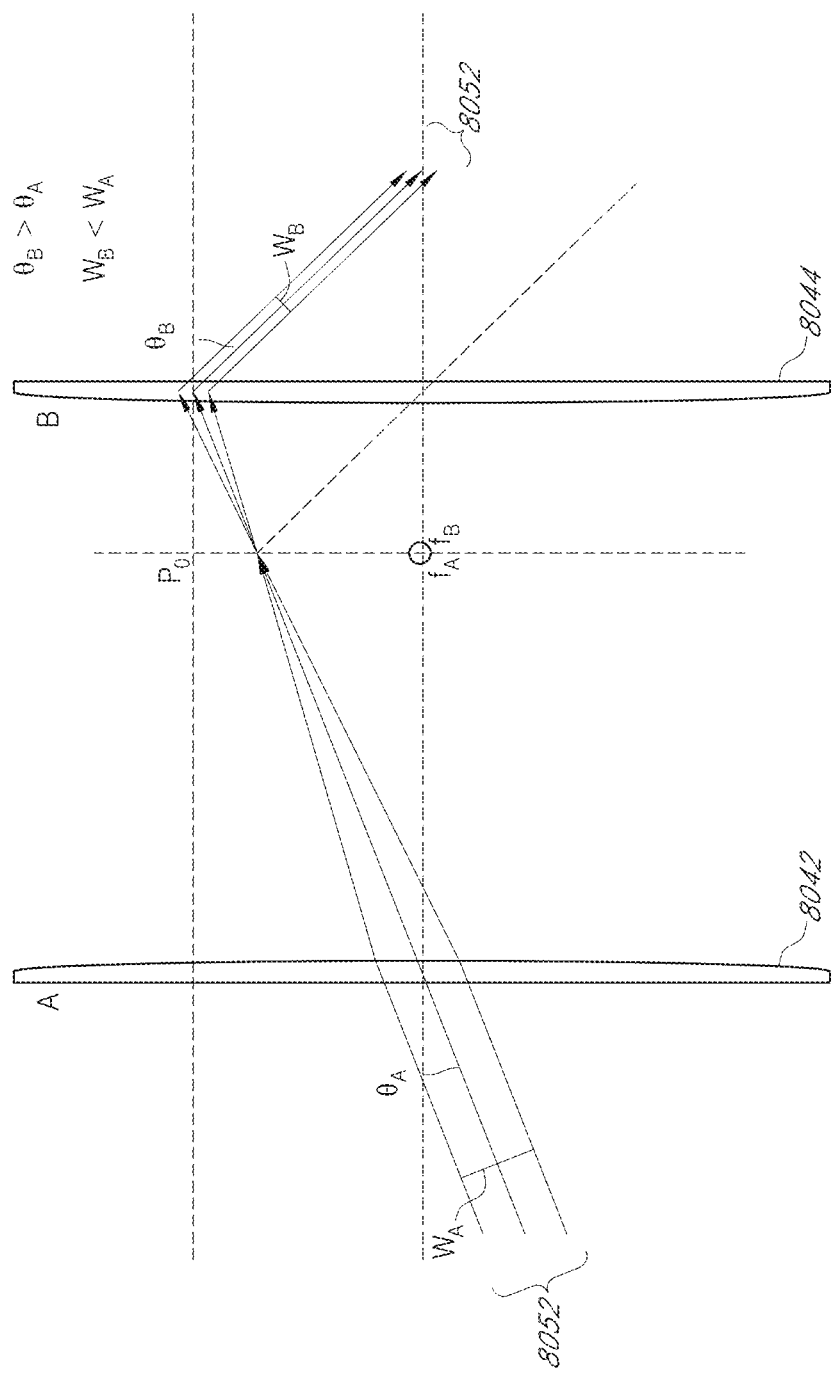
FIG. 31A illustrates schematically the operating principles of a first relay lens assembly in the display system illustrated in FIGS. 30A-30B.

FIG. 31A illustrates schematically the operating principles of the first relay lens assembly according to some embodiments. The first relay lens assembly can operate in a manner similar to a telescope. A collimated first light beam 8052 associated with the first image stream is incident on the first optical lens 8042 at an angle of incidence $\theta_A$, and is focused by the first optical lens 8042 to a real image point $P_0$ located approximately at a focal plane of the first optical lens 8042. The real image point $P_0$ is also located approximately at a focal plane of the second optical lens 8044. Thus, the first light beam 8052 emitted from the real image point $P_0$ is collimated by the second optical lens 80044 and exits from the second optical lens 8044 at an angle of transmittance $\theta_B$.

The ratio of $\theta_B$ and $\theta_A$ can give rise to a first angular magnification $M_1$, where $$M_1 = \frac{\theta_B}{\theta_A}.$$

The magnitude of first angular magnification $M_1$ can be approximately equal to the ratio of the focal length of the first optical lens 8042 $f_A$ and the focal length of the second optical lens 8044 $f_B$. Thus $$M_1 \approx \frac{f_A}{f_B}.$$

In some embodiments, the first relay lens assembly is configured such that the magnitude of the first angular magnification $M_1$ is greater than one, e.g., by having $f_A > f_B$. Therefore, referring again to FIG. 30A, the collimated first light beam 8052 associated with the first image stream can be angularly magnified by the first relay lens assembly as it exits the second optical lens 8044, which is then projected to a viewing assembly for presenting the first image stream with a first field of view $FOV_1$ that is relatively wide.

Figure 31B:
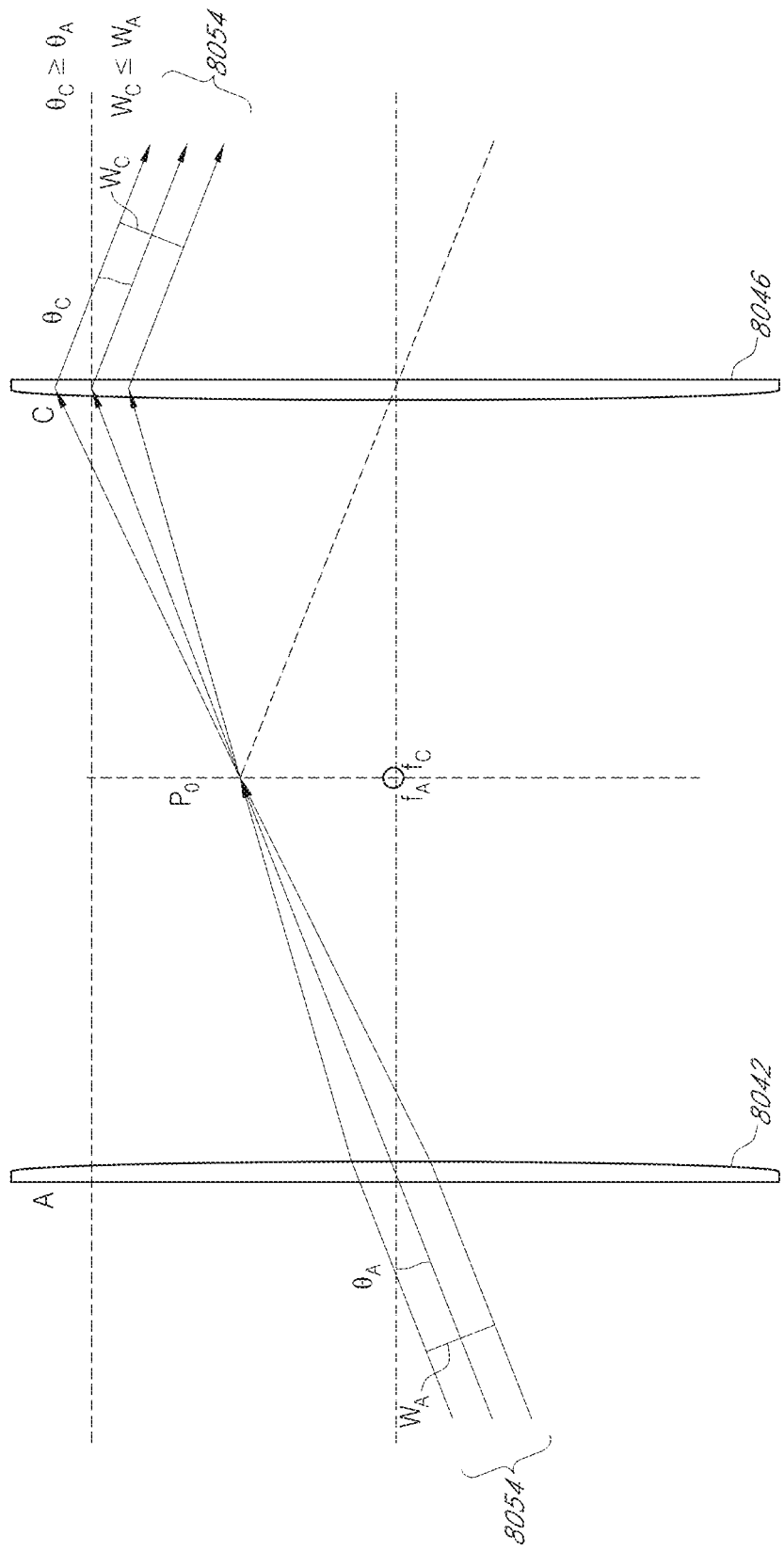
FIG. 31B illustrates schematically the operating principles of a second relay lens assembly in the display system illustrated in FIGS. 30A-30B.

FIG. 31B illustrates schematically the operating principles of the second relay lens assembly according to some embodiments. The second relay lens assembly can also operate in a similar manner as a telescope. A collimated second light beam 8054 associated with the second image stream is incident on the first optical lens 8042 at an angle of incidence $\theta_A$, and is focused by the first optical lens 8042 to a real image point $P_0$ located approximately at a focal plane of the first optical lens 8042. The real image point $P_0$ is also located approximately at a focal plane of the third optical lens 8046. Thus, the second light beam 8054 emitted from the real image point $P_0$ is collimated by the third optical lens 8046 and exits from the third optical lens 8046 at an angle of transmittance $\theta_C$.

The ratio of $\theta_C$ and $\theta_A$ can give rise to a second angular magnification $M_2$, where $$M_2 = \frac{\theta_C}{\theta_A}.$$

The magnitude of second angular magnification $M_2$ can be approximately equal to the ratio of the focal length of the first optical lens 8042 $f_A$ and the focal length of the third optical lens 644 $f_C$. Thus $$M_2 \approx \frac{f_A}{f_C}.$$

The second lens assembly can be configured such that the magnitude of the second angular magnification $M_2$ is less than the first angular magnification $M_1$. In some embodiments, the second angular magnification $M_2$ can have a value of unity (i.e., no magnification) or less than one (i.e., demagnification), e.g., by having $f_A \leq f_C$. Therefore, referring again to FIG. 30B, the collimated second light beam 8054 associated with the second image stream can have a second field of view $FOV_2$ as it exits the third optical lens 8046, the second field of view $FOV_2$ being less than the first field of view $FOV_1$ of the first light beam 8052 associated with the first image stream.

Note in FIG. 31A that the collimated first light beam 8052 has an initial beam width $w_A$ as it is incident on the first optical lens 8042, and a final beam width $w_B$ as it exits the second optical lens 8044, where the final beam width $w_C$ is narrower than the initial beam width $w_A$. Note also in FIG. 31B that the collimated second light beam 8054 has an initial beam width $w_A$ as it is incident on the first optical lens 8042, and a final beam width $w_C$ as it exits the third optical lens 8046, where the final bam width $w_C$ is about the same as the initial beam width $w_A$. In other words, the final beam width $w_C$ of the second light beam 8054 is wider than the final beam width $w_B$ of the first light beam 8052. A wider beam width would result in a sharper angular resolution perceived by the eye. This can be explained by Gaussian beam physics, where a collimated beam with a wider beam waist has lower angular divergence over propagation to infinity. Therefore, increasing the FOV can reduce the beam width, and hence can reduce the angular resolution, which is consistent with the Lagrange invariant.

In some embodiments, the first angular magnification $M_1$ can have a magnitude of about 3, and the second angular magnification $M_2$ can have a magnitude of about unity. Referring to FIGS. 30A-30B, assume that the collimated first light beam 8052 associated with the first image stream and the collimated second light beam 8054 associated with the second image stream have the same initial FOV of about 20 degrees as projected by the image source 8010. The collimated first light beam 8052 exiting the second optical lens 644 can have a first field of view $FOV_1$ of about 60 degrees, whereas the collimated second light beam 654 exiting the third optical lens 8046 can have a second field of view $FOV_2$ of about 20 degrees. In some embodiments, the first FOV can range from about 30 degrees to about 90 degrees; and the second FOV can range from about 10 degrees to about 30 degrees.

As illustrated in FIGS. 28C-28D, the second image stream 6020 can be a high resolution version of a portion of the first image stream 6010 and is overlaid on and properly aligned with respect to the wide FOV and low resolution first image stream 6010. The content of the second image stream 6020 changes as the second image stream shifts relative to the first image stream 6010, so that the content of the second image stream 6020 corresponds to the portion of the first image stream 6010 overlaid by the second image stream 6020. Because the second image stream 6020 persistently covers the user's foveal vision, the user can perceive the combination of the first image stream 6010 and the second image stream 6020 as a composite image stream that has both a wide FOV and a high resolution.

Figure 31C:
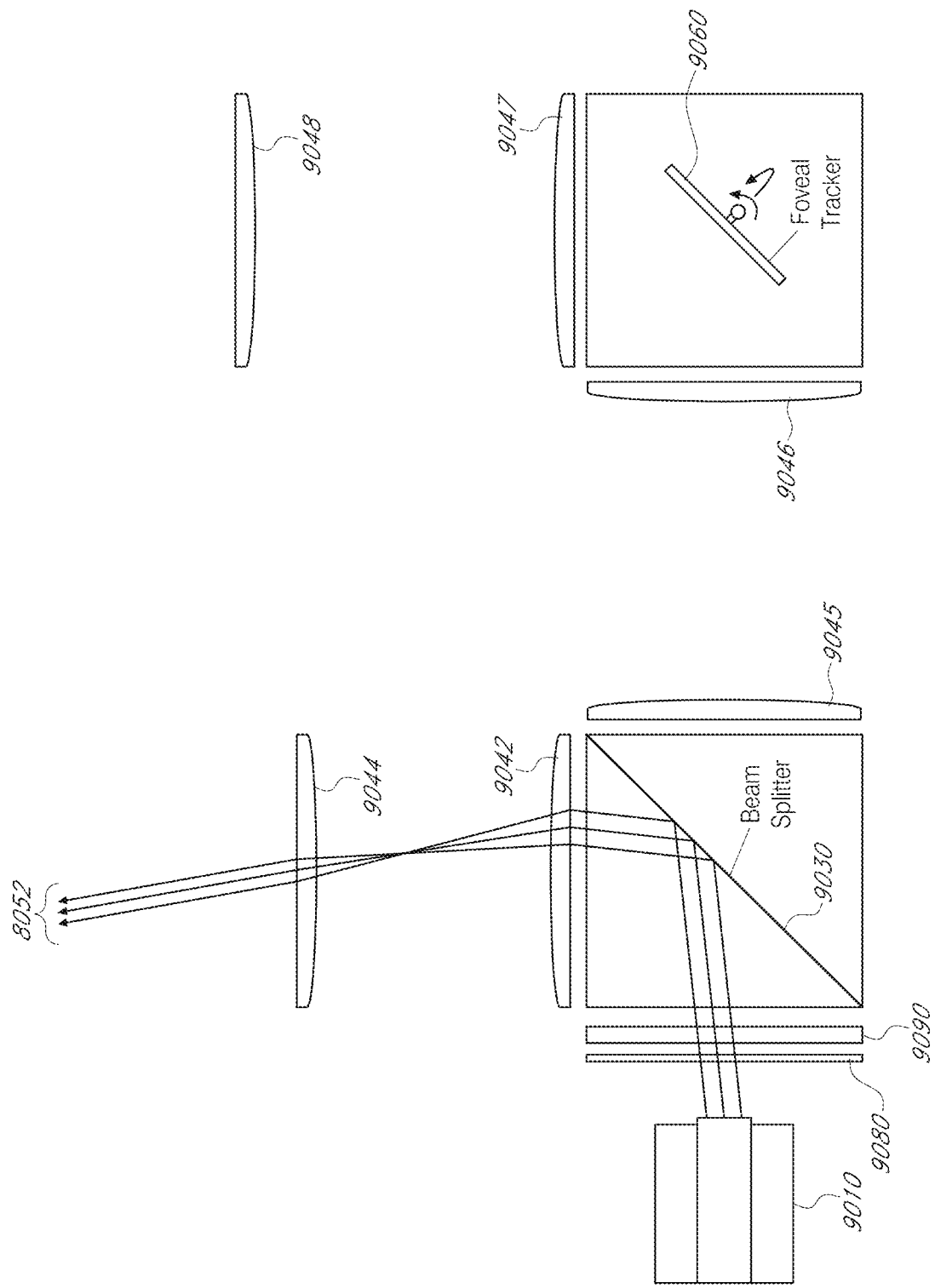
FIGS. 31C-31D illustrate schematically a display system.
Figure 31D:
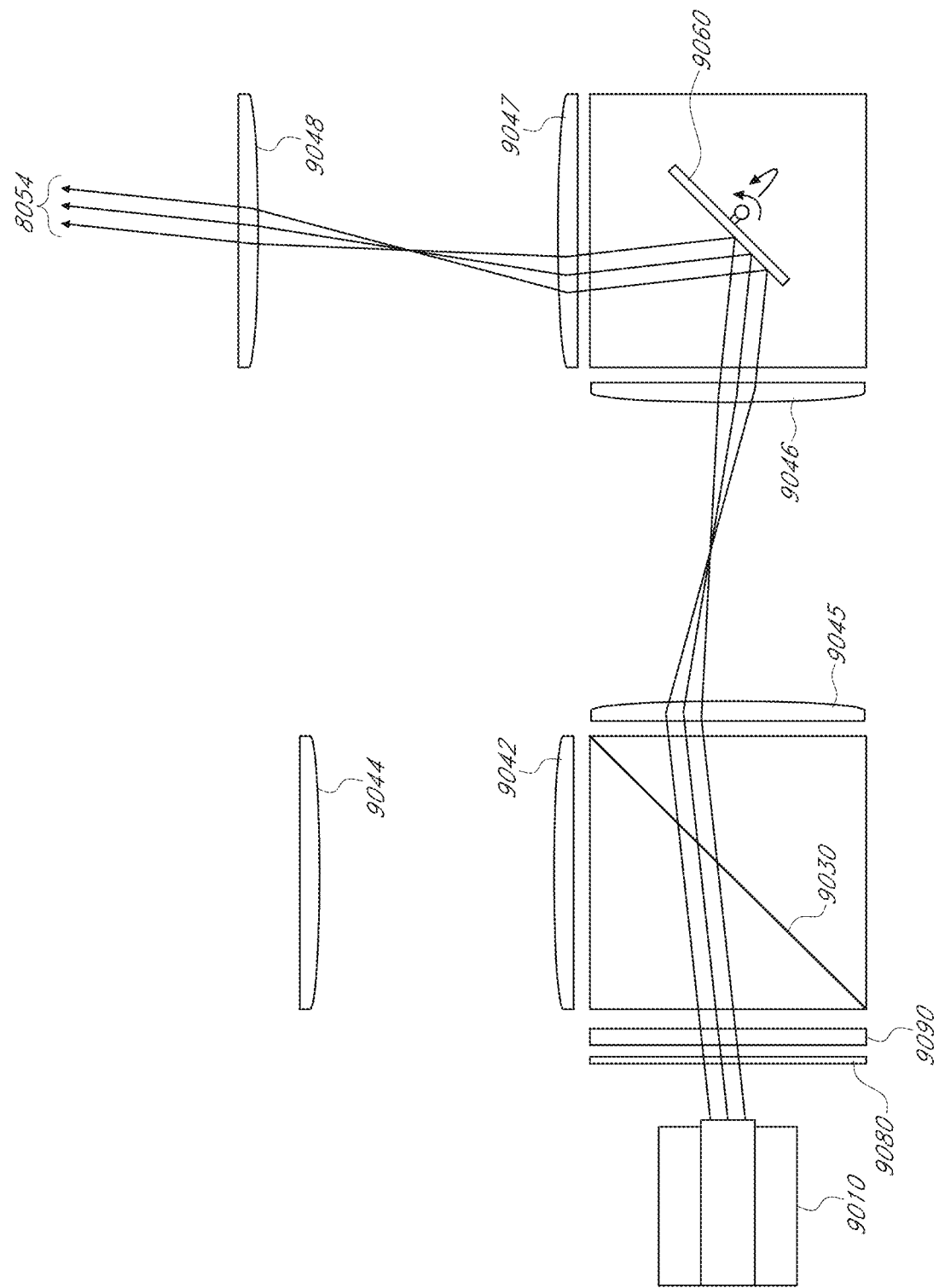

FIGS. 31C-31D illustrate schematically a display system 10000 according to some other embodiments. The display system 10000 includes an image source 9010 and a beam splitter 9030. The image source 9010 can provide a first light beam 8052 associated with a first image stream and a second light beam 8054 associated with a second image stream. The first light beam 8052 and the second light beam 8054 can be time-division multiplexed, polarization-division multiplexed, wavelength-division multiplexed, or the like. The beam splitter 9030 can serve as a de-multiplexer to separate the first light beam 8052 and the second light beam 8054 toward a first optical path and a second optical path, as depicted in FIGS. 31C and 31D, respectively.

The display system 10000 can also include a first optical lens 9042 and a second optical lens 9044 disposed downstream from the beam splitter 9030 along the first optical path. The combination of the first optical lens 9042 and the second optical lens 9044 can serve as a first relay lens assembly for the first light beam 8052. In some embodiments, the first relay lens assembly can provide an angular magnification for the first light beam 8052 that is greater than one, as described above in relation to FIG. 31A.

The display system 10000 can also include a third optical lens 9045 and a fourth optical lens 9046 disposed downstream from the beam splitter 9030 along the second optical path. The combination of the third optical lens 9045 and the fourth optical lens 9046 can serve as a second relay lens assembly for the second light beam 8054. In some embodiments, the second relay lens assembly can provide an angular magnification for the second light beam 8054 that is substantially unity or less than one, as described above in relation to FIG. 31B.

The display system 10000 can also include a scanning mirror 9060 positioned downstream from the second relay lens assembly along the second optical path. The scanning mirror 9060 is configured to reflect the second light beam 8054 toward a viewing assembly to be projected to the user's eye. According to some embodiments, the scanning mirror 9060 can be controlled based on the fixation position of the user's eye for dynamically projecting the second image stream.

The display system 10000 can also include a fifth optical lens 9047 and a sixth optical lens 9048 disposed downstream from scanning mirror 9060 along the second optical path. The combination of the fifth optical lens 9047 and the sixth optical lens 9048 can serve as a third relay lens assembly for the second light beam 8054. In some embodiments, the third relay lens assembly can provide an angular magnification for the second light beam 8054 that is substantially unity or less than one, as described above in relation to FIG. 31B.

In some embodiments, the display system 10000 can also include a polarizer 9080 and a switching polarization rotator 9090. The image source 9010 can provide an unpolarized first light beam 8052 and an unpolarized second light beam 8054, which are time-division multiplexed. The first light beam 652 and the second light beam 654 may become polarized after passing through the polarizer 9080. The switching polarization rotator 9090 can be operated in synchronization with the time-division multiplexing of the first light beam 8052 and the second light beam 8054. For example, the switching polarization rotator 9090 can be operated such that the polarization of the first light beam 8052 is unchanged after passing through the switching rotator 9090, whereas the polarization of the second light beam 8054 is rotated by 90 degrees after passing through the switching polarization rotator 9090, or vice versa. Therefore, the first light beam 8052 can be reflected by the polarization beam splitter 9030 along the first optical path as illustrated in FIG. 31C, and the second light beam 8054 can be transmitted by the polarization beam splitter 9030 along the second optical path, as illustrated in FIG. 31D.

Figure 32A:
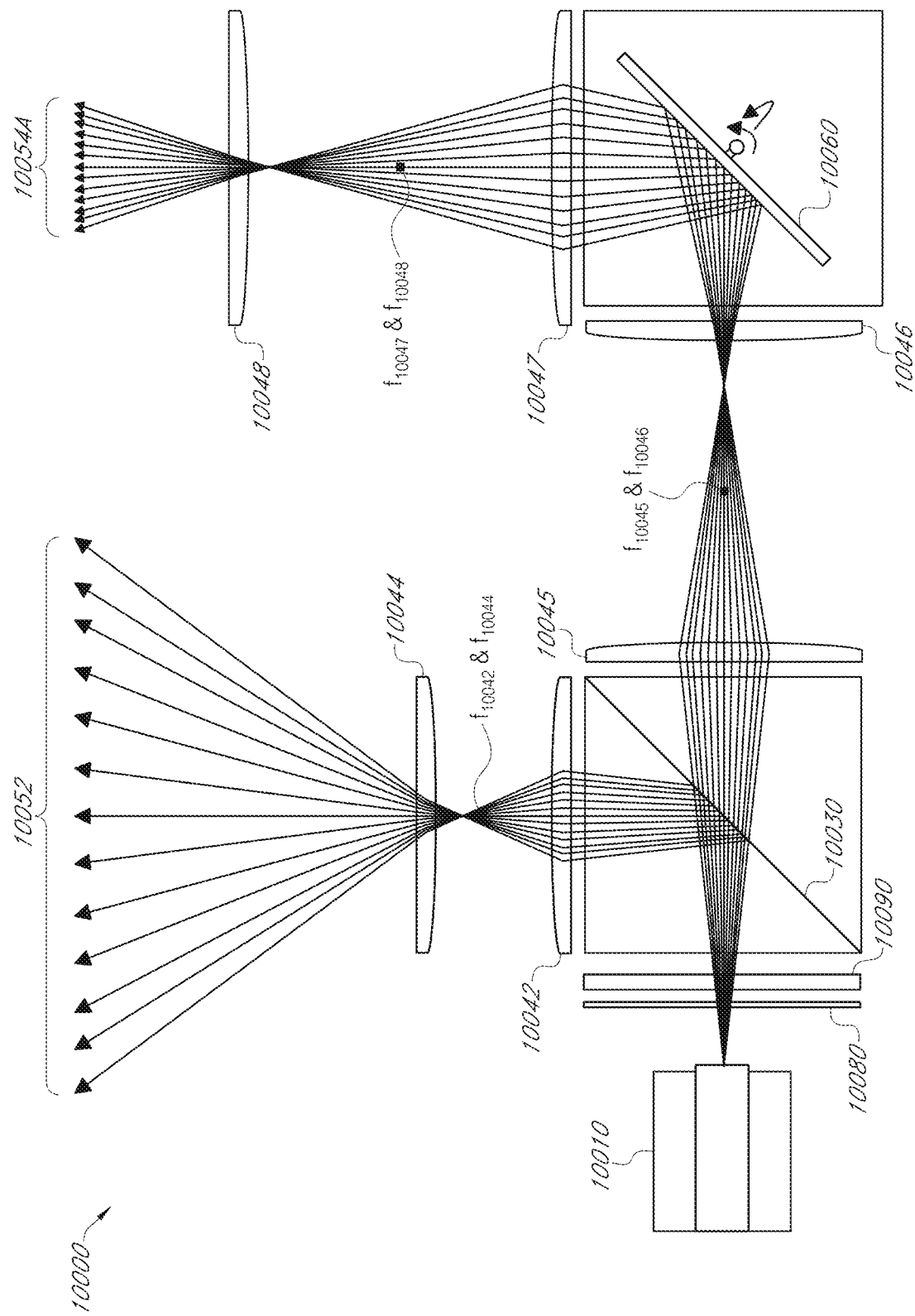
FIGS. 32A-32C illustrate schematically a display system.
Figure 32B:
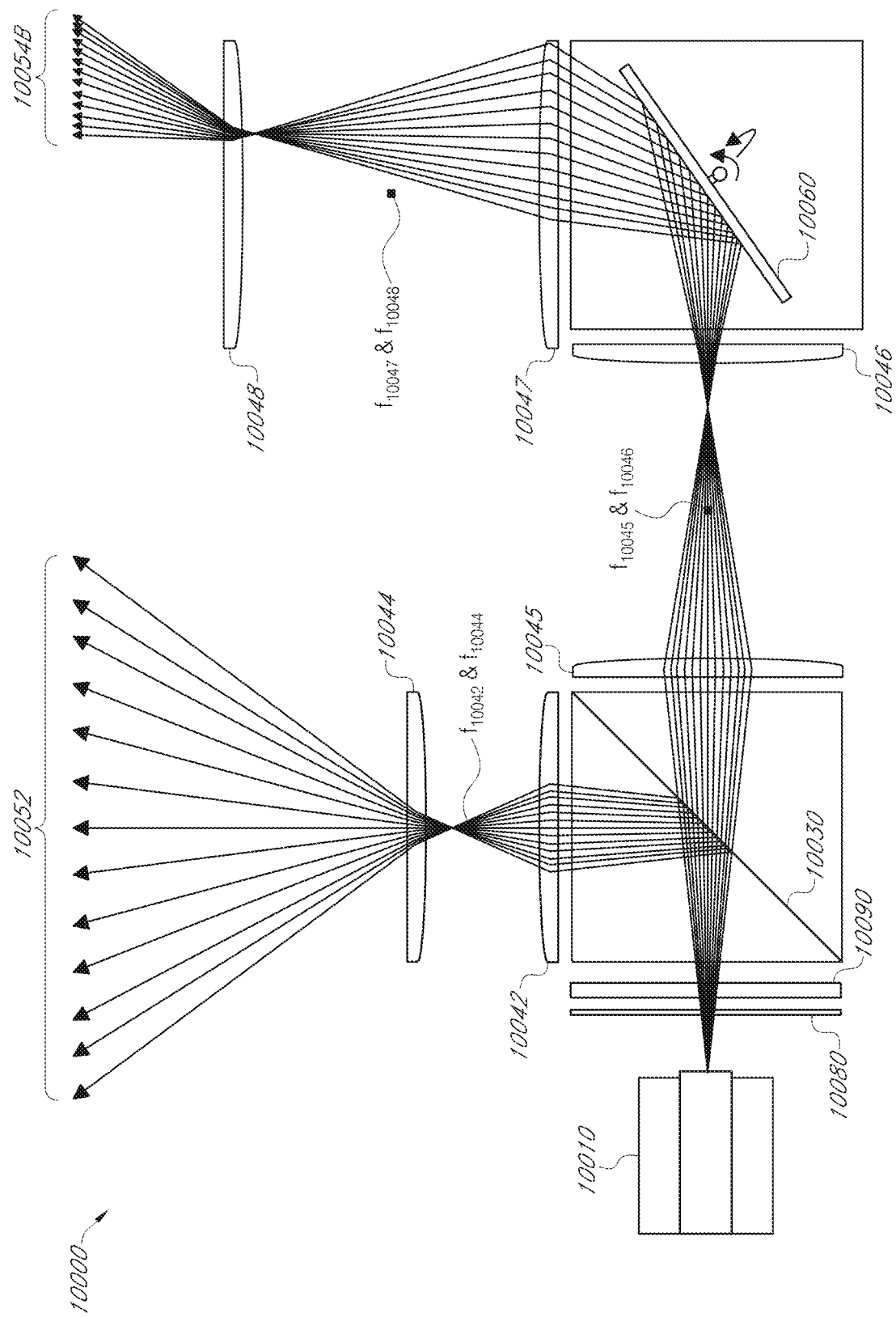
Figure 32C:
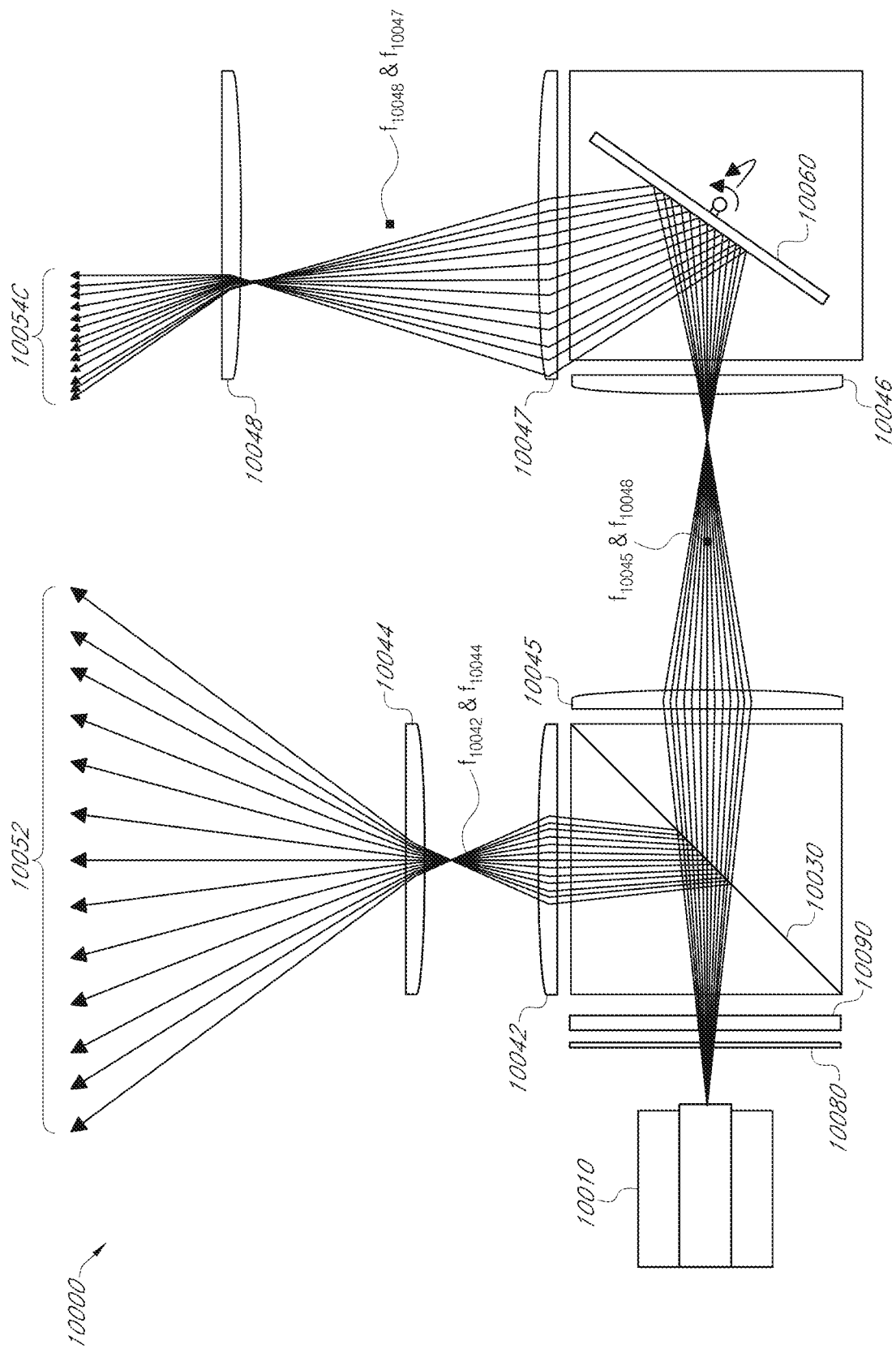

FIGS. 32A-32C illustrate schematically a display system 10000 according to some other embodiments. In some examples, one or more components of display system 10000 may be the same as or similar to one or more components of the display system as described above with reference to FIGS. 31C-31D. The display system 10000 includes an image source 10010, a beam splitter 10030, a first optical lens 10042, a second optical lens 10044, a third optical lens 10045, a fourth optical lens 10046, a fifth optical lens 10047, a sixth optical lens 10048, a scanning mirror 10060, a polarizer 10080, a switching polarization rotator 10090 that, in some examples, may be the same as or similar to elements 9010, 9030, 9042, 9044, 9045, 9046, 9047, 9048, 9060, 9080, and 9090, respectively, of the display system as described above with reference to FIGS. 31C-31D.

More specifically, FIGS. 32A-32C illustrate a display system 10000 in each of three different stages. In each of the three stages, the image source 10010 can output a range of angular light field components representative of virtual content as would be captured from the perspective of a head-tracked virtual camera and a range of angular light field components representative of virtual content as would be captured from the perspective of a fovea-tracked virtual camera. The two sets of angular light field components may, for instance, be time-division multiplexed, polarization-division multiplexed, wavelength-division multiplexed, or the like. As such, the angular light field components associated with the head-tracked virtual camera can be diverted upward by the polarization beam splitter 10030 along a first optical path through the first and second optical lenses 10042 and 10044, and the angular light field components associated with the fovea-tracked virtual camera can pass through the polarization beam splitter 10030 along a second optical path through third and fourth optical lenses 10045 and 10046 toward the scanning mirror 10060 and reflected upward through fifth and sixth optical lenses 10047 and 10048.

The virtual content represented by the angular light field components associated with the head-tracked virtual camera may be rendered upstream from the image source 10010 at a relatively low resolution, while the virtual content represented by the angular light field components associated with the fovea-tracked virtual camera may be rendered upstream from the image source 10010 at a relatively high resolution. And, as shown in FIGS. 32A-32C, the display system 10000 may be configured to output the angular light field components associated with the head-tracked render perspective and the angular light field components associated with the fovea-tracked render perspective as high FOV and low FOV light fields, respectively. In each of FIGS. 32A-32C, the light field components that propagate along the first optical path are output by the display system 10000 as a relatively wide cone of light 10052.

In the stage depicted in FIG. 32A, the scanning mirror 10060 is in a first position. As such, it can be seen that the light field components that pass through the polarization beam splitter 10030 and propagate along the second optical path are output by the display system 10000 as a relatively narrow cone of light 10054A spanning a substantially central region of angular space. Within the context of the examples described above with reference to FIGS. 28A-28B, the display system 10000 could, for instance, place the scanning mirror 10060 in the first position shown in FIG. 32A when the user's eye is oriented in a manner similar to that of the viewer's eye 210 in FIG. 28A. In this way, the light components 10054A may represent virtual content in a relatively centralized region of render space, such as virtual object 6012. Further to the examples of FIGS. 28A-28B, the relatively wide cone of light 10052 may, for instance, include virtual content in off-centered regions of render space, such as virtual objects 6011 and 6013. In some examples, the relatively wide cone of light 10052 may further include light components that represent the same virtual content as is represented by the light components 10054A, but in lower resolution.

In the stage depicted in FIG. 32B, the scanning mirror 10060 is in a second position different from the first position. As such, it can be seen that the light field components that pass through the polarization beam splitter 10030 and propagate along the second optical path are output by the display system 10000 as a relatively narrow cone of light 10054B spanning one substantially off-centered region of angular space. Within the context of the examples described above with reference to FIGS. 28A-28B, the display system 10000 could, for instance, place the scanning mirror 10060 in the second position shown in FIG. 32B when the user's eye is oriented in a manner similar to that of the viewer's eye 210 while the viewer is looking at virtual object 6011. In this way, the light components 10054B may represent virtual content in one relatively off-centered region of render space, such as virtual object 6011. Further to the examples of FIGS. 28A-28B, the relatively wide cone of light 10052 may, for instance, include virtual content in the other off-centered region of render space, such as virtual object 6013, as well as virtual content in the centralized region of render space, such as virtual object 6012. In some examples, the relatively wide cone of light 10052 may further include light components that represent the same virtual content as is represented by the light components 10054B, but in lower resolution.

In the stage depicted in FIG. 32C, the scanning mirror 10060 is in a third position different from the first and second positions. As such, it can be seen that the light field components that pass through the polarization beam splitter 10030 and propagate along the second optical path are output by the display system 10000 as a relatively narrow cone of light 10054C spanning another, different substantially off-centered region of angular space. Within the context of the examples described above with reference to FIGS. 28A-28B, the display system 10000 could, for instance, place the scanning mirror 10060 in the second position shown in FIG. 32C when the user's eye is oriented in a manner similar to that of the viewer's eye 210 in FIG. 28B. In this way, the light components 10054C may represent virtual content in the other relatively off-centered region of render space, such as virtual object 6013. Further to the examples of FIGS. 28A-28B, the relatively wide cone of light 10052 may, for instance, include virtual content in the off-centered region of render space described above with reference to FIG. 32B, such as virtual object 6011, as well as virtual content in the centralized region of render space, such as virtual object 6012. In some examples, the relatively wide cone of light 10052 may further include light components that represent the same virtual content as is represented by the light components 10054C, but in lower resolution.

Figure 33A:
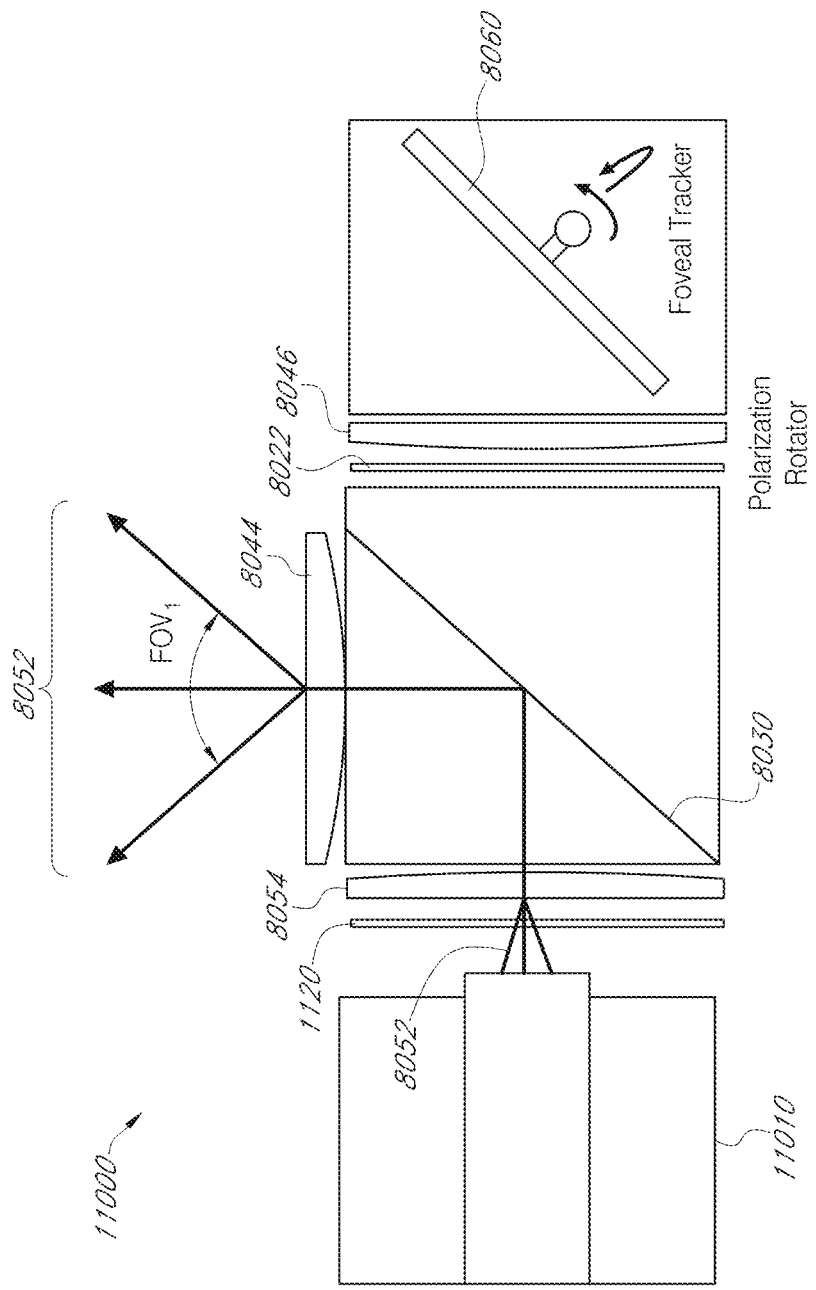
FIGS. 33A-33B illustrate schematically a display system.
Figure 33B:
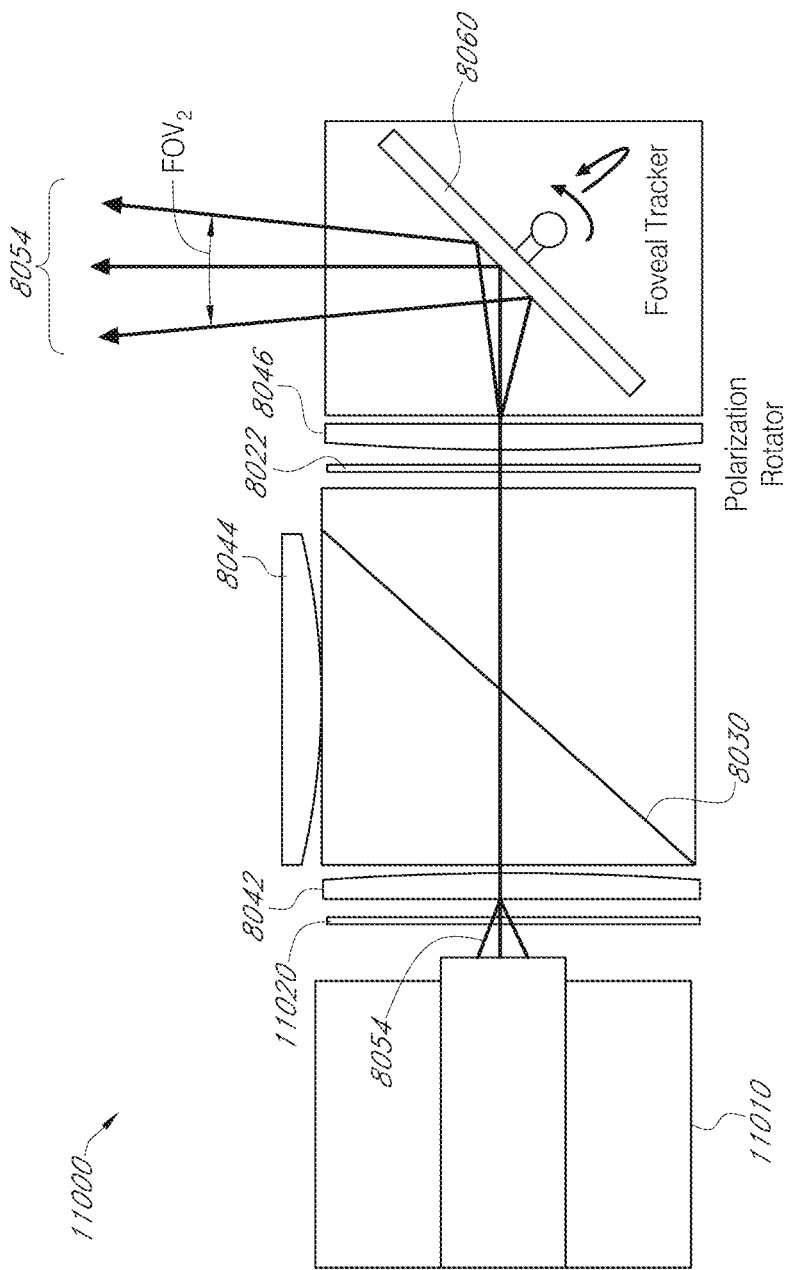

FIGS. 33A-33B illustrate schematically a display system 11000 for presenting a first image stream and second image stream, where time-division multiplexing is used for multiplexing the first light beam 8052 associated with the first image stream and the second light beam 8054 associated with the second image stream, according to some embodiments. The display system 11000 is similar to the display system 8000. The image source 11010 can be configured to provide time-division multiplexed first light beam 8052 and second light beam 8054. The first light beam 8052 and the second light beam 8054 can be in the same polarization state as output from the image source 8010. It should be noted that the first light beam 8052 and the second light beam 8054 are depicted in FIGS. 33A-33B as schematic light rays, which are not intended to represent accurate ray-traced rays.

The display system 11000 can further include a switching polarization rotator 11020, whose operation can be synchronized with the time-division multiplexing of the first light beam 8052 and the second light beam 8054. For example, the switching polarization rotator 11020 can be operated such that the polarization of the first light beam 8052 is unchanged after passing through the switching rotator 11020, whereas the polarization of the second light beam 8054 is rotated by 90 degrees after passing through the switching polarization rotator 11020, or vice versa. Therefore, the first light beam 8052 can be reflected by the polarization beam splitter 8030 along the first optical path as illustrated in FIG. 33A, and the second light beam 8054 can be transmitted by the polarization beam splitter 8030 along the second optical path, as illustrated in FIG. 33B.

In some other embodiments, the switching polarization rotator 11020 can be part of the image source 11010. In such cases, the first light beam 8052 and second light beam 8054 would be emitted sequentially and the first light beam 8052 projected from the image source 8010 would be polarized in a first direction, and the second light beam 8054 projected from the image source 8010 would be polarized in a second direction.

According to some embodiments, in cases where the first light beam 8052 associated with the first image stream and the second light beam 8054 associated with the second image stream are time-division multiplexed, a switchable mirror can be used in place of the polarization beam splitter 8030 shown in FIGS. 30A-30B, 31C-31D, and 33A-33B. The switching of the switchable mirror can be synchronized with the time-division multiplexing of the first light beam 8052 and the second light beam 8054. For example, the switchable mirror can be switched to a first state for the first light beam 8052 so that it operates as a mirror reflecting the first light beam 8052 along the first optical path as illustrated in FIGS. 30A, 31C, and 33A, and be switched to a second state for the second light beam 8054 so that it operates as a transparent optical element transmitting the second light beam 8054 along the second optical path as illustrated in FIGS. 30B, 31D, and 33B.

According to some embodiments, wavelength-division multiplexing can be used for multiplexing the first light beam associated with the first image stream and the second light beam associated with the second image stream. For example, the first light beam can be composed of light in a first set of wavelength ranges in red, green, and blue, and the second light beam can be composed of light in a second set of wavelength ranges in red, green, and blue light. The two sets of wavelength ranges can be shifted with respect to each other, but the composite of the second set of wavelength ranges produces a white light that is substantially the same as the white light produced by the composite of the first set of wavelength ranges.

In cases where wavelength-division multiplexing is used, a display system can include a dichroic beam splitter that takes the place of the polarization beam splitter to separate the first light beam associated with the first image stream and the second light beam associated with the second image stream. For example, the dichroic beam splitter can be configured to have a high reflectance value and a low transmittance value for the first set of wavelength ranges, and a low reflectance value and a high transmittance value for the second set of wavelength ranges. In some embodiments, the first light beam and the second light beam can be projected concurrently without the need for a switchable polarization rotator.

Figure 34A:
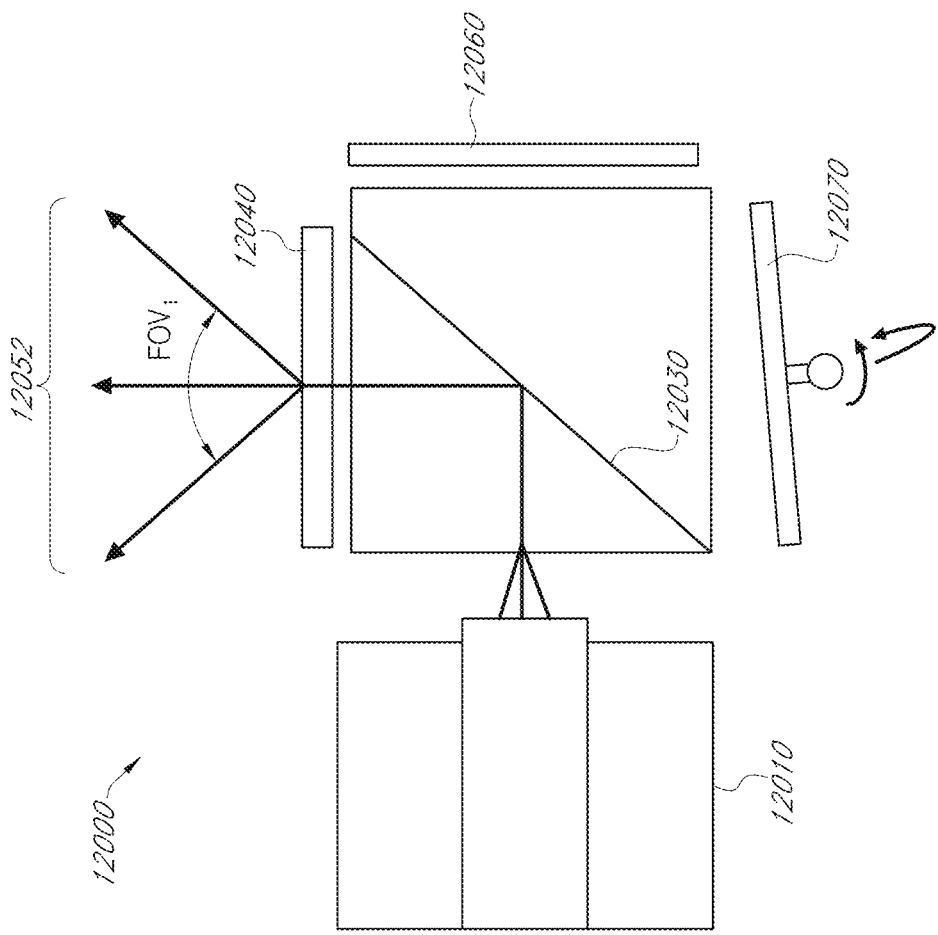
FIGS. 34A-34B illustrate schematically a display system.
Figure 34B:
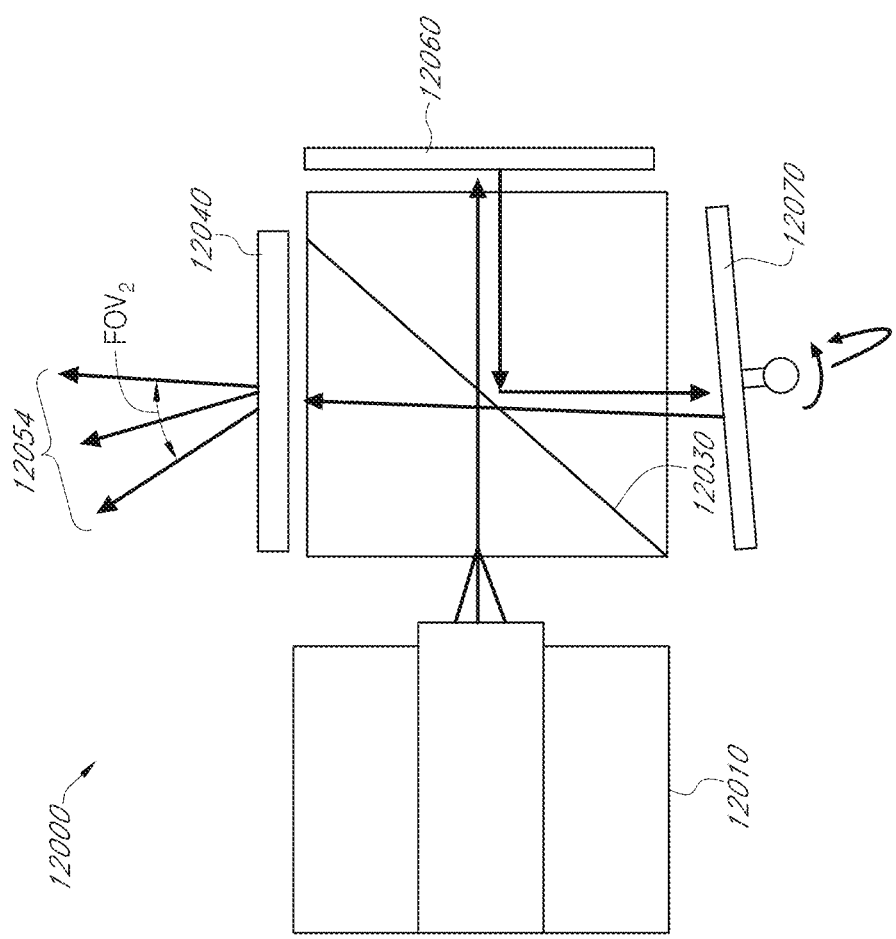

FIGS. 34A-34B illustrate schematically a display system 12000 according to some other embodiments. The display system 12000 includes an image source 12010. The image source 12010 can be configured to project first light beam 12052 associated with a first image stream as illustrated in FIG. 34A, and second light beam 12054 associated with a second image stream as illustrated in FIG. 34B. The first image stream can be a wide FOV and low resolution image stream, and the second image stream can be a narrow FOV and high resolution image stream, as discussed above with reference to FIGS. 26E-26F. The first light beam 12052 and the second light beam 12054 can be multiplexed using, for example, polarization-division multiplexing, time-division multiplexing, wavelength-division multiplexing, and the like. In FIGS. 34A-34B, the first light beam 12052 and the second light beam 12054 are depicted as schematic light rays, which are not intended to represent accurate ray-traced rays.

The display system 12000 can further include a beam splitter 12030 configured to de-multiplex the first light beam 12052 and the second light beam 12054 according to some embodiments. For example, the beam splitter 12030 can be a polarization beam splitter (PBS) or a dichroic beam splitter. The beam splitter 12030 can be configured to reflect the first light beam 12052 along a first optical path as illustrated in FIG. 34A, and to transmit the second light beam 12054 along a second optical path as illustrated in FIG. 34B.

The display system 12000 can further include a switchable optical element 12040. Although the switchable optical element 12040 is illustrated as a single element, it can include a pair of sub switchable optical elements that functions as a switchable relay lens assembly. Each sub switchable optical element can be switched to a first state such that it operates as an optical lens with a first optical power, or be switched to a second state such that it operates as an optical lens with a second optical power different than the first optical power. As such, the switchable optical element 12040 can provide a first angular magnification when the sub switchable optical elements are switched to the first state, as illustrated in FIG. 34A, and a second angular magnification different from the first angular magnification when the sub switchable optical elements are switched to the first state, as illustrated in FIG. 34B.

Each sub switchable optical element can take many forms, including e.g., liquid crystal varifocal lenses, tunable diffractive lenses, or deformable lenses. In general, any lens that could be configured to change shape or configuration to adjust its optical power could be applied. In some embodiments, each sub switchable optical element can be a multi-focal birefringent lens that has a first optical power for a light with a first polarization and a second optical power substantially different from the first optical power for light with a second polarization. For example, a multifocal birefringent lenses can comprise a polymer that has been made birefringent by an orienting process by stretching the polymer under defined conditions, such that the polymer exhibits an ordinary refractive index no and an extraordinary refractive index $n_e$.

In cases where the first light beam 12052 and the second light beam 12054 are time-division multiplexed, the switching of the switchable optical element 12040 can be synchronized with the time-division multiplexing of the first light beam 12052 and the second light beam 12054, so that each sub switchable optical element operates as an optical lens with the first optical power for the first light beam 12052 as illustrated in FIG. 34A, and operates as an optical lens with the second optical power for the second light beam 12054 as illustrated in FIG. 34B. Therefore, the first light beam 12052 associated with the first image stream can be angularly magnified by the switchable optical element 12040 as they exit the switchable optical element 12040, and can be subsequently projected to a viewing assembly for presenting the first image stream with a first field of view FOV, that is relatively wide.

The display system 12000 can further include a first mirror 12060 positioned downstream from the beam splitter 12030 along the second optical path as illustrated in FIG. 34B. The first mirror 12060 can reflect the second light beam 12054 back toward the beam splitter 12030, which can be subsequently reflect by the beam splitter 12030 towards a second mirror 12070.

The second mirror 12070 is positioned below the beam splitter 12030 as illustrated in FIG. 34B. The second mirror 12070 can reflect the second light beam 12054 back toward the beam splitter 12030, which can be subsequently transmitted by the beam splitter 12030 toward the switchable optical element 12040. As described above, each sub switchable optical element can be switched to the second state so that it can operate as an optical lens with the second optical power for the second light beam 12054. The second optical power can be less than the first optical power associated with the first state, or be substantially zero or negative. Therefore, the second light beam 12054 can be angularly magnified by an amount less than the first light beam 12052, or be not magnified or be demagnified as they exit the switchable optical element 12040. Thus, the second light beam 12054 can be subsequently projected to the viewing assembly for presenting the second image stream with a second field of view $FOV_2$ that is relatively narrow.

In some embodiments, the second mirror 12070 can be configured as a two-dimensional (2D) scanning mirror (i.e., a scanning mirror with two degrees of rotational freedom), such as a 2D MEMS scanner, that can be tilted in two directions as illustrated in FIG. 34B. The tilting of the second mirror 12070 can be controlled based on the fixation position of the user's eye, such that the second light beam 12054 can project the second image stream at the user's foveal vision. In some other embodiments, the second mirror 12070 can be a fixed mirror, and the first mirror 12060 can be a 2D scanning mirror. In some further embodiments, the first mirror can be a one-dimensional (1D) scanning mirror (i.e., a scanning mirror with one degree of rotational freedom) that can be tilted in a first direction, and the second mirror can be a 1D scanning mirror that can be tilted in a second direction.

Figure 35:
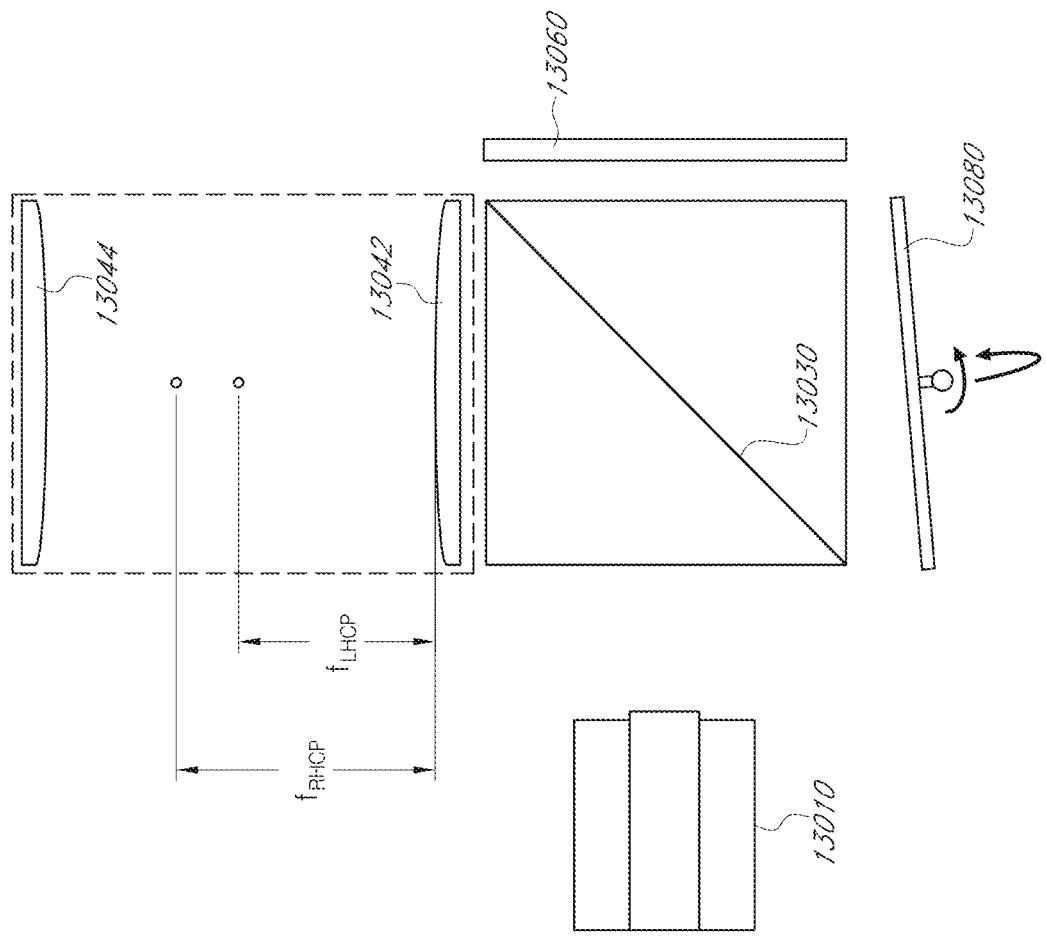
FIG. 35 illustrates schematically a display system.

FIG. 35 illustrates schematically a display system 13000 according to some other embodiments. The display system 13000 includes an image source 13010. The image source 13010 can be configured to provide a first light beam associated with a first image stream in right-handed circular polarization (RHCP) and a second light beam associated with a second image stream in left-handed circular polarization (LHCP) (or vice versa).

The display system 13000 can further include a beam splitter 13030 configured to de-multiplex the first light beam and the second light beam. For example, the beam splitter 13030 can comprise a liquid crystal material that reflects the right-handed circularly polarized first light beam and transmits the left-handed circularly polarized second light beam.

The display system 13000 can further include a first switchable optical element 13042 and a second switchable optical element 13044, the combination of which can serve as a relay lens assembly. Each of the first switchable optical element 13042 and the second switchable optical element 13044 can comprise a liquid crystal material such that it has a first focal length $f_{RHCP}$ for right-handed circular polarized light and a second focal length $f_{LHCP}$ for left-handed circularly polarized light. Therefore, the combination of the first switchable optical element 13042 and the second switchable optical element 13044 can provide a first angular magnification to the first light beam, and a second angular magnification to the second light beam that is different from the first angular magnification. For example, the first angular magnification can be greater than one, and the second angular magnification can equal to unity or less than one.

Figure 36:
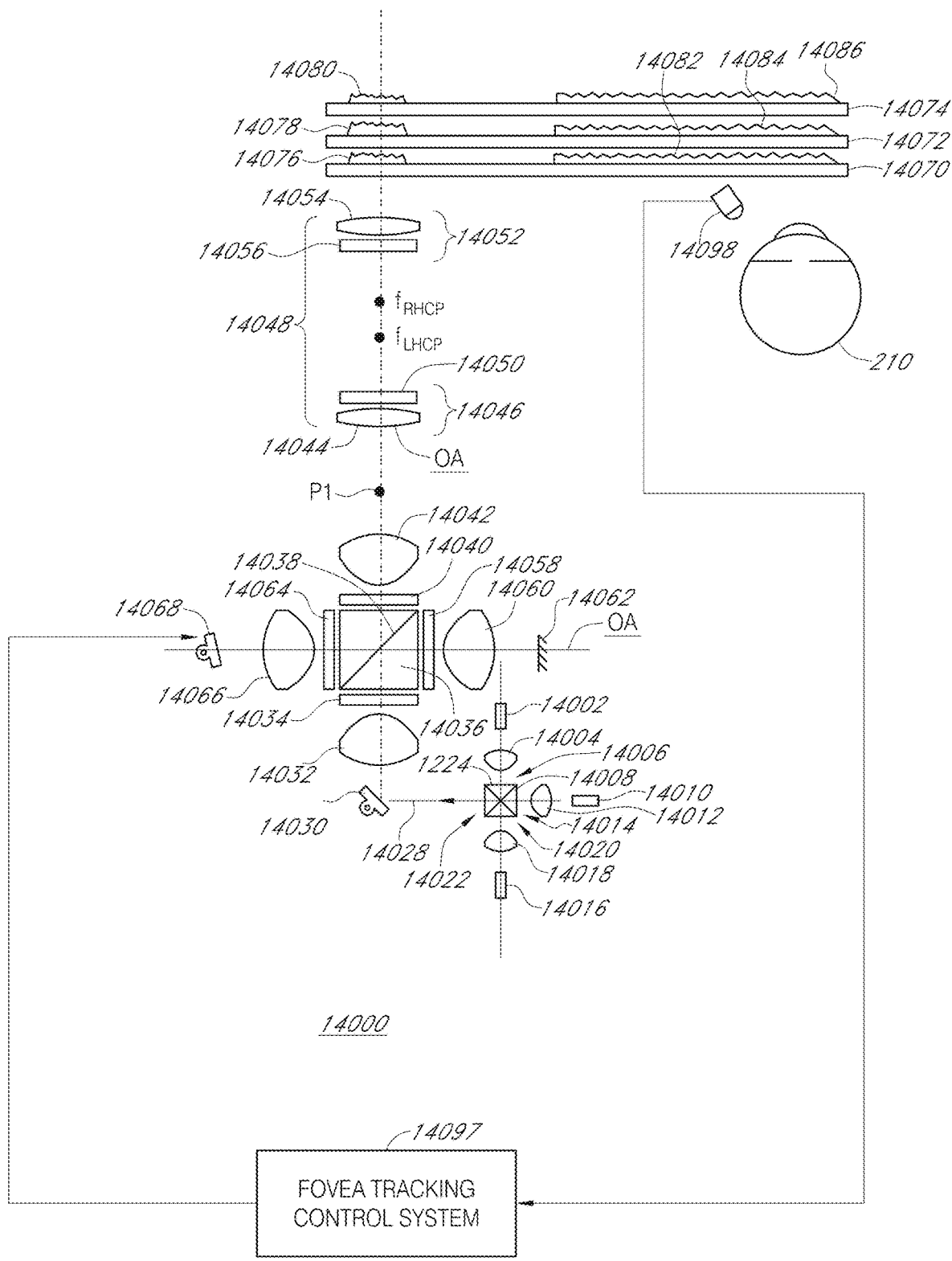
FIG. 36 illustrates schematically an augmented reality near-eye display system.

FIG. 36 illustrates schematically an augmented reality near-eye display system 14000 according to some embodiments. FIG. 36 shows a portion of the display systems 14000 for one eye 210. In practice a second such system would be provided for a user's other eye. Two such systems are incorporated in augmented reality glasses according to embodiments. Referring to FIG. 36, a red laser diode 14002 is optically coupled through a red laser collimating lens 14004 into a red light input face 14006 of a Red-Green-Blue (RGB) dichroic combiner cube 14008. A green laser diode 14010 is optically coupled through a green laser collimating lens 14012 into a green light input face 14014 of the RGB dichroic combiner cube 14008. Similarly, a blue laser diode 14016 is optically coupled through a blue laser collimating lens 14018 into a blue light input face 14020 of the RGB dichroic combiner cube 14008. The RGB dichroic combiner cube 14008 has an output face 14022. The RGB dichroic combiner cube 14008 includes a red reflecting dichroic mirror (short wavelength pass mirror) 14024 set at 45 degrees so as to reflect light from the red laser diode 14002 through the output face 14022. The RGB dichroic combiner cube 14008 also includes blue reflecting dichroic mirror (long wavelength pass) 14026 set at 135 degrees (perpendicular to red reflecting dichroic mirror 14024) so as to reflect light from the blue laser diode 14016 to the output face 14022. Light from the green laser diode 14010 passes through (is transmitted by) the red reflecting dichroic mirror 14024 and the blue reflecting dichoric mirror 14026 to the output face 14022. The red reflecting dichroic mirror 14024 and the blue reflecting dichroic mirror 14026 can be implemented as thin film optical interference films.

The red, green, and blue laser diodes 14002, 14010, 14016 are separately modulated with red, blue and green color channel image information. A cycle including a first period in which image information to be directed to the fovea of a user's retina is output and a subsequent period in which image information to be directed to a larger portion of the user's retina is repeated sequentially. There can be some angular overlap between image information directed to user's retina in the first period and the image information directed to the user's retina during the subsequent period of the cycle. In other words, certain portions of the user's eye may receive light during both periods. Rather than trying to achieve a sharp boundary, overlapping boundaries characterized by a tapering intensity may be used. The optical arrangement to achieve the aforementioned functionality will be described below.

The dichroic combiner cube 14008 outputs a collimated beam 14028 that includes red, blue and green components. The collimated beam 14028 is incident on a first two degree of freedom image scanning mirror 14030. The image scanning mirror 14030 has two degrees of freedom of rotation and can be oriented to angles within a predetermined angular range. Each orientation of the image scanning mirror 14030 effectively corresponds to angular coordinates in an image space. The orientation of the image scanning mirror 14030 is scanned in coordination with modulation of the red, green and blue laser diodes 14002, 14010, 14016 based on image information so as to present an image, ultimately, to a user's eye.

Light deflected by the image scanning mirror 14030 is coupled through a first relay lens element 14032 to a polarization rotation switch 14034. Alternatively, the polarization rotation switch could be located closer to the laser diodes 14002, 14010, 14016. The polarization rotation switch 14034 is electrically controlled by electronics (not shown in FIG. 36). The polarization rotation switch 14034 can be implemented as a liquid crystal polarization rotation switch. The polarization rotation switch 14034 receives light of a specific linear polarization that is output by the laser diodes 14002, 14010, 14016 and transferred through the collimating lenses 14004, 14012, 14018 and the RGB dichroic combiner cube 14008 without altering the polarization. The polarization rotation switch 14034 under the control of external electrical signals either passes the incoming light without altering its polarization or rotates the polarization of the light by 90 degrees.

Light exiting the polarization rotation switch 14034 is coupled to a polarization beam splitter (PBS) 14036. The PBS 14036 has embedded therein a polarization selective reflector 14038 arranged diagonally across the PBS 14036. The polarization selective reflector 14038 can be of the type including an array of parallel metal conductive lines (not visible in FIG. 36). Light polarized (i.e., have an electric field direction) parallel to the metal conductive lines is reflected and light polarized perpendicular to the conductive metal lines is transmitted. In the case of the embodiment shown in FIG. 36 it is assumed that the conductive metal lines are oriented perpendicular to the plane of the drawing sheet. With such an orientation the polarization selective reflector 14038 will reflect S-polarized light and transmit P-polarized light.

Considering first the case in which the polarization rotation switch 14034 is in a state that outputs P-polarized light, such P-polarized light will pass through the polarization selective reflector 14038 and through the PBS 14036 entirely reaching a first quarter wave plate (QWP) 14040. The first QWP 14040 is oriented so as to convert P-polarized light to right hand circularly polarized (RHCP) light. (Alternatively the first QWP could have been oriented so as to convert P-polarized light to LHCP, in which changes to other components described below will also be made as will be apparent after considering the remaining description of FIG. 36.) After passing through the first QWP 14040 light will reach a second relay lens element 14042. The first relay lens element 14032 and the second relay lens element 14042 for a unity magnification afocal compound lens. Note that the image scanning mirror 14030 is spaced from the first relay lens element 14032 by a distance equal to the focal length of the first relay lens element 14032. The second relay lens element 14032 will recollimate the light (the light having been initially collimated by collimating lenses 14004, 14012, 14018). Note also that light propagating from the second relay lens element 14042 will cross an optical axis OA near a point P1 that is spaced from the second relay lens element 14042 by the focal length of the second relay lens element 14042. In the embodiment shown in FIG. 36 the first relay lens element 14032 and the second relay lens element 14042 have the same focal length.

After exiting the second relay lens element 14042 the light will be incident on a first group positive refractive lens 14044 of a first group 14046 of a dual magnification afocal magnifier 14048. In addition to the first group positive refractive lens 14044, the first group 14046 also includes a first group geometric phase lens 14050. After passing through the first group geometric phase lens 14050, the light passes through a second group 14052 that includes a second group positive refractive lens 14054 and a second group geometric phase lens 14056. The geometric phase lenses 14050, 14056 include patternwise aligned liquid crystal material. Geometric phase lenses (also known as "polarization directed flat lenses") are available from Edmund Optics of Barrington, N.J. The geometric phase lenses 14050, 14056 have the property that they are positive lenses for circularly polarized light that has a handedness (RH or LH) that matches their handedness and are negative lenses for circularly polarized light of opposite handedness. Geometric phase lenses also have the property that in transmitting light they reverse the handedness of circularly polarized light. In the embodiment shown in FIG. 36, the geometric phase lenses 14050, 14056 are right handed. It should be noted that this system could be modified to accommodate use with left handed geometric phase lenses.

In operation when RHCP light is passed through the first group 14046, the first group geometric phase lens 14050 will act as a negative lens, so that the positive optical power of the first group 14046 will be less than the positive optical power of the first group refractive lens 14044 alone and the first group 14046 will have focal length about equal to a distance to point $F_{RHCP}$ indicated in FIG. 36 from a principle plane of the first group 14046. Propagating through the first group geometric phase lens 14050 will convert the light to the left handed circularly polarized (LHCP) state. For light of the LHCP state the second group geometric phase lens 14056 will have positive refractive power, and therefore the positive refractive power of the second group 14052 will be greater than the positive refractive power of the second group positive refractive lens 14054 alone. In this case a focal length of the second group 14052 will also equal a distance from the principle plane of the second group 14052 to the point $F_{RHCP}$, with the subscript "RHCP" referring to the polarization state of the light entering the magnifier 14048. Because the point $F_{RHCP}$ is closer to the second group 14052 than the first group 14046, the dual magnification afocal magnifier 14048 will be a magnifier (have a magnification greater than 1) for RHCP light received from the second relay lens element 14042.

Now considering a second case in which the polarization rotation switch 14034 is in a state that outputs S-polarized light, such S-polarized light is reflected by the polarization selective reflector 14038 nominally 90 degrees and then passes through a second QWP 14058 and thereafter passes through a third relay lens element 14060 which deflects the light toward a fixed mirror 14062. Note that for S-polarized light the first relay lens element 14032 in combination with the third relay lens element 14060 form a unity magnification afocal relay. The fixed mirror 14062 reflects the light back through third relay lens element 14060 and second QWP 14058 changing the sign but not the absolute value of the angle of the light beam with respect to the optical axis OA. After the first pass through the second QWP 14058 the S-Polarized light is converted to circularly polarized light of a particular handedness (which can be chosen to be either RHCP or LHCP by choosing the orientation of the fast and slow axes of the second QWP 14058). Upon reflection by the fixed mirror 14062 the handedness of the circularly polarized light is reversed. Upon the second pass through the second QWP the circularly polarized light which was S-polarized is converted (temporarily) to P-polarized light which then passes through the polarization selective reflector 14038.

After passing through the polarization selective reflector 14038, the light passes through a third QWP 14064 and a fourth relay lens element 14066 and is directed to a fovea tracking mirror 14068. In the system 14000, because the image scanning mirror 14030, the fixed mirror 14060 and the fovea tracking mirror 14068 are spaced from respectively from the relay lens elements 14032, 14066, 14060 by the focal length of the relay lens element 14032, 14066, 14060 and the QWPs 14040, 14058, 14064 are positioned after the relay lens elements 14032, 14042, 14060, 14066 the angle of light incidence on the QWPs 14040, 14058, 14064 is relatively low which leads to improved performance of the QWPs 14040, 14058, 14064. According to an alternative embodiment, rather than having a single fovea tracking mirror 1268 that tracks two angular degrees of freedom of eye movement (e.g., azimuth and elevation), the fixed mirror 14062 can be replaced with a second fovea tracking mirror (not shown) and one of the two fovea tracking mirrors can be used to track one degree of freedom of eye movement and the second fovea tracking mirror can be used to track a second degree of freedom of eye movement. In such an alternative, single degree of freedom fovea tracking mirrors may be used. Referring again to FIG. 36, the third relay lens element 14060 in combination with the forth relay lens element 14066 forms a unity magnification afocal relay. The fovea tracking mirror 14068 can add to the deflection of the light beam 14028 produced by the image scanning mirror 14030 and thereby deflect the mean angle of the entire solid angle range of beam angles produced by the image scanning mirror 14030 off axis in order to track the fovea (not shown) of a user's eye 210. An eye-tracking camera 14098 tracks the eye gaze of a user's eye 210. The eye-tracking camera 14098 is coupled to a fovea tracking control system 14097. The eye-tracking camera 14098 outputs information indicative of the eye gaze which is input to the fovea tracking control system 14097. The fovea tracking control system 14097 is drivingly coupled to the fovea tracking mirror 14068. Based on the eye gaze information received from the eye-tracking camera 14098, the fovea tracking control system 14097 outputs a signal to the fovea tracking mirror 14068 in order to orient the fovea tracking mirror 14068 to track the fovea of the user's eye 14099. The fovea tracking control system 14097 can use image processing to determine the user's eye gaze and generate the signal to control the fovea tracking mirror based on the eye gaze.

After being reflected by the fovea tracking mirror 14068 the light passes back through the fourth relay lens element 14066 and the third QWP 14064. The first pass of light through the third QWP 14064 converts the light to circularly polarized light, the reflection by the fovea tracking mirror 14068 reverses the handeness of the circularly polarized light and the second pass through the third QWP 14064 converts the light back to the S-polarized state. Because the light is now S-polarized it is reflected by the polarization selective reflector 14038 and deflected nominally 90 degrees toward the first QWP 14040. The first QWP 14040 converts the S-Polarized light to left hand circularly polarized (LHCP) light. The light then passes through second relay lens element 14042. The fourth relay lens element 14066 in combination with the second relay lens element 14042 forms a unity magnification afocal compound lens. The relay lens elements 14032, 14042, 14060, 14066 are symmetrically placed at 90 degree intervals about the center of the polarization selective mirror 14038. Generally successive (in the order of light propagation) relay lens elements 14032, 14042, 14060, 14066 form unity magnification afocal relays. Successive relay lens elements positioned so as to be confocal, sharing a common focal point halfway across the PBS 14036. The relay lens elements 14032, 14042, 14060, 14066 can include, by way of non-limiting examples, aspheric lenses, aplanatic lenses, hybrid refractive and diffractive lenses and achromatic lenses, compound lenses including for example refractive lenses along with diffractive lenses. As used in the present description "relay lens element" includes a single lens or compound lens.

For LHCP light the first group geometric phase lens 14050 has a positive refractive power which increases the refractive power of the first group 14046. For LHCP the focal length of the first group 14044 is equal to a distance from the principal plane of the first group 14044 to a point $F_{LHCP}$. Upon passing through the first group geometric phase lens 14050 the LHCP light is converted to RHCP light. Subsequently the light passes through the second group 14052. For RHCP light the second group geometric phase lens 14056 has a negative refractive power so that the positive refractive power of the second group 14052 will be lower than the refractive power of the second group positive refractive lens 14054 alone. For RHCP light the second group 14052 has a focal length equal to a distance from a principal plane of the second group 14052 to the point $F_{LHCP}$. Accordingly for LHCP light entering the dual magnification afocal magnifier 14048, the dual magnification afocal magnifier 14048 serves as a demagnifier with a magnification less than one. Thus a solid angle range of light beam directions produced by the image scanning mirror 14030 which is deflected by the fovea tracking mirror 14068 is demagnified to cover a reduced angular range which tracks a user's fovea as the user's gaze is shifted. Recall that for incoming RHCP the dual magnification afocal magnifier 14048 has a magnification greater than one. The magnification greater than one is used to provide a wider field of view corresponding to a portion of the user's retina outside the fovea.

In certain embodiments the second group 14052 is a mirror image of the first group 14046, in which case the first group geometric phase lens 14050 and the second group geometric phase lens 14056 are identical, and the first group positive refractive lens 14044 and the second group positive refractive lens 14054 are identical. If the refractive lenses 14044, 14054 have surfaces of different refractive power, they can be positioned so that surfaces of the same refractive power face each other in order to maintain the mirror image symmetry of the dual magnification afocal magnifier 14048. In this case although each group 14046, 14052 can have two different principal planes depending on whether the geometric phase lenses 14050, 14056 are acting as positive or negative lenses, nonetheless two groups 14046, 14052 can be spaced from each other at a fixed distance that maintains the confocal relation of the two groups 14046, 14052 in order to maintain the afocal magnification of the magnifier 14048 regardless of whether LHCP or RHCP light entering the magnifier 14048.

A set of three augmented reality glasses eyepiece waveguides including a first eyepiece waveguide 14070, a second eyepiece waveguide 14072 and a third eyepiece waveguide 14074 are positioned beyond and optically coupled (through free space, as shown) to the second group 14052 of the dual magnification afocal magnifier 14048. Although three eyepiece waveguides 14070, 14072, 14074 disposed in overlying relation are shown, alternatively a different number of eyepiece waveguides are provided. For example multiple sets of three eyepiece waveguides, with each set configured to impart a different wavefront curvature (corresponding to a different virtual image distance) to exiting light may be provided. The three eyepiece waveguides 14070, 14072, 14074 are respectively provided with three light incoupling elements 14076, 14078, 14080 including a first light incoupling element 14076, a second light incoupling element 14078 and a third light incoupling element 14080. Each of the three eyepiece waveguides 14070, 14072, 14074 can be configured to transfer light in a particular color channel, e.g., red, green or blue light. Additionally each of the incoupling elements 14076, 14078, 14080 can be wavelength selective so as to only couple light in one color channel into its associated eyepiece waveguide 14070, 14072, 14074. The incoupling elements 14076, 14078, 14080 can for example comprise spectrally selective reflective diffraction gratings, such as for example diffraction gratings made of cholesteric liquid crystal material. Such cholesteric liquid crystal material has a helical pitch which determines a spectral reflectivity band. Each of the incoupling elements can for example include two superposed layers of cholesteric liquid crystal material with one being reflective of LHCP light and the other being reflective of RHCP light. Diffraction gratings generally have a profile pitch which determines light deflection angles. In the case that the incoupling elements 14076, 14078, 14080 are implemented as diffraction gratings the grating profile pitch of each grating is suitably selected in view of an associated the wavelength of light to be incoupled such that light is diffracted to angles above the critical angle for total internal reflection for the associated eyepiece waveguide 14070, 14072, 14074. The first, second and third eyepiece waveguides 14070, 14072, 14074 respectively include a first exit pupil expander (EPE) 14082, a second EPE 14084 and a third EPE 14086. The EPEs 14082, 14084, 14086 may be implemented as transmissive and/or reflective diffraction gratings. The EPEs 14082, 14084, 14086 incrementally couple light that is propagating within the waveguides 14070, 14072, 14074 out of the waveguides 14070, 14072, 14074 such that light exits the waveguides 14070, 14072, 14074 over a relatively wide area compared to the transverse extent of the incoupling elements 14076, 14078, 14080. Orthogonal pupil expanders (OPEs) not visible in FIG. 36 can also be provided on the eyepiece waveguides 14070, 14072, 14074 and located behind the EPEs 14082, 14084, 14086. The OPEs serve to deflect light from the incoupling elements 14076, 14078, 14080 that is propagating within the eyepiece waveguides 14070, 14072, 14074 toward the EPEs 14082, 14084, 14086. The OPEs may be located in the path of light emanating from the incoupling elements 14076, 14078, 14080 and the EPEs 14082, 14084, 14086 may be outside the path of light emanating from the incoupling elements 14076, 14078, 14080, but the OPEs may deflect light from the incoupling elements 14076, 14078, 14080 toward the EPEs 14082, 14084.

According to an alternative embodiment the first relay lens element 14032 has a longer focal length than the second 14042, third 14060 and fourth 14066 relay lens elements, and is spaced from the center of the PBS 14036 (taking into account the index of refraction of the PBS 14036) by a distance equal to the longer focal length. In this case the longer focal length first relay lens element 14032 in combination with the second relay lens 14042 imparts an angular magnification greater than 1:1 to the non-fovea tracked light; and the longer focal length first relay lens element 14032 in combination with the third relay lens element 14060 imparts an angular magnification greater than 1:1 to fovea tracked light. Recall that the dual magnification afocal magnifier 14048 will demagnify the fovea tracked light and the magnifiy the non-fovea tracked light. Thus changing the focal length of the first relay lens element 14032 provides another degree of design freedom that can be used to set the magnifications achieved in the system 14000 without disturbing the symmetry of the design of the dual magnification afocal magnifier 14048. Introducing asymmetry into the design of the dual magnification afocal magnifier 14048 is another possible alternative.

According to an alternative embodiment in lieu of the geometric phase lenses 14050, 14056 other types of dual state lenses are used. According to one alternative actively driven electowetting liquid lenses may be used. According to another alternative lenses that include a liquid crystal with its ordinary axis aligned in a specific direction overlying a diffractive optic made of a material that matches the ordinary axis and exhibits a lens power for light polarized parallel to the extraordinary axis may be used. In the latter case the first QWP 14040 may be eliminated as the anisotropic performance of the lenses will be dependent on the linear polarization differences between the fovea tracked and non-fovea tracked light.

Each orientation of the image scanning mirror 14030 corresponds to certain angular coordinates in the image space when the polarization rotation switch 14034 is configured to transmit non-fovea-tracked P-polarized light. When the polarization rotation switch 14034 is configured to output S-polarized light that is fovea-tracked, the orientation of the image scanning mirror 14030 in combination with the orientation of the fovea tracking mirror 14068 determine angular coordinates in the image space. The angles of light beam propagation determined by the orientation of the image scanning mirror and the fovea tracking mirror 14068 are multiplied by the magnifications of the dual magnification afocal magnifier 14048 and optionally by magnification determined by the relative focal lengths of the relay lenses 14032, 14042, 14060, 14066. The effective size of pixel defined in angular image space is related to the inverse of the modulation rates of the laser diodes 14002, 14010, 14016 and the angular rate of motion of the image scanning mirror 14030. To the extent that the motion of the image scanning mirror 14030 may be sinusoidal, the modulation rate of the laser diodes 14002, 14010, 14016 may be made inversely related to the angular rate of the image scanning mirror 14030 in order to reduce or eliminate pixel size variation. When both fovea tracked and non-fovea tracked are being generated the laser diodes 14002, 14010, 14016 the full potential modulation rate of laser diodes 14002, 14010, 14010 (limited by characteristics of available lasers) can be used (at least for certain points in the field of view), and the full angular range of the image scanning mirror can be used such that resolution imagery of imagery produced for the fovea tracked region which subtends a relatively small solid angle range can be higher (smaller pixel size) than the resolution of imagery produced for the wider field of view.

According to certain embodiments in an augmented reality system in which the system 14000 is used virtual content is superimposed on the real world which is visible to the user through the eyepiece waveguides 14070, 14072, 14074. The virtual content is defined as 3D models (e.g., of inanimate objects, people, animals, robots, etc.). The 3D models are positioned and oriented in a 3D coordinate system. In an augmented reality system, through the provision of, for example, an inertial measurement unit (IMU) and/or visual odometry the aforementioned 3D coordinate system is maintained registered to a real world environment (inertial reference frame) of the user of the augmented reality system. A game engine processes the 3D models taking into account their position and orientation in order to render a left eye image and a right eye image of the 3D models, for output to the user via the system 14000 (and a like systems for the user's other eye). To the extent that the 3D models are defined in a coordinate system that is fixed to user's environment and to the extent that the user may move and turn his or her head (which carriers the augmented reality glasses) within the environment, the rendering of the left eye image and the right eye image is updated to take into account the user's head movement and turning. So for example if a virtual book is displayed resting on a real table and the user's rotates his or her head by 10 degrees to the left in response to information of the rotation from the IMU or a visual odometry subsystem (not shown), the game engine will update the left and right images to shift the image of the virtual book being output by the system 14000 10 degrees to the right so that the book appears to maintain its position notwithstanding the user's head rotation. In the present case imagery for a wider portion of the retina extending beyond the fovea and imagery for more limited portion of retina including the fovea are time multiplexed through the system 14000 using the polarization rotation switch 14034. Imagery is generated and output by the game engine in synchronism with the operation of the polarization rotation switch 14034. As mentioned above the game engine generates left eye imagery and right eye imagery. The game engine also generates narrower FOV left fovea and right fovea imagery which are output when the polarization rotation switch 14034 is configured to output S-polarization light that is fovea tracked using the fovea tracking mirror 14068. As discussed above such fovea tracked imagery is converted to LHCP light and is demagnified by the dual magnification afocal magnifier 14048. Such demagnification limits the angular extent to a narrow range including the fovea (or at least a portion thereof). The demagnification reduces pixel size thereby increasing angular resolution for the fovea tracked imagery.

Figure 37A:
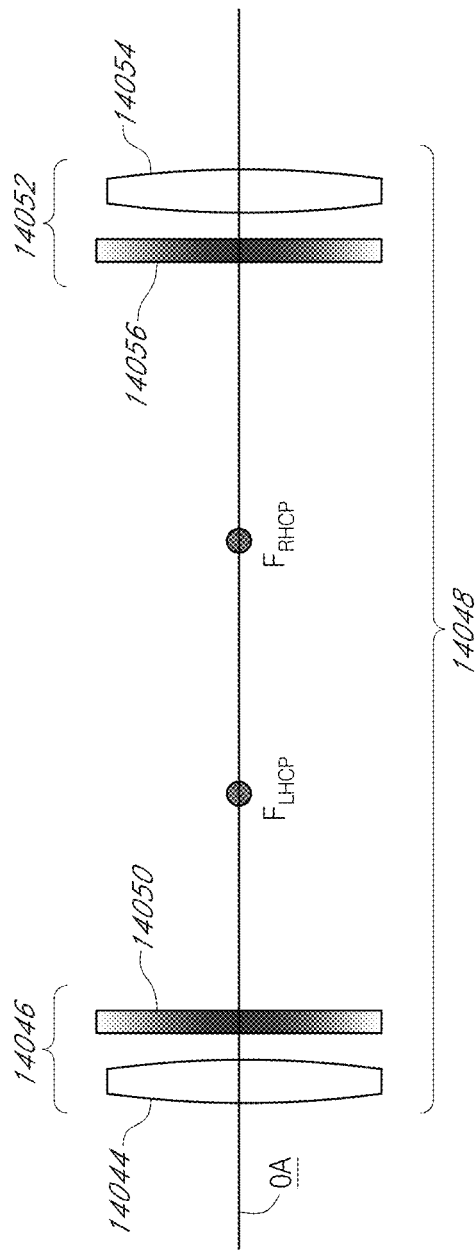
FIG. 37A is a schematic illustration of a dual magnification afocal magnifier.

FIG. 37A is a schematic illustration of a dual magnification afocal magnifier 14048 used in augmented reality near eye display system shown in FIG. 36 according to one embodiment.

Figure 37B:
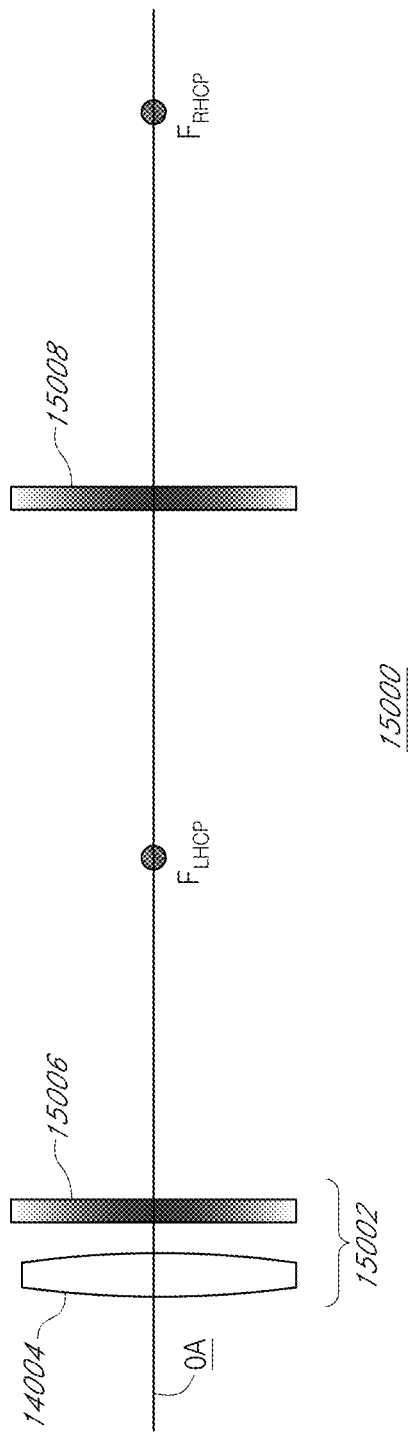
FIG. 37B is a schematic illustration of a dual focal magnification afocal magnifier.

FIG. 37B is a schematic illustration of a dual focal magnification afocal magnifier 15000 that may be used in the augmented reality near eye display system 14000 shown in FIG. 36 in lieu of the afocal magnifier 14048 according to other embodiments. The afocal magnifier 15000 includes a lens group 15002 that includes a positive refractive lens 15004 and a first geometric phase lens 15006. The afocal magnifier 15000 further includes a second geometric phase lens 15008 spaced at a distance from the first lens group 15002. The first geometric phase lens 15006 and the second geometric phase lens 15008 have opposite handedness. For light having a handedness matching the handedness of a geometric phase lens the geometric phase lens acts as a positive lens and for light having a handedness opposite to the handedness of the geometric phase lens the geometric phase lens acts as a negative lens. Additionally upon propagating through a geometric phase lens the handedness of the light is reversed. Accordingly when the first geometric phase lens 15006 is acting as a positive lens the second geometric phase lens 15008 will also be acting as a positive lens and when the first geometric phase lens 15006 is acting as a negative lens the second geometric phase lens 15008 will also be acting as a negative lens. When the first geometric phase lens 15006 is acting as a negative lens the lens group 15002 will have a longer focal length than the focal length of the positive refractive lens 15004 alone. When the first geometric phase lens 15006 is acting as a positive lens the lens group 15002 will have a shorter focal length than the focal length of the positive refractive lens 15004 alone.

Recall that in the augmented reality near eye display system 14000 shown in FIG. 36, the P-polarized light output by the polarization switch 14034 passes directly through the PBS 14036, is not foveal tracked and is converted to RHCP light by the first QWP 14040; whereas S-polarized light output from the polarization rotation switch 14034 is routed so as to be reflected by the foveal tracking mirror 14068 and is eventually converted to LHCP light.

The embodiment shown in FIG. 37B will be further described with the assumption that the first geometric phase lens 15006 is left handed and the second geometric phase lens 15008 is right handed. It is further assumed, that as in the case of the system 14000 shown in FIG. 36, LHCP light is foveal tracked and RHCP is not foveal tracked light and carries imagewise modulated light for a wider FOV (a wider portion of the retina). For LHCP light the first geometric phase lens 15006 acts as a positive lens and the lens group 15002 has a relatively short focal length corresponding to a distance from the lens group 15002 to a focal point $F_{LHCP}$. In transmitting light the first geometric phase lens 15006 converts the LHCP light to RHCP light for which the second geometric phase lens 15008 has a positive refractive power and a focal length equal to a distance from the second geometric phase lens 15008 to the point $F_{LHCP}$. In this case the afocal magnifier 15000 forms a Keplerian afocal magnifier. By proper selection (as will be described further below) of the focal lengths of the positive refractive lens 15004, the first geometric phase lens 15006 and the second geometric phase lens 15008, the magnification of the afocal magnifier 15000 in the Keplerian configuration can be chosen to be about 1:1 or another desired value. Assuming for example that image scanning mirror 14030 has an optical angular scan range of +/−10 degrees, such an angular range can substantially cover the fovea region of the retina.

For RHCP light entering the afocal magnifier 15000 the first geometric phase lens 15006 has a negative optical power and the lens group 15002 has a relatively longer focal length corresponding to a distance from the lens group 15002 to a point $F_{RHCP}$. The first geometric phase lens 15006 converts the RHCP light to LHCP light for which the second geometric phase lens 15008 has a negative focal length corresponding to a distance from the second geometric phase lens 15008 to the point $F_{RHCP}$. In this case, the afocal magnifier 15000 is configured as a Galilean afocal magnifier and can have a magnification substantially greater than 1:1 for example 3:1. Thus the RHCP light entering the afocal magnifier (which is not fovea tracked) can provide imagewise modulated light to a larger portion of the retina beyond the fovea (compared to the portion illuminated by the LHCP light. It should be noted that the systems 14000, 15000 can be reconfigured to reverse the roles the RHCP and LHCP light.

For a given focal length of the positive refractive lens 15004 and given magnitude of focal length of the first geometric phase lens 15004, the lens group 15002 will have one of two focal lengths equal to distances from the lens group 15002 to the points $F_{LHCP}$ and $F_{RHCP}$, depending on the handedness of incoming light (as described above). The second geometric phase lens 15008 should be positioned about half way between the points $F_{LHCP}$ and $F_{RHCP}$ and the focal length of the second geometric phase lens 15008 should be set to about one-half of the distance between $F_{LHCP}$ and $F_{RHCP}$. The magnification of the Keplerian configuration is equal to about minus the ratio of the distance from the lens group 15002 to point $F_{LHCP}$ divided by the distance from the point $F_{LHCP}$ to the second geometric phase lens 15008. The magnification of the Galilean configuration is about equal to the ratio of the distance from the lens group 15002 to the point $F_{RHCP}$ divided by the distance from the second geometric phase lens 15008 to the point $F_{RHCP}$.

The dual magnification afocal magnifiers 14048, 15000 can be used in other types of optical devices, including, by way of non-limiting example, telescopes, binoculars, cameras and microscopes. In systems in which a real image is to be formed the afocal magnifiers 14048, 15000 can be used in combination with additional optical elements (e.g., lenses, convex mirrors).

Referring to FIG. 36, according to an alternative embodiment, the fixed mirror 14062 is replaced with a second image scanning mirror, and a second subsystem (like what is shown in FIG. 36) including laser diodes, collimating lenses and RGB dichroic combining cube can be used to provide RGB image modulated light to the second scanning mirror. The second subsystem and second scanning mirror would be dedicated to providing fovea-tracked light. In this case the polarization rotation switch 14034 can be dispensed with and both fovea-tracked and non-fovea-tracked light can be simultaneously produced. In such an alternative all of the laser diodes would be oriented to inject P-polarized light into the PBS 14036.

IV. Tracking the Entire Field of View with Eye Gaze

Figure 38B:
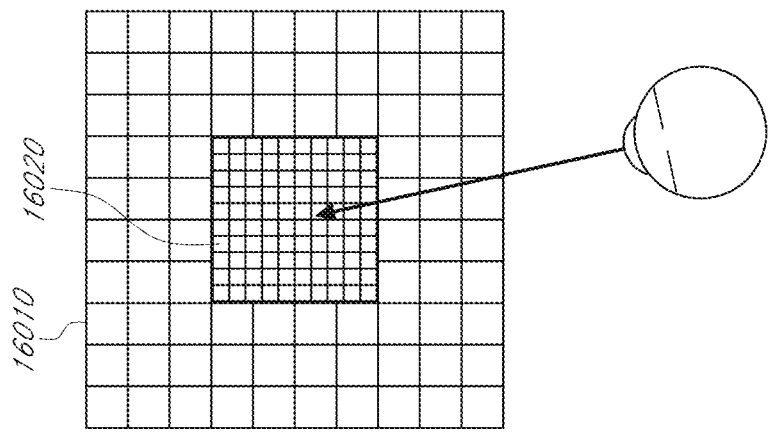
FIGS. 38A-38B illustrates schematically an exemplary configuration of images that can be presented to a user.
Figure 38A:
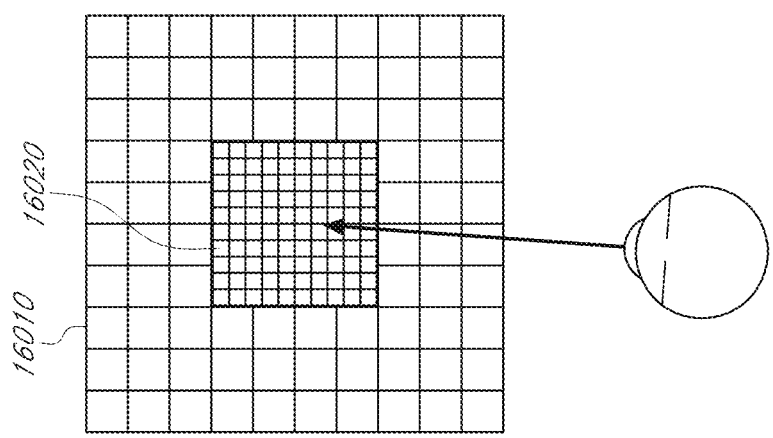

According to some embodiments, instead of presenting the first image stream at a static position as illustrated in FIGS. 26E-26F, both the first image stream and the second image stream can be dynamically shifted around according to the user's current fixation point. FIGS. 38A-38B illustrates schematically an exemplary configuration of images that can be presented to a user according to some embodiments. FIG. 38A shows how the second image stream 16020 can be positioned substantially at the center of the first image stream 16010. In some embodiments, it may be desirable to offset the second image stream 16020 from the center of the first image stream. For example, since a user's field of view extends farther in the temporal direction than the nasal direction it may be desirable to have the second image stream 16020 offset towards the nasal side of the first image stream. During operation, the first and second image stream can be persistently shifted in accordance with the user's current fixation point as determined in real-time using eye-gaze tracking techniques, as shown in FIG. 38B. That is, the first image stream 16010 and the second image stream 16020 can be shifted around in tandem such that the user is usually looking directly at the center of both image streams. It should be noted that the grid squares in FIGS. 38A-38B represent schematically image points that, much like fields 3002, 3004 and 3006 as described above with reference to FIG. 24, are defined in two-dimensional angular space.

Similar to the embodiments depicted in FIGS. 26A-26B, the second image stream 16020 represents a high-resolution image stream having a relatively narrow FOV that can be displayed within the boundaries of the first image stream 16010. In some embodiments, the second image stream 16020 can represent one or more images of virtual content as would be captured by a second, different virtual camera having an orientation in render space that can be dynamically adjusted in real-time based on data obtained using eye-gaze tracking techniques to angular positions coinciding with the user's current fixation point. In these examples, the high-resolution second image stream 16020 can represent one or more images of virtual content as would be captured by a fovea-tracked virtual camera such as the fovea-tracked virtual camera described above with reference to FIGS. 26A-26D. In other words, the perspective in render space from which one or more images of virtual content represented by the second image stream 16020 is captured can be reoriented as the user's eye gaze changes, such that the perspective associated with the second image stream 5020E is persistently aligned with the user's foveal vision.

For example, the second image stream 16020 can encompass virtual content located within a first region of render space when the user's eye gaze is fixed at the first position as illustrated in FIG. 38A. As the user's eye gaze moves to a second position different from the first position, the perspective associated with the second image stream 16020 can be adjusted such that the second image stream 16020 can encompass virtual content located within a second region of render space, as illustrated in FIG. 38B. In some embodiments, the first image stream 16010 has a wide FOV, but a low angular resolution as indicated by the coarse grid. The second image stream 16020 has a narrow FOV, but a high angular resolution as indicated by the fine grid.

Figure 39A:
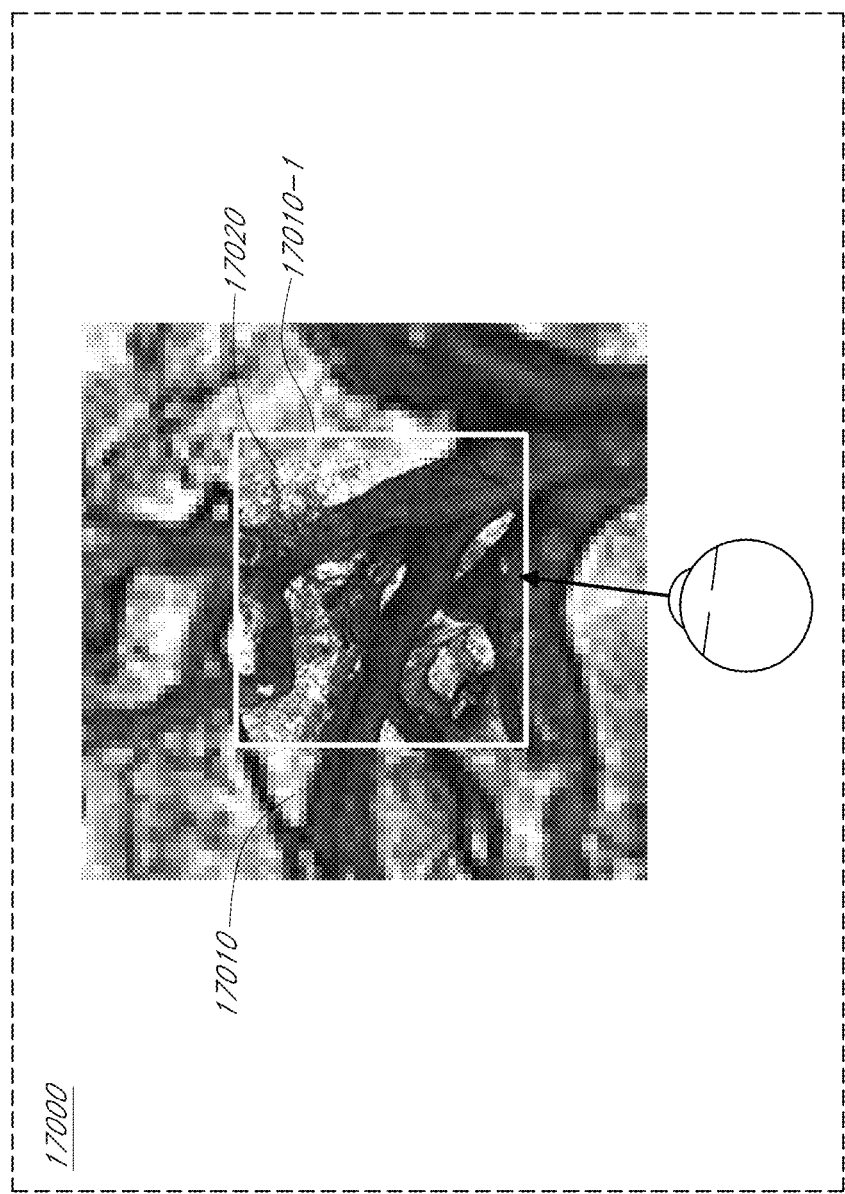
FIGS. 39A-39B illustrate some exemplary images that can be presented to a user.
Figure 39B:
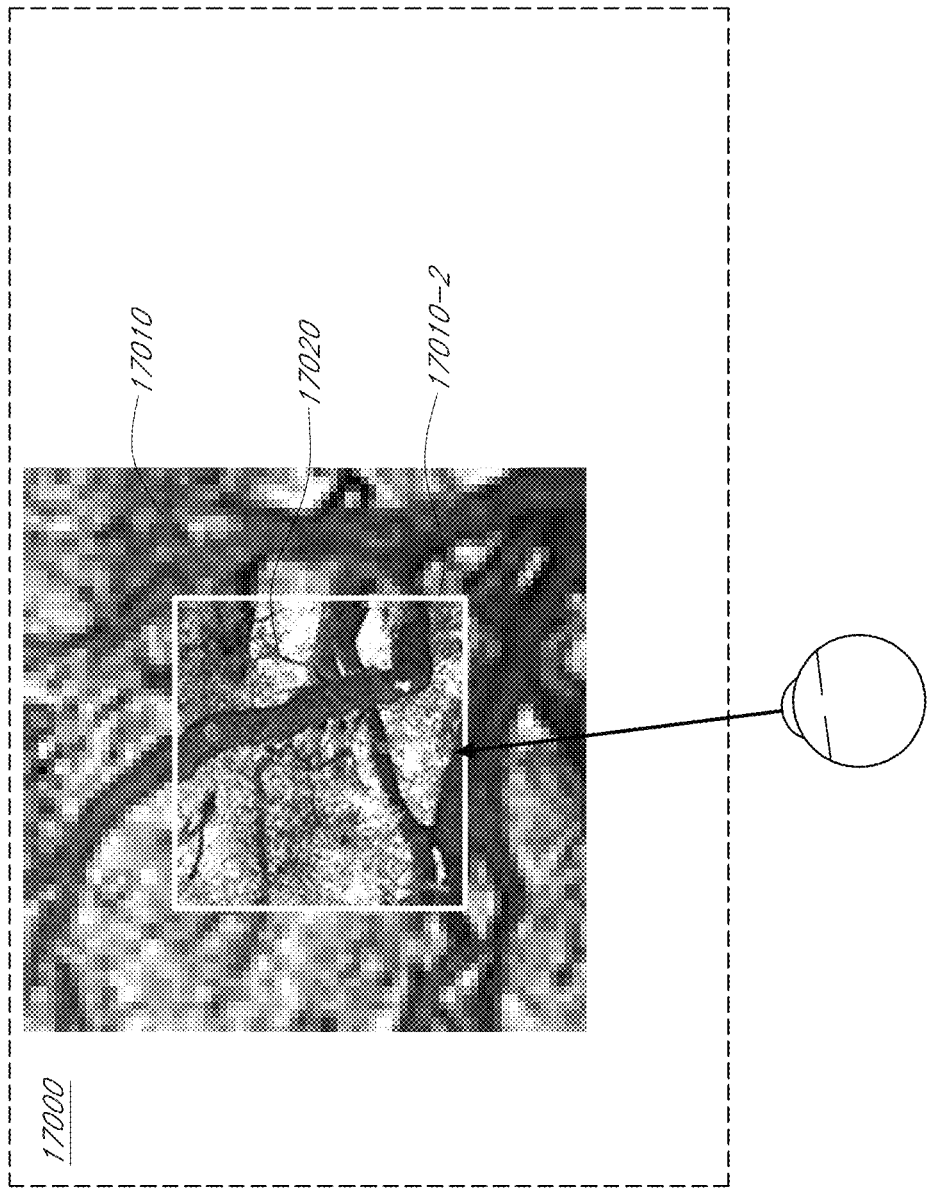

FIGS. 39A-39B illustrate some of the principles described in FIGS. 38A-38B using some exemplary images that can be presented to a user according to some embodiments. In some examples, one or more of the images and/or image streams depicted in FIGS. 39A-39B may represent two-dimensional images or portions thereof that are to be displayed at a particular depth plane, such as one or more of the depth planes described above with reference to FIG. 25B. That is, such images and/or image streams may represent 3-D virtual content having been projected onto at least one two-dimensional surface at a fixed distance away from the user. In such examples, it is to be understood that such images and/or image streams may be presented to the user as one or more light fields with certain angular fields of view similar to those described above with reference to FIGS. 26A-26D and 28A-28B.

As depicted, the content of a first image stream 17010 includes a portion of a tree. During a first period of time represented by FIG. 39A, eye-tracking sensors can determine a user's eye gaze (i.e., the foveal vision) is focused at a first region 17010-1 within a viewable region 17000. In this example, first region 17010-1 includes lower branches of the tree. A second image stream 17020 can be positioned within the first region 17010-1 and have a higher resolution than the first image stream. The first and second image streams can be displayed concurrently or in rapid succession in a position determined to correspond to the user's current eye gaze.

During a second period of time represented by FIG. 39B, the user's eye gaze can be detected shifting to a second region 17010-2 within the viewable region 1500 that corresponds to upper branches of the tree. As depicted, during the second period of time, the position and content of the first and second image streams changes to correspond to the second region 17010-2. The content of both the first image stream 17010 and second image stream 17020 can include the second region 17010-2 of the tree. The first and second image streams can be displayed concurrently or in rapid succession. Further detected movements of the user's eye gaze can be accommodated in the same manner to keep both the first and second image streams aligned with the user's current eye gaze.

Similar to the embodiments illustrated in FIGS. 28C-28D, because the higher resolution second image stream 17020 overlays the portion of the first image stream 17010 within the user's foveal vision, the lower resolution of the first image stream 17010 may not be perceived or noticed by the user. Furthermore, because the first image stream 17010 having a wide field of view can encompass a substantial portion of the user's vision, the user may be prevented from fully perceiving the boundaries of the light field display. Therefore, this technique can provide an even more immersive experience to the user.

FIGS. 40A-40D illustrate schematically a display system 18000 for projecting images to an eye of a user according to some embodiments. The display system 18000 includes an image source 18010. The image source 18010 can be configured to project first light beam 18052 associated with a first image stream and second light beam 18054 associated with a second image stream. The first image stream can be a wide FOV and low resolution image stream, and the second image stream can be a narrow FOV and high resolution image stream, as discussed above with reference to FIGS. 38A-38B. In some embodiments, the first light beam 18052 and the second light beam 18054 can be time-division multiplexed, polarization-division multiplexed, wavelength-division multiplexed, or the like.

The display system 18000 can further include a 2D scanning mirror 18020 configured to reflect the first light beam 18052 and the second light beam 18054. In some embodiments, the 2D scanning mirror 18020 can be tilted in two directions based on the fixation position of the user's eye, such that both the first light beam 18052 and the second light beam 18054 can project the first image stream and the second image stream, respectively, at the user's foveal vision.

Figure 40A:
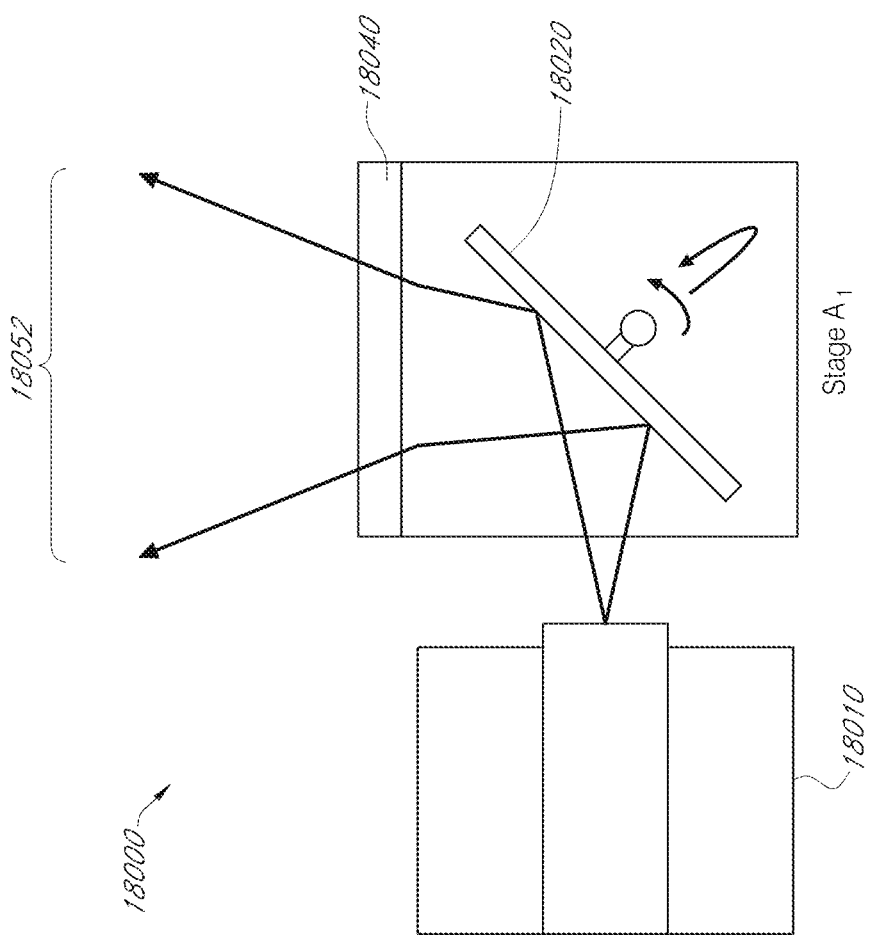
FIGS. 40A-40D illustrate schematically a display system for projecting image streams to an eye of a user.
Figure 40B:
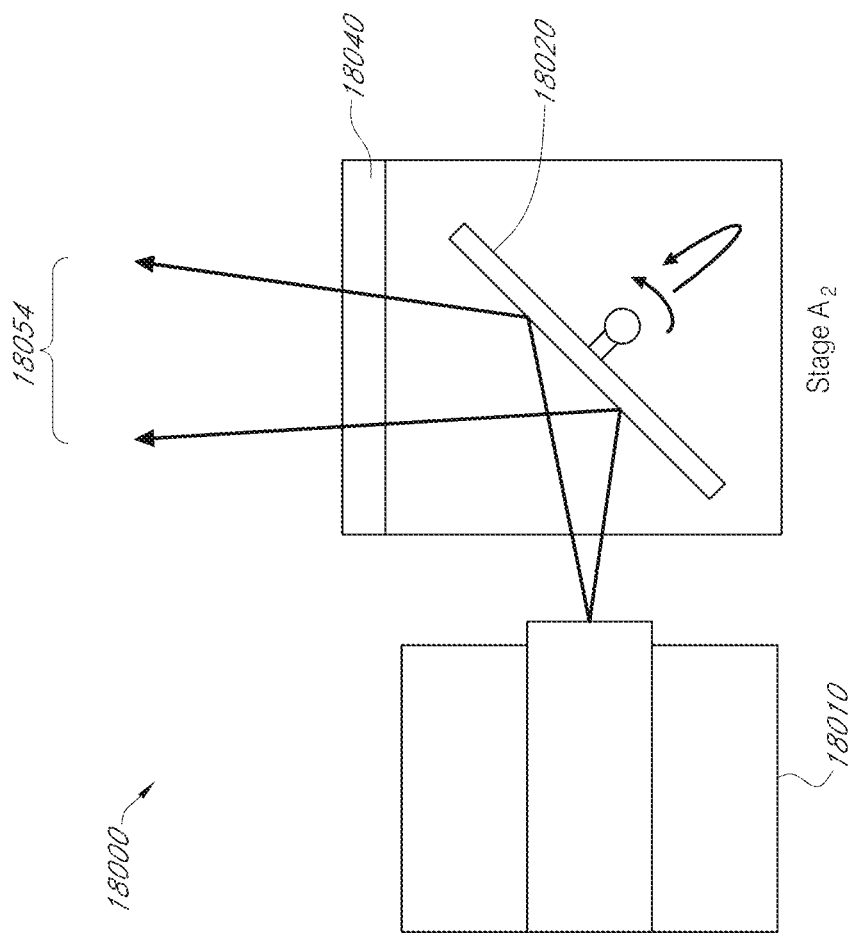
Figure 40C:
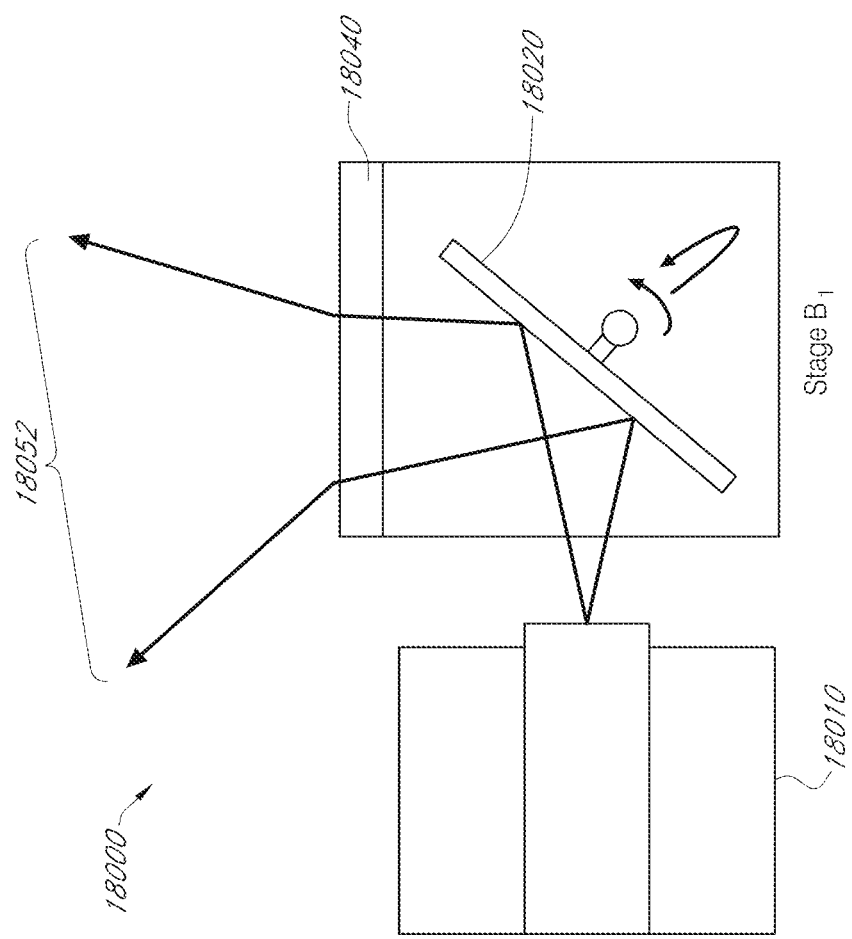
Figure 40D:
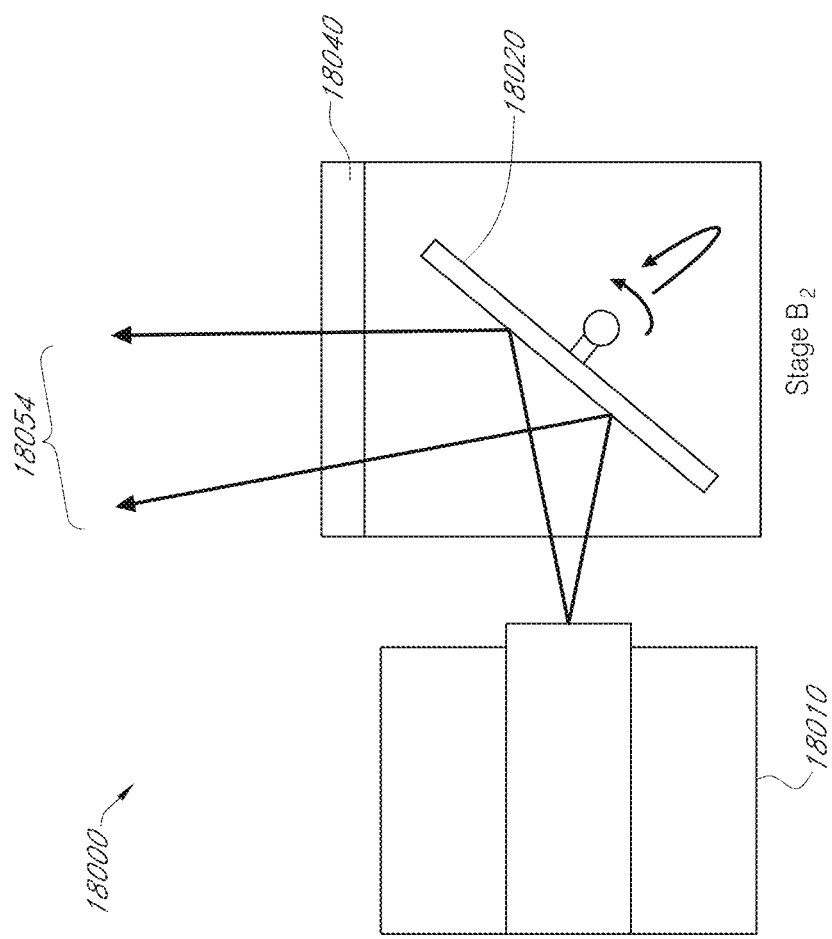
Figure 41A:
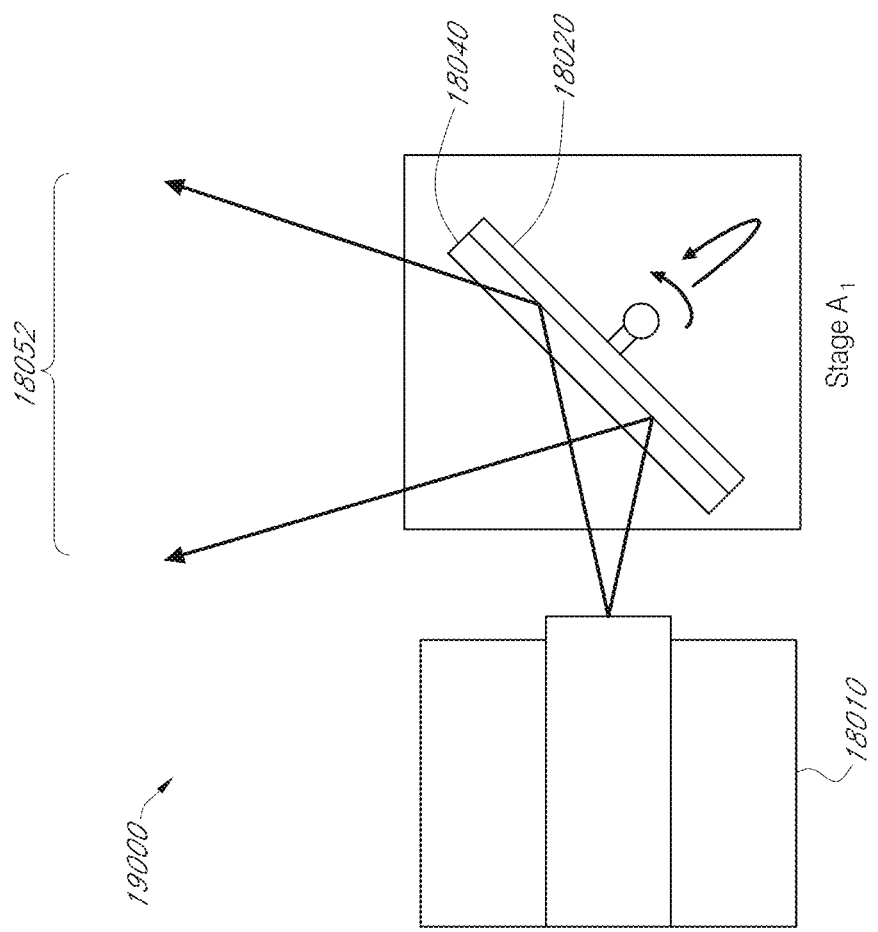
FIGS. 41A-41D illustrate schematically a display system for projecting image streams to an eye of a user.
Figure 41B:
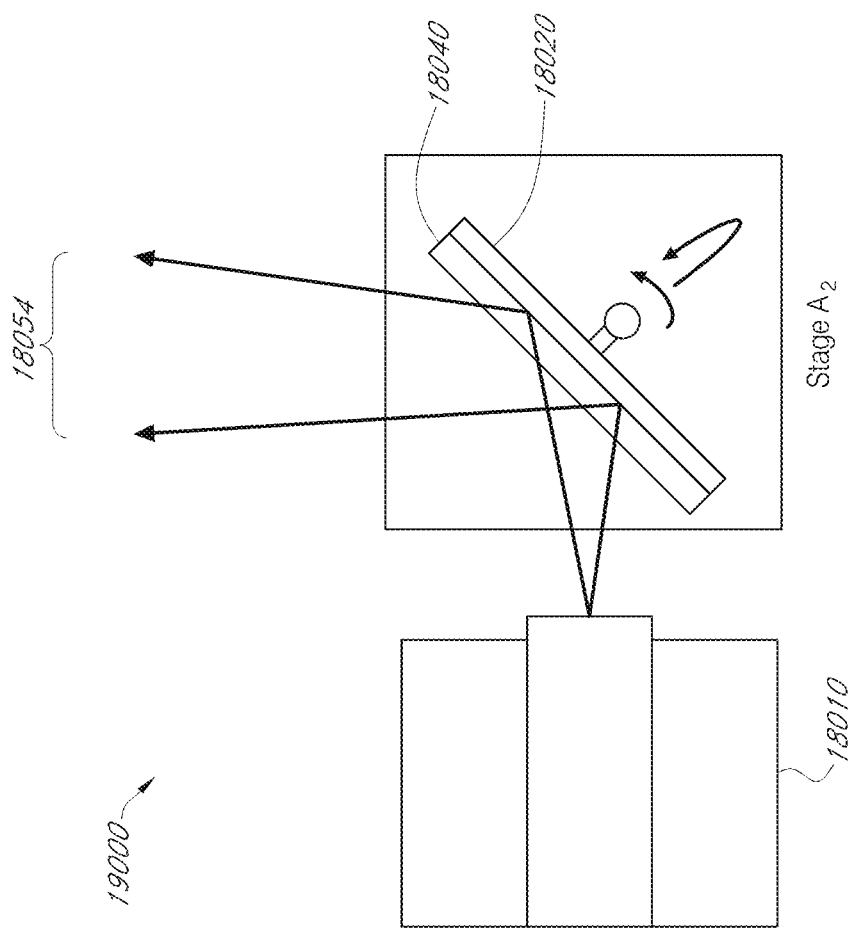
Figure 41C:
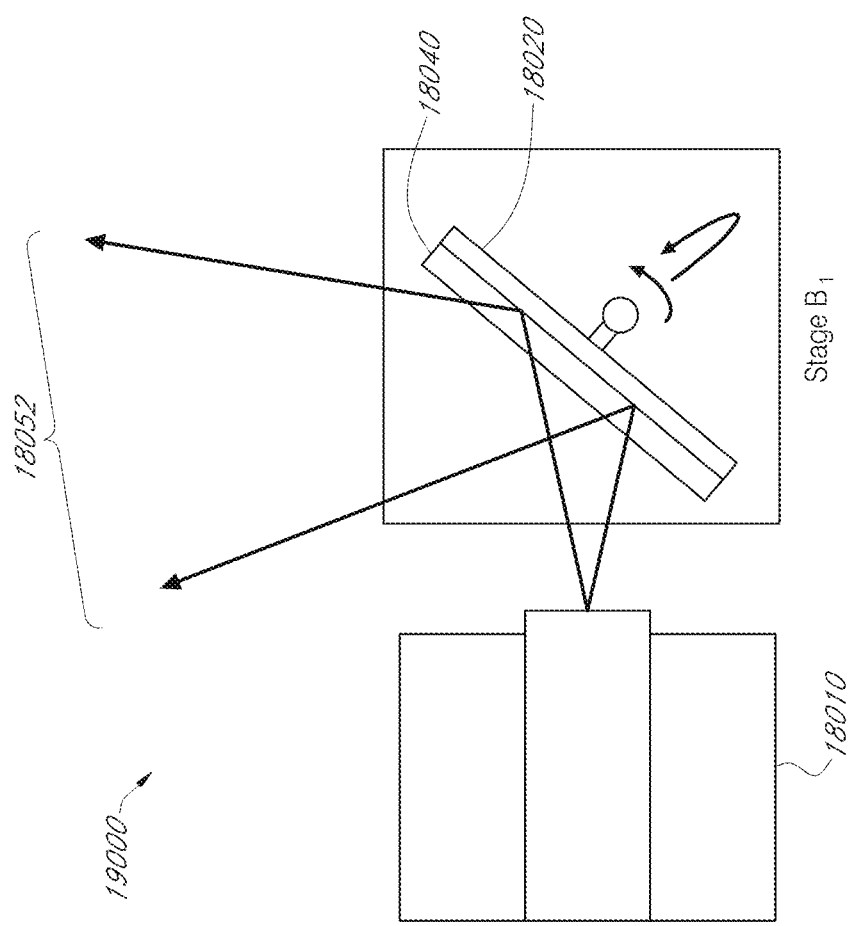
Figure 41D:
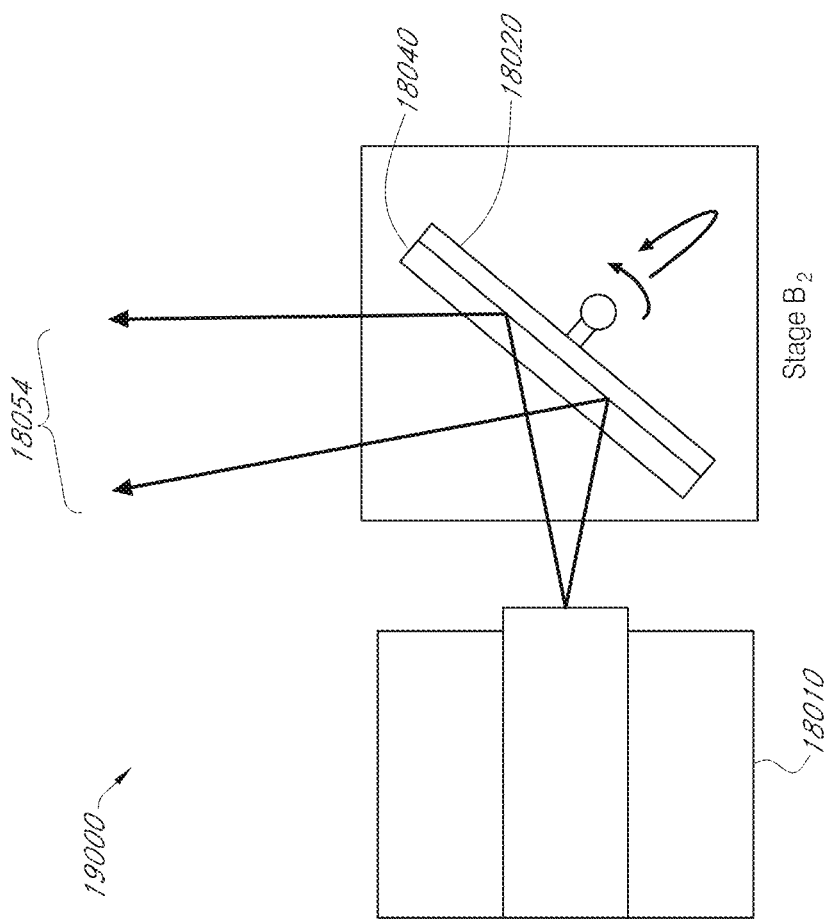

The display system 18000 can further include a switchable optical element 18040. Although the switchable optical element 18040 is illustrated as a single element, it can include a pair of sub switchable optical elements that functions as a switchable relay lens assembly. Each sub switchable optical element can be switched to a first state such that it operates as an optical lens with a first optical power, as illustrated in FIGS. 40A and 40C, or be switched to a second state such that it operates as an optical lens with a second optical power different from the first optical power, as illustrated in FIGS. 40B and 40D. Each sub switchable optical element can be, for example, a liquid crystal varifocal lens, a tunable diffractive lens, a deformable lens, or a multifocal birefringent lens according to various embodiments.

In cases where the first light beam 18052 and the second light beam 18054 are time-division multiplexed, the switchable optical element 18040 and the scanning mirror 18020 can operate as follows. Assume that the user's eye gaze is fixed at a first position during a first time period. The scanning mirror 18020 can be in a first orientation during the first time period so that the first light beam 18052 and the second light beam 18054 are directed toward a first position, as illustrated in FIGS. 40A and 40B. During a first time slot of the first time period (Stage $A_1$) when the image source 18010 outputs the first light beam 18052, the switchable optical element 18040 can be switched to the first state where it operates as an optical lens with the first optical power as illustrated in FIG. 40A. During a second time slot of the first time period (Stage $A_2$) when the image source 18010 outputs the second light beam 18054, the switchable optical element 18040 can be switched to the second state where it operates as an optical lens with the second optical power as illustrated in FIG. 40B. Thus, the first light beam 18052 are angularly magnified more than the second light beam 18054, so that the first light beam 18052 can present the first image stream with a wider FOV than that of the second image stream presented by the second light beam 18054.

Now assume that the user's eye gaze moves from the first position to a second position during a second time period. The scanning mirror 18020 can be in a second orientation during the second time period so that the first light beam 18052 and the second light beam 18054 are directed toward a second position, as illustrated in FIGS. 40C and 40D. During a first time slot of the second time period (Stage $B_1$) when the image source 18010 outputs the first light beam 18052, the switchable optical element 18040 can be switched to the first state where it operates as an optical lens with the first optical power as illustrated in FIG. 40C. During a second time slot of the second time period (Stage $B_2$) when the image source 18010 outputs the second light beam 18054, the switchable optical element 18040 can be switched to a second state where it operates as an optical lens with the second optical power as illustrated in FIG. 40D.

In cases where the first light beam 18052 and the second light beam 18054 are polarization-division multiplexed, the switchable optical element 18040 can comprise a multifocal birefringent lens, so that it operates as an optical lens with the first optical power for the first light beam 18052 as illustrated in FIGS. 40A and 40C, and operates as an optical lens with the second optical power for the second light beam 18054 as illustrated in FIGS. 40B and 40D.

In cases where the first light beam 18052 and the second light beam 18054 are wavelength-division multiplexed, the switchable optical element 18040 can comprise a wavelength-dependent multifocal lens, so that it operates as an optical lens with the first optical power for the first light beam 18052 as illustrated in FIGS. 40A and 40C, and operates as an optical lens with the second optical power for the second light beam 18054 as illustrated in FIGS. 40B and 40D.

FIGS. 41A-41D illustrate schematically a display system 19000 for projecting images to an eye of a user according to some other embodiments. The display system 19000 can be similar to the display system 18000, except that the switchable optical element 18040 can be disposed on the surface of the scanning mirror 18020. For example, the switchable optical element 18040 can be one or more substrates layered on the surface of the scanning mirror 18020.

In some further embodiments, the switchable optical element 18040 can be positioned elsewhere in the display system 19000. For example, it can be positioned between the image source 18010 and the scanning mirror 18020.

In some other embodiments, a polarization beam splitter or a dichroic beam splitter can be used to de-multiplex the first light beam 18052 and the second light beam 18054 into two separate optical paths, but both optical paths intersect the reflective surface of the scanning mirror 18020.

In other embodiments, more than two image streams can be presented to the user so that the transition in resolution from the user's fixation point to the user's periphery vision is more gradual in appearance. For example, a third image stream having a medium FOV and medium resolution can be presented in addition to the first image stream and the second image stream. In such cases, additional relay lens assemblies and/or scanning mirrors can be utilized to provide additional optical paths for the additional image streams.

Time Multiplexing Scheme

In some embodiments, the high-FOV low-resolution image stream (i.e., the first image stream) and the low-FOV high-resolution image stream (i.e., the second image stream) can be time-division multiplexed.

Figure 42:
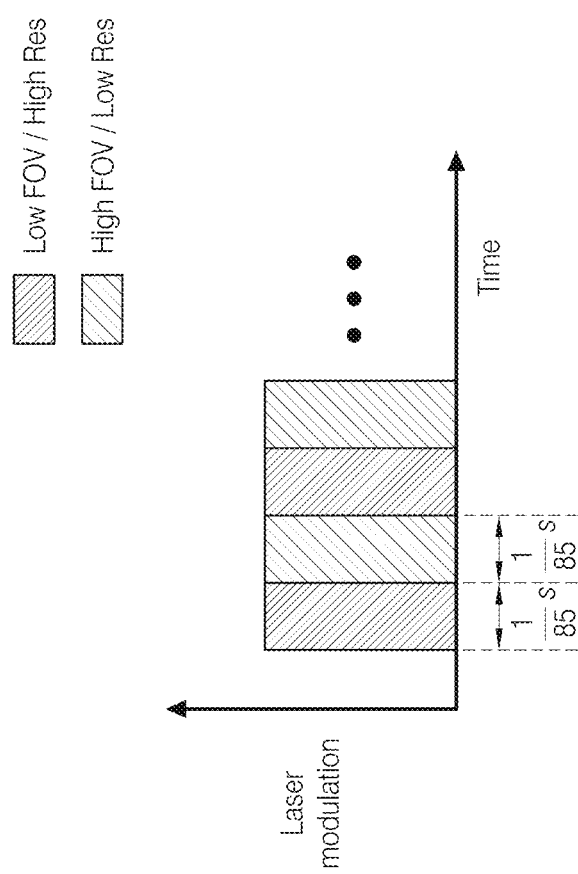
FIG. 42 illustrate an exemplary frame structure for a high-FOV low-resolution image stream and a low-FOV high-resolution image stream that are time-division multiplexed.

FIG. 42 shows a graph illustrating an exemplary time-division multiplexing pattern suitable for use with a high-FOV low-resolution image stream and a low-FOV high-resolution image stream. As illustrated, the high-FOV low-resolution image stream and the low-FOV high-resolution image stream are allocated at alternating time slots. For example, each time slot can be about one eighty-fifth of a second in duration. Thus, each of the high-FOV low-resolution image stream and the low-FOV high-resolution image stream may have a refresh rate of about 42.5 Hz. In some embodiments, an angular region corresponding to light fields of the low-FOV high-resolution image stream overlaps a portion of an angular region of the light fields corresponding to the high-FOV low-resolution image stream making the effective refresh rate in the overlapped angular region about 85 Hz (i.e., twice the refresh rate of each individual image stream).

In some other embodiments, the time slots for the high-FOV low-resolution image stream and the time slots for the low-FOV high-resolution image stream can have different durations. For example, each time slot for the high-FOV low-resolution image stream can have a duration longer than one eighty-fifth seconds, and each time slot for the low-FOV high-resolution image stream can have a duration shorter than one eighty-fifth seconds, or vice versa.

Figure 43:
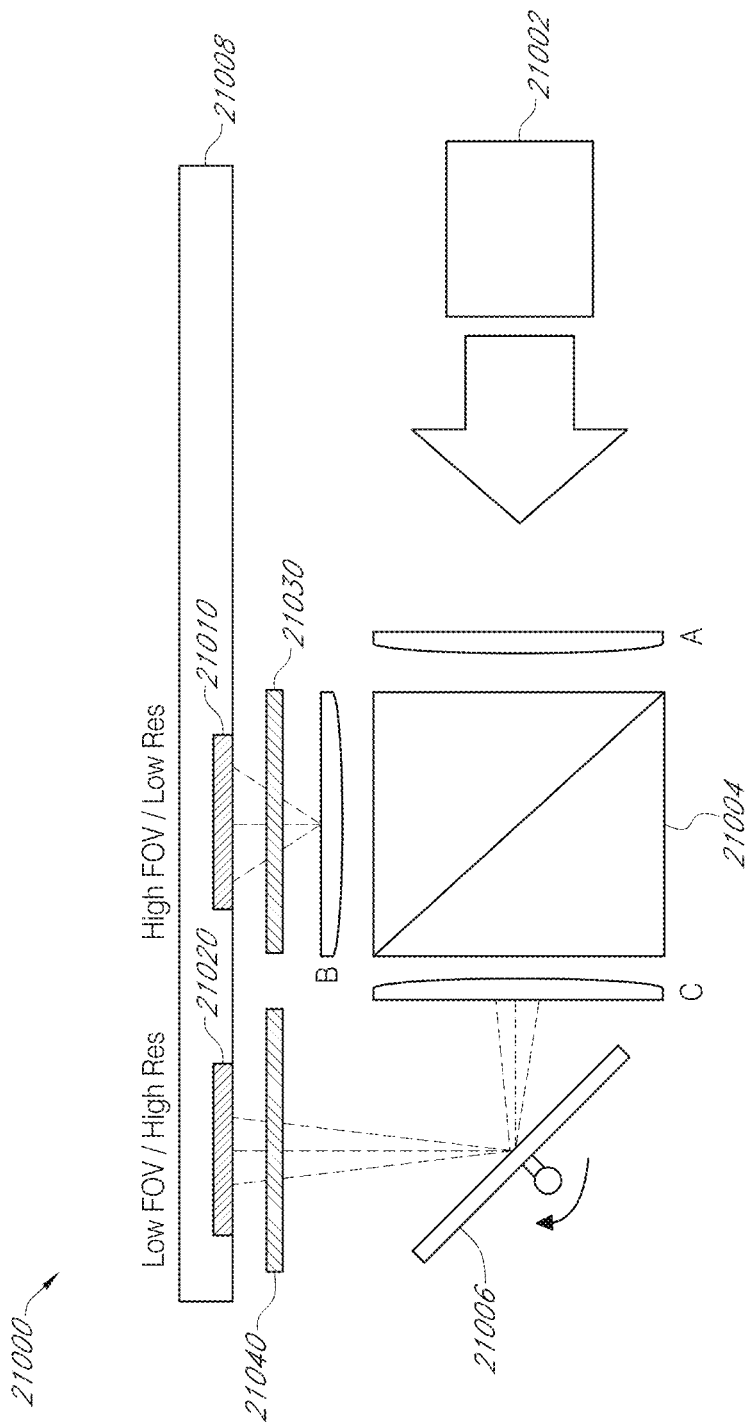
FIG. 43 illustrates schematically a display system for projecting image streams to an eye of a user.

FIG. 43 illustrates schematically a display system 21000 for projecting image streams to an eye of a user according to some embodiments. The display system 21000 may share some elements in common with display system 8000 as illustrated in FIGS. 30A-30B; for this reason, the description about those common elements in relation to FIGS. 30A-30B are applicable here as well. An image source 21002 can be configured to provide a high-FOV low-resolution image stream in a first polarization state and a low-FOV high-resolution image stream in a second polarization state contemporaneously. For example, the first polarization state can be a linear polarization in a first direction, and the second polarization state can be a linear polarization in a second direction orthogonal to the first direction; or alternatively, the first polarization state can be a left-handed circular polarization and the second polarization state can be a right-handed circular polarization. Similar to the display system 8000 illustrated in FIGS. 30A-30B, the display system 21000 includes a polarization beam splitter 21004 for separating light beams projected by an image source (e.g., image source 21002) into a first light beam associated with the high-FOV low-resolution image stream propagating along a first optical path, and a second light beam associated with the low-FOV high-resolution image stream propagating along a second optical path.

Similar to the display system illustrated in FIGS. 30A-30B, the display system 21000 can include a first optical lens (lens A) positioned between the image source 21002 and the beam splitter 21004, a second optical lens (lens B) positioned downstream from the beam splitter 21004 along the first optical path, and a third optical lens (lens C) positioned downstream from the beam splitter 21004 along the second optical path. In some embodiments, as described above in relation to FIGS. 30A-30B and 31A-31B, the combination of the first optical lens (lens A) and the second optical lens (lens B) can provide an angular magnification for the first light beam that is greater than unity, and the combination of the first optical lens (lens A) and the third optical lens (lens C) can provide an angular magnification for the second light beam that is substantially equal to unity or less than unity. Thus, the first light beam can project an image stream that has a wider FOV than that projected by the second light beam.

Similar to the display system 8000 illustrated in FIGS. 30A-30B, the display system 21000 also includes a foveal tracker 21006 that can take the form of a scanning mirror (e.g., a MEMs mirror), which can be controlled based on the fixation position of the user's eye for dynamically projecting the second light beam associated with the low-FOV, high-resolution image stream.

The display system 21000 can also include a first in-coupling grating (ICG) 21010 and a second ICG 21020 coupled to an eyepiece 21008. The eyepiece 21008 can be a waveguide plate configured to propagate light therein. Each of the first ICG 21010 and the second ICG 21020 can be a diffractive optical element (DOE) configured to diffract a portion of the light incident thereon into the eyepiece 21008. The first ICG 21010 can be positioned along the first optical path for coupling a portion of the first light beam associated with the high-FOV low-resolution image stream into the eyepiece 21008. The second ICG 21020 can be positioned along the second optical path for coupling a portion of the second light beam associated with the low-FOV high-resolution image stream into the eyepiece 21008.

The display system 21000 can also include a first switchable shutter 21030, and a second switchable shutter 21040. The first switchable shutter 21030 is positioned along the first optical path between the second optical lens (lens B) and the first ICG 21010. The second switchable shutter 21040 is positioned along the second optical path between the foveal tracker and the second ICG 21020. The operation of the first switchable shutter 21030 and the second switchable shutter 21040 can be synchronized with each other such that the high-FOV low-resolution image stream and the low-FOV high-resolution image stream are time-division multiplexed according to a time-division multiplexing sequence (e.g. as illustrated in FIG. 42). The first switchable shutter 21030 can be open for a time period corresponding to a first time slot associated with the high-FOV low-resolution image and closed during a second time slot associated with the low-FOV high-resolution image stream. Similarly, the second switchable shutter 21040 is open during the second time slot and is closed during the first time slot.

As such, the high-FOV low-resolution image stream is coupled into the eyepiece 21008 by way of the first ICG 21010 during the first time slot (e.g., when the first switchable shutter 21030 is open), and the low-FOV high-resolution image stream is coupled into the eyepiece 21008 by way of the second ICG 21020 during the second time slot (e.g., when the second switchable shutter 21040 is open). Once the high-FOV low-resolution image stream and the low-FOV high-resolution image stream are coupled into the eyepiece 21008, they may be guided and out-coupled (e.g., by out-coupling gratings) into a user's eye.

Figure 44:
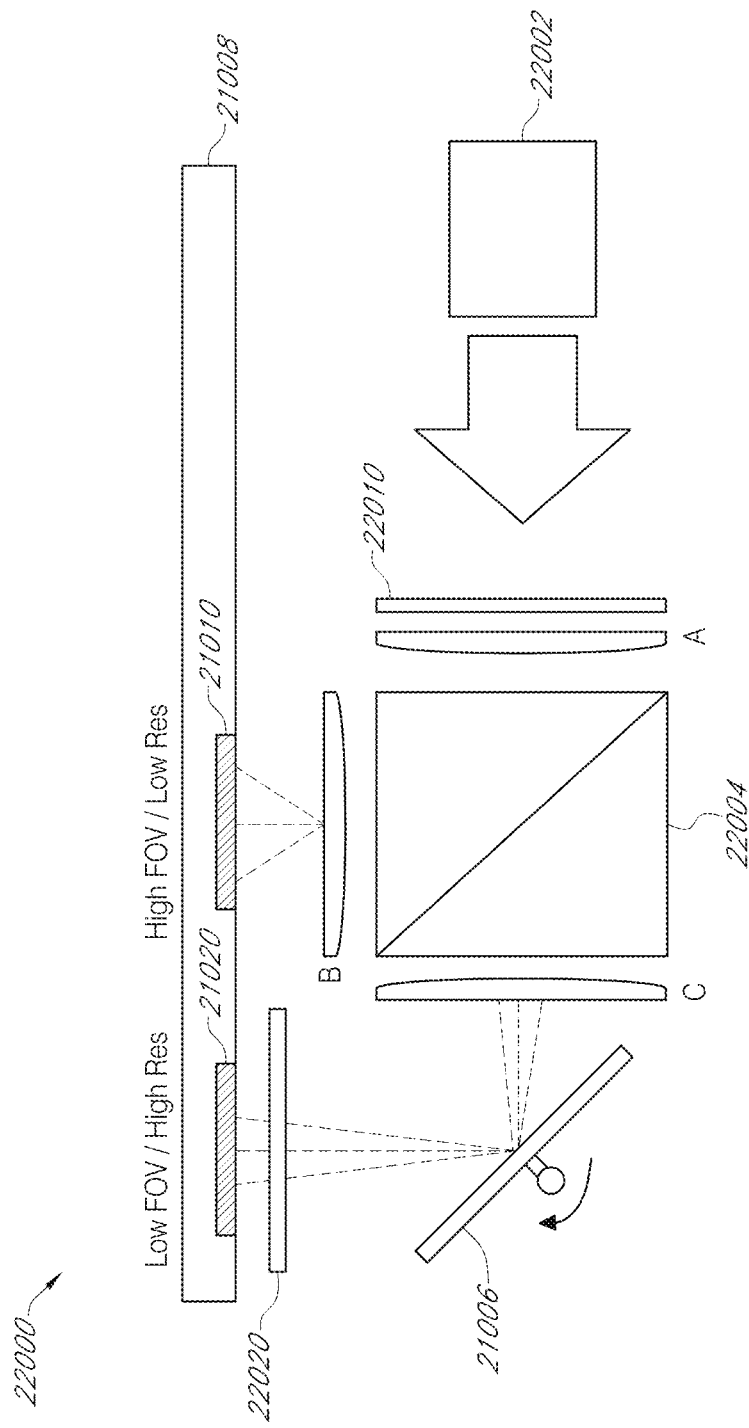
FIG. 44 illustrates schematically a display system for projecting image streams to an eye of a user.

FIG. 44 illustrates schematically a display system 22000 for projecting image streams to an eye of a user according to some embodiments. The display system 22000 may share some elements in common with the display system 8000 illustrated in FIGS. 30A-30B; the description about those elements in relation to FIGS. 30A-30B are applicable here as well. The high-FOV low-resolution image stream and the low-FOV high-resolution image stream provided by the image source 22002 can be time-division multiplexed and can be in a given polarized state.

The display system 22000 can include a switchable polarization rotator 22010 (e.g., ferroelectric liquid-crystal (FLC) cell with a retardation of half a wave). The operation of the switchable polarization rotator 22010 can be electronically programed to be synchronized with the frame rates of the high-FOV low-resolution image stream and the low-FOV high-resolution image stream in the time-division multiplexing (e.g., as illustrated in FIG. 42), so that the switchable polarization rotator 22010 does not rotate (or rotates by a very small amount) the polarization of the high-FOV low-resolution image stream, and rotates the polarization of the low-FOV high-resolution image stream by about 90 degrees (i.e., introducing a phase shift of $\pi$), or vice versa. Therefore, after passing through the switchable polarization rotator 22010, the polarization of the high-FOV low-resolution image stream may be orthogonal to the polarization of the low-FOV high-resolution image stream. For example, the high-FOV low-resolution image stream can be s-polarized, and the low-FOV high-resolution image stream can be p-polarized, or vice versa. In other embodiments, the high-FOV low-resolution image stream can be left-handed circularly polarized, and the low-FOV high-resolution image stream can be right-handed circularly polarized, or vice versa.

The display system 22000 can include a polarization beam splitter 22004 for separating light beams into a first light beam associated with the high-FOV low-resolution image stream propagating along a first optical path toward the first ICG 21010, and a second light beam associated with the low-FOV high-resolution image stream propagating along a second optical path toward the second ICG 21020.

The display system 22000 can also include a static polarization rotator 22020 positioned along one of the two optical paths, for example along the second optical path as illustrated in FIG. 44. The static polarization rotator 22020 can be configured to rotate the polarization of one of the low-FOV high-resolution image stream and the high-FOV low-resolution image stream, so that the two image streams may have substantially the same polarization as they enter the first ICG 21010 and the second ICG 21020, respectively. This may be advantageous in cases where the first ICG 21010 and the second ICG 21020 are designed to have a higher diffraction efficiency fora certain polarization. The static polarization rotator 22020 can be, for example, a half-wave plate.

Figure 45:
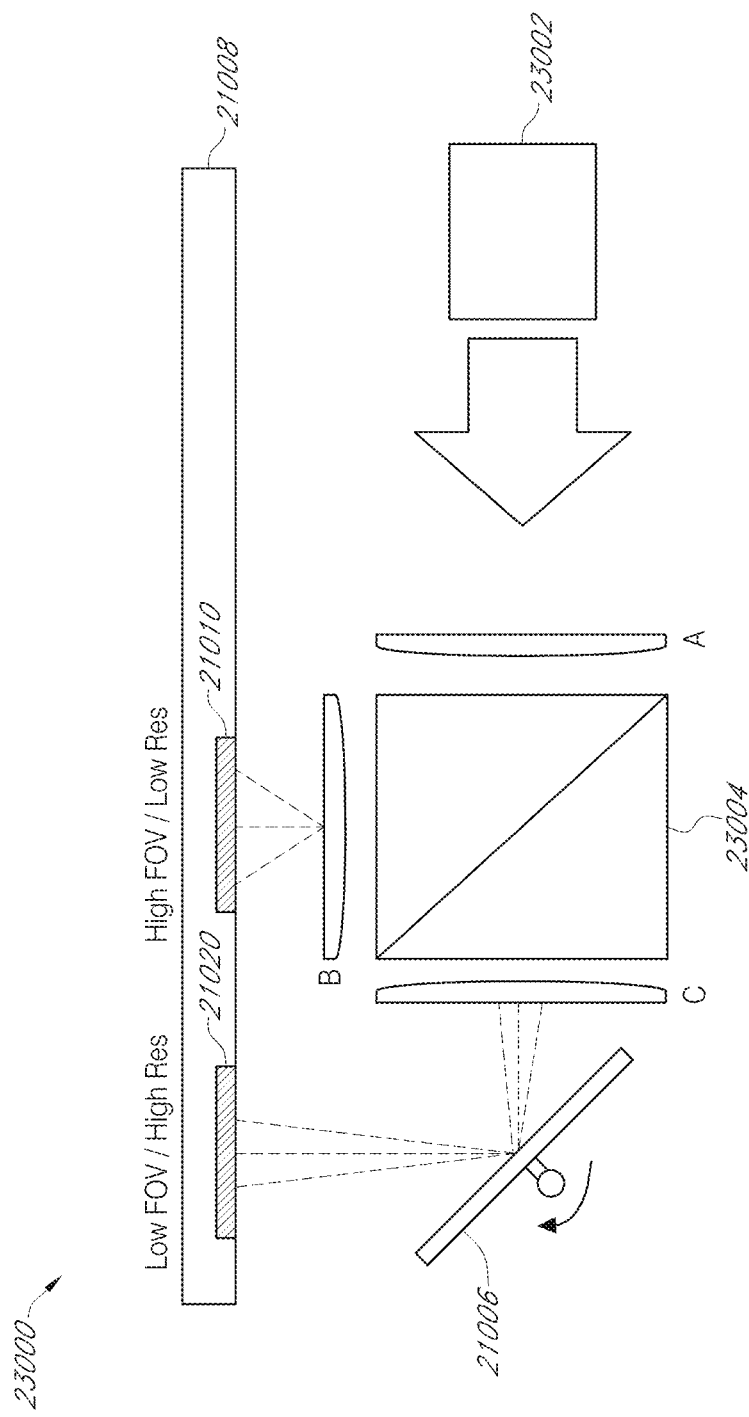
FIG. 45 illustrates schematically a display system for projecting image streams to an eye of a user.

FIG. 45 illustrates schematically a display system 23000 for projecting image streams to an eye of a user according to some embodiments. The display system 23000 may share some elements in common with the display system 8000 illustrated in FIGS. 30A-30B; the description about those elements in relation to FIGS. 30A-30B are applicable here as well. An image source 23002 can be configured to provide a high-FOV low-resolution image stream and a low-FOV and high-resolution image stream that are time-division multiplexed.

Here, instead of a beam splitter, the display system 23000 includes a switchable reflector 23004. The switchable reflector 23004 can be switched to a reflective mode where an incident light beam is reflected, and to a transmission mode where an incident light beam is transmitted. The switchable reflector may include an electro-active reflector comprising liquid crystal embedded in a substrate host medium such as glass or plastic. Liquid crystal that changes refractive index as a function of an applied current may also be used. Alternatively, lithium niobate may be utilized as an electro-active reflective material in place of liquid crystal. The operation of the switchable reflector 23004 can be electronically programed to be synchronized with the frame rates of the high-FOV low-resolution image stream and the low-FOV high-resolution image stream in the time-division multiplexing (for example as illustrated in FIG. 42), so that the switchable reflector 23004 is in the reflective mode when the high-FOV low-resolution image stream arrives, and in the transmission mode when the low-FOV high-resolution image stream arrives. Thus, the high-FOV low-resolution image stream can be reflected by the switchable reflector 23004 along the first optical path toward the first ICG 21010; and the low-FOV high-resolution image stream can be transmitted by the switchable reflector 23004 along the second optical path toward the second ICG 21020.

Alternatively, the switchable reflector 23004 can be replaced by a dichroic mirror configured to reflect light in a first set of wavelength ranges, and to transmit light in a second set of wavelength ranges. The image source 23002 can be configured to provide the high-FOV low-resolution image stream in the first set of wavelength ranges, and the low-FOV high-resolution image stream in the second set of wavelength ranges. For example, the first set of wavelength ranges can correspond to the red, green, and blue (RGB) colors, and the second set of wavelength ranges can correspond to the RGB colors in a different hue than that of the first set of wavelength ranges. In some embodiments, the high-FOV low-resolution image stream and the low-FOV high-resolution image stream are time-division multiplexed, for example as illustrated in FIG. 42. In some other embodiments, the high-FOV low-resolution image stream and the low-FOV high-resolution image stream are presented simultaneously.

Polarization Multiplexing Scheme

In some embodiments, the high-FOV low-resolution image stream and the low-FOV high-resolution image stream can be polarization-division multiplexed. An image source can include a first set of RGB lasers for providing the high-FOV low-resolution image stream in a first polarization, and a second set of RGB lasers for providing the low-FOV high-resolution image stream in a second polarization different from the first polarization. For example, the high-FOV low-resolution image stream can be s-polarized, and the low-FOV high-resolution image stream can be p-polarized, or vice versa. Alternatively, the high-FOV low-resolution image stream can be left-handed circular polarized, and the low-FOV high-resolution image stream can be right-handed circular polarized, or vice versa.

Figure 46:
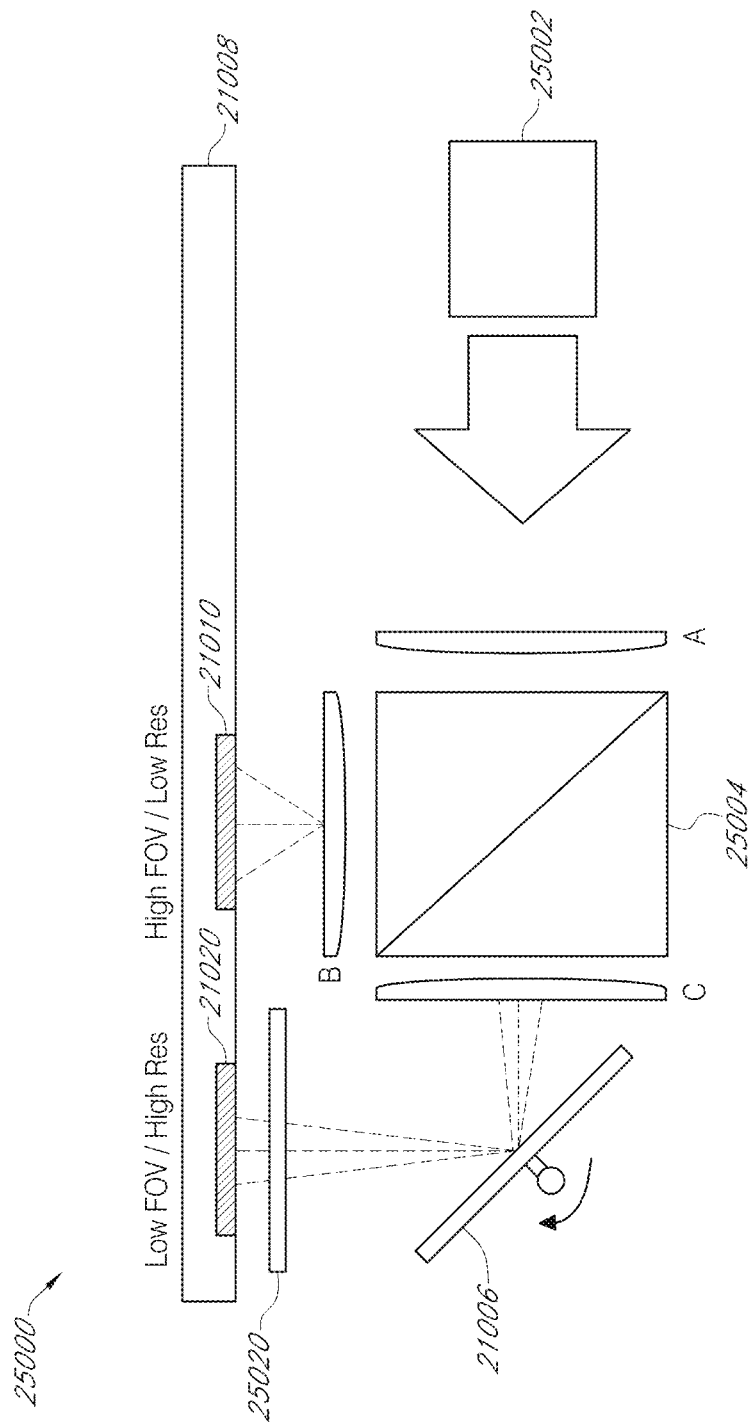
FIG. 46 illustrates schematically a display system for projecting image streams to an eye of a user.

FIG. 46 illustrates schematically a display system 25000 for projecting image streams to an eye of a user according to some embodiments. The display system 25000 may share some elements in common with the display system 8000 illustrated in FIGS. 30A-30B; the description about those elements in relation to FIGS. 30A-30B are applicable here as well. An image source 25002 can be configured to provide a high-FOV low-resolution image stream and a low-FOV and high-resolution image stream that are polarization-division multiplexed, as discussed above.

The display system 25000 can include a polarization beam splitter 25004 for separating light beams into a first light beam associated with the high-FOV low-resolution image stream propagating along a first optical path toward the first ICG 21010, and a second light beam associated with the low-FOV high-resolution image stream propagating along a second optical path toward the second ICG 21020.

The display system 25000 can also include a static polarization rotator 25020 positioned along one of the two optical paths, for example along the second optical path as illustrated in FIG. 46. The static polarization rotator 25020 can be configured to rotate the polarization of one of the low-FOV high-resolution image stream and the high-FOV low-resolution image stream, so that the two image streams may have substantially the same polarization as they enter the first ICG 21010 and the second ICG 21020, respectively. This may be advantageous in cases where the first ICG 21010 and the second ICG 21020 are designed to have a higher diffraction efficiency fora certain polarization. The static polarization rotator 25020 can be, for example, a half-wave plate.

V. Optical Architectures for Incoupling Images Projected into Opposing Sides of the Eyepiece In some embodiments, instead of having two ICGs laterally separated from each other (i.e., having separate pupils), a display system can be configured so that the high-FOV low-resolution image stream and the low-FOV high-resolution image stream are incident on opposing sides of the same ICG (i.e., having a single pupil).

Figure 47:
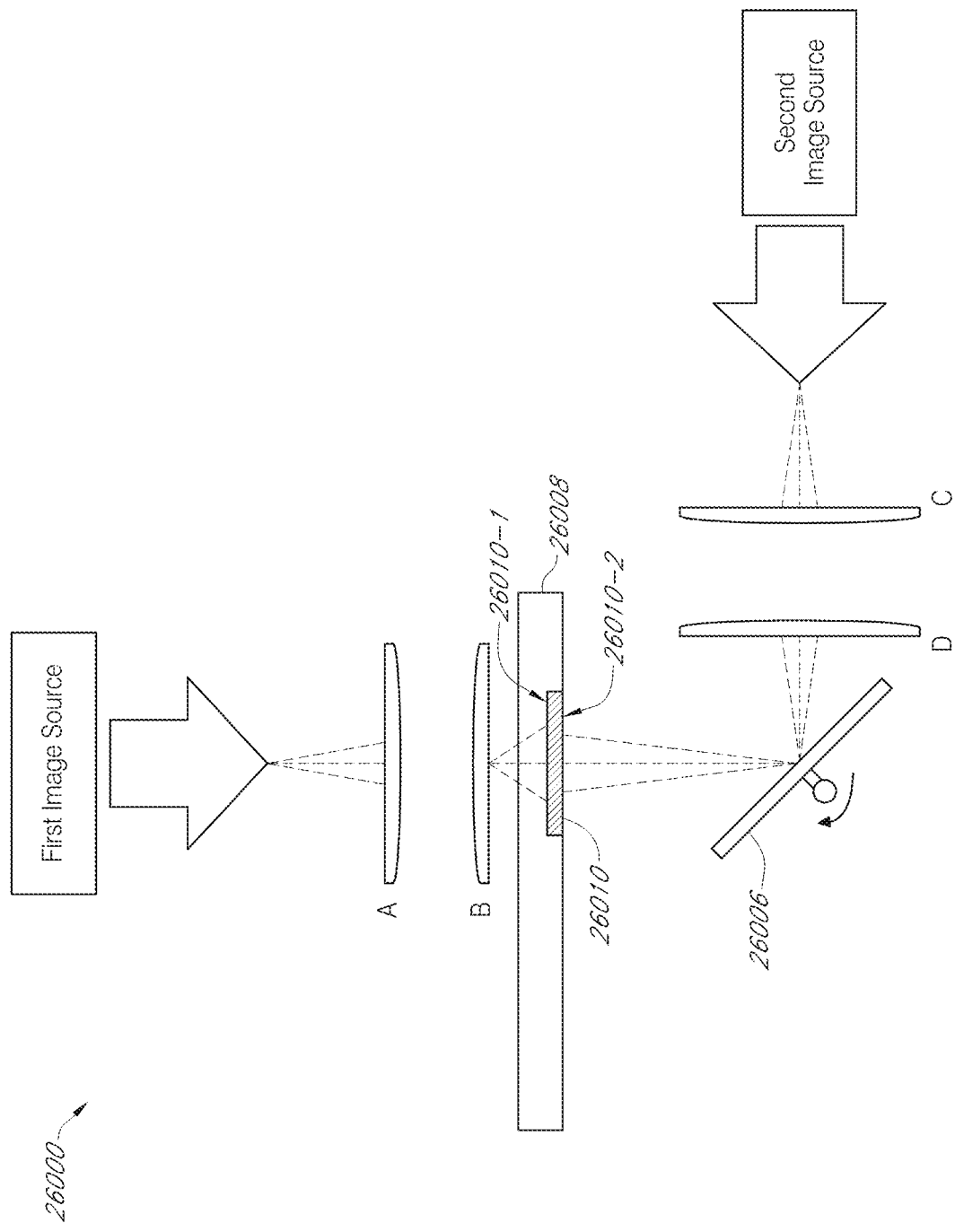
FIG. 47 illustrates schematically a display system for projecting image streams to an eye of a user.

FIG. 47 illustrates schematically a display system 26000 for projecting image streams to an eye of a user according to some embodiments. The display system 26000 can include a first image source 26002 configured to provide a high-FOV low-resolution image stream, and a second image source 26004 configured to provide a low-FOV high-resolution image stream.

The display system 26000 can also include a first optical lens (lens A) and a second optical lens (lens B) positioned along a first optical path of the high-FOV low-resolution image stream. In some embodiments, the combination of the first optical lens and the second optical lens can provide an angular magnification that is greater than unity for a first light beam associated with the high-FOV low-resolution image stream, thereby resulting in a wider FOV for the first light beam.

The display system 26000 also includes an eyepiece 26008 and an in-coupling grating (ICG) 26010 coupled to the eyepiece 26008. The eyepiece 26008 can be a waveguide plate configured to propagate light therein. The ICG 26010 can be a diffractive optical element configured to diffract a portion of the light incident thereon into the eyepiece 26008. As the first light beam associated with the high-FOV low-resolution image stream is incident on a first surface 26010-1 of the ICG 26010, a portion of the first light beam is diffracted into the eyepiece 26008 in a reflection mode (e.g., a first order reflection), which may then be subsequently propagated through the eyepiece 26008 and be out-coupled toward an eye of a user.

The display system 26000 can also include a third optical lens (lens C) and a fourth optical lens (lens D) positioned along a second optical path of the low-FOV high-resolution image stream. In some embodiments, the combination of the third optical lens and the fourth optical lens can provide an angular magnification that is equal substantially to unity or less than unity for a second light beam associated with the low-FOV high-resolution image stream. Thus, the second light beam may have a narrower FOV than that of the first light beam.

The display system 26000 can further include a foveal tracker 26006, such as a scanning mirror (e.g., a MEMs mirror), that can be controlled based on the fixation position of the user's eye for dynamically projecting the second light beam associated with the low-FOV and high-resolution image stream.

The second light beam associated with the low-FOV high-resolution image stream may be incident on the second surface 26010-1 of the ICG 26010 opposite the first surface 26010-2. A portion of the second light beam can be diffracted into the eyepiece 2408 in a transmission mode (e.g., a first order transmission), which may then be subsequently propagated through the eyepiece 26008 and be out-coupled toward the eye of the user.

As described above, the display system 26000 uses a single ICG 26010, instead of two separate ICGs as illustrated in FIGS. 43-46. This can simplify the design of the eyepiece.

Figure 48:
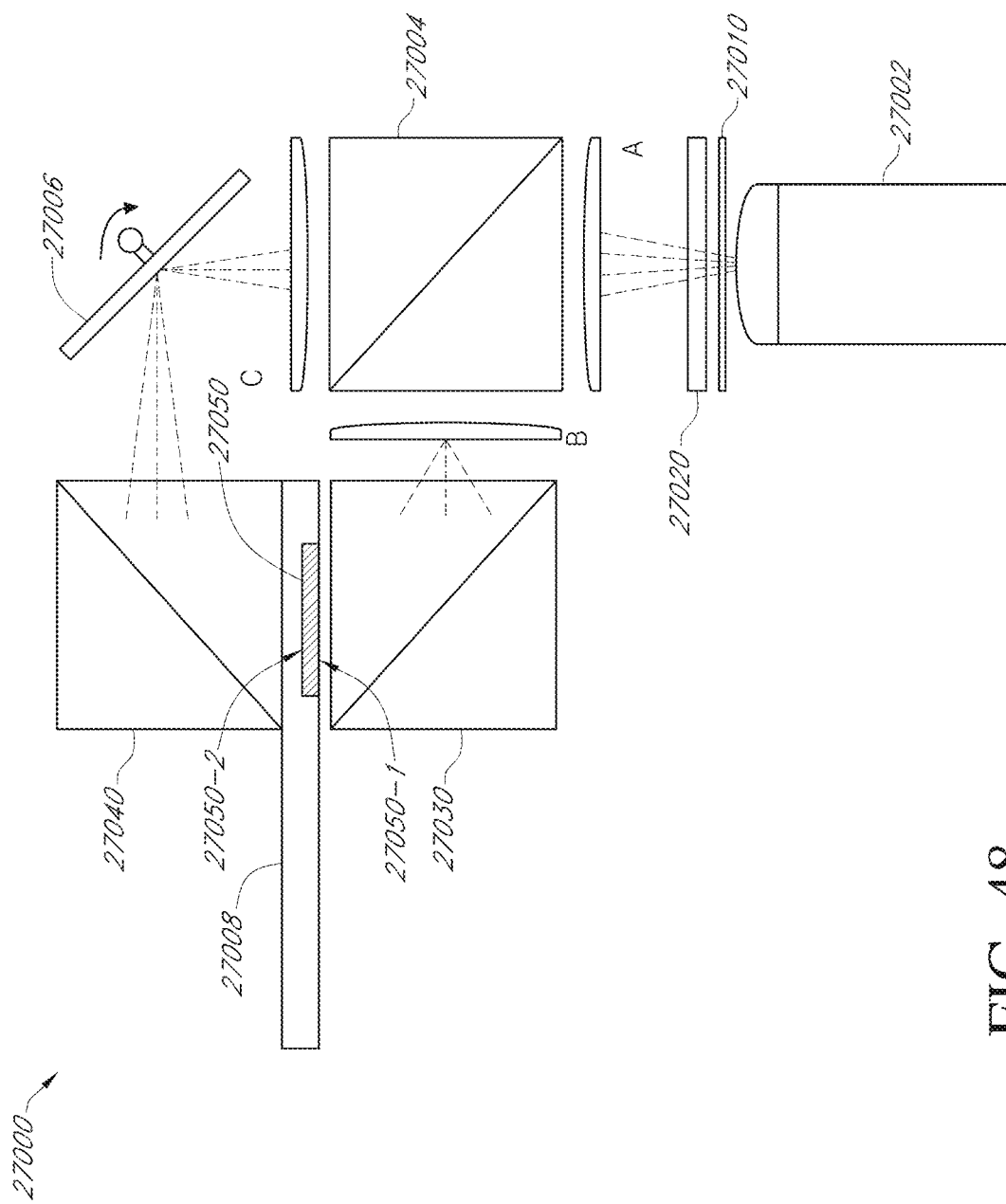
FIG. 48 illustrates schematically a display system for projecting image streams to an eye of a user.

FIG. 48 illustrates schematically a display system 27000 for projecting image streams to an eye of a user according to some embodiments. The display system 27000 may share some elements in common with the display system 8000 illustrated in FIGS. 30A-30B; the description about those elements in relation to FIGS. 30A-30B are applicable here as well. The display system 27000 can include an image source 27002 configured to provide a high-FOV low-resolution image stream and a low-FOV and high-resolution image stream that are time-division multiplexed. In some embodiments, the image source 27002 can take the form of a pico projector.

The display system 27000 can include a polarizer 27010 positioned downstream from the image source 27002 and configured to convert the high-FOV low-resolution image stream and the low-FOV and high-resolution image stream from an unpolarized state into a polarized state, such as S-polarized and P-polarized, or RHCP and LHCP polarized.

The display system 27000 can further include a switchable polarization rotator 27020 positioned downstream from the polarizer 27010. The operation of the switchable polarization rotator 27020 can be electronically programed to be synchronized with the frame rates of the high-FOV low-resolution image stream and the low-FOV high-resolution image stream in the time-division multiplexing, so that the switchable polarization rotator 27020 does not rotate (or rotates by a very small amount) the polarization of the high-FOV low-resolution image stream, and rotates the polarization of the low-FOV high-resolution image stream by about 90 degrees (i.e., introducing a phase shift of $\pi$), or vice versa. Therefore, after passing through the switchable polarization rotator 27020, the polarization of the high-FOV low-resolution image stream may be orthogonal to the polarization of the low-FOV high-resolution image stream. For example, the high-FOV low-resolution image stream can be s-polarized, and the low-FOV high-resolution image stream can be p-polarized, or vice versa. In other embodiments, the high-FOV low-resolution image stream can be left-handed circular polarized, and the low-FOV high-resolution image stream can be a right-handed circular polarized, or vice versa.

The display system 27000 further includes a polarization beam splitter 27004 configured to reflect the high-FOV low-resolution image stream along a first optical path, and to transmit the low-FOV high-resolution image stream along a second optical path.

The display system 27000 can further include a first optical lens (lens A) positioned in in front of the polarization beam splitter 27004, a second optical lens (lens B) positioned downstream from the polarization beam splitter 27004 along the first optical path, and a third optical lens (lens C) positioned downstream from the beam splitter 27004 along the second optical path. In some embodiments, as described above in relation to FIGS. 30A-30B and 31A-31C, the combination of the first optical lens (lens A) and the second optical lens (lens B) can provide an angular magnification for the high-FOV low-resolution image stream that is greater than unity; and the combination of the first optical lens (lens A) and the third optical lens (lens C) can provide an angular magnification for the low-FOV high-resolution image stream that equals substantially to unity or less than unity. Thus, the high-FOV low-resolution image stream may be projected to an eye of a user with a wider FOV than that projected by the low-FOV high-resolution image stream.

The display system 27000 can further include a foveal tracker 27006, such as a scanning mirror (e.g., a MEMs mirror), that can be controlled based on the fixation position of the user's eye for dynamically projecting the second light beam associated with the low-FOV and high-resolution image stream.

The display system 27000 can further include an eyepiece 27008 and an in-coupling grating (ICG) 27050 coupled to the eyepiece 27008. The eyepiece 27008 can be a waveguide plate configured to propagate light therein. The ICG 27050 can be a diffractive optical element configured to diffract a portion of the light incident thereon into the eyepiece 27008.

The display system 27000 can further include a first reflector 27030 positioned downstream from the second optical lens (lens B) along the first optical path. The first reflector 27030 can be configured to reflect the high-FOV low-resolution image stream toward the ICG 27050. As a first light beam associated with the high-FOV low-resolution image stream is incident on a first surface 27050-1 of the ICG 27050, a portion of the first light beam is diffracted into the eyepiece 27008 in a transmission mode (e.g., a first order transmission), which may subsequently propagate through the eyepiece 27008 and be out-coupled toward an eye of a user.

The display system 27000 can further include a second reflector 27040 positioned downstream from the foveal tracker 27006 along the second optical path. The second reflector 27040 can be configured to reflect the low-FOV high-resolution image stream toward the ICG 27050. As a second light beam associated with the low-FOV high-resolution image stream is incident on a second surface 27050-2 of the ICG 27050 opposite to the first surface 27050-1, a portion of the second light beam is diffracted into the eyepiece 27008 in a reflective mode (e.g., a first order reflection), which may subsequently propagate through the eyepiece 27008 and be out-coupled toward the eye of the user.

Figure 49:
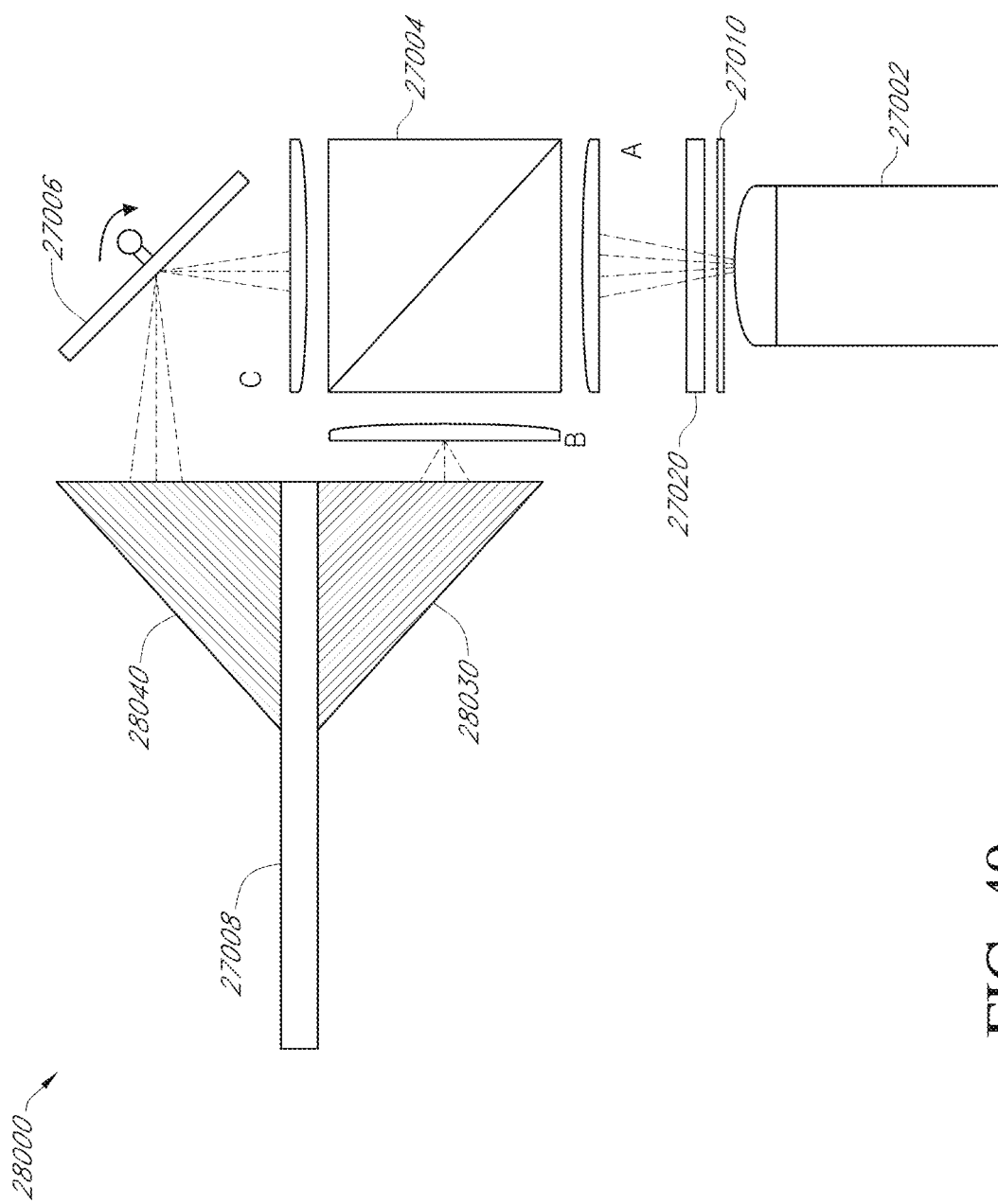
FIG. 49 illustrates schematically a display system for projecting image streams to an eye of a user.

FIG. 49 illustrates schematically a display system 28000 for projecting image streams to an eye of a user according to some embodiments. The display system 28000 is similar to the display system 27000, except that it does not include an ICG. Instead, the display system 28000 includes a first in-coupling prism 28030 (in place of the first reflector 27030 in the display system 27000) for coupling the high-FOV low-resolution image stream into the eyepiece 27008, and a second in-coupling prism 28040 (in place of the second reflector 27040 in the display system 27000) for coupling the low-FOV high-resolution image stream into the eyepiece 27008. The index of refraction of the first in-coupling prism 28030 and the index of refraction of the second in-coupling prism 28040 can be suitably selected with respect to the index of refraction of the eyepiece 27008, so that a fraction of the power contained in a first light beam associated with the high-FOV low-resolution image stream and a fraction of the power contained in a second light beam associated with the low-FOV high-resolution image stream are coupled into the eyepiece 27008 by the first in-coupling prism 28030 and the second in-coupling prism 28040, respectively.

VI. High Field of View and High Resolution Foveated Display using Overlapping Optical Paths In some embodiments, a display system may be configured so that the high-FOV low-resolution image stream and the low-FOV high-resolution image stream are provided to an eyepiece without utilizing a PBS to separate a composite image stream into two image streams that propagate in different directions. Rather, the high-FOV low-resolution image stream and the low-FOV high-resolution image stream may take substantially the same path from an image source to the eyepiece, which may obviate the PBS. This may have advantages for providing a compact form factor for the display system.

Figure 50:
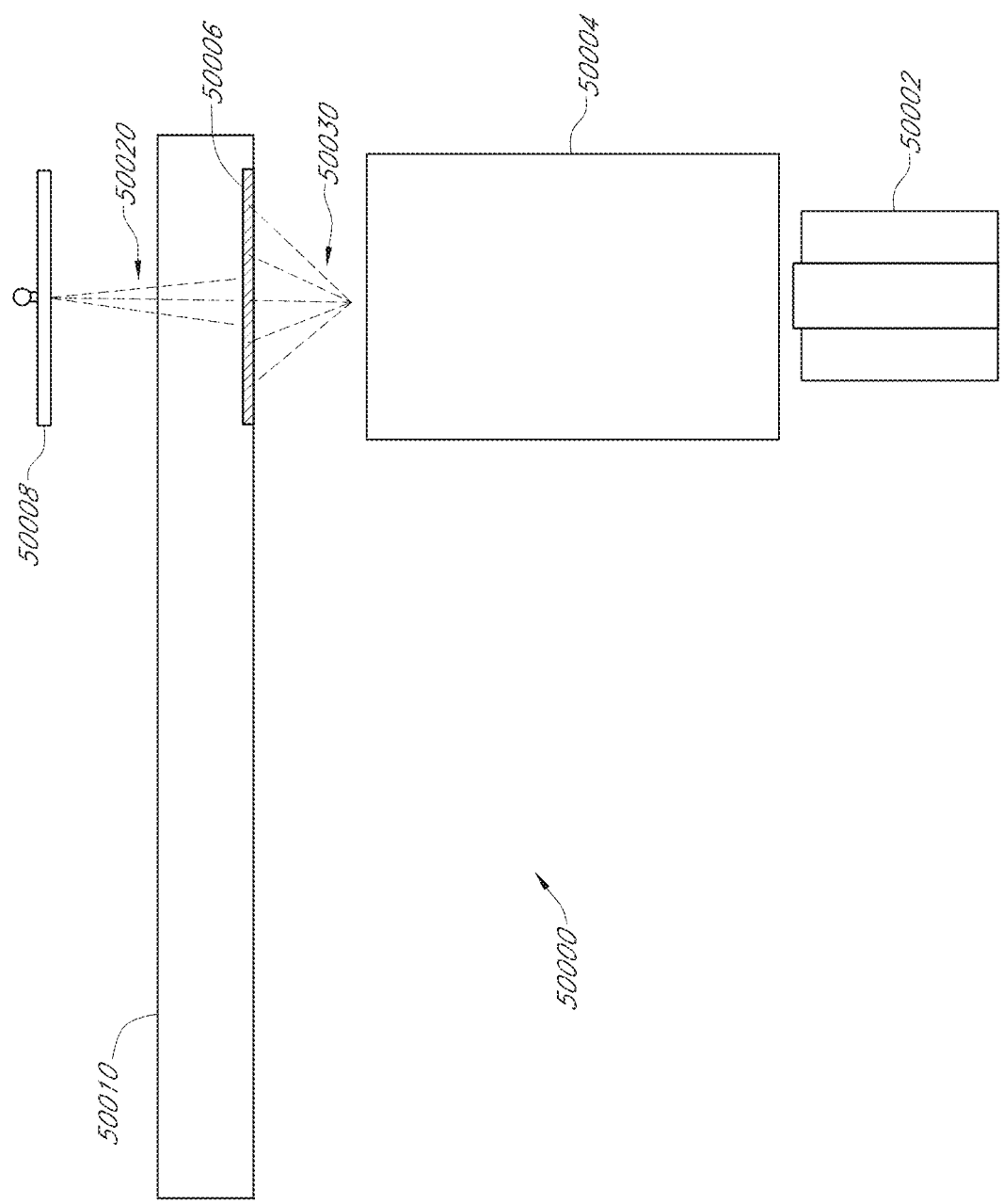
FIG. 50 illustrates schematically a display system for projecting image streams to an eye of a user according to some embodiments.

FIG. 50 illustrates schematically a display system 50000 for projecting image streams to an eye of a user. The display system 50000 may include an image source 50002 (sometimes referred to as a light source) configured to provide a high-FOV low-resolution image and also provide a low-FOV high-resolution image (using, e.g., a high-FOV low-pixel-density image stream and a low-FOV high-pixel-density image stream, respectively). In some embodiments, the image source 50002 may provide the high-FOV low-resolution image stream and the low-FOV high-resolution image stream in a time-multiplexed manner, such as by interleaving frames from the high-FOV low-resolution image stream with frames of the low-FOV high-resolution image stream.

The display system 50000 may also include variable optics 50004. In some embodiments, the variable optics 50004 may provide a different angular magnification for light rays 50030 associated with the high-FOV low-resolution image stream than for light rays 50020 associated with the low-FOV high-resolution image stream, thereby enabling projection of the high-FOV low-resolution image stream out of the waveguide 50010 to provide a wider FOV than that projected by the low-FOV high-resolution image stream. It will be appreciated that the range of angles at which in-coupled light is incident on the ICG 50006 is preferably preserved upon the out-coupling of that light from the waveguide 50010. Thus, in-coupled light incident on the ICG 50006 at a wide range of angles also propagates away from the waveguide 50010 at a wide range of angles upon being out-coupled, thereby providing a high FOV and more angular magnification. Conversely, light incident on the ICG 50006 at a comparatively narrow range of angles also propagates away from the waveguide 50010 at a narrow range of angles upon being out-coupled, thereby providing a low FOV and low angular magnification.

Additionally, to select the appropriate level of angular magnification, variable optics 50004 may alter light associated with the high-FOV low-resolution image stream so that it has a different optical property then light associated with the low-FOV high-resolution image stream. Preferably, the function of the variable optics 50004 and the properties of light of each image stream are matched such that changing the relevant property of the light changes the optical power and focal length provided by the variable optics 50004. For example, the high-FOV low-resolution image stream may have a first polarization and the low-FOV low-resolution image stream may have a second polarization. Preferably, the variable optics 50004 is configured to provide different optical power and different focal lengths for different polarizations of light propagating through it, such that the desired optical power may be selected by providing light of a particular, associated polarization. The first polarization may be a right hand circular polarization (RHCP), a left hand circular polarization (LFCP), S-polarization, P-polarization, another polarization type, or un-polarized. The second polarization may be a right hand circular polarization (RHCP), a left hand circular polarization (LFCP), S-polarization, P-polarization, another polarization type, or un-polarized, so long as it is different from the first polarization. In some preferred embodiments, the first polarization is one of a right hand circular polarization (RHCP) and a left hand circular polarization (LFCP), and the second polarization is the other of the left hand circular polarization (LFCP) and right hand circular polarization (RHCP).

In some embodiments, the operation of the variable optics 50004 may be electronically programed to be synchronized with the frame rates of the high-FOV low-resolution image stream and the low-FOV high-resolution image stream in the time-division multiplexing. In some embodiments, the image frames of the high-FOV stream are given their desired polarization and angular magnification to couple to waveguide 50010 via ICG 50006 while interleaved frames of the low-FOV stream are given their desired magnification and polarization to initially pass through ICG 50006, be passed to mirror 50008, be targeted to the user's fixation point, and then be coupled to waveguide 50010 via ICG 50006.

The display system 50000 also includes an eyepiece 50010 and a polarization-sensitive in-coupling grating (ICG) 50006 coupled to the eyepiece 50010. The eyepiece 50010 may be a waveguide, e.g., a plate plate, configured to propagate light therein, e.g., by total internal reflection. The polarization-sensitive ICG 50006 may be a polarization-sensitive diffractive optical element configured to diffract a portion of the light incident thereon into the eyepiece 50010. In some embodiments, the ICG 50006 may be polarization-sensitive in that incident light having a particular polarization is preferentially diffracted into the eyepiece 50010, while incident light of at least one other polarization passes through the ICG 50006. Light that passes through the ICG 50006 without coupling into the eye piece 50010 may be directed towards mirror 50008, which may be a MEMS mirror, and which may be configured to switch the polarization of incident light. As a first example, the polarization-sensitive ICG 50006 may couple light having a right-hand circular polarization (RHCP) into the waveguide, while passing light having a left-hand circular polarization (LHCP) through towards mirror 50008. As a second example, polarization-sensitive ICG 50006 may couple light having a LHCP into the waveguide, while passing light having a RHCP through towards mirror 50008.

In at least some embodiments, light reflected off of mirror 50008 may be directed towards ICG 50006. Additionally, the reflection of the light off mirror 50008 may alter the polarization of the light (e.g., flip the polarization of the light from RHCP to LHCP and vice versa) such that the reflected light has the desired polarization to be diffracted by ICG 50006 and coupled into eye piece 50010. As an example, if ICG 50006 is configured to couple light having a RHCP into eye piece 50010, then light associated with the high FOV stream may be given a RHCP by variable optics 50004 and then coupled into eye piece 50010. In such an example, light associated with the low FOV stream may be given a LHCP by variable optics 50004, such that the LHCP light may then pass through ICG 50006 without coupling into eyepiece 50001 and instead may be directed towards mirror 50008. Reflection of the LHCP light off of the mirror 50008 may flip the polarization of the light to RHCP. Then, when the now-RHCP light hits ICG 50006, it may be coupled by ICG 50006 into eye piece 50010. Similar examples apply when ICG 50006 is configured to couple LHCP into eye piece 50010.

As disclosed herein, mirror 50008 may be a movable mirror, e.g., a scanning mirror, and may function as a fovea tracker. As also discussed herein, the mirror 50008 may be controlled and moved/tilted based on the determined fixation position of the user's eye. The tilting of the mirror 50008 may cause the reflected light to in-couple into the waveguide 500010 at different locations, thereby causing light to also out-couple at different locations corresponding to the location of the fovea of the user's eye.

With continued reference to FIG. 50, the light source 50002 may produce a high-FOV low-resolution (HFLR) image stream and a low-FOV high-resolution (LFHR) image stream in a time-multiplexed manner. Additionally, the variable optics 50004 may alter the HFLR image stream to have a particular polarization (such as RHCP) (and associated angular magnification) so that the HFLR image stream is coupled into waveguide 50010 by polarization-sensitive ICG 50006. The variable optics may alter the LFHR image stream to have a different polarization (such as LHCP) and associated angular magnification. As a result, the LFHR image stream passes through polarization-sensitive ICG 50006, reflects off of mirror 50008 (flipping the polarization to RHCP and targeting the LFHR images to a user's fixation position), and is then coupled into waveguide 50010 by ICG 50006.

Figure 51:
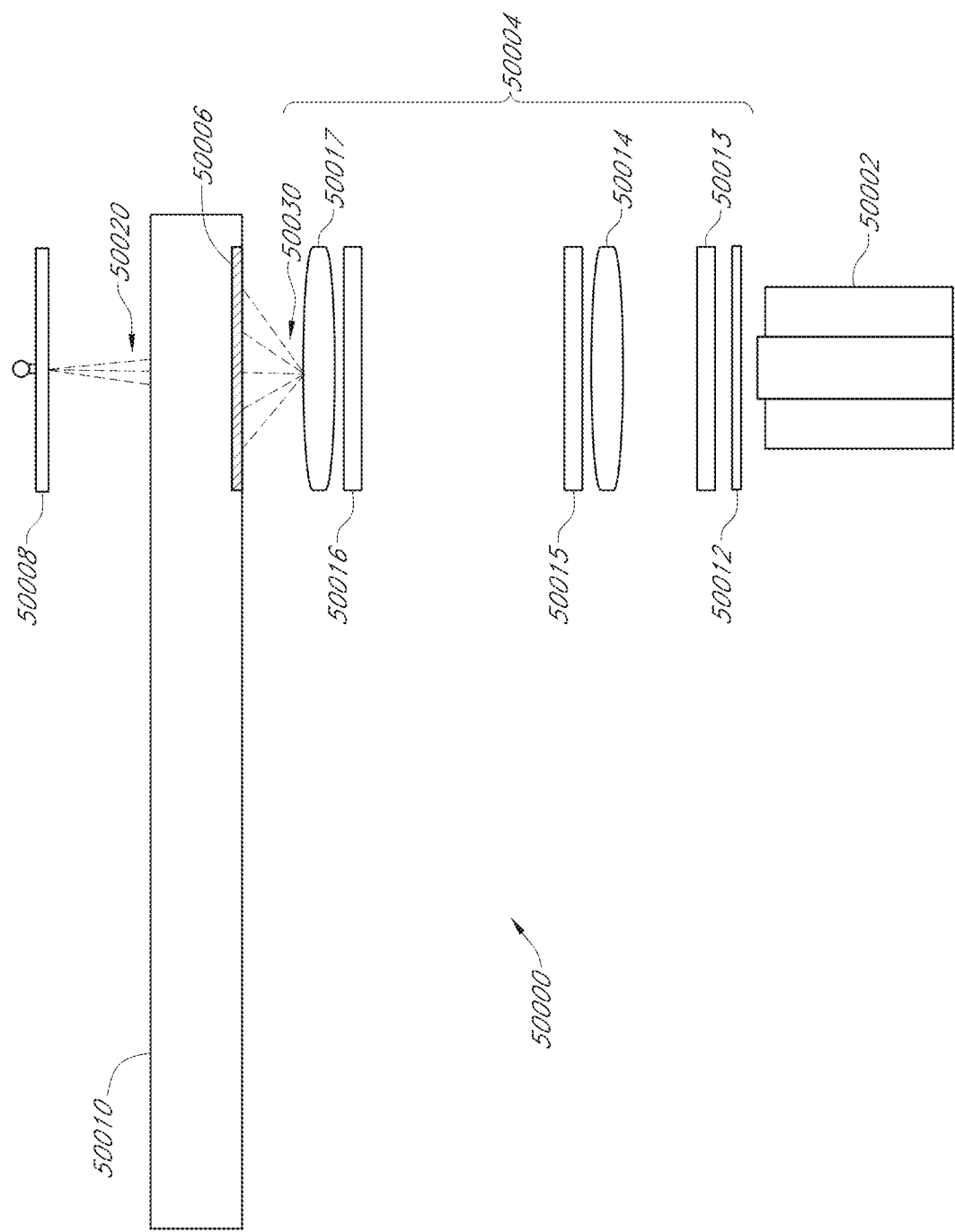
FIG. 51 illustrates schematically a display system for projecting image streams to an eye of a user according to some embodiments.

FIG. 51 illustrates an example of an implementation of variable optics 50004. As shown in FIG. 51, variable optics 50004 may be formed from polarizer 50012, switchable quarter wave plate (QWP) 50013, lens 50014, diffractive waveplate lens 50015, diffractive waveplate lens 50016, and lens 500017. This is merely one possible implementation of variable optics 50004.

The polarizer 50012 may be configured to convert the high-FOV low-resolution image stream and the low-FOV high-resolution image stream from light source 50002 from an unpolarized state into a polarized state, such as S-polarized and P-polarized, or RHCP and LHCP polarized.

The switchable QWP 50013 may be configured to convert the polarized light from polarizer 50012 into either (1) a right-hand circular polarization (RHCP) or (2) a left-hand circular polarization (LHCP).

After exiting the QWP 50013, the light may be incident on lens 50014 and diffractive waveplate lens 50015. The diffractive waveplate lens 50015 may be a geometric phase lens including patternwise aligned liquid crystal material. Diffractive waveplate lens 50015 may have a positive optical power (e.g., be a positive lens) for circularly polarized light that has a handedness (RH or LH) that matches their handedness and may have a negative optical power (e.g., be a negative lens) for circularly polarized light of opposite handedness. Diffractive waveplate lens 50015 may also have the property that it reverses the handedness of circularly polarized light. Thus, if diffractive waveplate lens 50015 is right-handed and receives RHCP light from lens 500014, the diffractive waveplate lens 50015 would act as a positive lens and the light would be left-handed after passing through diffractive waveplate lens 50015.

After exiting the diffractive waveplate lens 50015, the light will be incident on diffractive waveplate lens 50016 and then lens 50017. Diffractive waveplate lens 50016 may operate in a manner similar to that of diffractive waveplate lens 50015. Additionally, the handedness of diffractive waveplate lens 50016 may match that of diffractive waveplate lens 50015, at least in some embodiments. With such an arrangement, the optical power of the diffractive waveplate lens 50016 will be opposite that of diffractive waveplate lens 50015. Thus, in an example in which the switchable QWP 50013 provides light with a polarization matching diffractive waveplate lens 50015, lens 50015 will have a positive optical power and will also reverse the handedness of the light. Then, when the subsequent diffractive waveplate lens 50016 receives the light, lens 50015 will have a negative optical power, as it receives the light after its handedness was reversed.

With an arrangement of the type shown in FIG. 51, the variable optics 50004 may provide a first angular magnification when the switchable QWP 50013 provides light matching the handedness of diffractive waveplate lens 50015 (e.g., such that lens 50015 provides a positive optical power, while lens 50016 provides a negative optical power) and may provide a second angular magnification when the switchable QWP 50013 provides light of opposite handedness (e.g., such that lens 50015 provides a negative optical power, while lens 50016 provides a positive optical power). In other embodiments, the handedness of the two diffractive waveplate lens 50015 and 50016 may be different.

Figure 52A:
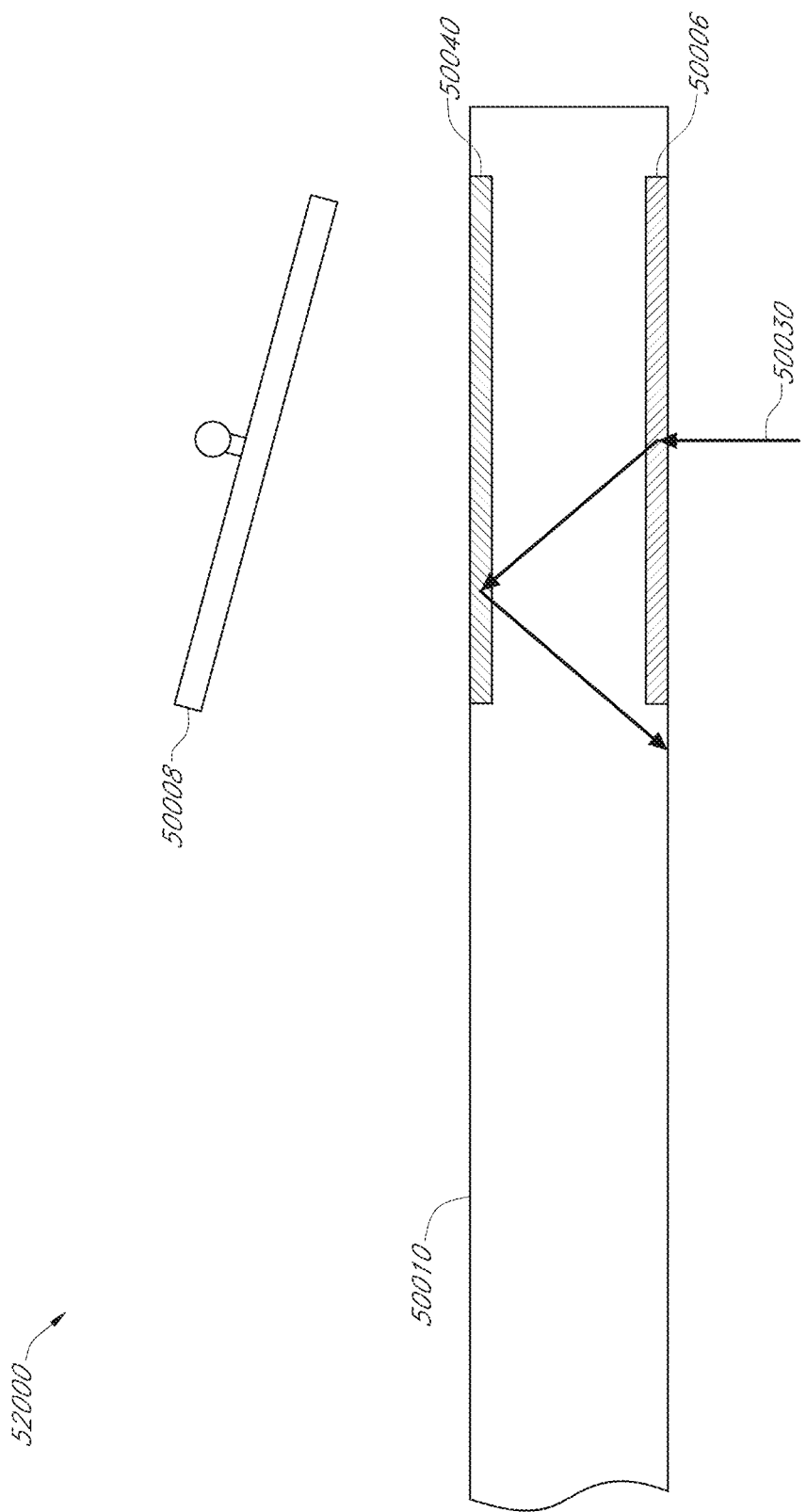
FIGS. 52A-52B illustrate schematically a display system for projecting image streams to an eye of a user according to some embodiments.
Figure 52B:
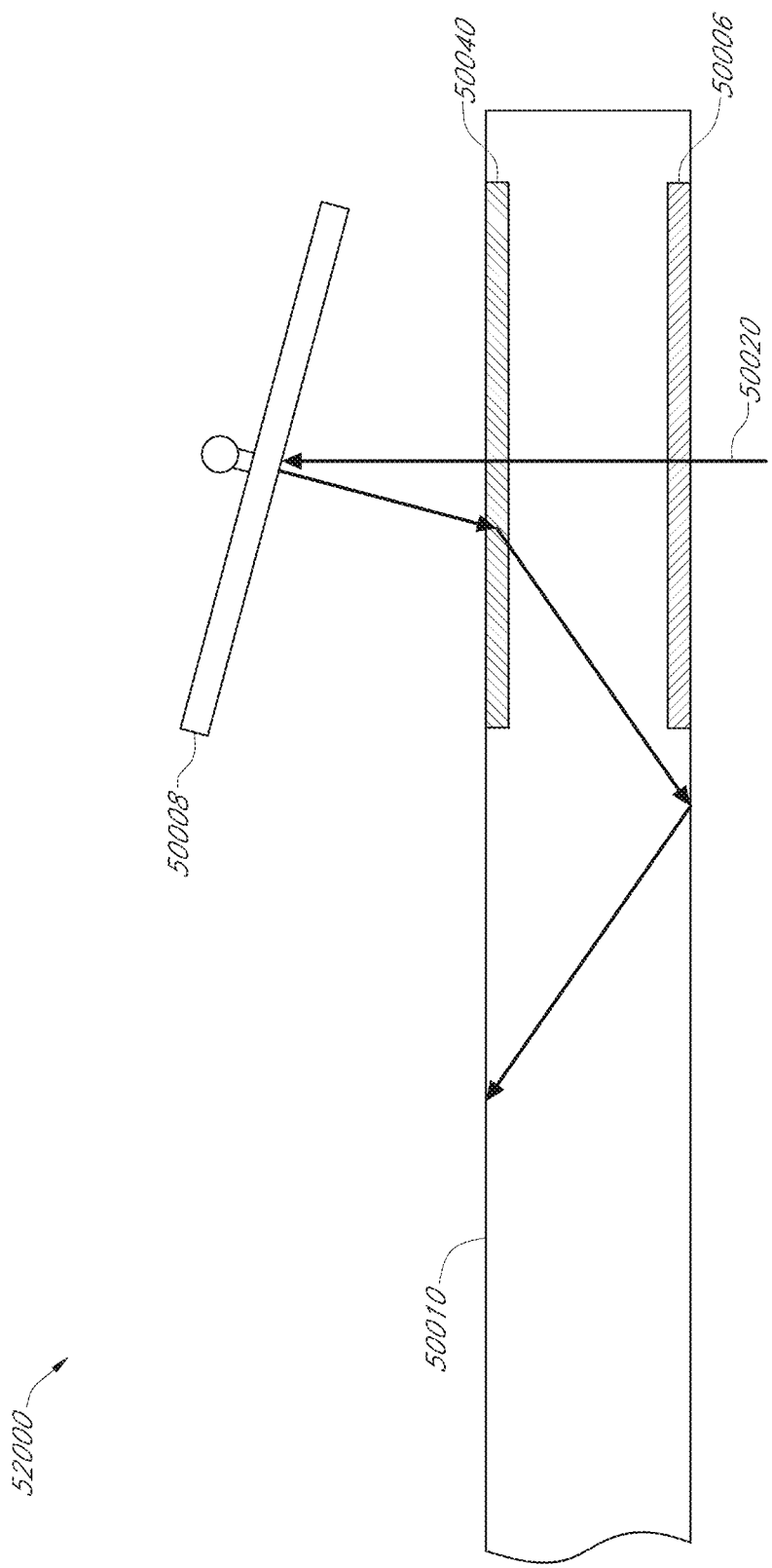

With reference now to FIGS. 52A-52B, additional details regarding example ICG configurations are provided. For example, it will be appreciated that polarization sensitive ICG's may preferentially direct light in a particular lateral direction depending upon which side of the ICG the light is incident. For example, with reference to FIG. 52A, light incident on ICG 50006 from below is redirected to the left of the page. However, light incident on ICG 50006 from above would be undesirably directed towards the right of the page, away from the area of the waveguide from which light is out coupled to a viewer. In some embodiments, in order to in-couple light such that it propagates in the desired direction, different ICG's may be used for light incident from different directions or sides of the waveguide 50010.

For example, in some embodiments, the display system may be configured so that the high-FOV low-resolution image stream and the low-FOV high-resolution image stream are coupled into waveguide 50010 (which may be an eyepiece) using a pair of a polarization-sensitive in-coupling gratings (ICG) 50006 and 50040. Such an arrangement may be beneficial where, e.g., light that strikes an ICG from below (in the perspective of FIGS. 50-53B) is coupled into the waveguide 50010 in a desired lateral direction (to the left), while light that strikes the ICG from above is coupled into the waveguide 50010 in the opposite direction (to the right). More details about in-coupling gratings (ICG) gratings are described in U.S. patent application Ser. No. 15/902,927, the contents of which are hereby expressly and fully incorporated by reference in their entirety, as though set forth in full.

FIGS. 52A-52B illustrate schematically a display system 52000 for projecting image streams to an eye of a user according to some embodiments of the present invention, which may include two ICGs 50006 and 50040. In some embodiments, ICGs 50006 and 50040 may both be configured to couple light of the same polarization-type into waveguide 50010. As an example, ICGs 50006 and 50040 may each couple light having a left-hand circular polarization (LHCP) into waveguide 50010, while passing light having a right-hand circular polarization (RHCP). Alternatively, the polarizations may be swapped.

As shown in FIG. 52A, optical elements such as those shown in FIGS. 50-51 may provide a high FOV low resolution image stream 50030 having a left-handed circular polarization (LHCP). The light 50030 may be incident upon ICG 50006. Since the light 50030 is LHCP and the ICG 50006 is configured to couple LHCP light into waveguide 50010, the light is coupled by ICG 50006 into the waveguide 50010.

As shown in FIG. 52B, optical elements such as those shown in FIGS. 50-51 may provide a low FOV high resolution image stream 50020 (which may be interleaved with the image stream of FIG. 52A in a time-multiplexed manner) having a right-handed circular polarization (RHCP). The light 50020 may be incident upon ICG 50006. However, since the light 50020 is RHCP and the ICG 50006 is configured to couple only LHCP light into waveguide 50010, the light 50020 passes through ICG 50006. ICG 50040 may, similarly, be configured to couple only LHCP light into waveguide 50010, thus the light may also pass through ICG 50040. After passing through both ICGs, the light 50020 may be incident on movable mirror 50008, which may be in a particular orientation based upon a user's fixation point (as discussed herein in various sections). After reflecting off of mirror 50008, the polarization of the light 50020 may be flipped, so the light is now LHCP. Then, the light 50020 may be incident on ICG 50040, which may couple the now-LHCP light 50020 into the waveguide 50010.

In some embodiments, the display system may be configured so that the high-FOV low-resolution image stream and the low-FOV high-resolution image stream are formed by light having the same polarization. As a result, both image streams may be in coupled by the same ICG, upon being incident on the same side of that ICG.

Figure 53A:
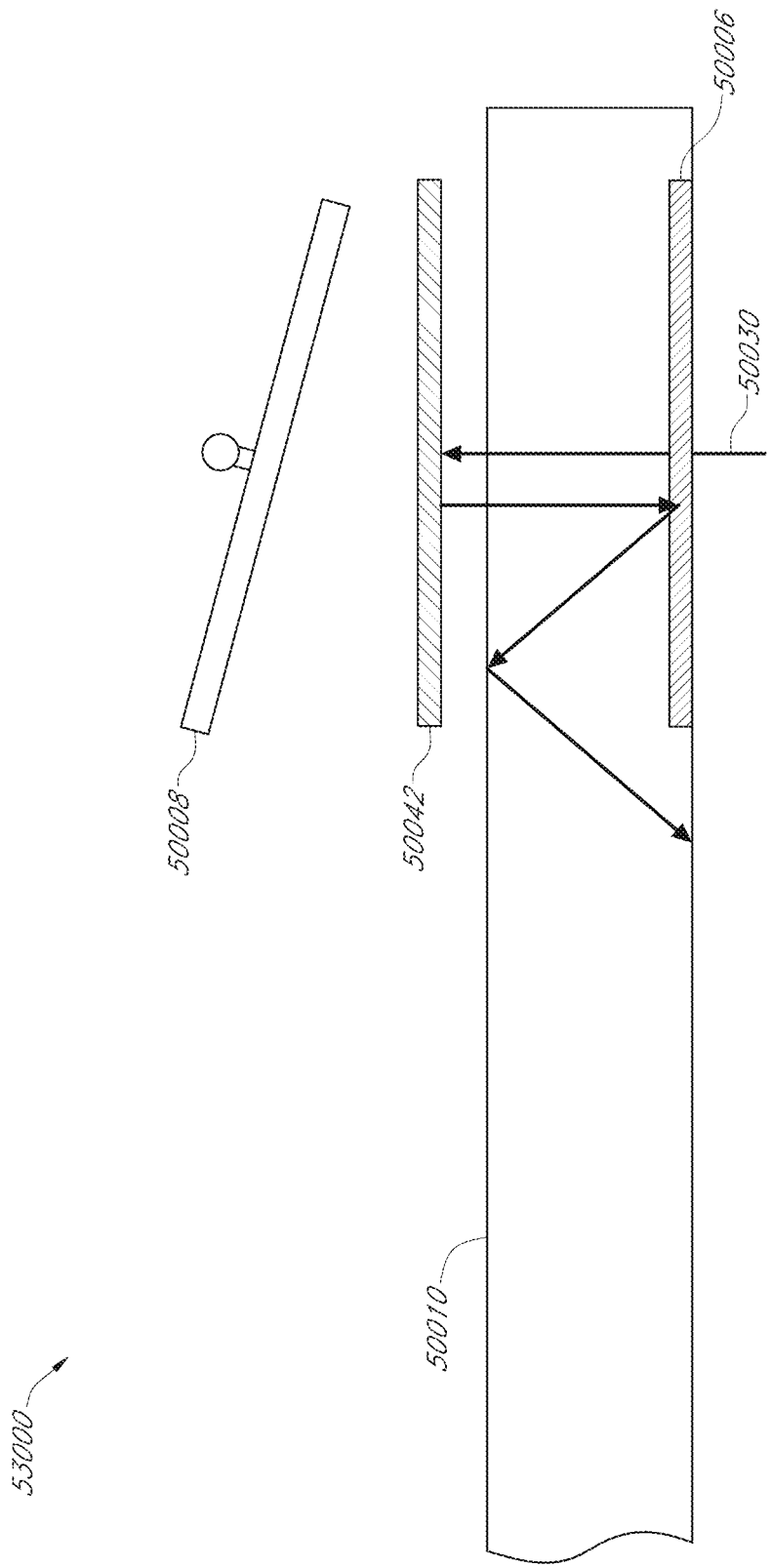
FIGS. 53A-53B illustrate schematically a display system for projecting image streams to an eye of a user according to some embodiments.
Figure 53B:
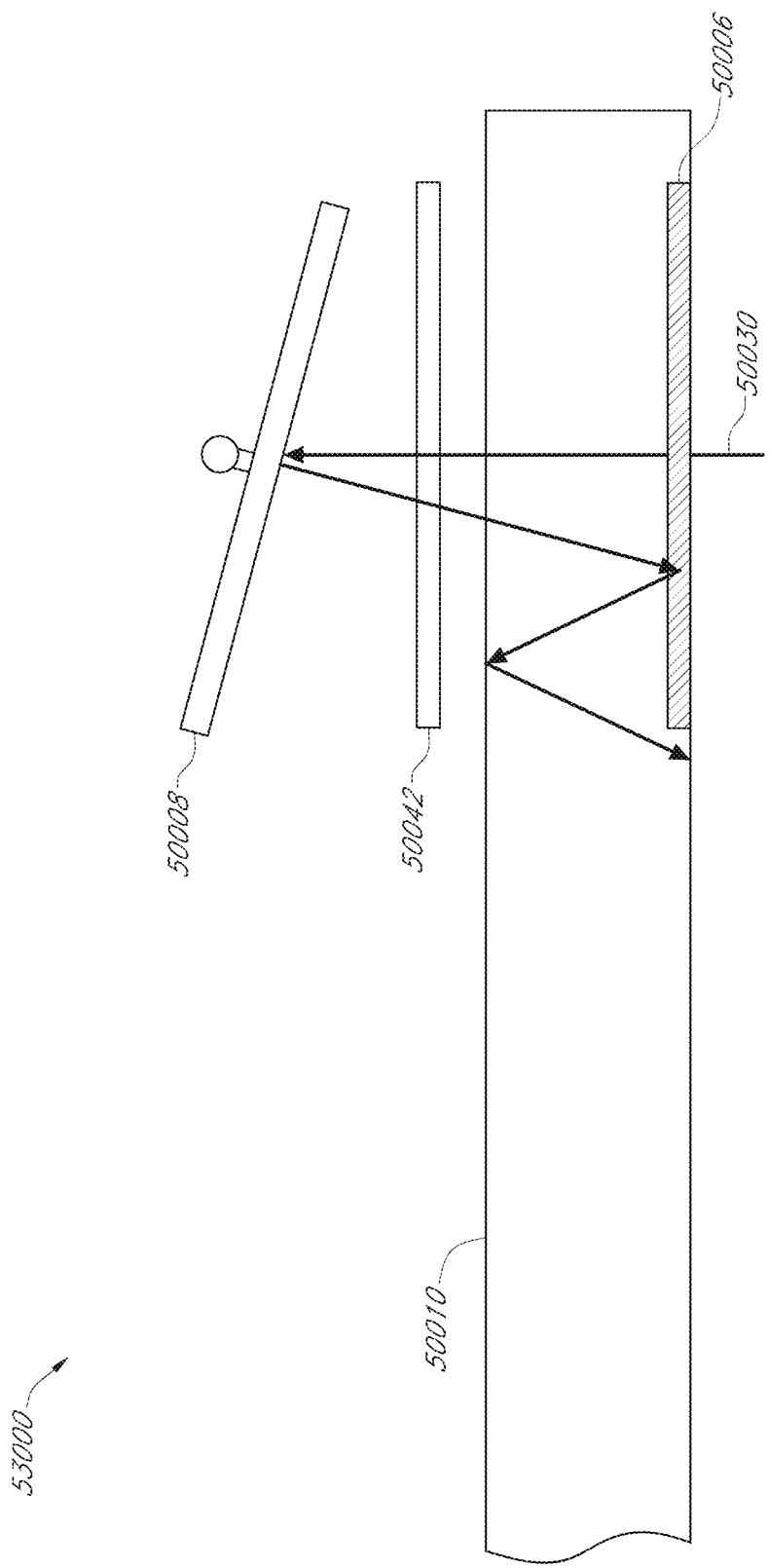

FIGS. 53A-53B illustrate schematically a display system 53000 for projecting image streams to an eye of a user according to some embodiments of the present invention, which may include a single ICG 50006 and a switchable reflector 50042. The switchable reflector 50042 may be a liquid-crystal based planar device that switches between a substantially transparent state and a substantially reflective state at a sufficiently high rate; that is, the switching rate of the switchable reflector 50042 is preferably sufficiently high to allow coordination with interleaved frames of the high-FOV low-resolution image stream and the low-FOV high-resolution image stream. For example, the switchable reflector 50042 is preferably able to switch between reflective and transmissive states at at least the same rate as the high and low-FOV resolution image streams are switched.

As shown in FIG. 53A, the ICG 50006 may receive a high FOV low resolution image stream 50030 from optical elements such as those shown in FIGS. 50-51. As an example, the image stream may have a left-handed circular polarization (LHCP). The light of the image stream 50030 may be incident upon ICG 50006. However, ICG 50006 may be configured to couple RHCP light and pass LHCP light. Thus, the LHCP light 50030 may pass through ICG 50006. The light may then be incident on switchable reflector 50042, which may be configured in its reflective state (while the system is projecting high FOV low resolution image stream 50030). Thus, the light of the image stream 50030 may reflect off of switchable reflector 50042, thereby reversing the handedness of its polarization. After reflecting off of switchable reflector 50042, the 50030 light may be incident again upon ICG 50006, and ICG 50006 may couple the now-RHCP light 50030 into the waveguide 50010.

As shown in FIG. 53B, optical elements such as those shown in FIGS. 50-51 may provide a low FOV high resolution image stream 50020 having a left-handed circular polarization (LHCP). This arrangement differs slightly, in that the polarization of the low FOV image stream 50020 matches the polarization of the high FOV image stream 50030. Such an arrangement may be achieved using a modification of the variable optics 50004 shown in FIGS. 50-51. As an example, an additional polarizer, e.g., a switchable polarizer, and may be provided between lens 50017 and ICG 50006.

Returning to the low FOV high-resolution LHCP light 50020 in FIG. 53B, the light 50020 is incident upon ICG 50006. However, ICG 50006 is configured to couple RHCP into waveguide 50010. Thus, the light 50020 passes through ICG 50006. The light 50020 is next incident upon the switchable reflector 50042, which may be configured to be in its transparent state (while the system is projecting low FOV high resolution light 50020). Thus the light may pass through switchable reflector 50042 and be incident upon mirror 50008 and, optionally, be targeted by mirror 50008 on a user's fixation point (as discussed herein in various sections). After reflecting off of mirror 50008, the polarization of the light 50020 may be flipped, so the light is now RHCP. Then, the light 50020 may be incident on ICG 50006, which may couple the now-RHCP light 50020 into the waveguide 50010. It will be appreciated that the mirror 50008 may be configured to provide fovea tracking and/or may be sufficiently spaced from the ICG 50006 to account for the different focal length of the wearable optics 50004 (FIGS. 50-51), to provide a focused image.

Three-Dimensional Foveated Rendering

As described herein, a wearable display system (e.g., the wearable display system 60) may present augmented or virtual reality content to a user. In an effort to reduce the processing power required to present the content (e.g., virtual content as described herein), and thus additionally to reduce power requirements, FIGS. 10A-23 and the related discussion describe adjusting various display characteristics of virtual content based on their respective three-dimensional locations within a user's field of view. For example, virtual content presented proximate to a three-dimensional location at which a user is fixating may be presented (e.g., rendered) at a high resolution. As another example, resolution of virtual content may be reduced based on a three-dimensional distance of the virtual content from the user's fixation point. By tying reductions in resolution to proximity to the user's three-dimensional fixation point, the system may advantageously limit an extent to which such reductions in resolution are perceptible, as discussed herein.

Resolution may encompass any modification to a virtual object to alter a quality of presentation of the virtual object. Such modifications may include one or more of adjusting a polygon count of the virtual object, adjusting primitives utilized to generate the virtual object (e.g., adjusting a shape of the primitives, for example adjusting primitives from triangle mesh to quadrilateral mesh, and so on), adjusting operations performed on the virtual object (e.g., shader operations), adjusting texture information, adjusting color resolution or depth, adjusting a number of rendering cycles or a frame rate, and so on, including adjusting quality at one or more points within a graphics pipeline of graphics processing units (GPUs). Additionally, in some embodiments, virtual content located proximate to a user's fixation point may be presented at a higher refresh rate than virtual content farther from the fixation point.

As described above, FIG. 10A illustrates a virtual object 1008A being located proximate to a user's fixation point (e.g., a three-dimensional vergence point 1006). In the example of FIG. 10A, the virtual object 1008A is presented (e.g., rendered) in high-resolution in a rendered frame 1010 to the user. In contrast, virtual object 1008B, which is located farther from the fixation point, is rendered in low resolution in the rendered frame 1010. To identify a resolution at which to render virtual content, the wearable display system may separate the user's field of view into different resolution adjustment zones. For example, FIG. 11A1 illustrates example resolution adjustment zones (also referred to herein as 'zones') encompassing different three-dimensional volumes of space within a user's field of view. As illustrated, each resolution adjustment zone may be assigned a particular resolution. In the example of FIG. 11A1, an assigned resolution represents a polygon count associated with rendering virtual content located within a resolution adjustment zone. FIGS. 11A2-11E illustrate some additional examples schemes to separate a user's three-dimensional field of view into resolution adjustment zones.

As described above, these resolution adjustment zones may be customized according to user settings. For example, a user may update a size, shape, location, and so on, of resolution adjustment zones. Additionally, applications or content may update the settings of these resolution adjustment zones. As an example, a first application may prefer that resolution sharply falls off based on distance to the user's fixation point. The first application may implement stark depth of field adjustment through blurring, applying bokeh, and so on, to virtual content located away from the user's fixation point. Therefore, the first application may provide cinematic effects to virtual content being presented to the user.

To ensure that adjustment of resolution has low perceptibility (e.g., is substantially imperceptible), the wearable display system may utilize empirically determined schemes to identify resolutions at which to render differently located virtual content. For example, a user utilizing the wearable display system may train the system based on the user's own visual perception. The wearable display system may present different types of virtual content to the user. The wearable display system may also customize presentation of these types based on responses received from the user. As another example, the wearable display system may utilize aggregated information from multitudes of users to identify a standard scheme to adjust resolution. FIGS. 54-59 describe techniques to determine shapes, sizes, and so on, of the resolution adjustment zones illustrated in FIGS. 11A1-11E. While the description below focuses on identifying an angular distance encompassed by a resolution adjustment zone, it should be understood that the description below may at least be applied to any of the zones described in FIGS. 11A1-11E.

Figure 54:
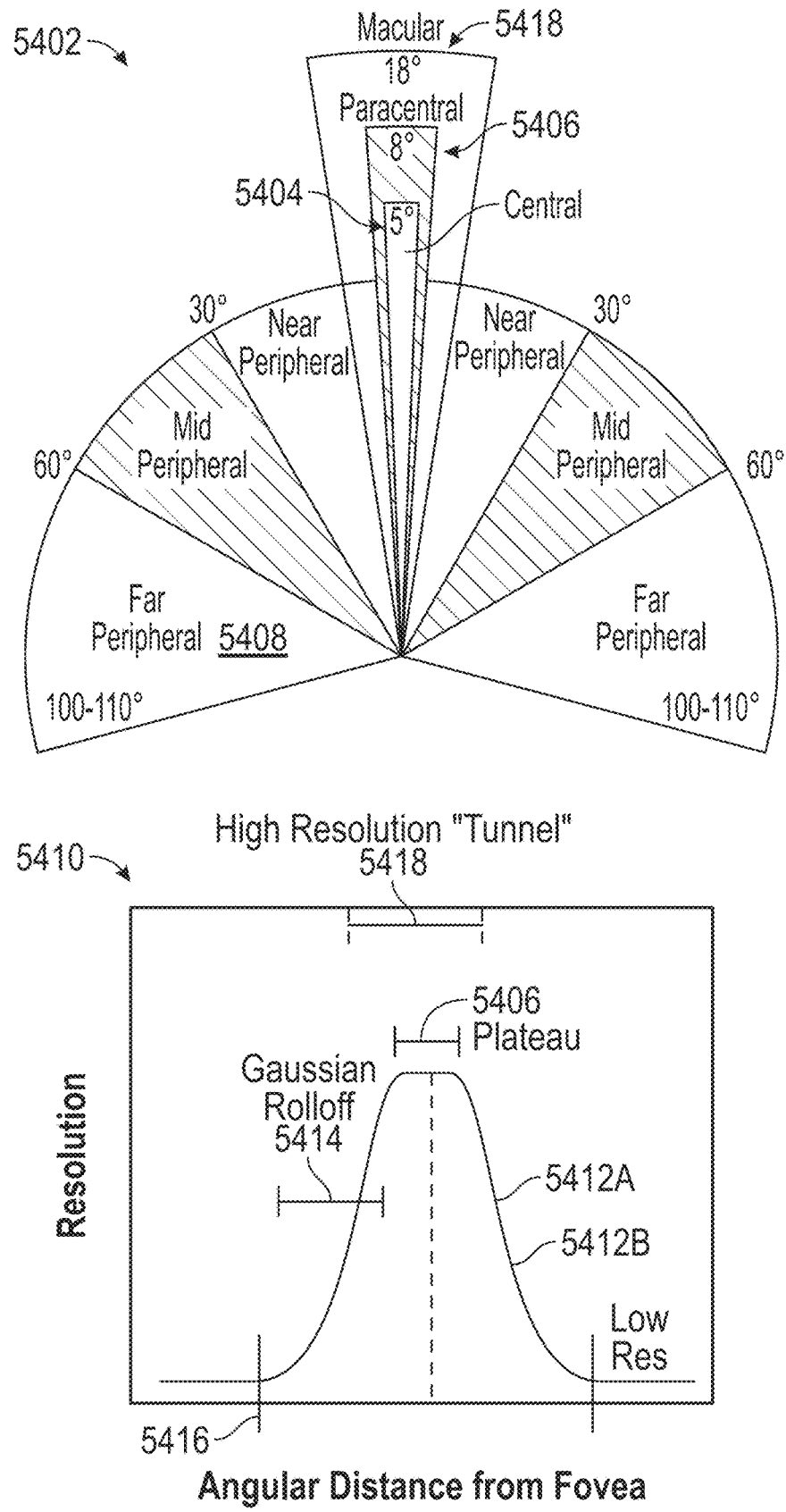
FIG. 54 illustrates a representation of an angular field of view of a user along with an example resolution distribution.

FIG. 54 illustrates a representation 5402 of an angular field of view of a user along with an example resolution distribution 5410. In this illustration, a user's field of view is separated according to angular distance from a center 5404 of the field of view. The center 5404 may correspond to a foveal region of the user's field of view, which in the example of FIG. 54 spans five degrees of the field of view. Thus, a user may be able to resolve and identify fine detail of virtual objects that fall within the center 5404. Other portions of the field of view (e.g., portion 5408) are located further from the center 5404 and a user may have reduced visual acuity with respect to virtual content in these portions. For example, a user may be unable to resolve fine details in virtual content presented in portion 5408. In this example, the user may rotate or adjust his/her eyes to fixate at this virtual content and thus shift center 5404. Thus, the virtual content may be presented closer to, or within, the center 5404.

The representation 5402 of the user's field of view 5402 may additionally encompass an entire three-dimensional volume of real-world space visible to the user; that is, the representation 5402 may be a slice of the user's field of view (e.g., along a z axis). Thus, the representation 5402 may extend along two axes (e.g., an X and Z axis). It should be understood that the representation 5402 may be extended along a remaining third axis (e.g., a Y axis) and the techniques described herein may still be utilized. For example, a zone referred to herein as a foveal zone 5406 (e.g., a zone for which virtual content is presented on a user's fovea) may be extended along the third axis.

Without being constrained by theory, a user may also have sufficient visual acuity to identify details of virtual content that falls outside of the foveal zone 5406. For example, the foveal zone 5406 may correspond to a fovea, but a high resolution zone 5418 may encompass virtual objects that fall within a threshold angular distance from the foveal zone 5406. The high resolution zone 5418, for example, may include the fovea, parafovea belt, parafovea outer region, and so on. As illustrated, the high resolution zone 5418 is represented as being eighteen degrees. Thus, reducing resolution of virtual content presented within this high resolution zone 5418 may be perceptible. The high resolution zone 5418 may therefore represent a high resolution region or tunnel for which virtual content is rendered at greater than a threshold resolution (e.g., a lowest resolution 5416). As will be described, virtual content presented within the high resolution zone 5418 may be rendered at reduced resolutions according to a resolution distribution 5410.

The example resolution distribution 5410 of FIG. 54 identifies the foveal zone 5406 as being a plateau of the high resolution zone 5418. For example, the distribution 5410 may be a Gaussian distribution, a super Gaussian distribution, a normal or "bell curve" distribution, a Cauchy distribution, and so on. In some embodiments, the distribution 5410 may be governed by a function of mathematical equivalence or resemblance to a function describing the frequency response of one of any of a variety of different types of filters, including linear bandpass filters, pulse shaping filters, and other types of signal processing filters. For example, in at least some of these embodiments, the distribution 5410 may be governed by a mathematical function equivalent or similar to that which describes the frequency response of a raised-cosine filter, a root-raised-cosine filter, a sinc filter, a Gaussian filter, a Butterworth filter, a Chebyshev filter, a Bessel filter, and so on. As illustrated, the distribution 5410 identifies a resolution at which to render virtual content based on the virtual content's angular distance from a center of a field of view. While the distribution 5410 is illustrated as being dependent on angular distance, it should be understood that the distribution 5410 may further be dependent on depth (e.g., different depths along a same angular distance may be rendered at different resolutions). For example, and as will be described in FIG. 56, the resolution distribution 5410 may be a multivariate normal distribution.

A wearable display may utilize, at least in part, the distribution 5410 to render virtual content. For example, virtual content within the foveal zone 5406 may be rendered at a maximum resolution. However, virtual content presented outside of this foveal zone 5406 may be rendered at decreasing resolutions. FIG. 54 illustrates that for any angular distance, a particular resolution may be determined based on the distribution 5410. However, it should be understood that ranges of angular distances may be assigned a same resolution. For example, the high resolution zone 5418 may extend from a particular angular distance on either side of a center of a user's field of view. Optionally, virtual content presented in this high resolution zone 5418 may be rendered at a same resolution. Additionally, another example zone (e.g., a medium resolution zone outside of the high resolution zone 5418) may be defined by a first angular distance 5412A and a second angular distance 5412B. Optionally, virtual content presented in this medium resolution zone may be assigned a same resolution (e.g., a maximum resolution assigned to any angular distance within the portion, an average resolution, a lowest resolution, and so on). While FIG. 54 illustrates a foveal zone 5406, a high resolution zone 5418, and a medium resolution zone (e.g., between angular distances 5412A, 5412B), it should be understood that the resolution distribution 5410 may be subdivided into multitudes of zones.

The example resolution distribution 5410 may be based, at least in part, on the foveal zone 5406 and a rolloff 5414. As mentioned above with reference to FIGS. 11A1, 11C, and 12A, in some examples, a rolloff attribute of a resolution distribution, such as rolloff 5414 of resolution distribution 5410, may correspond to a drop-off in resolution. With respect to the example of the distribution 5410 being Gaussian, the rolloff 5414 may be related with a variance and/or standard deviation. Optionally, the rolloff 5414 may be measured in arcmin per degree of field of view. With respect to a super Gaussian distribution, the rolloff 5414 may additionally be related with a degree to which the content of a normal Gaussian's exponent is raised by a power. In embodiments where the distribution 5410 may be governed by a mathematical function equivalent or similar to that which describes the frequency response of a filter, such as a raised-cosine filter, the rolloff 5414 may be correspond to a roll-off factor ($\beta$) of the function. Thus, the rolloff 5414 may inform how quickly resolution reduces once an angular distance extends outside of the foveal zone 5406.

As will be described below, a wearable display system may learn values to utilize for the foveal zone 5406 and rolloff 5414. For example, a first user may have a foveal zone 5406 which encompasses a greater angular distance than a second user. As another example, a first user may have a same angular distance of a foveal zone 5406 as a second user, while the rolloff 5414 may be larger or smaller than the second user's. As another example, the wearable display system may utilize information aggregated from multitudes of users. For example, the system may utilize a same foveal zone 5406 angular distance for each user. Users may then adjust the angular distance to improve the functioning of the wearable display system for their unique visual system.

In addition to different users utilizing different foveal zones and rolloffs, the wearable display system may customize an angular distance encompassed by a foveal zone and/or customize a rolloff according to a type of virtual content being presented. For example, virtual content associated with a video game may be more perceptible to a user than virtual content comprising elements of nature (e.g., virtual trees located in their field of view). As an example, the video game content may not be similar to real-world content the user has previously seen. That is, the video game may present fantastical situations, characters, and so on, which may be more perceptible to the user than virtual trees, virtual bushes, and so on. As another example, and as will be described in FIG. 55C, the video game content may have a more varied frequency spectrum than virtual trees. Thus, in this example optionally the wearable display system may increase angular distances encompassed by the foveal zone. Optionally, the wearable display system may adjust the rolloff as different types of virtual content are presented. For example, the rolloff may be larger for the video game than for the nature virtual content. In this example, since the rolloff is larger the steepness of the distribution 5410 may be reduced. Therefore, the system may render virtual content for the video game at a same or greater resolution than for the nature virtual content.

These values may optionally be utilized to inform sizes, shapes, and so on, of differing resolution adjustment zones (e.g., as described above in FIGS. 10A-14). For example, the foveal zone 5406 may correspond to a highest resolution of virtual content. Additionally, one or more additional zones outside of the foveal zone 5406 may be assigned lesser resolutions at which to present virtual content. FIGS. 55A-55D illustrate examples of these additional zones along with variations in foveal zone 5406 and rolloff 5414 based on a type of virtual content presented.

Figure 55A:
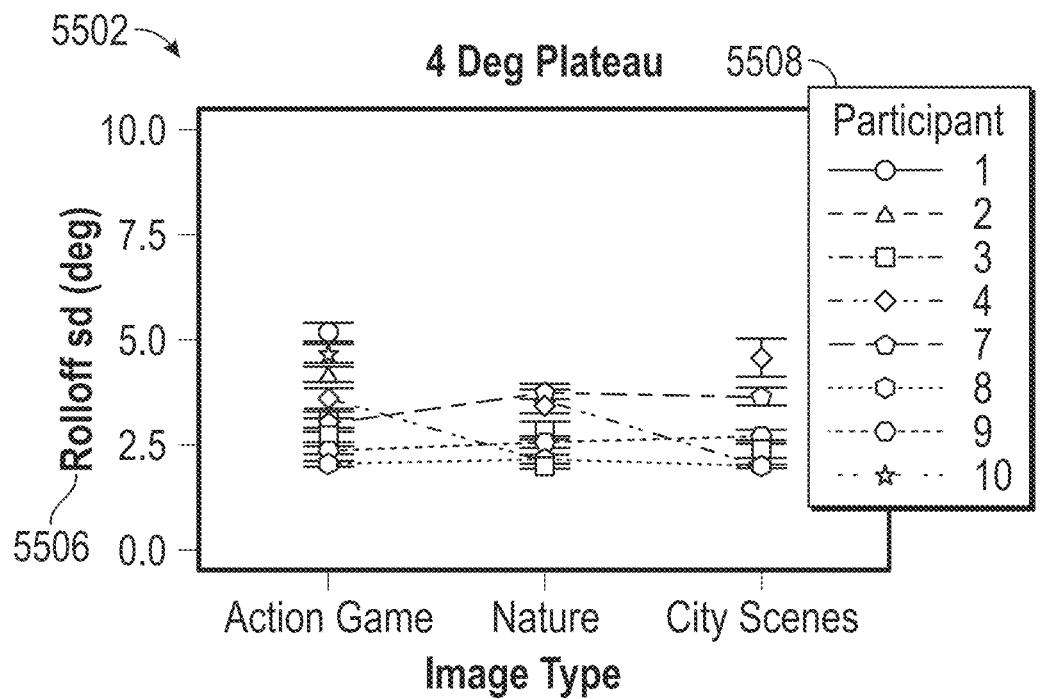
FIG. 55A-55B illustrate example schemes to identify a rolloff for a resolution distribution based on a type of virtual content.
Figure 55A:
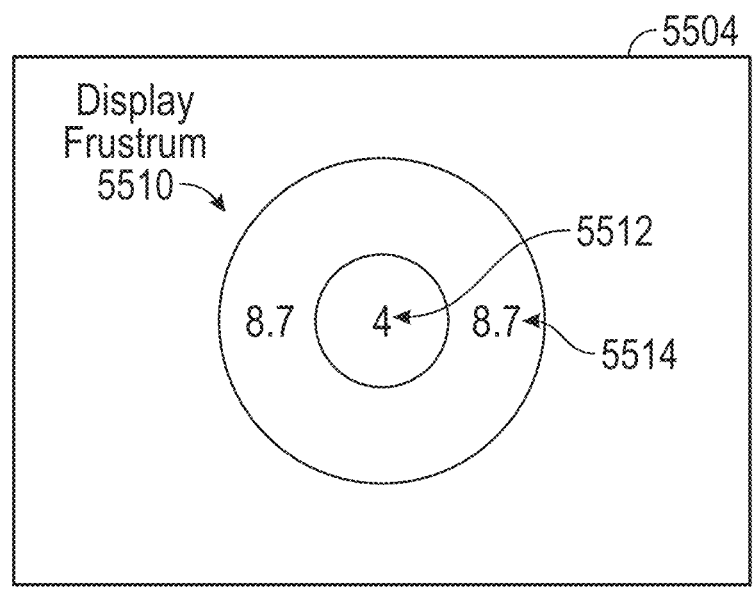

FIG. 55A illustrates an example scheme to identify a rolloff for a resolution distribution based on a type of virtual content. As described above, a resolution distribution may be utilized by a wearable display system to identify a resolution at which to render virtual content based on its angular distance from a center of a user's field of view. The resolution distribution may utilize a value of an angular distance encompassed by a foveal zone, along with a value of a rolloff.

To identify suitable values for the foveal zone and rolloff, users may be presented with low resolution virtual content via wearable display systems in a periphery of their field of view. For example, a wearable display system may select an angular distance at which to present virtual content. Optionally, the wearable display system may select an angular distance and a depth at which to present virtual content. The users may then indicate whether the virtual content appears blurry or otherwise appears perceptibly reduced in quality. For example, the virtual content may be presented at a lowered resolution or presented with blur applied to it. The periphery may encompass angular distances outside of a specified foveal zone. For example, the foveal zone may encompass a particular range of angular distances from a center of a field of view based on physiological characteristics of eyes. In the example of FIG. 55A, the foveal zone is specified as encompassing four degrees of a user's field of view. That is, the foveal zone has a radius of two degrees from a center of the user's field of view.

Optionally, and as described above, the display system may update presentation of virtual content during a particular eye movement of a user (e.g., a saccade). In this example, a size of a foveal zone may be dependent on a speed of the saccade, and optionally parameters of the display system such as system latency. Latency may include a latency associated with obtaining virtual content and updating presentation to the user. The size of the foveal zone may therefore optionally be determined based on the following formula:

$$\text{radial size of foveated zone } (\alpha) \, FOV \, (deg) = \\ \text{peak saccade velocity} \left(\frac{deg}{sec}\right) \times \text{total system latency (sec)}$$

FIG. 55A illustrates example results 5502 for different participants 5508 who were requested to indicate whether presented virtual content appeared blurry. As described above, the virtual content may be presented outside of a foveal zone. The virtual content presented to the participants 5508 may be separated according to type. Example types 5504 may include an action video game, nature, or city scenes. If a participant indicated that virtual content appeared blurry, a rolloff associated with a resolution distribution may be increased by a particular step size. Once the rolloff is increased, the virtual content may be presented to the participant again. That is, the wearable display system may render the virtual content at a new resolution determined based on the increased rolloff. Thus, the participant may specify a rolloff at which the presented virtual content does not appear blurry.

Based on the responses from the participants, a rolloff 5506 for each participant may be identified. For example, virtual content may be presented at different angular distances from each participant. As described in FIG. 54, different resolutions may be utilized to render the virtual content based on angular distance. Each participant may then cause the increase of the rolloff until the participant can't identify the virtual content as being blurry. A system may then determine a lowest rolloff for the participant at which reductions in resolution of virtual content were not perceptible. As illustrated in graph 5502, each participant has specified a particular rolloff 5506 according to a type 5504 of virtual content presented to the participant. As will be described in more detail below, based on the empirically determined result that type 5504 of virtual content may impact rolloff 5502, a wearable display system may monitor types of virtual content being presented to users. Thus, as the type of virtual content changes, the wearable display system may modify techniques to adjust resolution of virtual content.

FIG. 55A further illustrates an example display frustum 5510, along with two example resolution adjustment zones 5512, 5514. A first resolution adjustment zone 5512 is indicated as having a diameter of four degrees. This first resolution adjustment zone 5512 may therefore correspond with the foveal zone 5406 described above. Based on the determined rolloffs 5506 from the aggregated responses of participants 5508, an angular distance for a second resolution adjustment zone 5514 may be determined. For example, a system may determine a measure of central tendency of the rolloffs 5506 (e.g., a mean, a median, and so on). Based on this measure of central tendency, the system may determine an angular distance extending outside the first resolution adjustment zone 5512 for which the resolution is greater than a threshold. With respect to the example resolution adjustment distribution 5410 described in FIG. 54, the threshold may be greater than the low resolution 5416 illustrated on the distribution 5410. As another example, the threshold may be greater than a resolution assigned to angular distance 5412A.

In the example of FIG. 55A, the second resolution adjustment zone 5514 has been determined to extend '8.7' degrees further than an edge of the first resolution adjustment zone 5512. Thus, the determined zones (e.g., high resolution zone 5118) encompass an angular distance of '21.4' degrees of a user's field of view. Optionally, when rendering virtual content, a wearable display system may render all virtual content at a same resolution that falls within the second resolution adjustment zone 5514. For example, the resolution may be an average of resolutions for the range of angular distances encompassed by the second resolution adjustment zone 5514. Optionally, outside of the second resolution adjustment zone 5514, a wearable display system may render all virtual content at a lowest resolution. Optionally, a wearable display system may further separate these resolution adjustment zones 5512, 5514. For example, the second resolution adjustment zone 5514 may be subdivided into additional resolution adjustment zones. Each of these subdivided resolution adjustment zones may be assigned a particular resolution at which to render virtual content.

While the description above focused on using different participants 5508 to identify a rolloff value, it should be understood that the techniques described above may be customized for each user. For example, a wearable display system may perform a training routine for a user of the wearable display system. The system, as described above, may present virtual content at reduced resolutions in the user's periphery. The user may then indicate when the virtual content is not perceptibly reduced in quality, thus informing a rolloff for the user. The wearable display system may then utilize this rolloff thereafter.

Figure 55B:
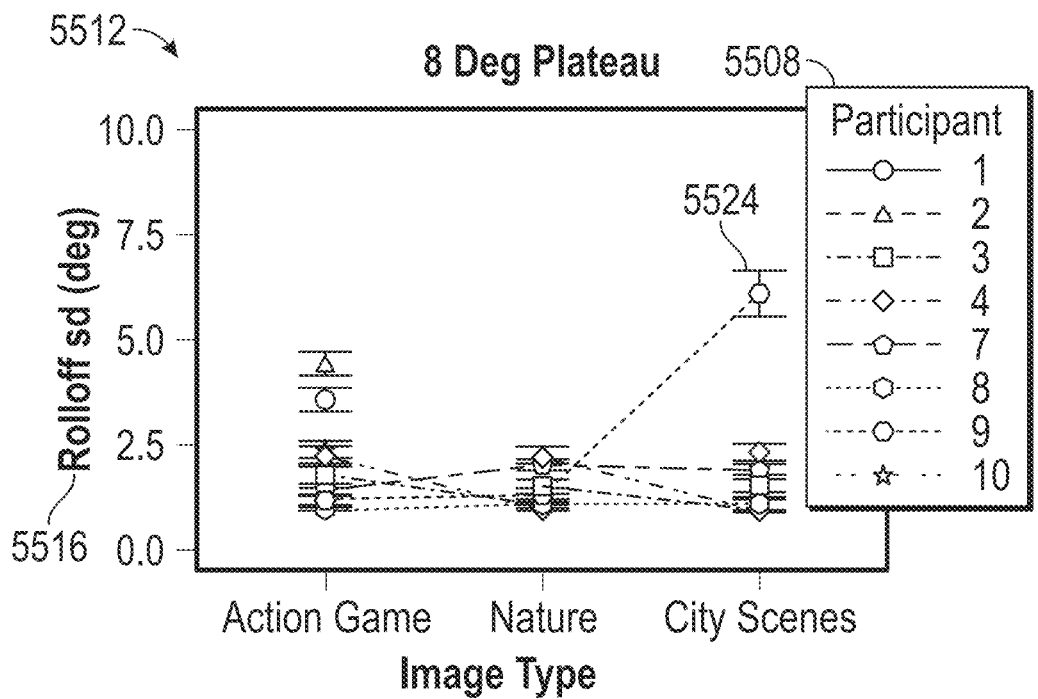
Figure 55B:
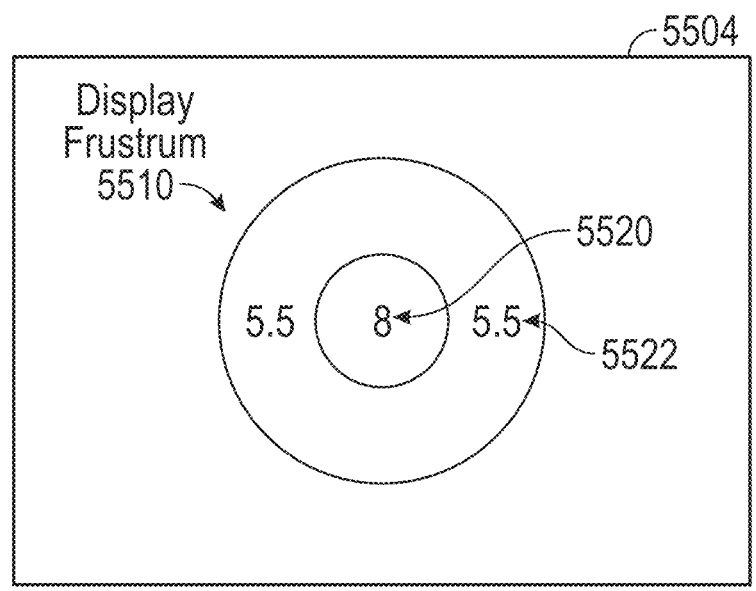

FIG. 55B illustrates an example scheme to identify a rolloff for a resolution distribution based on a type of virtual content. As illustrated, a foveal zone is indicated as encompassing an angular distance of '8' degrees. In contrast to FIG. 55A, the foveal zone in this example is larger. As described above, wearable display systems may present reduced resolution virtual content to users in their peripheries (e.g., outside of the foveal zone). The users may then increase a value of a rolloff, and thus cause virtual content at a same angular distance to be rendered at a higher resolution. The user may continue increasing the rolloff until the virtual content is not perceptibly reduced in resolution.

As illustrated, a graph 5512 presents example rolloffs 5512 determined for the participants 5508 according to a type 5504 of virtual content presented to the participants 5508. Based on the example rolloffs, first and second resolution adjustment zones 5520, 5522, may be determined. For example, an average rolloff may be determined from the example rolloffs 5512. Optionally, outliers (e.g., rolloff 5524) may be discarded. The average rolloff may then be utilized to determine an angular distance of the second resolution adjustment zone 5522. An angular distance encompassed by the first resolution adjustment zone 5520, for example a foveal zone, is eight degrees as described above. Based on this angular distance, and the determined rolloffs 5516, an angular distance for the second resolution adjustment zone 5522 is indicated as extending '5.5' degrees from an edge of the first zone 5520. The first and second zones 5520, 5522, therefore encompass 19 degrees of a user's field of view. Thus, the second resolution adjustment zone 5522 encompasses a smaller angular distance than the second resolution adjustment zone 5514 of FIG. 55B.

Figure 55C:
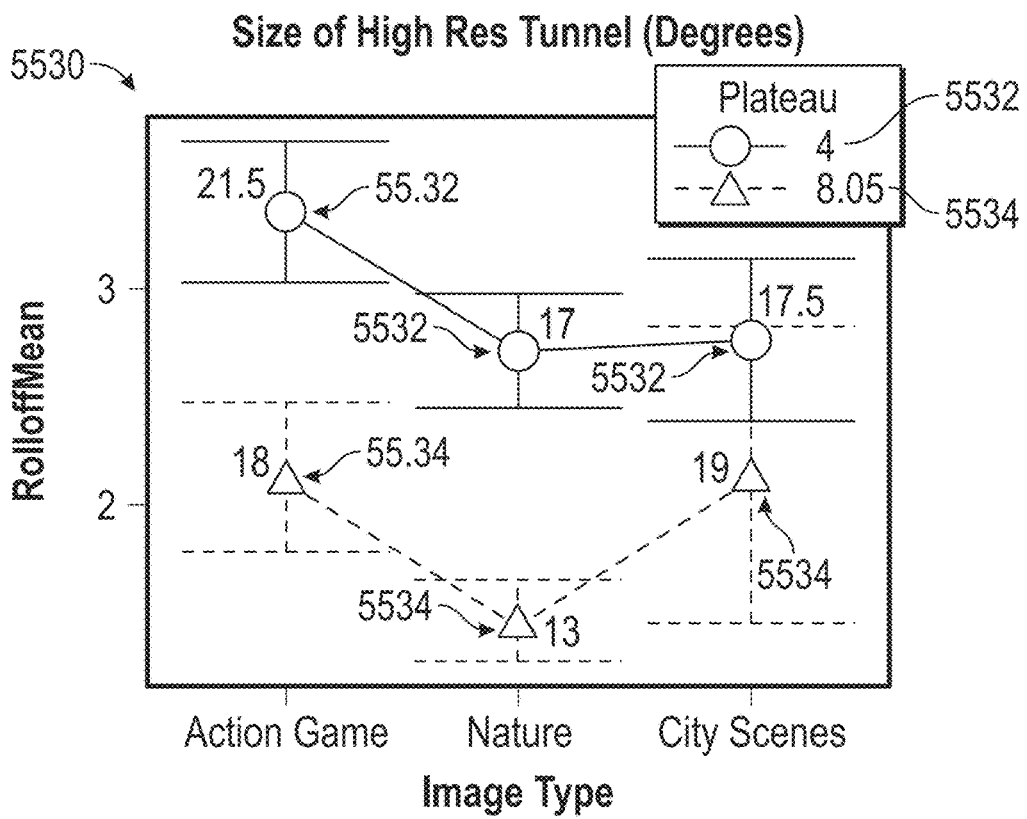
FIG. 55C-55D illustrate graphs of average rolloffs determined for different types of image content.

FIG. 55C illustrates a graph 5530 of average rolloffs determined for different types of image content. FIG. 55C illustrates rolloffs for differing angular distances encompassed by foveal zones. For example, the first foveal zone 5532 of FIG. 55A encompasses four degrees of a user's field of view. As another example, the second foveal zone 5534 of FIG. 55B encompasses eight degrees of a user's field of view. These different foveal zones 5532, 5534, may result in different determined average rolloffs. As illustrated, the first foveal zone 5532 may require greater average rolloffs, and thus a greater angular distance encompassed by a second resolution adjustment zone, than the second foveal zone 5534.

As described above, the average rolloffs are dependent on a type of image content being presented to the participants. Indeed, rolloffs may be determined to be greater for image content with varied frequency dependence. That is, virtual content illustrating nature or calm city scenes may have an inverse spatial frequency spectrum (e.g., a power spectral density is inversely proportional to frequency) to a flat spatial frequency spectrum. In contrast, virtual content illustrating video game action may have a more varied frequency spectrum. Thus, virtual content illustrating synthetic images may tend to require more gradual rolloffs as compared to virtual content illustrating natural images.

Figure 55D:
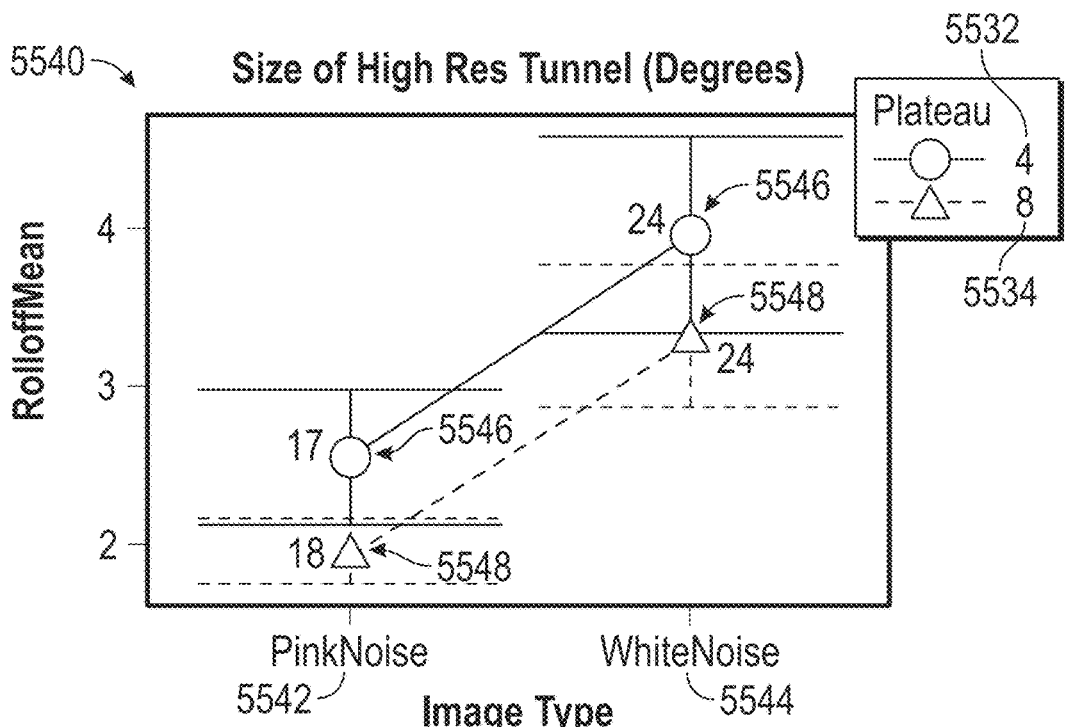

FIG. 55D illustrates a graph 5540 of average rolloffs determined for different types of presented image noise. The types of noise presented include pink noise 5542 and white noise 5544. As is known in the art, white noise includes signals with a power spectral density that is substantially flat in frequency. Pink noise includes signals with a power spectral density that is inversely proportional to frequency. Thus, with respect to pink noise intensities of higher frequencies are reduced as compared to white noise. Since pink noise reduces higher frequencies in intensity, it may be understood that virtual content conforming to pink noise may appear less chaotic or random to users. Thus, users may be less able to identify whether the pink noise was blurred when presented in their periphery. In contrast, white noise may be more noticeable (e.g., the white noise may appear sharper to users). Thus, users may be more able to identify whether the white noise was reduced in resolution when presented in their periphery.

As illustrated in FIG. 55D, average rolloffs were determined for the differing angular distances of foveal zones described above (e.g., 4 degrees 5546 and 8 degrees 5548). In conformance with the theory described herein, average rolloffs for white noise 5544 were determined to be greater than average rolloffs for pink noise 5542. That is, white noise is more similar to the video game virtual content than the nature virtual content described in FIGS. 55A-55C. Similarly, an angular distance encompassed by the foveal zone and second resolution adjustment zones (e.g., as illustrated in FIGS. 55A-55B), which in the illustration is referred to as a 'high resolution tunnel', is greater for the white noise 5544 than for the pink noise 5542. That is, since the rolloffs determined for the white noise 5544 are greater, a width of a corresponding resolution distribution (e.g., as illustrated in distribution 5410 in FIG. 54) may also be greater. Thus, the resolution distribution for white noise 5544 encompasses a larger angular distance for which resolutions are greater than a threshold (e.g., greater than a low resolution 5416).

Thus, it may be appreciated that a resolution distribution may be based on features of a foveal zone and a rolloff. As an example, a foveal zone may be defined based on an angular distance encompassed by the foveal zone. For example, and with respect to FIG. 55B, an example angular distance may be eight (8) degrees. With respect to the resolution distribution being a Gaussian or raised-cosine distribution, the foveal zone may thus correspond with a plateau portion (e.g., plateau 5406 in FIG. 54). As described above, the rolloff may additionally impact a resolution distribution. For example, the rolloff may more sharply reduce a resolution as a virtual object is located farther from a foveal zone.

In some embodiments, certain features of a resolution distribution may be adjusted during operation. For example, a rolloff may be adjusted. In this example, the rolloff may, as an example, be adjusted based on a user preference (e.g., the user may notice a reduced resolution and, as a result, specify a more gradual rolloff with distance from the fixation point). As another example, a plateau width (e.g., angular distance encompassed by a foveal zone) may be adjusted. In some embodiments, certain features of a resolution distribution may be held constant during operation. For example, an area under a resolution distribution may be held constant.

In this example, the average value (e.g., mean of the distribution) may be held constant, such that an average resolution may be achieved. Thus, if a rolloff is adjusted then the plateau width may be adjusted. Similarly, if the plateau width is adjusted then the rolloff may be adjusted. As an example, the display system may dynamically redistribute pixels (e.g., such that the resolution in a given region of the user's field of view may be dynamically increased and decreased), but it may not actually adjust the total quantity of pixels available to represent virtual content.

In some embodiments, certain features of a resolution distribution may have constraints. For example, an angular distance encompassed by a foveal zone may have a minimum (e.g., a minimum plateau width). As another example, the resolution distribution may be constrained such that it never falls below a specific minimum width (e.g., the angular width of an average human fovea or the radial size of foveated zone).

Example Flowcharts

Figure 56:
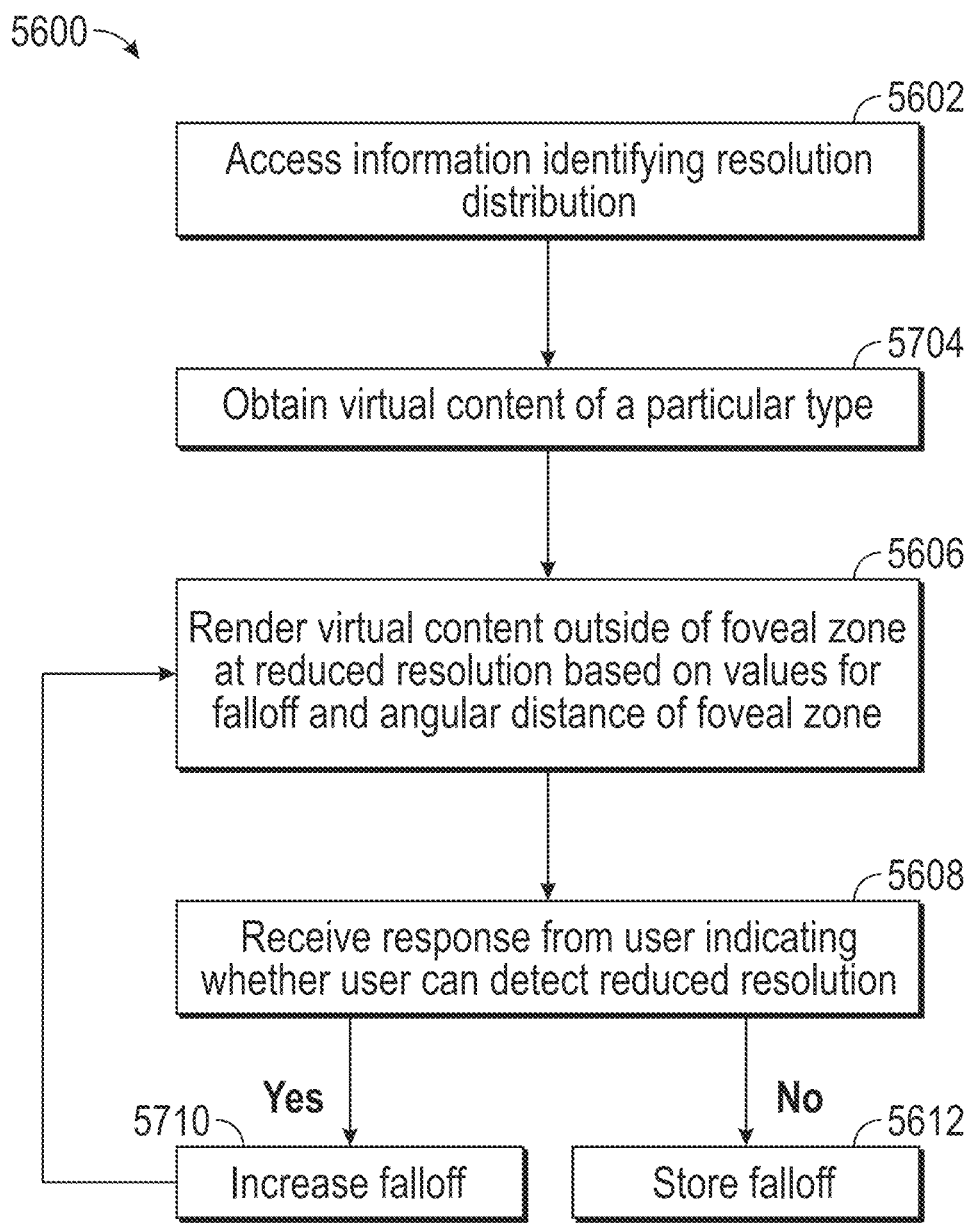
FIG. 56 illustrates a flowchart of an example process 5600 for determining a rolloff to be utilized in a resolution distribution.

FIG. 56 illustrates a flowchart of an example process 5600 for determining a rolloff to be utilized in a resolution distribution. For convenience, the process 5600 may be described as being performed by a display system (e.g., the wearable display system 60, which may include processing hardware and software, and optionally may provide information to an outside system of one or more computers or other processing, for instance to offload processing to the outside system, and receive information from the outside system).

The process 5600 describes a user training the display system to the user's particular visual acuity. The user may view virtual content in a periphery of the user's field of view (e.g., outside of a foveal zone), and may specify whether the virtual content appears blurry. If the user positively specifies the virtual content as being blurry, the display system may increase a rolloff associated with a resolution distribution. The same, or different, virtual content may then be presented to the user. Since the rolloff was increased, the virtual content may be rendered at a greater resolution. The user may then indicate whether the rolloff still appears blurry. In this way, the display system may determine a rolloff for the user such that reductions in resolution are imperceptible. Additionally, and as described above in FIGS. 55A-55D, the process 5600 may be performed for multitudes of users. Based on responses of these users, an average rolloff may be determined. This average rolloff may then be used for all users. For example, the average rolloff may be used as a default rolloff. A user may then adjust this average rolloff according to the techniques described herein.

At block 5602, the display system access information identifying a resolution distribution. To identify a resolution at which to render virtual content located in a user's field of view, the display system may utilize a resolution distribution (e.g., resolution distribution 5410 illustrated in FIG. 54). As described above, the resolution distribution may inform selection of a resolution based on an angular distance of virtual content from a center of a user's field of view. As will be described below, to inform a shape associated with the resolution distribution, the display system may adjust a rolloff (e.g., a Gaussian rolloff) utilized in the resolution distribution.

At block 5604, the display system obtains virtual content of a particular type (block 5604). Since, as described above with respect to FIGS. 55A-55D, users may have a greater ability to notice reductions in resolution of certain types of virtual content, the display system may advantageously present differing types of virtual content. For example, the types may include video game virtual content, nature-based virtual content, office-based virtual content (e.g., documents, spreadsheets, animations, and so on), calm city scenes, suburban scenes (e.g., trees, houses), and so on. At block 5604, the display system may therefore select from among these differing types. For example, the display system may select a particular type of virtual content and then keep presenting virtual content of the selected type until a user of the display system ceases adjusting a rolloff.

At block 5606, the display system renders the obtained virtual content outside of a foveal zone. The display system may identify a resolution (e.g., reduced from a highest resolution) at which to render the obtained virtual content based on the accessed resolution distribution. As described above, with respect to at least FIG. 12A, the display system may determine a point at which the user is fixating. This fixation point (e.g., three-dimensional fixation point) may be utilized as a center of the user's field of view. As describe above, the resolution distribution may be defined, at least in part, by a value of an angular distance encompassed by a foveal zone and a value of a rolloff. The display system may thus select an angular distance, from the determined center of the user's field of view, at which to render the obtained virtual content.

For example, and with respect to FIG. 54, the display system may optionally utilize an angular distance greater than an edge of a foveal zone 5406, but less than an edge corresponding to a low or lowest resolution 5416. For example, the angular distance may be included in a high resolution zone, medium resolution zone, and so on as described above. The display system may then obtain, based on the selected angular distance and resolution distribution, a resolution at which to render the virtual content. Optionally, and as described above, the resolution distribution may be divided into zones. In this example, the display system may utilize a greatest resolution within a zone that includes the selected angular distance. As another example, the display system may utilize an average resolution within the zone.

Furthermore, the resolution distribution may depend on a depth along the angular distance. That is, and as described above in FIGS. 11A1-11E, a resolution at which to render virtual content may depend on three-dimensional distance of the virtual content from a user's fixation point. While the description above has focused on angular distance, it should be understood that the resolution distribution accessed in block 5602 may include depth information. Thus, the resolution distribution may be, for example, a multivariate normal distribution. In this example, the display system may select an angular distance and optionally a depth from the user. As described in FIGS. 11A1-11E, increased depth may cause a reduction in resolution. However, for angular distances that are included in a foveal zone, virtual content at any depth along the angular distances may be rendered at a high resolution.

The display system may then present the rendered virtual content to the user of the display system. For example, the virtual content may be presented at the selected angular distance (e.g., a centroid of the virtual content may correspond to a three-dimensional location along the selected angular distance). As another example, the virtual content may be presented at a particular depth from the user as described above.

At block 5608, the display system receives a response indicating whether the user may detect if the virtual content has been reduced in resolution. For example, the display system may respond to user input obtained from one or more devices (e.g., controllers, remotes, and so on). As another example, the display system may monitor movements of a user's hands or other extremities. In this example, the display system may determine that the user is performing a particular hand motion to indicate that blurriness is evident (e.g., the user may wave his/her hands back and forth). As another example, a shaking of the user's head from left to right may indicate a response. For example, the response may indicate a 'no', such that the user cannot detect the blurriness. Similarly, a shaking of the user's head up and down may indicate a 'yes', such that the user may detect the blurriness.

If the user may detect that the virtual content has been reduced in resolution, at block 5610 the display system may increase the rolloff. For example, the rolloff may be increased by a particular step size, such as 0.3, 0.6, 0.7, or 1.1 arcmin/deg. The display system may then render the same, or different, virtual content based on the increased rolloff. Blocks 5606 through 5610 may be repeated until the user indicates he/she cannot identify a reduction in resolution.

If the user cannot detect that the virtual content has been reduced in resolution, at block 5612 the display system may store the rolloff. Optionally, the stored rolloff may be utilized for the user thereafter. Since rolloffs, as described above, may be dependent on a type of virtual content, the display system may determine rolloffs for the differing types. When presenting virtual content of a certain type, the display system may optionally utilize a rolloff specific to the type.

Figure 57:
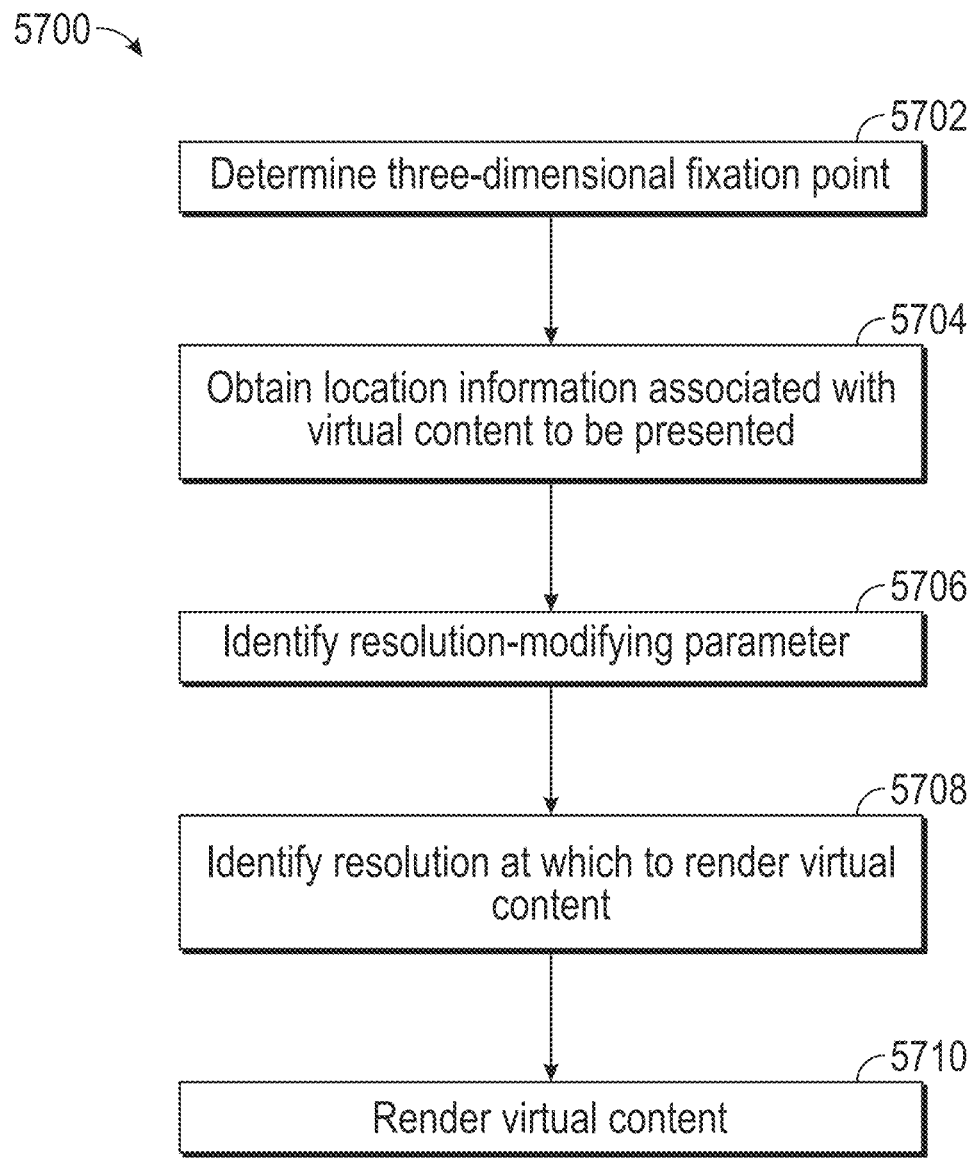
FIG. 57 illustrates an example flowchart of a process for presenting virtual content according to a type of the virtual content.

FIG. 57 illustrates an example flowchart of a process 5700 for presenting virtual content according to a type of the virtual content. For convenience, the process 5700 may be described as being performed by a display system (e.g., the wearable display system 60, which may include processing hardware and software, and optionally may provide information to an outside system of one or more computers or other processing, for instance to offload processing to the outside system, and receive information from the outside system).

At block 5702, the display system determines a fixation point of a user. For example, the fixation point may be a three-dimensional fixation point. As described above, with respect to at least FIG. 12A, the display system may monitor eyes of the user and identify a location at which vectors extending from each eye intersect (e.g., a vergence point).

At block 5704, the display system obtains location information associated with virtual content to be presented. The display system may identify a location, such as a three-dimensional location, at which particular virtual content is to be presented. As described in FIGS. 54-57, the location may optionally be specified according to polar coordinates (e.g., an angle from a center of the user's field of view, and a distance along the angle).

At block 5706, the display system identifies, or obtains, a resolution-modifying parameter. An example resolution-modifying parameter may be a type of the virtual content. Another example resolution-modifying parameter may include a user preference. For example, the user preference may indicate an adjustment to a resolution distribution (e.g., as described in FIG. 56). With respect to the example of a type that particular content may be categorized as, the display system may optionally access metadata, or other information, that indicates the type. In this example, if the user is playing a video game, the display system may access information specifying the video game. As another example, the display system may analyze a power spectral density of the virtual content. The display system may then identify whether the virtual content is more similar to a particular type of virtual content (e.g., video game data, nature, and so on as described herein). In this example, the display system may determine that the frequency spectrum is varied, or that the frequency spectrum is closer to a particular type of noise (e.g., pink noise, white noise). Based on these comparisons, the display system may select a closest type of virtual content to the obtained virtual content.

At block 5708, the display system identifies a resolution at which to render the virtual content. As described in FIG. 54, the display system may utilize a resolution distribution to identify the resolution. Based on the obtained virtual content's location information, and identified type of virtual content, the display system may prefer to utilize a particular resolution distribution. For example, the particular resolution distribution may have a rolloff determined for the identified type of virtual content (e.g., as described in FIG. 56). Optionally, for a type of virtual content which is similar to two or more types of virtual content, the display system may combine characteristics of resolution distributions specific to each. For example, the display system may utilize an average value of a size of a foveal zone or an average value of a rolloff. As another example, the system may utilize a largest value of a rolloff to ensure virtual content is rendered at a highest resolution.

At block 5710, the display system renders the virtual content. The display system may thus render the virtual content at the identified resolution. As described above, the user may update the resolution distribution if the user identifies blurriness in presented virtual content. For example, the user may update a rolloff via settings of the wearable display system. As another example, the user may classify virtual content as corresponding to particular types. In this way, if the display system incorrectly identifies the type of virtual content in block 5706, the user may update the classification.

Adjusting Resolution of Virtual Content

Virtual content may be adjusted in resolution to reduce processing and power requirements. Examples of adjusting resolution may include, for example, adjusting a polygon count, texture information, shader or lighting effects, and so on. As described above with respect to at least FIGS. 11A-11E, different resolution adjustment zones may be utilized. Virtual content located within each zone may be adjusted based on a resolution assigned, or determined, for that zone. As described above, a particular resolution adjustment zone (e.g., a foveal zone) may encompass a particular angular distance within a user's field of view, and virtual content within this particular resolution adjustment zone may be rendered at a highest resolution.

A portion of a user's field of view, referred to herein as a high resolution zone or tunnel (e.g., high resolution zone 5418 illustrated in FIG. 54), may encompass the foveal zone and one or more zones extending outwards from the foveal zone. For virtual content presented in this high resolution zone, the display system may identify a resolution at which to render the virtual content. As illustrated in FIGS. 55A-55D, an example angular distance of a high resolution zone may encompass between about 18 degrees to about 20 degrees of a user's field of view. This example angular distance may optionally be increased due to one or more sources of error. Additionally, this example angular distance may include a notch in it to account for a blind spot of a user. Virtual content located in this notch may be advantageously be reduced in resolution.

For virtual content located proximate to an edge of a resolution adjustment zone, or for virtual content that encompasses an edge, the display system may adjust a resolution distribution, size, position, and/or geometry associated with the resolution adjustment zones. Optionally, if the virtual content is of relatively stark contrast, the display system may adjust the parameters described above. This is because the boundary between resolution adjustment zones (e.g., a foveal zone and surrounding zones) may become more discernible to a user in the presence of such an edge or border of stark contrast.

In addition, adjusting resolution may include the display system adjusting a refresh rate associated with different portions of a user's field of view. For example, as described above with respect to at least FIG. 43, a display system 21000 may include a foveal tracker 21006, which may take the form of a scanning mirror (e.g., MEMs mirror). In this example, the display system 21000 may utilize at least two multiplexed virtual content images (e.g., multiplexed in time or polarization) to present both high resolution and low resolution virtual content to a user. These different resolutions may be generated via a same MEMS mirror (e.g., as described above). As described in FIGS. 38A-38B, a high-resolution image with low field of view (e.g., image stream 16020) may be positioned within a central vision of a user and may correspond to a native MEMS project field. A low-resolution image that covers a high field of view, for example image stream 16010), may be an optically expanded version of the MEMS projector field. The high resolution low field of view region may be tracked, for example based on an eye tracker. This may enable a lower scan angle and speed requirement for the MEMS mirror.

Figure 58A:
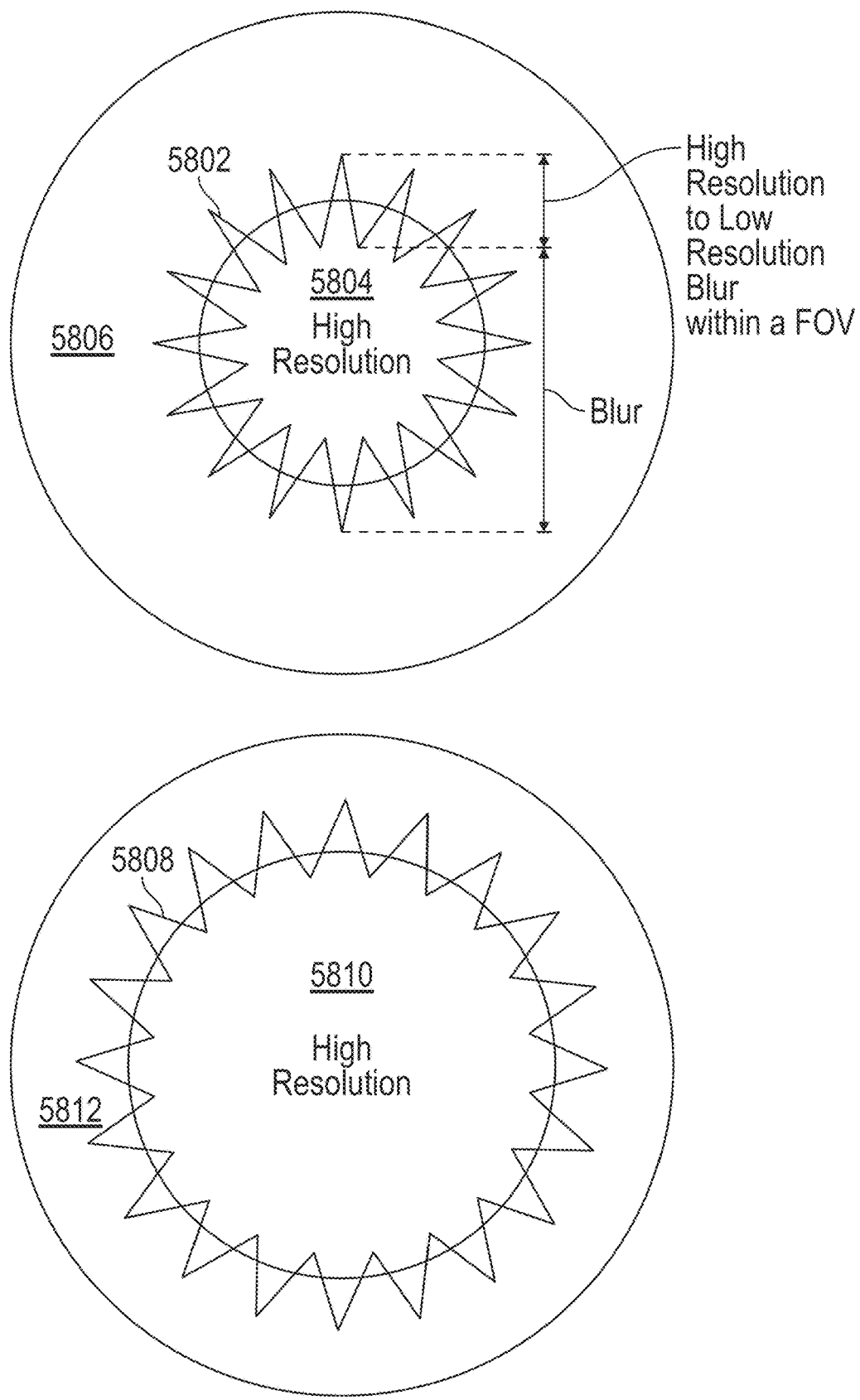
FIG. 58A illustrates two example blurring regions.

As will be described below, the display system may optionally apply blur to virtual content located proximate to edges of these resolution adjustment zones. FIGS. 58A-59 illustrate examples of blurring regions between resolutions adjustment zones. These blurring regions may be utilized to hide a boundary between a higher resolution adjustment zone and a lower resolution adjustment zone.

FIG. 58A illustrates two example blurring regions 5802, 5808. The blurring regions may cause virtual content located, at least in part, within the blurring regions to be blurred, thus masking the transition between a low-resolution zone (e.g., zone 5806) and a higher resolution zone (e.g., zone 5804). For example, virtual content located partially in the low-resolution zone 5806, and partially in the blurring region 5802, may be rendered at a resolution corresponding to the low-resolution zone 5806. The blurring may therefore limit an extent to which a user is aware of the reduced resolution. Optionally, the virtual content may be rendered according to the high-resolution zone 5808, and a portion extending into the blurring region 5806 may be blurred. The blurring regions 5802, 5808, may be of a particular size and/or shape. For example, the blurring regions may form a starburst pattern. This starburst pattern may optionally be extended in depth according to the techniques described in FIGS. 11A-11E.

As described above in FIG. 14, an example blurring process may include the display system performing a convolution of a kernel associated with blurring (e.g., a Gaussian kernel, circular kernel such as to reproduce a bokeh effect, box blur, and so on) to the content. In this way, the reduction in resolution may be masked, while the processing savings from reducing the resolution may be maintained. Optionally, a strength associated with the blurring process (e.g., a degree to which the content is blurred) may be based on a difference in depth between the user's fixation point and the content, and/or an angular proximity of the content to the user's gaze. For example, the degree of blurring may increase with increasing proximity to the user's gaze.

Figure 58B:
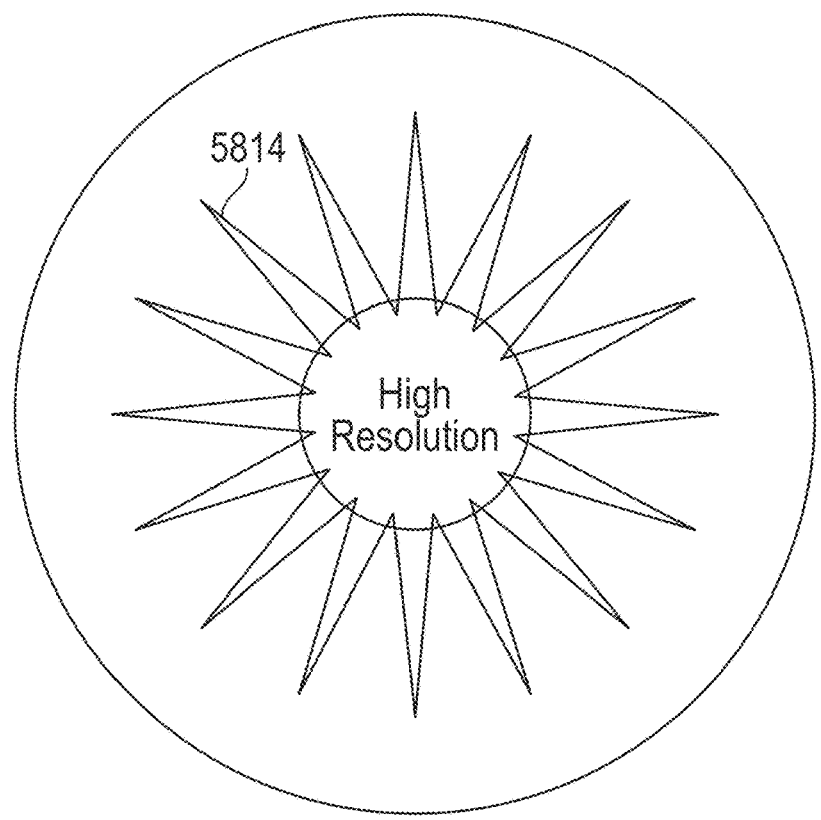
FIG. 58B illustrates two additional example blurring regions.
Figure 58B:
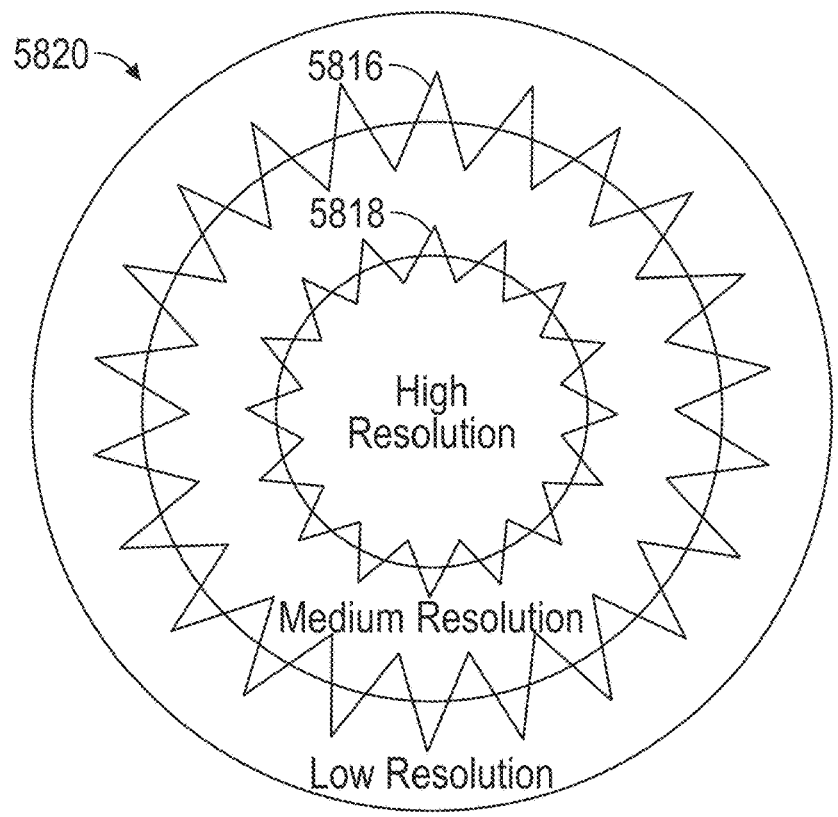
Figure 59:
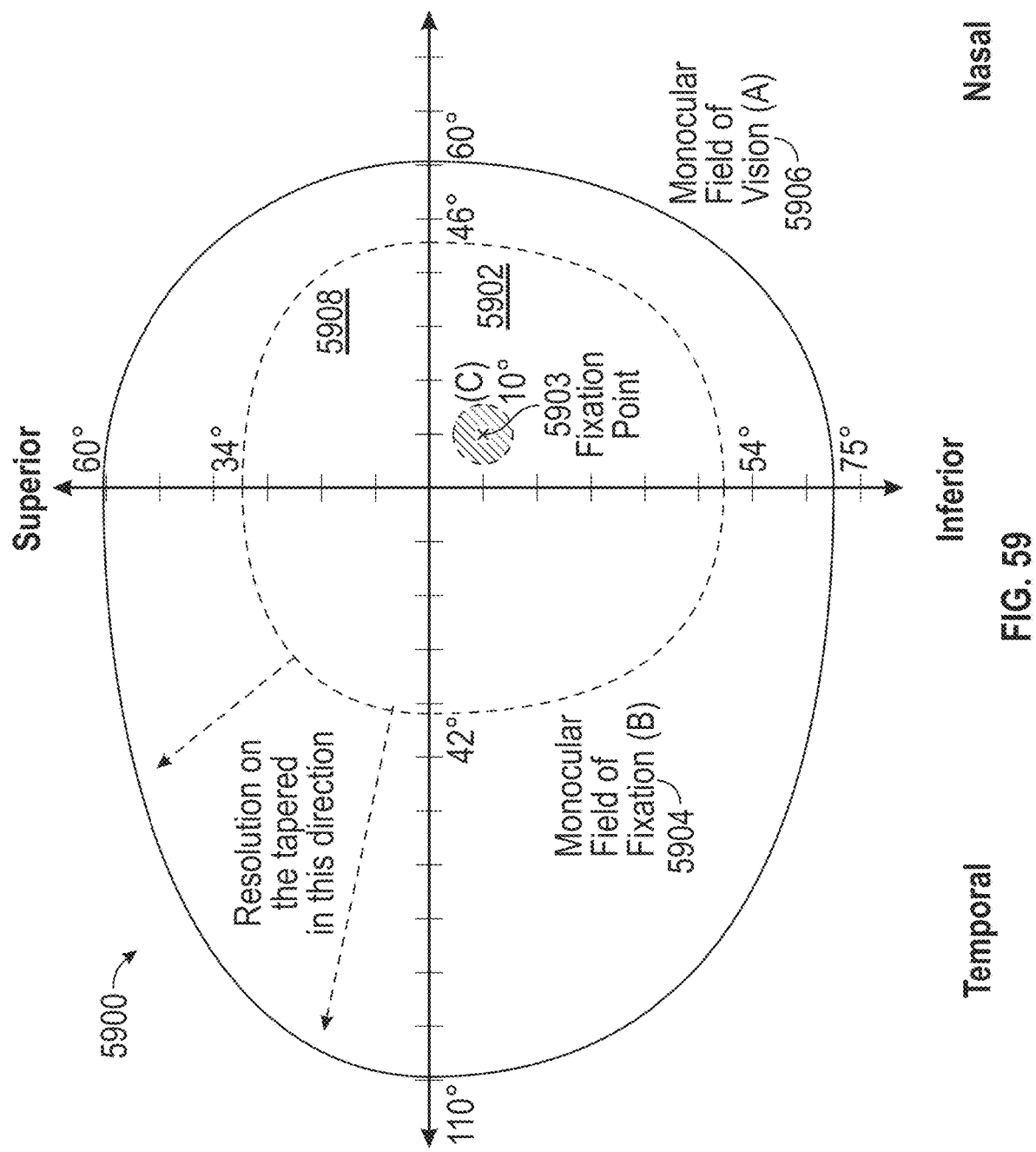
FIG. 59 illustrates an example of different resolution adjustment zones according to the techniques described herein.

FIG. 58B illustrates two additional example blurring regions 5814-5818. These blurring regions 5814-5818, may be similar to the blurring regions of FIG. 58A, but may be different in one or more of shape, size, and so on. For example, the starburst pattern of blurring region 5814 may be larger than the starburst pattern of blurring regions 5802, 5808. Additionally, for portion 5820, two blurring regions are illustrated. For example, blurring region 5816 may separate a zone of low resolution from a zone of medium resolution. Additionally, blurring region 5818 may separate a zone of medium resolution from a zone of high resolution.

FIG. 59 illustrates an example 5900 of different resolution adjustment zones according to the techniques described herein. In the illustration, a first zone 5902 may correspond to a foveal zone. As described above, the foveal zone may encompass a user's fixation point 5903. Additionally, a second zone 5904 (e.g., outside of the first zone 5902) is illustrated along with a third zone 5906. Each of these resolution adjustment zones may cause resolutions of virtual content located within the zone to be rendered at a particular resolution. Additionally, an edge between zones (e.g., edge 5908) may be associated with a blurring region as illustrated in FIGS. 58A-58B.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It will also be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A head-mounted display system comprising:
a display configured to output light with a plurality of levels of wavefront divergence, wherein different levels of wavefront divergence correspond to different distances from a fixation point of a user's eyes;
one or more processors; and
one or more computer storage media storing instructions that when executed by the one or more processors, cause the one or more processors to perform operations comprising:
determining the fixation point of the user's eyes;
obtaining location information associated with a first virtual object to be presented to the user via the display;
obtaining a resolution-modifying parameter of the first virtual object;
identifying, based on the location information and the resolution-modifying parameter of the first virtual object, a particular resolution at which to render the first virtual object, wherein the particular resolution is based on a resolution distribution specifying resolutions for corresponding distances from the fixation point, wherein identifying the particular resolution comprises associating different resolutions with different levels of wavefront divergence, wherein a field of view of the user is separated into a plurality of portions based on the resolution distribution, and wherein, for a particular depth or range of depths, each portion is assigned an associated resolution at which to render virtual content; and
causing presentation to the user, via the display, of the first virtual object rendered at the identified resolution by outputting light from the display with a level of wavefront divergence associated with the identified resolution.

2. The head-mounted display system of claim 1, wherein the resolution-modifying parameter comprises a content type associated with the first virtual object, wherein the operations further comprise:
accessing a plurality of resolution distributions, the plurality of resolution distributions associated with respective content types; and
selecting, from the plurality of resolution distributions, a particular resolution distribution based on the content type of the first virtual object, wherein the particular resolution comprises the particular resolution distribution.

3. The head-mounted display system of claim 2, wherein the content type associated with the first virtual object is identified based on a frequency spectrum associated with the first virtual object.

4. The head-mounted display system of claim 3, wherein the plurality of resolution distributions are associated with respective rolloffs in resolution away from the fixation point, wherein values of the rolloffs differ for content with different frequency spectrums.

5. The head-mounted display system of claim 1, wherein the resolution-modifying parameter is a user selectable value.

6. The head-mounted display system of claim 5, wherein the display is configured to adjust the particular resolution, and wherein adjusting the particular resolution comprises:
causing presentation to the user, via the display, of a second virtual object, the second virtual object being rendered with the resolution distribution identified for the first virtual object;
receiving, from the user, a response indicating user detection of reduction in resolution of the second virtual object, wherein the user response is the user selectable value; and
adjusting the particular resolution distribution.

7. The head-mounted display system of claim 6, wherein adjusting the particular resolution distribution comprises:
adjusting a rolloff associated with the particular resolution distribution, wherein adjusting a rolloff changes an amount of resolution reduction based on a distance from the center of the field of view of the user.

8. The head-mounted display system of claim 1, wherein the fixation point is in a volume at the center of the field of view of the user.

9. The head-mounted display system of claim 1, wherein the operations further comprise:
determining a proximity of the first virtual object to a boundary of one of the plurality of portions; and
modifying a presentation of the first virtual objected based on the determined proximity.

10. The head-mounted display system of claim 1, wherein modifying a presentation of the first virtual objected based on the determined proximity comprises applying a blurring process to the virtual object.

11. The head-mounted display system of claim 1, wherein identifying the particular resolution at which to render the first virtual object comprises:
identifying a portion of the plurality of portions which encompasses the first virtual object; and
identifying the resolution based on the portion which encompasses the first virtual object.

12. A computer-implemented method, the method being performed by a head-mounted display system comprising one or more processors, and the method comprising:
determining a fixation point of a user's eyes;
obtaining location information associated with a first virtual object to be presented to the user via a display configured to output light with a plurality of levels of wavefront divergence, wherein different levels of wavefront divergence correspond to different distances from the fixation point of the user's eyes;
obtaining a resolution-modifying parameter of the first virtual object;
identifying, based on the location information and the resolution-modifying parameter of the first virtual object, a particular resolution at which to render the first virtual object, wherein the particular resolution is based on a resolution distribution specifying resolutions for corresponding distances from the fixation point, wherein identifying the particular resolution comprises associating different resolutions with different levels of wavefront divergence, wherein a field of view of the user is separated into a plurality of portions based on the resolution distribution, and wherein, for a particular depth or range of depths, each portion is assigned an associated resolution at which to render virtual content; and causing presentation to the user, via the display, of the first virtual object rendered at the identified resolution by outputting light from the display with a level of wavefront divergence associated with the identified resolution.

13. The computer-implemented method of claim 12, wherein the resolution-modifying parameter comprises a content type associated with the first virtual object, wherein the method further comprises:

accessing a plurality of resolution distributions, the plurality of resolution distributions associated with respective content types; and selecting, from the plurality of resolution distributions, a particular resolution distribution based on the content type of the first virtual object, wherein the particular resolution comprises the particular resolution distribution.

14. The computer-implemented method of claim 13, wherein the content type associated with the first virtual object is identified based on a frequency spectrum associated with the first virtual object.

15. The computer-implemented method of claim 13, wherein the plurality of resolution distributions are associated with respective rolloffs in resolution away from the fixation point, wherein values of the rolloffs differ for content with different frequency spectrums.

16. The computer-implemented method of claim 13, wherein the resolution-modifying parameter is a user selectable value.

17. Non-transitory computer storage media storing instructions that when executed by a head-mounted display system of one or more processors, cause the one or more processors to perform operations comprising:

determining a fixation point of a user's eyes;

obtaining location information associated with a first virtual object to be presented to the user via a display configured to output light with a plurality of levels of wavefront divergence, wherein different levels of wavefront divergence correspond to different distances from the fixation point of the user's eyes;

obtaining a resolution-modifying parameter of the first virtual object;

identifying, based on the location information and the resolution-modifying parameter of the first virtual object, a particular resolution at which to render the first virtual object, wherein the particular resolution is based on a resolution distribution specifying resolutions for corresponding distances from the fixation point, wherein identifying the particular resolution comprises associating different resolutions with different levels of wavefront divergence, wherein a field of view of the user is separated into a plurality of portions based on the resolution distribution, and wherein, for a particular depth or range of depths, each portion is assigned an associated resolution at which to render virtual content; and causing presentation to the user, via the display, of the first virtual object rendered at the identified resolution by outputting light from the display with a level of wavefront divergence associated with the identified resolution.

18. The non-transitory computer storage media of claim 17, wherein the resolution-modifying parameter comprises a content type associated with the first virtual object, wherein the operations further comprise:

accessing a plurality of resolution distributions, the plurality of resolution distributions associated with respective content types; and selecting, from the plurality of resolution distributions, a particular resolution distribution based on the content type of the first virtual object, wherein the particular resolution comprises the particular resolution distribution.

19. The non-transitory computer storage media of claim 18, wherein the content type associated with the first virtual object is identified based on a frequency spectrum associated with the first virtual object.

20. The non-transitory computer storage media of claim 18, wherein the plurality of resolution distributions are associated with respective rolloffs in resolution away from the fixation point, wherein values of the rolloffs differ for content with different frequency spectrums.

* * * * *